United States Patent [19]
Spilo

[11] Patent Number: 5,167,030
[45] Date of Patent: Nov. 24, 1992

[54] SYSTEM FOR DYNAMICALLY ALLOCATING MAIN MEMORY TO FACILITATE SWAPPING OF TERMINATE AND STAY RESIDENT COMMUNICATION PROGRAM TO INCREASE AVAILABLE MEMORY SPACE

[75] Inventor: Michael L. Spilo, Briarwood, N.Y.

[73] Assignee: Helix Software Company, Inc., Long Island City, N.Y.

[21] Appl. No.: 397,752

[22] Filed: Aug. 23, 1989

[51] Int. Cl.[5] .......................... G06F 12/02; G06F 9/06
[52] U.S. Cl. ................................. 395/425; 364/243.2; 364/246.11; 364/281.3; 364/239.7; 364/928.2; 364/939.3; 364/941.1; 364/967.4; 364/DIG. 1; 395/250; 395/650
[58] Field of Search ... 364/200 MS File, 900 MS File; 395/425, 500, 650

[56] References Cited

U.S. PATENT DOCUMENTS

| | | | |
|---|---|---|---|
| 3,618,045 | 11/1971 | Campbell | 340/172.5 |
| 4,622,013 | 11/1986 | Cerchio | 434/118 |
| 4,716,543 | 12/1987 | Ogawa et al. | 364/900 |
| 4,868,738 | 9/1989 | Kish et al. | 364/200 |
| 4,897,780 | 1/1990 | Lakness | 364/200 |
| 4,912,628 | 3/1990 | Briggs | 364/200 |
| 4,949,248 | 8/1990 | Caro | 364/200 |

FOREIGN PATENT DOCUMENTS 0311187 9/1988 European Pat. Off. .

OTHER PUBLICATIONS

Edward Mendelson, Swap shuffles RAM-hungry TSRs to hard disk, EMS PC Magazine, vol. 8, No. 8, p. 54, Apr. 25, 1989.

Primary Examiner—Thomas C. Lee
Assistant Examiner—Ken S. Kim
Attorney, Agent, or Firm—Schweitzer, Cornman & Gross

[57] ABSTRACT

A method for the allocation of RAM memory space in a microcomputer environment allows for one or more terminate and stay resident (TSR) or other programs to be stored on a remote memory device in a way that preserves their accessability. The method includes the installation of a supervisory program which traps calls for a displaced program and transfers a portion of another program, such as an application-type program, in RAM to remote memory while retrieving the called displaced program from remote memory into the RAM space previously occupied by the transferred portion. The swap function is performed in a manner which preserves the integrity of the swapped program, and which allows operation of the application program to be halted such that it may be restarted without loss upon return from remote memory. In another aspect of the invention a communication TSR is simulated to allow data transfers to the TSR to be processed even if the TSR is in remote memory.

3 Claims, 6 Drawing Sheets

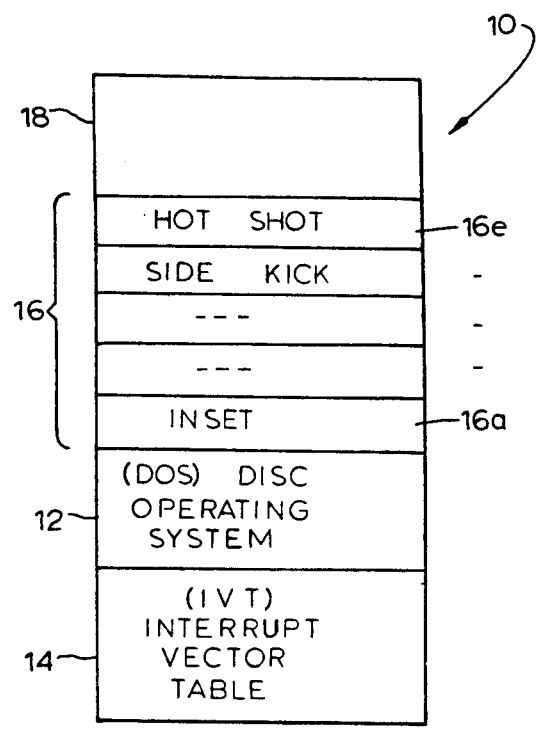
FIG. 1A
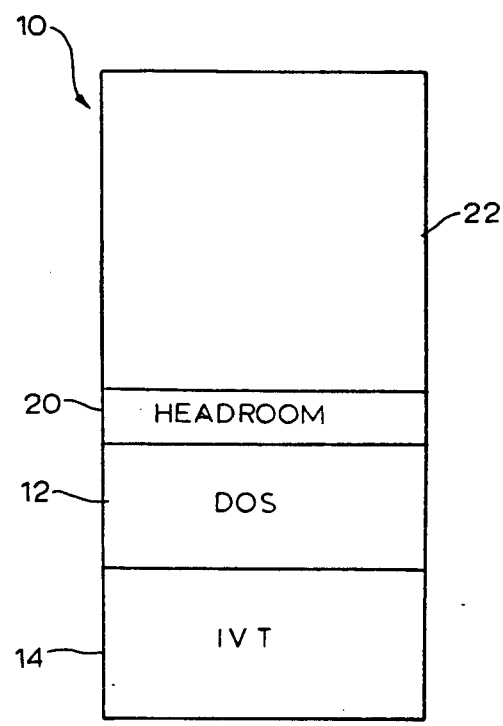
FIG. 1B
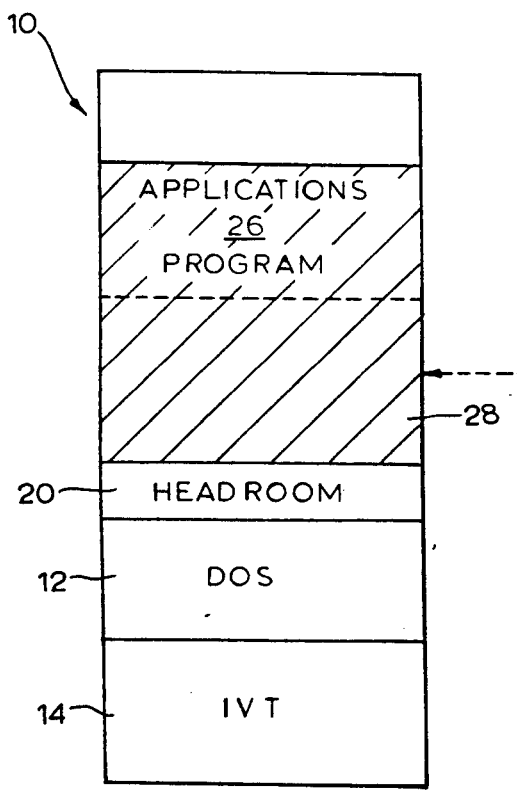
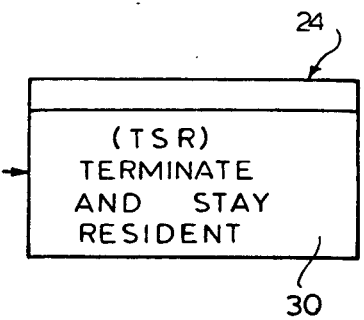
FIG. 2

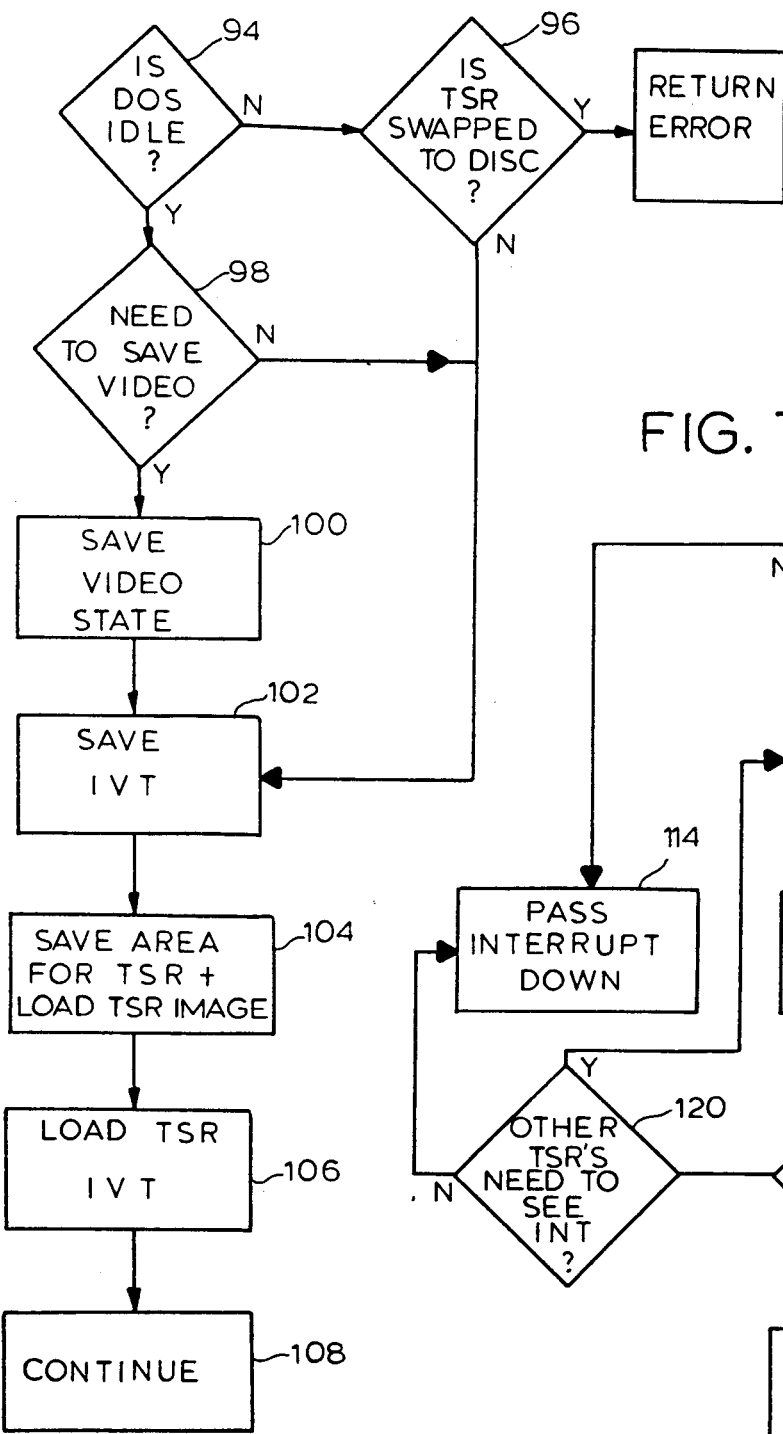

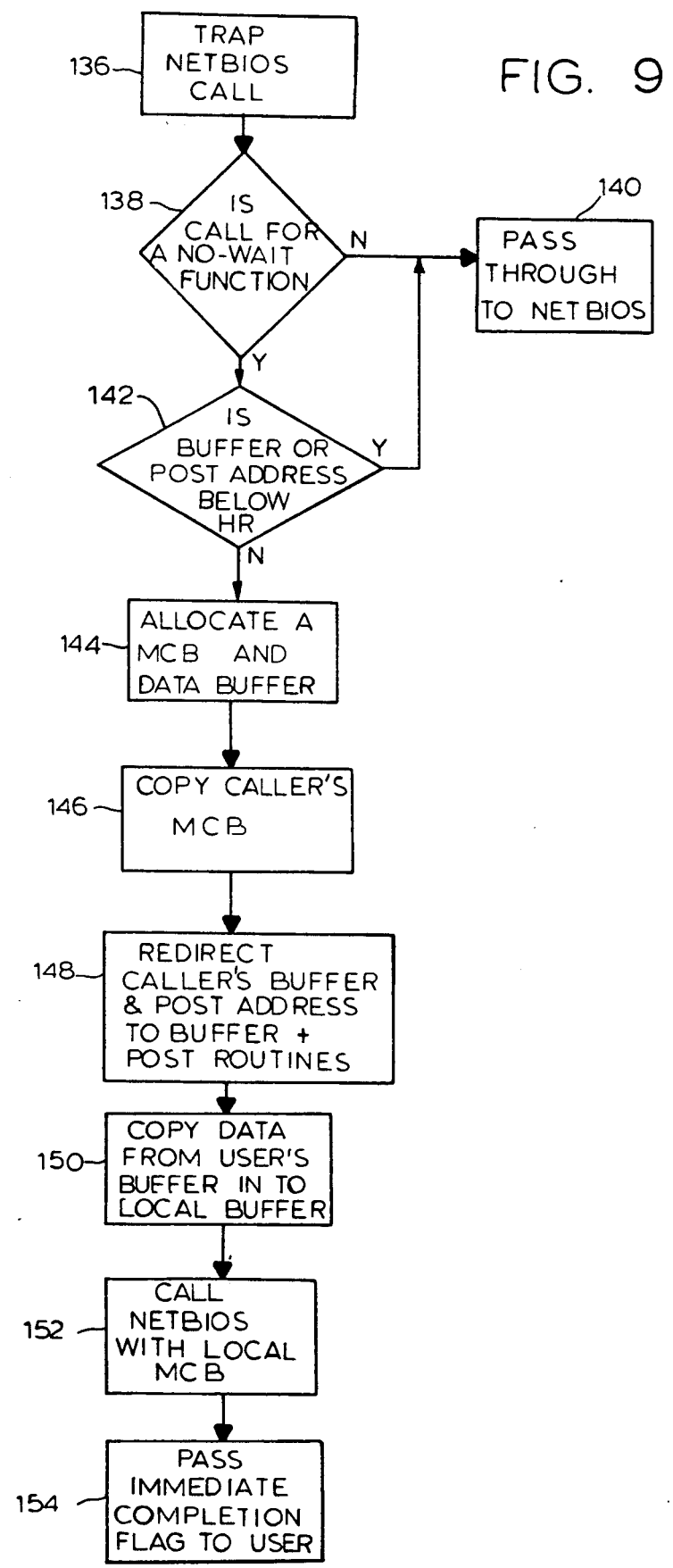

SYSTEM FOR DYNAMICALLY ALLOCATING MAIN MEMORY TO FACILITATE SWAPPING OF TERMINATE AND STAY RESIDENT COMMUNICATION PROGRAM TO INCREASE AVAILABLE MEMORY SPACE

BACKGROUND OF THE INVENTION

The present invention is directed to a computer memory allocation system allowing efficient use of random access memory (RAM), particularly in microcomputers such as the IBM-PC, XT, AT and PS/2 systems, as well as other personal computers compatible to such PC computers. Specifically, the present invention permits the utilization of a plurality of "terminate and stay resident" (TSR) programs, or other programs, in conjunction with a primary or "application" program, while staying within the computer's normal RAM storage limits, typically 640 kilobytes (640 K).

Since their initial appearance, TSRs have become a popular form of software for disc-operating system (DOS) microcomputers. TSRs provide instant access to a great number of functions and deliver a taste of multi-tasking on systems and environments that do not need the full power of a sophisticated operating system. The main drawback of the TSR approach is that the TSRs stay resident or stored in RAM at all times, thus occupying space that may be needed by another program. As application programs such as spreadsheet generators, word processing programs and the like grow more complex, they generally require more RAM space for themselves, thus limiting the space available for TSRs. Conversely, having the TSRs in RAM limits the size of the application program which can be loaded.

The general feature of a TSR program is that, once loaded into the computer's RAM memory, it can be activated at any time. This feature normally permits the operation of an application program to be temporarily suspended to gain access to a TSR. TSR programs are available to check spelling, to take notes, to provide instant calculations, to send telecopies, to store databases, and to automate everything from printing labels to dialing a telephone. Thus, as may be appreciated, they provide enormous flexibility to a computer system when they can be utilized with other programs. The shortcoming of such a system, however, is that, as TSR programs are designed to remain in RAM, the space allocated to the TSR is no longer available to other programs. Some TSRs use 200 K or more of memory, causing a substantial depletion in available memory. This sometimes prohibits the running of a large-scale application program.

Accordingly, personal computer users have had to choose which TSRs they can live without and, in some cases, have had to remove all TSRs entirely or to juggle them, loading only the TSRs that were deemed to be absolutely essential, depending on the appliction program with which they were to be installed. Such juggling substantially limits the value of a TSR.

In addition, in a network environment delays often experienced between a data transfer request and data receipt, which is often handled by a TSR communications program, can require the maintenance of the TSR in an "active" mode during the duration of the call. If the TSR is disabled, such as in the case where it is desired to reinstitute operation of an application program, the computer system will be unable to handle the received data, causing loss of the data or a system malfunction. It is thus necessary to keep the TSR active during the entirety of the call to prevent such loss, resulting in unnecessary, unproductive use of the system.

The present invention allows TSRs to be removed from RAM, placing them on disk or in expanded or extended memory space not normally able to be used by an active program. This frees all the internal RAM memory previously occupied by the TSRs, making it available for use by other programs. When it is desired to invoke a TSR, the invention brings it into RAM, suspending operation of the program currently running in such a manner that full continuity of processing is presented. The invention allocates the necessary RAM space for the TSR, removing and storing the previous contents of the space. After the TSR completes its operation, it is removed from RAM, and the removed contents are returned. The interrupted program is then fully restored.

In another and further aspect of the invention, the invention duplicates the data-handling attributes of a communication TSR in a network environment, thus allowing the TSR to be removed from memory without disrupting a communication link established by it. When data is received the invention emulates the TSR, allowing full receipt of the data and notifiction to the user and/or other software of its arrival.

For a more complete understanding of the present invention and a better appreciation of its attendant advantages, reference should be made to the following detailed description of a preferred embodiment thereof, taken in conjunction with the accompanying drawings.

DESCRIPTION OF THE DRAWINGS

FIG. 1 is a diagrammatic illustration of the memory economy achieved by the practice of the invention;

FIG. 2 is a diagrammatic illustration of the memory allocation procedure employed;

FIG. 6 depicts the steps of the swap-in portion of the invention;

FIG. 7 depicts the steps by which a swap may be invoked by a keystroke interrupt;

FIG. 9 depicts operation of the invention in a network environment; and

DESCRIPTION OF A PREFERRED EMBODIMENT

Figure 3:
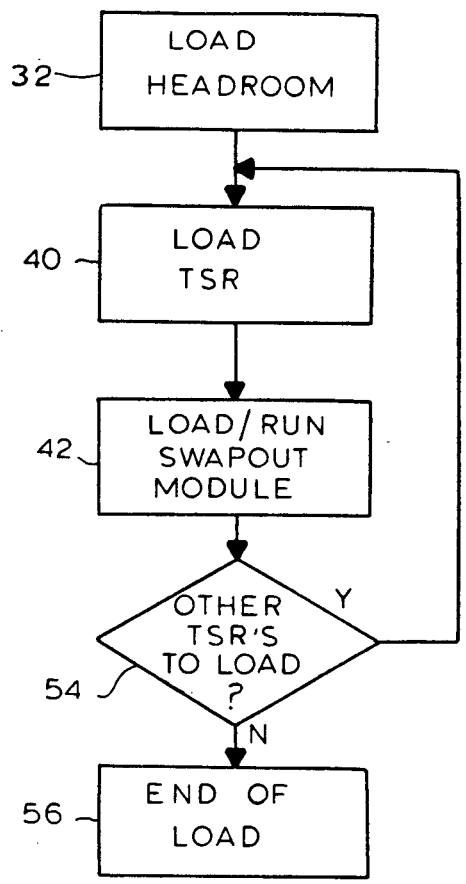
FIG. 3 is a flow diagram depicting the installation of the present invention into a computer system.

With initial reference to FIGS. 1 and 2, FIG. 1 illustrates a typical RAM memory 10 of a microcomputer. Loaded into such memory at the time the computer is turned on or "booted up" are DOS commands 12, which control the basic operation of the computer, and a set of pointers, the interrupt vector table (IVT) 14, which provides handling instructions to the system when an "interrupt", such as a keyboard keystroke, timer signal, or the like, is produced. The remaining RAM space is utilized for active programs, both of an "application" character, as well as TSRs. Programs are loaded into RAM on a first in/last out basis, the first loaded programs occupying the lowest memory positions. As depicted in FIG. 1(a), TSRs, such as Hot-Shot, Sidekick, and the like, 16a–e, are normally loaded into RAM by means of a set of commands which are automatically carried out upon system initiation. Documentation for a typical TSR would normally include instruction to the uninitiated as to how to program the computer to autoload the TSR. The methodology of such instructions is well known to those skilled in the art. As depicted, the TSRs 16 can consume a significant amount of available RAM memory, leaving only a relatively small portion 18 available for an application program, whether it be a spreadsheet generator, a word processing program, or the like.

FIG. 1b, on the other hand, illustrates the RAM memory 10 in which a program embodying the present invention is installed. The TSRs 16 are no longer resident in RAM, having been replaced by the inventive, supervisory program 20, hereinafter referred to as "Headroom" or "the Headroom program". The relatively minimal storage requirements of the invention provide significantly more RAM space 22 to be available for the loading of an application program, while still allowing the TSRs it replaces in RAM to be accessed as desired.

As depicted in FIG. 2, the supervisory Headroom program 20 allows the TSRs to remain in storage, such as on hard disk 24, until needed. Normally, the operation of a TSR is invoked by the user causing an interrupt to be generated. A typical TSR program designates one or more keyboard keys to serve as "hot keys", the activation of which generates an interrupt which invokes the TSR and suspends operation of the primary, application program otherwise in use. The initial processing of the interrupt is controlled by the IVT 14, which is overlaid with the necessary instructions for the uppermost, or most recently installed, program in RAM. After the interrupt is acted upon by the topmost program, it is passed down through RAM, each program in turn having the opportunity to act upon the interrupt.

Typically, a TSR gets the interrupt only after it is acted upon by an application program. The Headroom program recognizes the hot key assignments for each TSR with which it is used and, upon receipt of the proper interrupt, suspends application program processing, locates the TSR 30 on the hard disk or other storage locations, and "swaps" an image of it with a portion 28 of the application program 26, the portion of the program 26 removed being stored on the disk 24 or similar storage facility. After the swap is completed, Headroom allows activation and operation of the TSR in the normal manner. After use of the TSR is completed Headroom does a "reverse swap", bringing back into RAM the portion 28 of the application program swapped out to disk, while returning the then present image of the TSR 30 to update the stored version on disk. Headroom then reactivates the application program 26. In making the swaps, Headroom assures that operation of the application program during the swap is completely suspended to prevent a malfunction. In addition, Headroom retains all necessary interrupts and operation codes which are necessary to reinstitute operation of the application program at the completion of the swap.

There is nothing inherently particular about a TSR that allows a swap to be consummated. Headroom can also swap application programs, for example, allowing suspension of operation of a word processing program to access and invoke a spreadsheet program such that data to be used in the word processing program can be generated. A feature of the present invention is the assignment of appropriate "hot keys" to a program over which it is desired the Headroom have control. In addition, multiple swaps can be made, swapping a third program for a second, a fourth for a third, and the like.

A more detailed description of the operation of the present invention will be appreciated and understood by one skilled in the art upon consideration of the flowcharts of FIGS. 3 through 10 in conjunction with the annexed programming code.

FIG. 3 depicts the installation of the invention in a computer. As shown therein, the main supervisory portion of the invention of the Headroom program is first loaded into memory at 32. A TSR is then loaded at 40, which places it directly above Headroom in RAM as shown in FIG. 2. A second portion of the invention, the "Swap-Out" module, is then loaded at 42, which places it directly above the TSR in RAM, and is then executed. The operation of the Swap-Out module is shown in FIG. 4.

Figure 4:
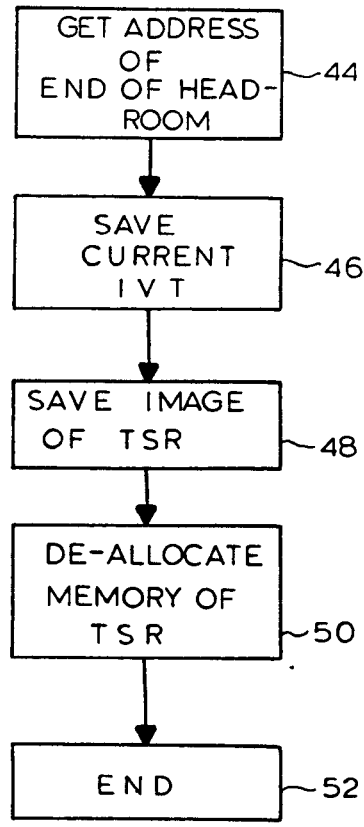
FIG. 4 depicts the initialization of the "swap-out" module of the invention.

As depicted in FIG. 4, Swap-Out first identifies the upper end memory address of Headroom 32 at 44 such that the memory location for the lower end of the contents of RAM to be swapped out or transferred to disk can be located. Swap-Out does not generate IVT pointers, so the condition of the IVT 14 of FIGS. 1 and 2 remains as if the TSR 30 was the topmost program installed in RAM. An image of the IVT as created by the TSR is then saved to disk by Swap-Out at 46. The IVT saved thus contains the pointers utilized by the TSR, which will provide the operating system with the necessary instructions for handling interrupts during the TSR's initiation. An image of the TSR is also saved to disk at 48, as is a portion of the Swap-Out module needed for subsequent activities as will be explained. The assignment of "hot keys" needed by the TSR is also identified and retained by Headroom.

With the TSR and Swap-Out portion being saved, Headroom deallocates at 50 the space previously utilized by the TSR and Swap-Out such that such memory can be reallocated for use by another program. With the end 52 of the load being reached, the initialization steps may be repeated as many times as is required, as seen at 54 in FIG. 3, each time with the loading of a different TSR with Swap-Out to generate the necessary IVT and transfer the IVT and program images to permanent storage. The loading procedure ends at 56.

After the initialization and loading procedure is run, an application-type program may be loaded into RAM and run in the typical manner. As the application program is installed above Headroom, the IVT is loaded with the application program pointers and allows any interrupt generated to be first acted upon by the application program. After it is made available to the application program, the interrupt is passed down to Headroom, which determines whether it is an interrupt resulting from a TSR "hot key" entry. If so, Headroom invokes the procedure to key in the appropriate TSR. If it is not such an interrupt, the interrupt is passed down to DOS, and the check for a hot key entry is repeated for the following keystroke.

Figure 5A:
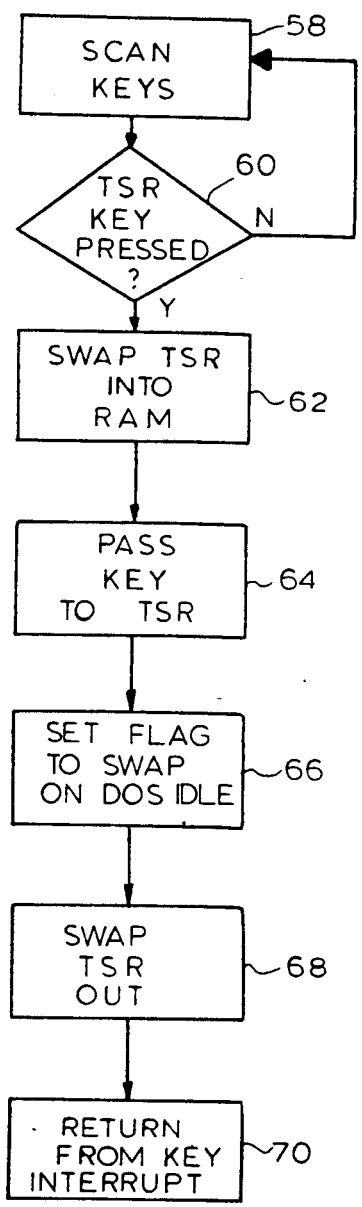
FIG. 5A depicts the steps representing the commencement of the swap-out procedure portion of the present invention.
Figure 5B:
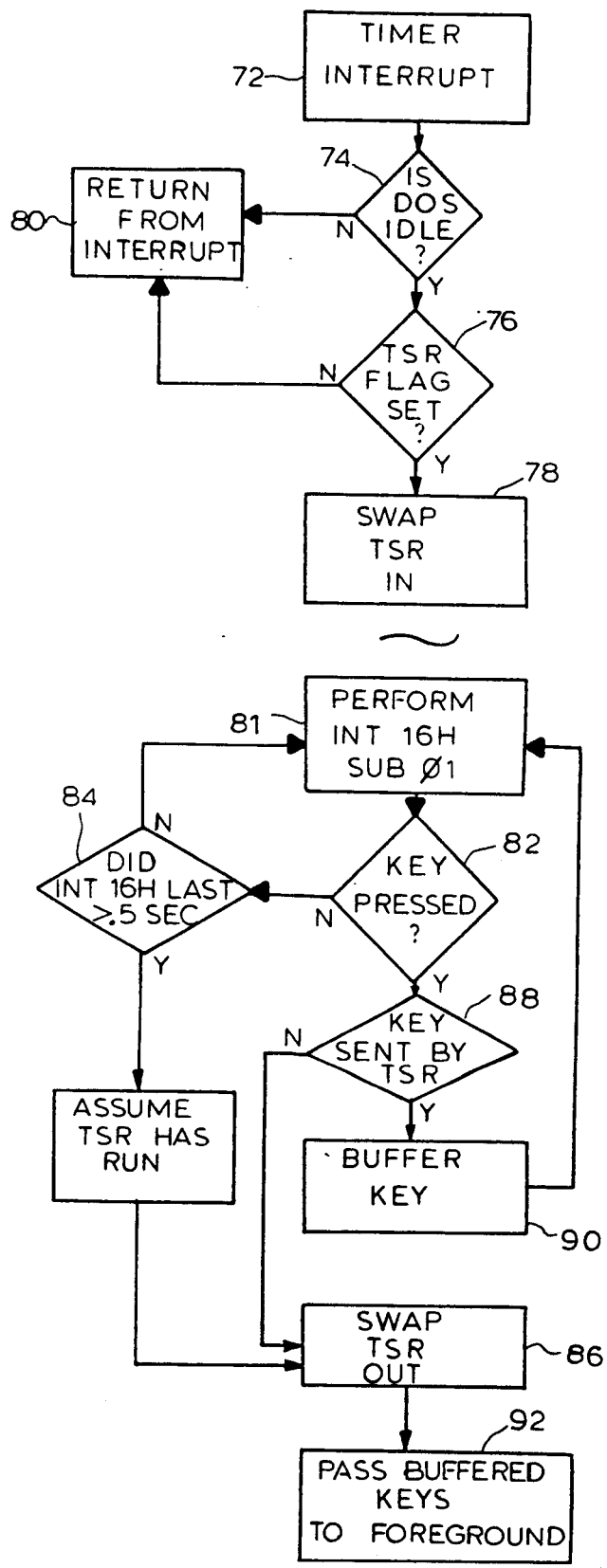
FIG. 5B depicts the portion of the swap-out procedure which determines the timing of a swap out.

In order to insure that a TSR is not invoked prematurely, before the application program has ceased processing, Headroom utilizes a two-step procedure, as depicted in FIG. 5, when it determines a TSR-calling key has been pressed at 60 while scanning the keys at 58.

Headroom initially swaps in the called TSR at 62, and passes the initiating interrupt to the TSR at 64 to allow the TSR to begin operation. In passing the interrupt to TSR, however, Headroom simulates an environment in which the TSR cannot begin processing. In such a state, the interrupt is immediately passed back to Headroom, because it is below the TSR in RAM. Upon return of the interrupt, an internal marker is set at 66, indicating to Headroom that the TSR is to be returned to RAM when DOS is idle. As DOS is normally the last element in the RAM chain to receive an interrupt, when it has ceased processing on an interrupt, all other processing has ceased. The TSR is then swapped back out at 68, the piece of the application program removed is reinstalled, and the interrupt is passed down the chain at 70 so that all operations can be performed.

Headroom determines, on a periodic basis, scheduled by timer interrupts 72, whether DOS is in an idle state at 74. If so, Headroom determines at 76 if the flag 68 has been set, and if so, swaps the TSR back in at 78, allowing it to continue from its "frozen" state. If the flag 68 has not been set the timer interrupt is passed at 80.

With the TSR in place and operational, all subsequent interrupts are handled by the TSR, rather than by the now-disabled application program. It is thus necessary to determine when the TSR ends operation.

This is performed by the main Headroom program below the TSR in RAM in conjunction with the Swap-Out portion sitting above the TSR in RAM, which is brought back in with the TSR. Upon Swap-In of the TSR at 78 the Swap-Out module passes control to the TSR to allow it to run. As the module does not generate an IVT, the active IVT is that of the TSR. Normally, interrupts which constitute "internal" communication with the TSR, such as the entry of numerical data for a calculator TSR, are not passed through the TSR and thus are not seen by Headroom or lower programs. An exit command keystroke, however, is passed when control is passed by the TSR. When control is passed to the TSR Swap-Out generates an interrupt at 81. Similar interrupts are generated whenever control is returned to Swap-Out, which could be indicative of the TSR terminating its processing. Thus, the Swap-Out module determines at 82 if a keystroke has been generated. If no keystroke is pending, it checks at 84 whether more than a half second has elapsed for the interrupt. If so, it may be assumed that the reason for the interval was the operation of the TSR and its subsequent termination. Thus, a command is issued at 86 to swap the TSR out of RAM.

If it is determined at 82 that a keystroke image has been created it is determined at 88 whether the image was created by the TSR as output or whether it was from another source. If the keystroke was TSR generated, the stroke is stored at 90 and the interrupt 80 is repeated until either there is a branch to 84 or a non-TSR stroke is sensed. The TSR is then swapped out at 86 and the stored strokes are passed to the application program at 92.

Further processing steps associated with each TSR swap-in are shown in FIG. 6. Each swap is proceeded by a check to determine whether DOS is idle at 94, and if not, if the TSR is on disk at 96. This is to insure that the disk can be accessed to retrieve the TSR. If the TSR is not on disk, but rather is on another device, such as expanded memory, the check need not be made. Depending upon the application and the operation of the TSR, Headroom then determines at 98 whether or not any of the current video signal must be saved and, if so, saves it at 100 as required. It then saves the current IVT at 102 as created by the program to be interrupted, along with the contents of the RAM area needed by the TSR at 104 and brings the TSR into RAM. The TSR's IVT is brought in at 106, and the initiating interrupt is passed to the TSR, which takes control. This is accomplished at 108 by step 66 or 80 as shown in FIG. 5 as appropriate for the source of the interrupt.

The invocation of a TSR upon receipt of a keystroke interrupt is a species of the general operation of Headroom upon receipt of an interrupt. This operation is depicted in FIG. 7. When an interrupt is generated, Headroom determines at 110 whether or not it is to be processed by a TSR, and swaps the TSR in at 112 as required as previously discussed. If the interrupt is not TSR-bound, the interrupt is passed down the stack at 114. Otherwise it is identified as a TSR interrupt and the TSR is brought in at 112. The interrupt is passed to the TSR at 116 which then runs in the normal manner. Headroom checks at 118 if the interrupt is still pending when the TSR completes its operation as a result of the interrupt and, if so, determines at 120 whether or not the interrupt is to be passed to any other TSR and if required, steps 112 and following are repeated. If it is not to be passed to a TSR, it passes it at 114 down the chain in the normal manner. If, on the other hand, the interrupt is no longer present at the end of TSR processing, the TSR is swapped out and the application program swapped back in at 122 with its IVT to allow recommencement of application programming from the point where it was disabled.

Figure 8:
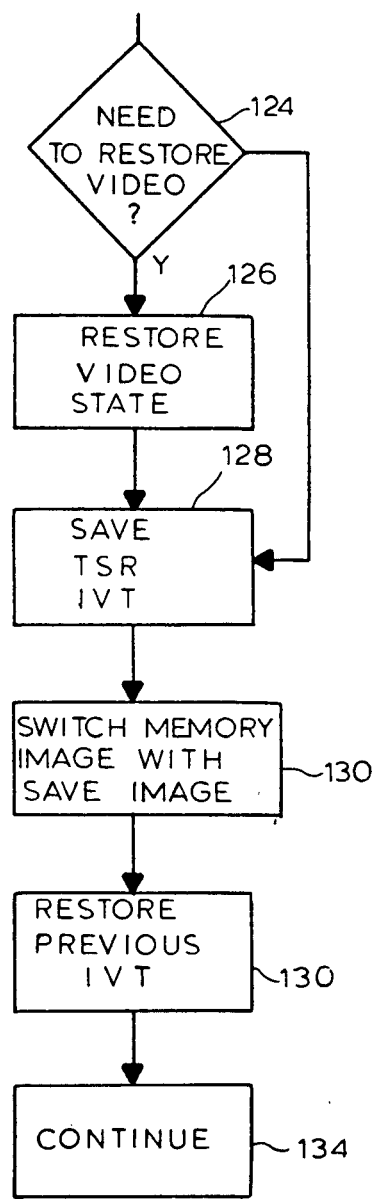
FIG. 8 depicts the TSR exit procedure.

With TSR processing completed, Headroom invokes a TSR exiting procedure, as represented in FIG. 8. Headroom first determines at 124 whether or not video has been moved out and stored, thus requiring it to be brought in and, if so, brings it from memory at 126 to restore the image. It then saves the TSR's IVT at 128 and swaps out the TSR at 130, bringing in the image of the portion of the application program previously swapped out. The application program's IVT is also restored at 132, and application processing recommences at 134 in the normal manner.

In addition to a stand-alone environment, TSRs are often utilized in a network configuration, in which two or more microcomputers are connected together to share resourses and memory. In addition to being coupled to other PCs, the PCs on a network may be coupled through a "gateway" PC to a large mainframe computer. This allows the PCs on the network to transfer information to and from the mainframe. The operating system for a network system is a network basic input/output system (NETBIOS). in such an environment, TSRs are often utilized for data transfer, interfacing with NETBIOS, allowing a data request to be transmitted through a network to obtain from another location data for use, for example, in an application program. In general, NETBIOS can handle two types of data calls or requests, wait and no-wait function calls. In a no-wait call the NETBIOS immediately reports to the initiating program as to the status of a request, and returns control of the system to the initiating program pending receipt of a response from the network. In a wait call, NETBIOS maintain control, essentially maintaining the system in a pause state pending a network response.

Figure 10:
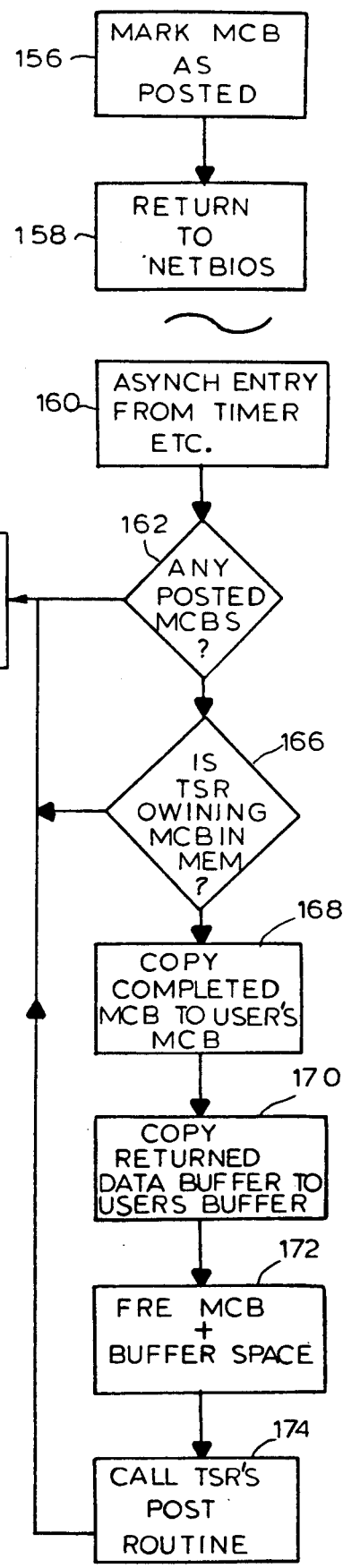
FIG. 10 depicts the steps in a network configuration which allow a communication TSR to be swapped out without interrupting message receipt capability.

With normal operation of a TSR, a no-wait condition is not a problem, since the TSR is always resident in memory, available to receive the data. With the use of Headroom, however, potential problems exist, as the TSR could be swapped out to disk at the time the data is received. Thus, the methodology set forth in FIGS. 9 and 10 are utilized in a network environment to allow Headroom to perform therein.

As shown in FIG. 9, Headroom accepts at 136 the function call generated by the TSR which would normally go directly to the NETBIOS, and determines at 138 whether it is a wait or no-wait function. If it is a wait function, Headroom immediately passes the request to NETBIOS at 140, and processing ceases until control is returned. There is no benefit gained by swapping out the TSR to allow an application program to run, as control is maintained by NETBIOS until the call is returned. Thus, Headroom need not do anything, but merely permits the TSR to be maintained in memory to await return of the data.

With a no-wait function call, however, Headroom determines at 142 whether or not either the instructions for handling the incoming data, which are located in a message control block (MCB), or the location at which the data is to be stored (post address), are below Headroom in RAM. If so, such locations would normally be in DOS or similar static locations, not being affected by a swap-out of the TSR, which is above Headroom in RAM. If either the buffer or post address is above Headroom, indicating that it is under the control of the TSR, Headroom allocates at 144-150 a message control buffer and/or data buffer within itself, and transfers the necessary control parameters from the TSR to the allocated area to duplicate that of the TSR. This permits NETBIOS to communicate with Headroom directly, rather than the TSR, as all the necessary functions for such communication have been duplicated in Headroom. Once the buffers have been created and loaded as required, Headroom communicates with NETBIOS at 152, which returns a report either that the data request created by the TSR and simulated by Headroom is proper and that the request has been passed through the network or, in the alternative, that the request is improper. In either case, the appropriate flag is passed at 154 by Headroom to the caller.

With the necessary communications parameters duplicated, Headroom allows the communication TSR to be swapped out, while the system retains the ability to obtain an incoming message on its behalf. FIG. 10 represents the steps creating this capability. When NETBIOS is prepared to notify the TSR that a message has been received, it instead activates at 156-158 the message control block established by Headroom that the transaction is complete. Headroom interrogates the MCB at 162 either asynchronously upon a request from the user or as otherwise provided by a system protocol at 160. If the no message has been received, no further action is required and the interrupt is passed in the normal manner at 164. If the inquiry 162 indicates that a message has been received, Headroom determines at 166 whether or not the program which established the message control block, either a TSR or an application program, is in memory. If so, the completed message control block is copied at 168 back to that message control block and the content of the created data buffer is passed at 170 to the original data buffer. The message control block and buffer space created by Headroom are then freed at 172, Headroom informing the TSR or application program at 174 that the message has been received to allow processing by the TSR or the application program. If, on the other hand, the creator of the message control block is not in memory, which would typically be the case with a TSR, Headroom brings in the TSR if authorized to do so or, if not, generates a signal indicating receipt, so the operator can direct Headroom to bring in the TSR.

The annexed listing of program coding for the invention as described herein further sets forth in detail the methodology utilized in connection with the invention. One skilled in the art will appreciate that the specific methodology set forth therein may be modified without departing from the true spirit of the invention.

```
                              PAGE    ,132
                              TITLE   Governor main application code
                          ;
                          ;
                              INCLUDE DEFBIOS.ASM
                        C ;
= 0200                  C   VECSIZ  EQU      200H              ;SIZE OF INT. VECTOR TABLE IN WORDS
                        C ;
0000                    C   BIOS_SEG         SEGMENT AT 40H
0010                    C           ORG      10H
0010 0000               C   EQUIPMENT        DW       ?
0017                    C           ORG      17H
0017 00                 C   KB_FLAG DB       ?
0018 00                 C   KB_FLAG_1        DB       ?
0019 00                 C   ALT_INPUT        DB       ?
001A 0000               C   BUFFER_HEAD      DW       ?
001C 0000               C   BUFFER_TAIL      DW       ?
001E 0010[              C   KB_BUFFER        DW       16 DUP(?)
       ????             C
                      ] C
                        C
                        C ;
```

```
003E                    C   KB_BUFFER_END   LABEL   WORD
                        C   ;
0049                    C           ORG     49H
0049  00                C   CRT_MODE        DB      ?
004A  0000              C   CRT_COLS        DW      ?
004C  0000              C   CRT_LEN DW      ?
004E  0000              C   CRT_START       DW      ?
0050  0008[             C   CRT_CURSES      DW      8 DUP(?)
      ????              C
                      ] C
                        C
0060  0000              C   CRT_CMOD        DW      ?
0062  00                C   CRT_PAGE        DB      ?
0063  0000              C   CRT_ADDR        DW      ?
0065  00                C   CRT_MSET        DB      ?
0066  00                C   CRT_PALETTE     DB      ?
                        C           ORG     6CH
006C                    C   BIOS_TIME       LABEL   DWORD
006C  0000              C   TIMER_LOW       DW      0
006E  0000              C   TIMER_HI        DW      0
0072                    C           ORG     72H
0072  0000              C   CRT_RFLSG       DW      ?
0084                    C           ORG     84H
0084  00                C   CRT_ROWS        DB      ?
0085  0000              C   CRT_POINTS      DW      ?
0087  00                C   CRT_INFO        DB      ?
0088  00                C   CRT_INFO_3      DB      ?
00A8                    C           ORG     0A8H
00A8                    C   CRT_SAV_PTR     LABEL   DWORD
0100                    C           ORG     100H
0100  00                C   CRT_STATUS_B    DB      ?
                        C   ;
0101                    C   BIOS_SEG        ENDS
                        C   ;
0000                    C   IPAGE_SEG       SEGMENT AT 0
                        C   ;
0024                    C           ORG     24H
0024                    C   KB_INT  LABEL   WORD
                        C   ;
0074                    C           ORG     1DH*4
0074                    C   PARAM_TBL       LABEL   DWORD
                        C   ;
0074                    C   IPAGE_SEG       ENDS
                        C   ;
0000                    C   MTR_SEG SEGMENT AT 0F000H
E05B                    C           ORG     0E05BH
E05B                    C   MTR_RESET       LABEL   FAR
                        C   ;
E05B                    C   MTR_SEG ENDS
                        C   ;
                        C   ;       CONSTANT DEFENITIONS
                        C   ;
= 0001                  C   I13FLG  EQU     WORD PTR 0001
= 0002                  C   I25FLG  EQU     WORD PTR 0002
= 0004                  C   I26FLG  EQU     WORD PTR 0004
= 0008                  C   I09FLG  EQU     WORD PTR 0008
= 0010                  C   I17FLG  EQU     WORD PTR 0016
= 0020                  C   I14FLG  EQU     WORD PTR 0032
                            INCLUDE DEFNCB.ASM
= 0001                  C   NETWORK_VERSION EQU 1
                        C   ;
                        C   ; NET BIOS MESSAGE CONTROL BLOCK DEFINITION
```

```
            C  ;
            C  MCB      STRUC
0000 00     C  MCB_COMMAND    DB    ?              ;COMMAND FIELD
0001 00     C  MCB_RETCODE    DB    ?              ;RETURN FIELD
0002 00     C  MCB_LSN        DB    ?              ;LOCAL SESSION NUMBER
0003 00     C  MCB_NUM        DB    ?              ;NUMBER OF APPLICATION NAME
0004 00000000 C  MCB_BUFFER   DD    ?              ;POINTER TO MESSAGE BUFFER
0008 0000   C  MCB_LENGTH     DW    ?              ;BUFFER LENGTH IN BYTES
000A 0010[  C  MCB_CALLNAME   DB    16 DUP(?)      ;NAME ON LOCAL OR REMOTE NETBIOS INTRFC
     ??     C
          ] C
            C
001A 0010[  C  MCB_NAME       DB    16 DUP(?)      ;NAME ON LOCAL NETBIOS INTERFACE
     ??     C
          ] C
            C
002A 00     C  MCB_RTO        DB    ?              ;RECIEVE TIME OUT
002B 00     C  MCB_STO        DB    ?              ;SEND TIMEOUT
002C 00000000 C  MCB_POST     DD    ?              ;POINTER TO POST ROUTINE
0030 00     C  MCB_LANA_NUM   DB    ?              ;ADAPTER NUMBER 0=FIRST 1=SENCOND ETC
0031 00     C  MCB_CMD_CPLT   DB    ?              ;COMMAND STATUS
0032 000E[  C  MCB_RESERVED   DB    14 DUP(?)      ;RESERVED EXCEPT FOR MSG.RESET
     ??     C
          ] C
            C
0040        C  MCB      ENDS
            C
            C
            C  MYMCB    STRUC
0000 0040[  C  OLDMCB         DB    SIZE MCB DUP(?) ;USER'S MCB
     ??     C
          ] C
            C
0040 00000000 C  MMCB_LOC     DD    0              ;POINTER TO USER'S MCB
0044 00     C  MMCB_INUSE     DB    0              ;IS THIS MCB IN USE?
0045 0000   C  MMCB_TSRNUM    DW    0              ;POINTER TO TSR USING THIS MCB
0047 0000   C  MMCB_COUNT     DW    0              ;PTR TO NEXT MCB POSTED FOR A TSR
0049 00     C  MMCB_POSTED    DB    0              ;THIS MCB IS DONE FLAG, 0=NO
004A 0000   C  MMCB_POSTAX    DW    0              ;AX FROM NETWORK POST CALL
004C 0000   C  MMCB_BLOCKS    DW    0              ;NUMBER OF BUFFER BLOCKS ALLOCATED
004E        C  MYMCB    ENDS
               ;
               ; EMM PAGE USAGE INFO
               ;    PAGE 0:    0000H-3FFFH     EGA FONT SAVE AREA
               ;    PAGE 1:    0000H-1000H     BACKGROUND BLANK-OUT
               ;    PAGE 2:    0   -3FFFH      DYNAMIC ALLOCATION OF WINDOW BUFFERS
               ;
               SETINT  MACRO    ADDR,INTR
                       MOV      AH,25H
                       MOV      AL,INTR
                       MOV      DX,OFFSET ADDR
                       INT      21H
                       ENDM
               ;
               SETC    MACRO
                       MOV      AH,2
                       CALL     DOBIOS
                       ENDM
               ;
               MUL3    MACRO    REG
                       MOV      AX,REG
                       SHL      REG,1
```

```
                        ADD     REG,AX
                        ENDM
                ;
                EMM_SAVE_STATE  MACRO
                        MOV     AH,47H
                        CALL    DOEMM
                ;       CALL    DOEMM
                        ENDM
                ;
                EMM_RESTORE_STATE    MACRO
                        MOV     AH,48H
                        CALL    DOEMM
                ;       CALL    DOEMM
                        ENDM
                ;
0000            _DATA   SEGMENT WORD PUBLIC 'DATA'

0000            _DATA   ENDS

0000            CONST   SEGMENT WORD PUBLIC 'CONST'
0000            CONST   ENDS

0000            _BSS    SEGMENT WORD PUBLIC 'BSS'
0000            _BSS    ENDS

DGROUP  GROUP   _DATA, CONST, _BSS

PGROUP  GROUP   _TEXT, INIT

0000            _TEXT   SEGMENT PARA PUBLIC 'CODE'
0000            _TEXT   ENDS

0000            INIT    SEGMENT PARA PUBLIC 'CODE'
0000            INIT    ENDS

0000            STRINGS SEGMENT  WORD PUBLIC 'FAR_DATA'
0000            STRINGS ENDS
0000            STRINGS_CONST   SEGMENT WORD PUBLIC 'FAR_DATA'
0000            STRINGS_CONST   ENDS
0000            STRINGS_BSS     SEGMENT WORD PUBLIC 'FAR_DATA'
0000            STRINGS_BSS     ENDS
                STRINGS_GROUP   GROUP   STRINGS_CONST, STRINGS_BSS, STRINGS

FGROUP  GROUP   BOTTOM

0000            BOTTOM  SEGMENT BYTE PUBLIC 'MGT'
0000            BOTTOM  ENDS

= 02AA          STKRSV  EQU     4096/6
0000            STACK   SEGMENT STACK 'STACK'
                        PUBLIC  STKEND
0000  02AA [    SBASE   DB      STKRSV DUP ('stack ')
        73 74 61 63 68
        20
              ]

OFFC            STKEND  LABEL   WORD
OFFC            STACK   ENDS
                ;
                        INCLUDE DEFTSR.ASM
```

```
                        C   EFCB    STRUC
0000  00                C   EXTEND  DB      0
0001  0005[             C           DB      5 DUP(0)
        00              C
            ]           C
                        C
0006  00                C   ATTRIB  DB      0
0007                    C   EFCB    ENDS
                        C   FCB     STRUC
0000  00                C   DRIVE   DB      ?
0001  0008[             C   FNAME   DB      8 DUP(?)
        ??              C
            ]           C
                        C
0009  0003[             C   FEXT    DB      3 DUP(?)
        ??              C
            ]           C
                        C
000C  0000              C   BLOCK   DW      ?
000E  0000              C   RECSIZ  DW      ?
0010  00000000          C   FILSIZ  DD      ?
0014  0000              C   FDATE   DW      ?
0016  000A[             C   RESERV  DB      10 DUP(?)
        ??              C
            ]           C
                        C
0020  00                C   RELREC  DB      ?
0021  0000              C   RRECLOW DW      ?
0023  0000              C   RRECHI  DW      ?
0025                    C   FCB     ENDS
                        C   ;
                        C   SWAPINT STRUC
0000  00                C   SWAP0   DB      0
0001  00               ·C   SWAP5   DB      0
0002  00                C   SWAP8   DB      0
0003  00                C   SWAP9   DB      0
0004  00                C   SWAPB   DB      0
0005  00                C   SWAPC   DB      0
0006  00                C   SWAPF   DB      0
0007  00                C   SWAP10  DB      0
0008  00                C   SWAP14  DB      0
0009  00                C   SWAP16  DB      0
000A  00                C   SWAP16A DB      0
000B  00                C   SWAP17  DB      0
000C  00                C   SWAP21  DB      0
000D  00                C   SWAP28  DB      0
000E  00                C   SWAP2A  DB      0
000F  00                C   SWAPNET DB      0
0010  00                C   SWAPU1  DB      0
0011  00                C   SWAPU2  DB      0
0012  00                C   SWAPU3  DB      0
0013                    C   SWAPINT ENDS
                        C
                        C   TSR     STRUC
0000  0015[             C   TSRNAME DB      21 DUP(0)           ;TSR NAME FOR MENU
        00              C
            ]           C
                        C
0015  00                C   INMEM   DB      0                   ;FLAG SET IF TSR/APP SWAPPED IN
0016  000A[             C   KEY     DB      10 DUP(?)           ;ACTIVATION KEY
        ??              C
            ]           C
```

```
                        C
                        C
0020  000A[             C   SHIFTS  DB    10 DUP(?)            ;SHIFT STATE FOR ACTIVATION
        ??              C
                     ]  C
                        C
002A  01                C   KEYSON  DB    1                    ;ARE THE KEYS FOR THIS TSR ACTIVE
002B  FF                C   EMMCHN  DB    -1                   ;POINTER TO START OF CHAIN OF HANDLES
002C  00                C   APPSEQ  DB    0                    ;SEQUENCE NUMBER OF APPLICATION
002D  0000              C   BATCHP  DW    0                    ;POINTER TO BATCH FILE IN BATCH BLOCK
002F  00                C   BATCHFL DB    0                    ;FLAG IF SHOULD PROCESS BATCH COMMAND
0030  00                C   DOSSTRT DB    0                    ;ACTIVATION FLAG - SWAP WHEN NOT BUSY
0031  0000              C   FIRSTP  DW    0                    ;PAGE NUMBER OF FIRST PAGE FOR APPL.
0033  0000              C   CYCLE   DW    0                    ;NEXT FREE 64k FOR APPL. SWAP
0035  0000              C   PAGES   DW    0                    ;SIZE OF APPLICATION IN PAGES.
0037  0000              C   LASTP   DW    0                    ;NUMBER OF WORDS IN LAST PAGE
0039  0000              C   SWPSEG  DW    0                    ;SEGMENT FOR SWAP IN
003B  00000000          C   XFERADD DD    0                    ;LOCATION TO START/CONTINUE TSR/APPL
003F  00000000          C   LOCALS  DD    0                    ;A NEW STACK FRAME FOR AFTER A SWAP
0043  FFFF              C   EMMHNDL DW    -1                   ;HANDLE OF EMM PAGE MAP FOR TSR/APPL
0045  0000              C   EMMOUTH DW    0                    ;TEMPORARY HANDLE FOR APPL SWAP OUT
0047  00                C   TEXT    DB    0                    ;FLAG SET IF SHOULD SWITCH TO TEXT
0048  01                C   ISTSR   DB    1                    ;FLAG SET IF IS A TSR
0049  00                C   ISGENIE DB    0                    ;FLAG SET IF IS A GENIE MODULE
004A  0000              C   OUTRECL DW    0                    ;1ST RECORD NUMBER OF SWAPPED
004C  0000              C   OUTRECH DW    0                    ;  APPL CODE IN SWAPOUT FILE
004E  0000              C   TSRPSP  DW    0                    ;SAVE AREA FOR PSP
0050  00000000          C   TSRDTA  DD    0                    ;SAVE AREA FOR OLD DTA
0054  00000000          C   ESAVLOC DD    0                    ;SAVE FOR EGA SAVE AREA
0058  00000000          C   CONSOLE DD    0                    ;SAVE AREA FOR DOS CONSOLE DRIVER
005C  0000              C   PINMEM  DW    0                    ;PREVIOUS TSR/APPL IN MEMORY
005E  0000              C   POSTSEQ DW    0                    ;SEQUENCE NUMBER FOR POSTED MCBS
0060  0000              C   POSTNXT DW    0                    ;NEXT MCB TO POST SEQUENCE NUMBER
0062  00                C   XRUN    DB    0                    ;0 = XPANDED, 1 = DISK, 2 = EXTENDED
                        C                                      ;4 = RUNNING IN XPANDED
0063  0000              C   IDLECNT DW    0                    ;NUMBER OF MINUTES IDLE BEFORE SWAP
0065  0000              C   AT_LOW  DW    0                    ;TIME AT WHICH TO SWAP IN - LOW WORD
0067  0000              C   AT_HIGH DW    0                    ;TIME AT WHICH TO SWAP IN - HIGH WORD
0069  0013[             C   COUNT   DB    SIZE SWAPINT DUP(0)  ;COUNTS OF SWAPIN ON INTERRUPT USU. 1
        00              C
                     ]  C
                        C
007C  0013[             C   RESET   DB    SIZE SWAPINT DUP(0)  ;INITIAL VALUE OF SWAPIN ON INTERRUPT
        00              C
                     ]  C
                        C
008F  0007[             C   TSRFEXT DB    7 DUP(0)             ;ROOM FOR FCB EXTENTION
        00              C
                     ]  C
                        C
0096  0025[             C   TSRFCB  DB    25H DUP(0)           ;ROOM FOR DISKSWAP FCB
        00              C
                     ]  C
                        C
00BB  0028[             C   SWPNAME DB    40 DUP(?)            ;FULL PATH NAME OF SWAP FILE
```

```
                            ??              C
                                         ]  C
                                            C
        00E3  48 52                         C  INIDIC   DB      'HR'
        00E5                                C  TSR      ENDS
                                            C  ;
                                            C           PUBLIC  TSRSIZE
                                            C  ;
        = 00E5                              C  TSRSIZE  EQU     SIZE TSR
                                            C  ;
                                            C  EXPTBL   STRUC
        0000  FF                            C  NEXT     DB      0FFH
        0001  FF                            C  PREV     DB      0FFH
        0002                                C  EXPTBL   ENDS
                                            C  ;
                                            C  DESCRIPT STRUC
        0000  0000                          C  LIMIT    DW      0
        0002  0000                          C  BASELO   DW      0
        0004  00                            C  BASEHI   DB      0
        0005  00                            C  ACCESS   DB      0
        0006  0000                          C           DW      0
        0008                                C  DESCRIPT ENDS
                                            C
                                            C  ELSE
        = 1000                              C  DWBSIZ   EQU     4096
                                            C  ENDIF

;
                                               ; The data segment defines locations which contain the offsets
                                               ; of the base and top of the stack.
                                               ;
        0000                                   _DATA    SEGMENT
                                                        PUBLIC  PALETTE,EGASAVE,EGAPAL,_PSP,_MAXPARA,_HLEN
                                                        PUBLIC  _DBLK,_ACTIVE,_AFTRDOS,__ACRTUSED,_MAPACT
                                                        PUBLIC  _ACTSHIFT,_ACTKEY,PAGESOUT,SOFCB,_EMMAVAIL,_DBLKEN
                                                        PUBLIC  _BCOLOR,_MONOMODE,_EMMTBL,_EMMSIZ,_SWAPEMM,INMYD
                                                        PUBLIC  _KSWAP,PALSAV,_MAXTSRS,DWBUFF,LOCSTK,_CHNSTRT
                                                        PUBLIC  _EXTFREE,_EXTAVAIL,BOTHAND,BINHAND,BOTSRC
                                                        PUBLIC  BINSRC,BOTDST,BINDST,_DOSWAP,_HRSIZE,MYSHIFT,VECTBL1
                                                        PUBLIC  _NOCOMM,_NOCOM2,GENNAME,GFTBL,TOPOUT,WDSKPTR
                                                        PUBLIC  VECTBL2,BSAVBUF,PRTBUFF,PRTEND,PRTHEAD,PRTTAIL
                                                        PUBLIC  VGADACS,MDSTK,MDEND,SPSAV,LASTX,RETAX,BSEND,MYDSS,MYDSP
                                                        PUBLIC  _DELAY,_DELAY_COUNT
                                               ;
                                                        EXTRN   _LEVEL:WORD,_SWAPNAME:BYTE,_USEEMM:WORD,_APPIN:WORD
                                                        EXTRN   _SWAP_FLAG:WORD,_APPOUT:WORD,_FTIME:WORD,_SHOWFLG:WORD
                                                        EXTRN   _SWAP_DIRECTORY:BYTE,_APPNAME:BYTE,_APPLEVEL:WORD
                                                        EXTRN   _BATCH:BYTE,CFCB0:BYTE,CFCB1:BYTE
                                               ;
        = 1234                                          __ACRTUSED EQU  1234H
        0000  0000 0000 0000 0000                       NULL      DW    0,0,0,0
        0008  0000                                      _PSP      DW    0
        000A  0000                                      _HLEN     DW    0
        000C  0000                                      _MAXPARA  DW    0
```

```
000E  0100 0000           PAGESOUT  DW    100H,0
0012  0100 0000           TOPOUT    DW    100H,0
0016  0001                _DOSWAP   DW    1
0018  0000                _HRSIZE   DW    0
001A  0000                _EXTFREE  DW    0
001C  0000                _EXTAVAIL DW    0
001E  0000                _MONOMODE DW    0
0020  0001                _EMMAVAIL DW    1
0022  0001                _BEHAVED  DW    1
0024  0000                _MAPACT   DW    0
0026  0000                _AFTRDOS  DW    0
0028  0000                _ACTIVE   DW    0
002A  0000                _SWAPEMM  DW    0
002C  0001                _KSWAP    DW    1
002E  0020                _MAXTSRS  DW    32
0030  0000                _NOCOMM   DW    0
0032  0000                _NOCOM2   DW    0
0034  0000                _DELAY    DW    0
0036  0000                _DELAY_COUNT DW 0

ELSE
0038  1002[               DWBUFF    DB    4098 DUP(?)
         ??
              ]

ENDIF     ;*****************************************

103A  001E[               WDSKPTR   DW    30 DUP(0)
         0000
              ]

PUBLIC    MYBHEAD,MYBTAIL,MYBUFF,MYBEND 1076  107A R              MYBHEAD   DW    MYBUFF
1078  107A R              MYBTAIL   DW    MYBUFF
                          ELSE
107A  0400[               MYBUFF    DW    1024 DUP(0)
         0000
              ]

187A                      MYBEND    LABEL BYTE
                          ENDIF
                          ;
187A  187E R              PRTHEAD   DW    PRTBUFF
187C  187E R              PRTTAIL   DW    PRTBUFF
187E  0180[               PRTBUFF   DB    128*3 DUP(0)
         00
              ]

19FE                      PRTEND    LABEL BYTE
                          ;
                                    EVEN
                                    PUBLIC KBIHEAD,KBITAIL,KBIUFF,KBIEND
```

```
19FE  1A02 R           KBIHEAD  DW      KBIUFF
1A00  1A02 R           KBITAIL  DW      KBIUFF
1A02  000A[            KBIUFF   DW      10 DUP(0)
       0000
              ]

1A16                   KBIEND   LABEL   BYTE
1A16  0007[            EGASAVE  DD      7 DUP(0)
       00000000
              ]

1A32  0100[            _EMMTBL  EXPTBL  256 DUP(<>)
       FF
       FF
              ]

1C32  0100[            _EMMSIZ  DW      256 DUP(0FFFFH)
       FFFF
              ]

1E32  FF               _CHNSTRT DB      -1
                       ;
1E33  36 2A 1D 38      SHTBL    DB      54,42,29,56
                       ;
1E37  00               MYSHIFT  DB      0
1E38  0100[            MSEBUF   DB      256 DUP(?)
       ??
              ]

1F38  1C               _ACTKEY   DB     1CH
1F39  08               _ACTSHIFT DB     8
1F3A  0016[            GENNAME   DB     22 DUP(0)
       00
              ]

EVEN
1F50  0096[            GFTBL    DW      6*25 DUP(0)
       0000
              ]

207C  0000             GENFUN   DW      0
207E  07               _BCOLOR  DB      7
207F  01               _SOUND   DB      1
2080  0011[            PALSAV   DB      17 DUP(0)
       00
              ]

2091  00                        EFCB    <>
2092  0005[
       00
              ]
2097  00

2098  00               TMPFCB   FCB     <>
```

```
2099  0008[
         ??
                    ]
20A1  0003[
         ??
                    ]
20A4  0000
20A6  0000
20A8  00000000
20AC  0000
20AE  000A[
         ??
                    ]
20B8  00
20B9  0000
20BB  0000

20BD  00                    EFCB    <>
20BE  0005[
         00
                    ]
20C3  00

20C4  00              SOFCB  FCB    <>
20C5  0008[
         ??
                    ]
20CD  0003[
         ??
                    ]
20D0  0000
20D2  0000
20D4  00000000
20D8  0000
20DA  000A[
         ??
                    ]
20E4  00
20E5  0000
20E7  0000

20E9  0020[            EGAPAL  DB    20H DUP(0)
         00
                    ]

2109  0118[            FATBUF  DB    30*4*2+40 DUP (0)
         00
                    ]

;
2221  00                       EVEN
                       ELSE
2222  0019[            _DBLK   TSR   25 DUP(<>)
         0015[
```

```
   00
         ]
   00
000A[
   ??
         ]
000A[
   ??
         ]
   01
   FF
   00
   0000
   00
   00
   0000
   0000
   0000
   0000
   0000
   00000000
   00000000
   FFFF
   0000
   00
   01
   00
   0000
   0000
   0000
   00000000
   00000000
   00000000
   0000
   0000
   0000
   00
   0000
   0000
   0000
0013[
   00
         ]
0013[
   00
         ]
0007[
   00
         ]
0025[
   00
         ]
0028[
   ??
```

```
                4852              ]
                                  ]
                                        ENDIF   ;************************************************
        387F                              _DBLKEN LABEL   WORD
                                        ;
        387F  00                                  EVEN
        3880  0100[                                DB      256 DUP('kkkk')
              68 68 68 68
                                  ]

3C80  0000                        LOCSTK  DW      0

3C82  0200[                       VECTBL1 DW      VECSIZ DUP(?)
              ????
                                  ]

4082  0200[                       VECTBL2 DW      VECSIZ DUP(?)
              ????
                                  ]

PUBLIC  MDSTK,MDEND
        4482  01AA[                       MDSTK   DB      426 DUP('M')
              4D
                                  ]

462C                              MDEND   LABEL   BYTE
        462C  FFFF                        INMYD   DW      -1
        462E  0000                        SPSAV   DW      0
        4630  00                          LASTX   DB      0
        4631  0000                        RETAX   DW      0
        4633  0000                        MYDSP   DW      0
        4635  0000                        MYDSS   DW      0
        4637  0300[                       VGADACS DB      300H DUP('V')
              56
                                  ]

4937  04C8[                       BSAVBUF DB      1224 DUP(7)
              07
                                  ]

4DFF                              BSEND   LABEL   BYTE
                                        ;
                                        ;DESCRIPTORS, IN AND OUT
        4DFF  00                                  EVEN
        4E00  0000                        BOTHAND DESCRIPT <>              ;DUMMY
        4E02  0000
        4E04  00
        4E05  00
        4E06  0000

4E08  0000                                DESCRIPT <>              ;DESCRIPTOR FOR DESCRIPTOR TABLE

4E0A  0000
        4E0C  00
        4E0D  00
        4E0E  0000
```

```
4E10  0000              BOTSRC  DESCRIPT <>      ;FOR SOURCE OF MOVE (HERE MEMORY TO EXTENDED)
4E12  0000
4E14  00
4E15  00
4E16  0000

4E18  0000              BOTDST  DESCRIPT <>      ;FOR DESTINATION OF MOVE (EXTENDED)
4E1A  0000
4E1C  00
4E1D  00
4E1E  0000

4E20  0000                      DESCRIPT <>      ;FOR BIOS
4E22  0000
4E24  00
4E25  00
4E26  0000

4E28  0000                      DESCRIPT <>      ;FOR STACK
4E2A  0000
4E2C  00
4E2D  00
4E2E  0000

;
4E30  0000              BINHAND DESCRIPT <>      ;DUMMY
4E32  0000
4E34  00
4E35  00
4E36  0000

4E38  0000                      DESCRIPT <>      ;DESCRIPTOR FOR DESCRIPTOR TABLE
4E3A  0000
4E3C  00
4E3D  00
4E3E  0000

4E40  0000              BINSRC  DESCRIPT <>      ;FOR SOURCE OF MOVE (HERE MEMORY TO EXTENDED)
4E42  0000
4E44  00
4E45  00
4E46  0000

4E48  0000              BINDST  DESCRIPT <>      ;FOR DESTINATION OF MOVE (EXTENDED)
4E4A  0000
4E4C  00
4E4D  00
4E4E  0000

4E50  0000                      DESCRIPT <>      ;FOR BIOS
4E52  0000
4E54  00
4E55  00
4E56  0000

4E58  0000                      DESCRIPT <>      ;FOR STACK
4E5A  0000
4E5C  00
4E5D  00
4E5E  0000
```

```
4E60  07 00 0A 0A 46 61      EMMERR   DB      7,13,10,10,'Fatal error accessing expanded memory!',13,10,10
      74 61 6C 20 65 72
      72 6F 72 20 61 63
      63 65 73 73 69 6E
      67 20 65 78 70 61
      6E 64 65 64 20 6D
      65 6D 6F 72 79 21
      00 0A 0A
4E8D  45 4D 4D 20 65 72               DB      'EMM error number $'
      72 6F 72 20 6E 75
      6D 62 65 72 20 24
4E9F  20 70 65 72 66 6F      EMMER1   DB      ' performing function number $'
      72 6D 69 6E 67 20
      66 75 6E 63 74 69
      6F 6E 20 6E 75 6D
      62 65 72 20 24
4EBC  07 00 0A 0A 50 6C      EMMER2   DB      7,13,10,10,"Please contact Helix Software immediately$"
      65 61 73 65 20 63
      6F 6E 74 61 63 74
      20 48 65 6C 69 78
      20 53 6F 66 74 77
      61 72 65 20 69 6D
      6D 65 64 69 61 74
      65 6C 79 24
4EEA  00 0A 4E 45 53 54      SWPOERR  DB      13,10,'NESTING ERROR IN SWAP OUT$'
      49 4E 47 20 45 52
      52 4F 52 20 49 4E
      20 53 57 41 50 20
      4F 55 54 24
4F06  0009[                  DEVNAM   DB      9 DUP(0)
        00
           ]
4F0F                         ROLMESS  LABEL   BYTE
4F0F  48 45 41 44 52 4F               DB      "HEADROOM rollout complete.",13,10,"$"
      4F 4D 20 72 6F 6C
      6C 6F 75 74 20 63
      6F 6D 70 6C 65 74
      65 2E 0D 0A 24
4F2C  46 61 74 61 6C 20      ROLM1    DB      "Fatal error occured in rollout",10,13,10,07
      65 72 72 6F 72 20
      6F 63 63 75 72 65
      64 20 69 6E 20 72
      6F 6C 6C 6F 75 74
      0A 0D 0A 07
4F4E  50 6C 65 61 73 65               DB      "Please re-boot.$"
      20 72 65 2D 62 6F
      6F 74 2E 24
                             ;
                             ;
                             ;
4F5E  00                     PALETTE  DB      0
4F5F  43 4F 4D 4D 41 4E      COMSTR   DB      "COMMAND "
      44 20
4F67                         _DATA    ENDS
                             ;
                             ;
0000                         _TEXT    SEGMENT
                                      ASSUME  CS:PGROUP
                                      ASSUME  DS:DGROUP
                             ;
```

```
                EXTRN   SAVEMTF:FAR,RESMTF:FAR,RUNNAM:NEAR
                EXTRN   HRSTART:NEAR,CLOSEIT:NEAR,SAVEIBM:FAR
                EXTRN   RESIBM:FAR,SETCONS:NEAR,GETCON:NEAR,RSETCON:NEAR
                EXTRN   _OPEN_FCB:NEAR,GETCSPEC:NEAR

IFNDEF  TSRONLY
                EXTRN   APSWAP:NEAR
        ENDIF

;
                PUBLIC  OLDMF,EMMFR,EMMHAND,OLDCSAV,OLDI1B
                PUBLIC  DOS_CRIT,INTTBL,OLDCPM,OLDKBI,OLDI10,OLDI16
                PUBLIC  SWITCHEM,OLDMF,OLDTIM,OLDCSAV,OLDI1C,IDLEMIN
                PUBLIC  TIDLE,OLDEMM,ANULL,EGAMEM,OLDNET
                PUBLIC  GENIN,GENFLG,NOKBFL,DOSCON,DCONPTR,UDITBL
        ;
0000 000A[              DB      10 DUP(0)
       00
     ]

0000A 45 4D 4D 58 58 58   ANULL   DB   "EMMXXXX0"              ;FAKE EMM DRIVER SIGNATURE
      58 30
                                  EVEN
0012 0000 0000          OLDI5   DW      0,0
0016 0000 0000          OLDIOB  DW      0,0
001A 0000 0000          OLDIOC  DW      0,0
001E 0000 0000          OLDIOF  DW      0,0
0022 0000 0000          OLDI10  DW      0,0
0026 0000 0000          OLDI13  DW      0,0
002A 0000 0000          OLDI14  DW      0,0
002E 0000 0000          OLDI15  DW      0,0
0032 0000 0000          OLDI16  DW      0,0
0036 0000 0000          OLDI17  DW      0,0
003A 0000 0000          OLDI1B  DW      0,0
003E 0000 0000          OLDI1C  DW      0,0
0042 0000 0000          OLDI23  DW      0,0
0046 0000 0000          OLDI24  DW      0,0
004A 0000 0000          OLDI25  DW      0,0
004E 0000 0000          OLDI26  DW      0,0
0052 0000 0000          OLDI20  DW      0,0
0056 0000 0000          OLDI27  DW      0,0
005A 0000 0000          OLDI28  DW      0,0
005E 0000 0000          OLDI33  DW      0,0
0062 0000 0000          OLDNET  DW      0,0
0066 0000 0000          OLDI67  DW      0,0
006A 0000 0000          OLDKBI  DW      0,0
006E 0000 0000          OLDTIM  DW      0,0
0072 0000 0000          OLDMF   DW      0,0
0076 0000 0000          OLDEMM  DW      0,0
007A 0000 0000          OLDCPM  DW      0,0
007E 0000 0000          OLDCSAV DW      0,0
0082 0000 0000          OLDUDI1 DW      0,0
0086 0000 0000          OLDUDI2 DW      0,0
008A 0000 0000          OLDUDI3 DW      0,0
008E 0000 0000          TMPKBI  DW      0,0
0092 0000 0000          DOSCON  DW      0,0
0096 0000 0000          DCONPTR DW      0,0
009A 0000               SWITCHEM DW     0
009C FFFF               EMMHAND DW      -1
009E 0000               SIMKB   DW      0
00A0 0000               EMMFR   DW      0
00A2 0000               TIDLE   DW      0
```

```
00A4  0000                   IDLEMIN  DW    0
00A6  0444                   TICKS    DW    18*60+12
00A8  0000                   GENFLG   DW    0
00AA  0000                   GENIN    DW    0
00AC  0000                   NOKBFL   DW    0

IFDEF    NETWORK_VERSION
                                      PUBLIC  NETLOG,INPOST,INNET,NETOUT

00AE  0000 0000              NETLOG   DW    0,0
00B2  0000 0000              INPOST   DW    0,0
00B6  0000 0000              INNET    DW    0,0
00BA  0000 0000              NETOUT   DW    0,0
                             ENDIF

;
00BE  20                     INTTBL   DB    20H
00BF  0052 R 0000                     DW    OFFSET OLDI20,0
00C3  05                              DB    5
00C4  0012 R 2B9A R                   DW    OFFSET OLDI5,OFFSET NEWI5
00C8  08                              DB    8
00C9  006E R 252B R                   DW    OFFSET OLDTIM,OFFSET TINTER
00CD  09                              DB    9

00CE  006A R 1533 R                   DW    OFFSET OLDKBI,SCANNR
00D2  10                              DB    10H
00D3  0022 R 0000                     DW    OFFSET OLDI10,0
00D7  0B                              DB    0BH
00D8  0016 R 2790 R                   DW    OFFSET OLDI0B,OFFSET COMBINT
00DC  0C                              DB    0CH
00DD  001A R 280B R                   DW    OFFSET OLDI0C,OFFSET COMCINT
00E1  0F                              DB    0FH
00E2  001E R 2873 R                   DW    OFFSET OLDI0F,OFFSET PRNFINT
00E6  13                              DB    13H
00E7  0026 R 24C4 R                   DW    OFFSET OLDI13,OFFSET NEWI13
00EB  14                              DB    14H
00EC  002A R 2B3F R                   DW    OFFSET OLDI14,OFFSET NEWI14
00F0  15                              DB    15H
00F1  002E R 2CF4 R                   DW    OFFSET OLDI15,OFFSET NEWI15
00F5  16                              DB    16H
00F6  0032 R 21E5 R                   DW    OFFSET OLDI16,OFFSET IBMI16
00FA  17                              DB    17H
00FB  0036 R 2ABA R                   DW    OFFSET OLDI17,OFFSET NEWI17
00FF  1B                              DB    1BH
0100  003A R 35BF R                   DW    OFFSET OLDI1B,OFFSET MYBRK
0104  21                              DB    21H
0105  0072 R 1888 R                   DW    OFFSET OLDMF,OFFSET MSFUN
0109  23                              DB    23H
010A  0042 R 35BF R                   DW    OFFSET OLDI23,OFFSET MYBRK
010E  24                              DB    24H
010F  0046 R 35C1 R                   DW    OFFSET OLDI24,OFFSET FABRT
0113  25                              DB    25H
0114  004A R 24E2 R                   DW    OFFSET OLDI25,OFFSET NEWI25
0118  26                              DB    26H
0119  004E R 24FE R                   DW    OFFSET OLDI26,OFFSET NEWI26
011D  27                              DB    27H
011E  0056 R 0000                     DW    OFFSET OLDI27,0
0122  28                              DB    28H
```

```
0123  005A R 28C0 R              DW       OFFSET OLDI28,OFFSET NEWI28
0127  33                          DB       33H
0128  005E R 0000                 DW       OFFSET OLDI33,0
012C  67                          DB       67H
012D  0066 R 0000                 DW       OFFSET OLDI67,0
0131  FF             UDITBL:      DB       0FFH
0132  0082 R 2BEF R               DW       OFFSET OLDUDI1,OFFSET NEWUDI1
0136  FF                          DB       0FFH
0137  0086 R 2C46 R               DW       OFFSET OLDUDI2,OFFSET NEWUDI2
013B  FF                          DB       0FFH
013C  008A R 2C90 R               DW       OFFSET OLDUDI3,OFFSET NEWUDI3
0140  FF                          DB       0FFH
                    ;
                                  PUBLIC   UDIINT1
                    ;
0141  0000          UDIINT1 DW    0
0143  0000          UDIINT2 DW    0
0145  0000          UDIINT3 DW    0
                    ;
                    ;
                                  PUBLIC   NEWI67
                    ;
0147                NEWI67  PROC  FAR
0147  9C                          PUSHF
0148  80 FC 43                    CMP      AH,43H
014B  74 0F                       JE       N67ALL
014D  80 FC 45                    CMP      AH,45H
0150  75 03                       JNE      N67JMP
0152  EB 70 90                    JMP      N67DAL
0155  9D            N67JMP: POPF
0156  2E: FF 2E 0066 R             JMP      DWORD PTR CS:[OLDI67]
015B  CF            N67DO1: IRET
015C  FA            N67ALL: CLI
015D  2E: FF 1E 0066 R             CALL     DWORD PTR CS:[OLDI67]
0162  0A E4                        OR       AH,AH
0164  75 F5                        JNE      N67DO1
0166  57                           PUSH     DI
0167  50                           PUSH     AX
0168  1E                           PUSH     DS
0169  2E: 8E 1E 1291 R             MOV      DS,CS:MYDSEG
016E  A0 1E32 R                    MOV      AL,_CHNSTRT
0171  32 E4                        XOR      AH,AH
0173  3C FF                        CMP      AL,0FFH
0175  75 1D                        JNE      N67A2
0177  8B FA                        MOV      DI,DX
0179  81 E7 00FF                   AND      DI,0FFH
017D  88 16 1E32 R                 MOV      _CHNSTRT,DL
0181  D1 E7                        SHL      DI,1
0183  C6 85 1A33 R FF              MOV      _EMMTBL[DI].PREV,0FFH
0188  C6 85 1A32 R FF              MOV      _EMMTBL[DI].NEXT,0FFH
018D  89 9D 1C32 R                 MOV      _EMMSIZ[DI],BX
0191  EB 2D 90                     JMP      N67END
0194  8B F8         N67A2:  MOV    DI,AX
0196  D1 E7                        SHL      DI,1
0198  8A 85 1A32 R                 MOV      AL,_EMMTBL[DI].NEXT
019C  32 E4                        XOR      AH,AH
019E  3D 00FF                      CMP      AX,0FFH
01A1  75 F1                        JNE      N67A2
01A3  88 95 1A32 R                 MOV      _EMMTBL[DI].NEXT,DL
01A7  57                           PUSH     DI
01A8  8B FA                        MOV      DI,DX
```

```
01AA  81 E7 00FF                      AND    DI,0FFH
01AE  D1 E7                           SHL    DI,1
01B0  58                              POP    AX
01B1  C6 85 1A32 R FF                 MOV    _EMMTBL[DI].NEXT,0FFH
01B6  D0 E8                           SHR    AL,1
01B8  88 85 1A33 R                    MOV    _EMMTBL[DI].PREV,AL
01BC  89 90 1C32 R                    MOV    _EMMSIZ[DI],BX
01C0  1F              N67END: POP    DS
01C1  58                      POP    AX
01C2  5F                      POP    DI
01C3  CF              N67DON: IRET
01C4  FA              N67DAL: CLI
01C5  2E: FF 1E 0066 R         CALL   DWORD PTR CS:[OLD167]
01CA  0A E4                    OR     AH,AH
01CC  75 F5                    JNE    N67DON
01CE  57                       PUSH   DI
01CF  50                       PUSH   AX
01D0  1E                       PUSH   DS
01D1  2E: 8E 1E 1291 R         MOV    DS,CS:MYDSEG
01D6  8B FA                    MOV    DI,DX
01D8  81 E7 00FF               AND    DI,0FFH
01DC  D1 E7                    SHL    DI,1
01DE  8A 85 1A32 R             MOV    AL,_EMMTBL[DI].NEXT
01E2  8A A5 1A33 R             MOV    AH,_EMMTBL[DI].PREV
01E6  C7 85 1A32 R FFFF        MOV    WORD PTR _EMMTBL[DI],-1
01EC  C7 85 1C32 R FFFF        MOV    _EMMSIZ[DI],-1
01F2  50                       PUSH   AX
01F3  32 E4                    XOR    AH,AH
01F5  8B F8                    MOV    DI,AX
01F7  81 FF 00FF               CMP    DI,0FFH
01FB  58                       POP    AX
01FC  74 06                    JE     N67D1
01FE  D1 E7                    SHL    DI,1
0200  88 A5 1A33 R             MOV    _EMMTBL[DI].PREV,AH
0204  50              N67D1:  PUSH   AX
0205  8A C4                    MOV    AL,AH
0207  32 E4                    XOR    AH,AH
0209  8B F8                    MOV    DI,AX
020B  58                       POP    AX
020C  81 FF 00FF               CMP    DI,0FFH
0210  74 06                    JE     N67D2
0212  D1 E7                    SHL    DI,1
0214  88 85 1A32 R             MOV    _EMMTBL[DI].NEXT,AL
0218  38 16 1E32 R    N67D2:  CMP    _CHNSTRT,DL
021C  75 03                    JNE    N67D3
021E  A2 1E32 R                MOV    _CHNSTRT,AL
0221  EB 9D           N67D3:  JMP    N67END
0223  FA              N67RAL: CLI
0224  2E: FF 1E 0066 R         CALL   DWORD PTR CS:[OLD167]
0229  0A E4                    OR     AH,AH
022B  75 96                    JNE    N67DON
022D  57                       PUSH   DI
022E  50                       PUSH   AX
022F  1E                       PUSH   DS
0230  8B FA                    MOV    DI,DX
0232  81 E7 00FF               AND    DI,0FFH
0236  D1 E7                    SHL    DI,1
0238  89 90 1C32 R             MOV    _EMMSIZ[DI],BX
023C  EB 82                    JMP    N67END
023E                  NEW167  ENDP
                      ;
```

```
                        PUBLIC  ERRABT
                ;
023E            ERRABT  PROC    NEAR
023E 2E: 8E 1E 1291 R           MOV     DS,CS:MYDSEG
0243 B/ 09                      MOV     AH,9
0245 CD 21                      INT     21H

0247 B8 4C01                    MOV     AX,4C01H
024A CD 21                      INT     21H
024C            ERRABT  ENDP
                ;
024C 0000       EMFUN   DW      0
                ;
024E            OUTDIG  PROC    NEAR
024E 24 0F                      AND     AL,0FH
0250 04 30                      ADD     AL,30H
0252 3C 39                      CMP     AL,'9'
0254 7E 02                      JLE     @F
0256 04 07                      ADD     AL,'A'-'9'-1
0258 8A D0      @@:     MOV     DL,AL
025A B4 02              MOV     AH,2
025C CD 21              INT     21H
025E C3                 RET
025F            OUTDIG  ENDP
                ;
                        PUBLIC  DOEMM
                ;
025F            DOEMM   PROC    NEAR
025F 2E: A3 024C R              MOV     CS:EMFUN,AX
0263 CD 67                      INT     67H
0265 0A E4                      OR      AH,AH
0267 74 1A                      JE      DOEM1
0269 80 FC 83                   CMP     AH,83H
026C 75 10                      JNE     @F
026E 2E: A1 024C R              MOV     AX,CS:EMFUN
0272 52                         PUSH    DX
0273 B6 FF                      MOV     DH,0FFH
0275 2A F2                      SUB     DH,DL
0277 CD 67                      INT     67H
0279 5A                         POP     DX
027A 0A E4                      OR      AH,AH
027C 74 05                      JE      DOEM1
027E 80 FC 84   @@:     CMP     AH,84H
0281 75 03              JNE     DOEMME
0283 32 E4      DOEM1:  XOR     AH,AH
0285 C3                 RET
0286 50         DOEMME: PUSH    AX
0287 B8 0003            MOV     AX,3
028A E8 17E8 R          CALL    DOBIOS
028D B8 ---- R          MOV     AX,DGROUP
0290 8E D8              MOV     DS,AX
0292 BA 4E60 R          MOV     DX,OFFSET EMMERR
0295 B4 09              MOV     AH,9
0297 CD 21              INT     21H
0299 58                 POP     AX
029A 8A C4              MOV     AL,AH
029C 50                 PUSH    AX
029D 24 F0              AND     AL,0F0H
029F B1 04              MOV     CL,4
02A1 D2 E8              SHR     AL,CL
02A3 E8 024E R          CALL    OUTDIG
```

```
02A6  58                           POP     AX
02A7  E8 024E R                    CALL    OUTDIG
02AA  BA 4E9F R                    MOV     DX,OFFSET EMMER1
02AD  B4 09                        MOV     AH,9
02AF  CD 21                        INT     21H
02B1  2E: A0 024D R                MOV     AL,BYTE PTR CS:EMFUN+1
02B5  50                           PUSH    AX
02B6  24 F0                        AND     AL,0F0H
02B8  B1 04                        MOV     CL,4
02BA  D2 E8                        SHR     AL,CL
02BC  E8 024E R                    CALL    OUTDIG
02BF  58                           POP     AX
02C0  E8 024E R                    CALL    OUTDIG
02C3  2E: A0 024C R                MOV     AL,BYTE PTR CS:EMFUN
02C7  50                           PUSH    AX
02C8  24 F0                        AND     AL,0F0H
02CA  B1 04                        MOV     CL,4
02CC  D2 E8                        SHR     AL,CL
02CE  E8 024E R                    CALL    OUTDIG
02D1  58                           POP     AX
02D2  E8 024E R                    CALL    OUTDIG
02D5  BA 4EBC R                    MOV     DX,OFFSET EMMER2
02D8  B4 09                        MOV     AH,9
02DA  CD 21                        INT     21H
02DC  FB                           STI
02DD  E8 115B R                    CALL    _ENKB
02E0  EB FE          DOEMML:       JMP     DOEMML
02E2                 DOEMM         ENDP
                                   ;
                                   PUBLIC  PUSHR,POPR
                                   ;
02E2                 PUSHR         PROC    NEAR
02E2  55                           PUSH    BP
02E3  8B EC                        MOV     BP,SP
02E5  87 7E 02                     XCHG    DI,[BP+02]
02E8  8B 6E 00                     MOV     BP,[BP]
02EB  50                           PUSH    AX
02EC  53                           PUSH    BX
02ED  51                           PUSH    CX
02EE  52                           PUSH    DX
02EF  56                           PUSH    SI
02F0  06                           PUSH    ES
02F1  1E                           PUSH    DS
02F2  FF E7                        JMP     DI
02F4                 PUSHR         ENDP
                                   ;
02F4                 POPR          PROC    NEAR
02F4  5F                           POP     DI
02F5  1F                           POP     DS
02F6  07                           POP     ES
02F7  5E                           POP     SI
02F8  5A                           POP     DX
02F9  59                           POP     CX
02FA  5B                           POP     BX
02FB  58                           POP     AX
02FC  8B EC                        MOV     BP,SP
02FE  87 7E 02                     XCHG    DI,[BP+02]
0301  5D                           POP     BP
0302  C3                           RET
0303                 POPR          ENDP
                                   ;
```

```
                        PUBLIC  DISKX
                ;
                ;   EXCHANGE DISK WITH MEMORY
                ;
                ;   CALL WITH DX = FCB, DS:DI = DESTINATION, CX=NUMBER OF BLOCKS(256 BYTES)
                ;   AX:BP=STARTING BLOCK NUMBER IN FILE
                ;
0303                DISKX   PROC    NEAR
0303  8B F7                 MOV     SI,DI
0305  E8 02E2 R             CALL    PUSHR
0308  8B FE                 MOV     DI,SI
030A  50                    PUSH    AX
030B  E8 357B R             CALL    _DSKBUSY            ;MAKE SURE DISK IS FREE
030E  0B C0                 OR      AX,AX
0310  58                    POP     AX
0311  74 05                 JE      DEX1
0313  E8 02F4 R     DEXERR: CALL    POPR
0316  F9                    STC
0317  C3                    RET
0318  8B F0         DEX1:   MOV     SI,AX
031A  52                    PUSH    DX
031B  1E                    PUSH    DS
031C  2E: 8E 1E 1291 R      MOV     DS,CS:MYDSEG
0321  BA 0038 R             MOV     DX,OFFSET DGROUP:DWBUFF
0324  B4 1A                 MOV     AH,1AH
0326  CD 21                 INT     21H
0328  07                    POP     ES                  ;MOVE DESTINATION SEG INTO ES
0329  5A                    POP     DX                  ;RESTORE FCB ADDRESS
032A  2E: 8E 1E 1291 R      MOV     DS,CS:MYDSEG        ;FCB IS IN MYDSEG
032F  8B DA                 MOV     BX,DX
0331  89 6F 21              MOV     DS:[BX].RRECLOW,BP
0334  89 77 23              MOV     DS:[BX].RRECHI,SI
0337  C7 47 0E 0100         MOV     DS:[BX].RECSIZ,100H ;MAKE SURE RECORD SIZE IS SET
033C  8B E9                 MOV     BP,CX
033E  51            DEX2:   PUSH    CX                  ;CX = NUMBER LEFT TO WRITE
033F  E8 0615 R             CALL    PACIFY              ; BP = TOTAL, CX = AMOUNT LEFT
0342  2E: 8E 1E 1291 R      MOV     DS,CS:MYDSEG
0347  B4 27                 MOV     AH,27H              ;READ A SINGLE RECORD
0349  83 F9 10              CMP     CX,DWBSIZ/100H
034C  7E 03                 JLE     DEX2A
034E  B9 0010               MOV     CX,DWBSIZ/100H
0351  CD 21         DEX2A:  INT     21H                 ;READ
0353  57                    PUSH    DI
0354  51                    PUSH    CX
0355  86 E9                 XCHG    CH,CL
0357  D1 E9                 SHR     CX,1
0359  51                    PUSH    CX

035A  BE 0038 R             MOV     SI,OFFSET DGROUP:DWBUFF
035D  26: 8B 05     DEX5:   MOV     AX,WORD PTR ES:[DI]
0360  A5                    MOVSW
0361  89 44 FE              MOV     WORD PTR DS:[SI-2],AX
0364  E2 F7                 LOOP    DEX5
0366  8C C0                 MOV     AX,ES
0368  59                    POP     CX
0369  D1 E9                 SHR     CX,1
036B  D1 E9                 SHR     CX,1
036D  D1 E9                 SHR     CX,1
036F  03 C1                 ADD     AX,CX
0371  8E C0                 MOV     ES,AX
0373  59                    POP     CX
0374  29 4F 21              SUB     WORD PTR DS:[BX].RRECLOW,CX
```

```
0377  83 5F 23 00              SBB     WORD PTR DS:[BX].RRECHI,0
037B  B4 28                    MOV     AH,28H
037D  CD 21                    INT     21H
037F  5F                       POP     DI
0380  59                       POP     CX
0381  83 F9 10                 CMP     CX,DWBSIZ/100H
0384  7E 05                    JLE     DEX6
0386  83 E9 10                 SUB     CX,DWBSIZ/100H
0389  EB B3                    JMP     DEX2
038B  E8 02F4 R         DEX6:  CALL    POPR
038E  2E: 8E 1E 1291 R         MOV     DS,CS:MYDSEG
0393  8B EA                    MOV     BP,DX
0395  3E: 8B 46 23             MOV     AX,DS:[BP].RRECHI
0399  3E: 8B 6E 21             MOV     BP,DS:[BP].RRECLOW
039D  F8                       CLC
039E  C3                       RET
039F                    DISKX  ENDP
                        ;
                        ;
                        ;       PUBLIC  DISKIN
                        ;
                        ;   LOAD IN BYTES FROM DISK
                        ;
                        ; CALL WITH DX = FCB, DS:DI = DESTINATION, CX=NUMBER OF BLOCKS(256 BYTES)
                        ; AX:BP=STARTING BLOCK NUMBER IN FILE
                        ;
039F                    DISKIN  PROC    NEAR
039F  8B F7                    MOV     SI,DI
03A1  E8 02E2 R                CALL    PUSHR
03A4  8B FE                    MOV     DI,SI
03A6  50                       PUSH    AX
03A7  E8 357B R                CALL    _DSKBUSY              ;MAKE SURE DISK IS FREE
03AA  0B C0                    OR      AX,AX
03AC  58                       POP     AX
03AD  74 05                    JE      DIN1
03AF  E8 02F4 R        DINERR: CALL    POPR
03B2  F9                       STC
03B3  C3                       RET
03B4  8B F0            DIN1:   MOV     SI,AX
03B6  2E: 83 3E 1854 R 00      CMP     CS:ISPS2,0
038C  75 08                    JNE     @F
038E  2E: 83 3E 183C R 00      CMP     CS:NOFLICK,0
03C4  75 0F                    JNE     DIN1A
03C6  8C D8            @@:     MOV     AX,DS
03C8  3D A000                  CMP     AX,0A000H
03CB  72 08                    JB      DIN1A
03CD  3D C000                  CMP     AX,0C000H
03D0  73 03                    JAE     DIN1A
03D2  EB 60 90                 JMP     DINFL
03D5  52               DIN1A:  PUSH    DX
03D6  8B D7                    MOV     DX,DI                 ;SET NEW DTA
03D8  B4 1A                    MOV     AH,1AH
03DA  CD 21                    INT     21H
03DC  5A                       POP     DX                    ;RESTORE FCB ADDRESS
03DD  2E: 8E 06 1291 R         MOV     ES,CS:MYDSEG          ;FCB IS IN MYDSEG
03E2  8B DA                    MOV     BX,DX
03E4  26: 89 6F 21             MOV     ES:[BX].RRECLOW,BP
03E8  26: 89 77 23             MOV     ES:[BX].RRECHI,SI
03EC  26: C7 47 0E 0100        MOV     ES:[BX].RECSIZ,100H   ;MAKE SURE RECORD SIZE IS SET
03F2  51                       PUSH    CX
03F3  81 F9 00FF       DIN3:   CMP     CX,0FFH               ; 64k - 1 RECORD MAX READ
```

```
03F7  76 03                         JBE     DIN2
03F9  B9 00FF                       MOV     CX,0FFH
03FC  1E              DIN2:         PUSH    DS
03FD  2E: 8E 1E 1291 R              MOV     DS,CS:MYDSEG
0402  B4 27                         MOV     AH,27H
0404  CD 21                         INT     21H                     ;READ
0406  0A C0                         OR      AL,AL                   ;END?
0408  58                            POP     AX                      ;GET DTA SEG INTO AX
0409  75 22                         JNE     DIN4                    ;
040B  D1 E1                         SHL     CX,1                    ;*10H=NUMBER OF SEGMENTS TO ADJ.
040D  D1 E1                         SHL     CX,1
040F  D1 E1                         SHL     CX,1
0411  D1 E1                         SHL     CX,1
0413  03 C1                         ADD     AX,CX                   ;ADJUST FOR READ
0415  8E D8                         MOV     DS,AX                   ;
0417  52                            PUSH    DX                      ;AND SET NEW DTA
0418  8B D7                         MOV     DX,DI
041A  B4 1A                         MOV     AH,1AH
041C  CD 21                         INT     21H
041E  5A                            POP     DX                      ;RESTORE FCB
041F  59                            POP     CX                      ;RESTORE COUNT
0420  81 F9 00FF                    CMP     CX,0FFH
0424  76 07                         JBE     DIN4
0426  81 E9 00FF                    SUB     CX,0FFH
042A  51                            PUSH    CX
042B  EB C6                         JMP     DIN3
042D  E8 02F4 R       DIN4:         CALL    POPR
0430  2E: 8E 1E 1291 R              MOV     DS,CS:MYDSEG
0435  8B EA                         MOV     BP,DX
0437  3E: 8B 46 23                  MOV     AX,DS:[BP].RRECHI
043B  3E: 8B 6E 21                  MOV     BP,DS:[BP].RRECLOW
043F  F8                            CLC
0440  C3                            RET
                      ; ROUTINE TO LOAD SCREEN DATA INTO SC. BUFF WITH RETRACE CHECK
                                    PUBLIC  DINFL 0441  52              DINFL:        PUSH    DX
0442  1E                            PUSH    DS
0443  2E: 8E 1E 1291 R              MOV     DS,CS:MYDSEG
0448  BA 0038 R                     MOV     DX,OFFSET DGROUP:DWBUFF
044B  B4 1A                         MOV     AH,1AH
044D  CD 21                         INT     21H
044F  07                            POP     ES                      ;MOVE DESTINATION SEG INTO ES
0450  5A                            POP     DX                      ;RESTORE FCB ADDRESS
0451  2E: 8E 1E 1291 R              MOV     DS,CS:MYDSEG            ;FCB IS IN MYDSEG
0456  8B DA                         MOV     BX,DX
0458  89 6F 21                      MOV     DS:[BX].RRECLOW,BP
045B  89 77 23                      MOV     DS:[BX].RRECHI,SI
045E  C7 47 0E 0100                 MOV     DS:[BX].RECSIZ,100H     ;MAKE SURE RECORD SIZE IS SET
0463  8B E9                         MOV     BP,CX
0465  51              DINF3:        PUSH    CX                      ;CX = NUMBER LEFT TO READ
0466  2E: 8E 1E 1291 R              MOV     DS,CS:MYDSEG
0468  B4 27                         MOV     AH,27H                  ;READ MULTIPLE RECORDS
046D  83 F9 10                      CMP     CX,DWBSIZ/100H
0470  7E 03                         JLE     DINF4
0472  B9 0010                       MOV     CX,DWBSIZ/100H
0475  CD 21           DINF4:        INT     21H                     ;READ
0477  57                            PUSH    DI                      ;SAVE ADDRESS
0478  51                            PUSH    CX                      ;SAVE RECORD COUNT
0479  86 E9                         XCHG    CH,CL                   ;CONVERT TO WORD COUNT
047B  D1 E9                         SHR     CX,1
047D  51                            PUSH    CX                      ;SAVE WORD COUNT
```

```
047E  BE 0038 R              MOV     SI,OFFSET DGROUP:DWBUFF ;GET BYTES FROM HERE
0481  52                     PUSH    DX
0482  1E                     PUSH    DS
0483  B8 ---- R              MOV     AX,BIOS_SEG
0486  8E D8                  MOV     DS,AX                   ;GET 6845 INDEX REGISTER
                             ASSUME  DS:BIOS_SEG
0488  8B 16 0063 R           MOV     DX,CRT_ADDR
048C  1F                     POP     DS
                             ASSUME  DS:DGROUP
048D  83 C2 06               ADD     DX,6                    ;GET STATUS REGISTER
0490  2E: 83 3E 1854 R 00  DINF1:  CMP   CS:ISPS2,0
0496  75 0B                  JNE     DINF5
0498  EC            DINF1A:  IN      AL,DX
0499  A8 01                  TEST    AL,1
049B  75 FB                  JNE     DINF1A
049D  FA                     CLI
049E  EC            @@:      IN      AL,DX
049F  A8 01                  TEST    AL,1
04A1  74 FB                  JE      @B
04A3  A5            DINF5:   MOVSW
04A4  E2 EA                  LOOP    DINF1
04A6  5A                     POP     DX
04A7  8C C0                  MOV     AX,ES
04A9  59                     POP     CX

04AA  D1 E9                  SHR     CX,1
04AC  D1 E9                  SHR     CX,1
04AE  D1 E9                  SHR     CX,1
04B0  03 C1                  ADD     AX,CX
04B2  8E C0                  MOV     ES,AX
04B4  59                     POP     CX
04B5  5F                     POP     DI
04B6  59                     POP     CX
04B7  83 F9 10               CMP     CX,DWBSIZ/100H
04BA  7E 05                  JLE     DINF2
04BC  83 E9 10               SUB     CX,DWBSIZ/100H
04BF  EB A4                  JMP     DINF3
04C1  E8 02F4 R     DINF2:   CALL    POPR
04C4  2E: 8E 1E 1291 R       MOV     DS,CS:MYDSEG
04C9  8B EA                  MOV     BP,DX
04CB  3E: 8B 46 23           MOV     AX,DS:[BP].RRECHI
04CF  3E: 8B 6E 21           MOV     BP,DS:[BP].RRECLOW
04D3  F8                     CLC
04D4  C3                     RET
04D5                DISKIN   ENDP
                    ;
                             PUBLIC  DISKOUT
                    ;
                    ;        WRITE OUT BYTES FROM DISK
                    ;
                    ; CALL WITH DX = FCB, DS:DI = DESTINATION, CX=NUMBER OF BLOCKS(256 BYTES)
                    ; AX:BP=STARTING BLOCK NUMBER IN FILE
                    ;
04D5                DISKOUT  PROC    NEAR
04D5  8B F7                  MOV     SI,DI
04D7  E8 02E2 R              CALL    PUSHR
04DA  8B FE                  MOV     DI,SI
04DC  50                     PUSH    AX
04DD  E8 357B R              CALL    _DSKBUSY                ;MAKE SURE DISK IS FREE
04E0  0B C0                  OR      AX,AX
04E2  58                     POP     AX
```

```
04E3  74 05                              JE      DOT1
04E5  E8 02F4 R            DOTERR: CALL   POPR
04E8  F9                           STC
04E9  C3                           RET
04EA  8B F0                DOT1:   MOV    SI,AX            ;HIGH PART OF RECORD NUMBER
04EC  2E: 83 3E 1854 R 00          CMP    CS:ISPS2,0
04F2  75 08                        JNE    aF
04F4  2E: 83 3E 183C R 00          CMP    CS:NOFLICK,0
04FA  75 0F                        JNE    DOT1A
04FC  8C D8                aa:     MOV    AX,DS
04FE  3D A000                      CMP    AX,0A000H
0501  72 08                        JB     DOT1A
0503  3D C000                      CMP    AX,0C000H
0506  73 03                        JAE    DOT1A
0508  E9 72 90                     JMP    DOTFL
050B  52                  DOT1A:   PUSH   DX
050C  8B D7                        MOV    DX,DI            ;SET NEW DTA
050E  B4 1A                        MOV    AH,1AH
0510  CD 21                        INT    21H
0512  5A                           POP    DX               ;RESTORE FCB ADDRESS
0513  2E: 8E 06 1291 R             MOV    ES,CS:MYDSEG     ;FCB IS IN MYDSEG
0518  8B DA                        MOV    BX,DX
051A  26: 89 6F 21                 MOV    ES:[BX].RRECLOW,BP
051E  26: 89 77 23                 MOV    ES:[BX].RRECHI,SI
0522  26: C7 47 0E 0100            MOV    ES:[BX].RECSIZ,100H ;MAKE SURE RECORD SIZE IS SET
0528  8B E9                        MOV    BP,CX
052A  51                           PUSH   CX
052B  E8 0615 R           DOT3:    CALL   PACIFY
052E  81 F9 00FF                   CMP    CX,0FFH          ; 64k MAX READ
0532  76 03                        JBE    DOT2
0534  B9 00FF                      MOV    CX,0FFH
0537  1E                  DOT2:    PUSH   DS
0538  2E: 8E 1E 1291 R             MOV    DS,CS:MYDSEG
053D  B4 28                        MOV    AH,28H
053F  CD 21                        INT    21H              ;READ
0541  0A C0                        OR     AL,AL
0543  58                           POP    AX               ;GET DTA SEG
0544  75 22                        JNE    DOT4
0546  D1 E1                        SHL    CX,1
0548  D1 E1                        SHL    CX,1
054A  D1 E1                        SHL    CX,1
054C  D1 E1                        SHL    CX,1
054E  03 C1                        ADD    AX,CX            ;ADJUST FOR READ
0550  8E D8                        MOV    DS,AX            ;
0552  52                           PUSH   DX               ;AND SET NEW DTA
0553  8B D7                        MOV    DX,DI
0555  B4 1A                        MOV    AH,1AH
0557  CD 21                        INT    21H
0559  5A                           POP    DX               ;RESTORE FCB
055A  59                           POP    CX               ;RESTORE COUNT
055B  81 F9 00FF                   CMP    CX,0FFH
055F  76 07                        JBE    DOT4
0561  81 E9 00FF                   SUB    CX,0FFH
0565  51                           PUSH   CX
0566  EB C3                        JMP    DOT3
0568  E8 02F4 R           DOT4:    CALL   POPR
056B  2E: 8E 1E 1291 R             MOV    DS,CS:MYDSEG
0570  8B EA                        MOV    BP,DX
0572  3E: 8B 46 23                 MOV    AX,DS:[BP].RRECHI
0576  3E: 8B 6E 21                 MOV    BP,DS:[BP].RRECLOW
057A  F8                           CLC
057B  C3                           RET
                                   ;
```

```
                ; ROUTINE TO LOAD SCREEN DATA INTO SC. BUFF WITH RETRACE CHECK
                  PUBLIC  DOTFL
                ;
057C 52         DOTFL:  PUSH    DX
057D 1E                 PUSH    DS
057E 2E: 8E 1E 1291 R   MOV     DS,CS:MYDSEG
0583 BA 0038 R          MOV     DX,OFFSET DGROUP:DWBUFF
0586 B4 1A              MOV     AH,1AH
0588 CD 21              INT     21H
058A 07                 POP     ES              ;MOVE SOURCE SEG INTO ES
058B 5A                 POP     DX              ;RESTORE FCB ADDRESS
058C 2E: 8E 1E 1291 R   MOV     DS,CS:MYDSEG    ;FCB IS IN MYDSEG
0591 8B DA              MOV     BX,DX
0593 89 6F 21           MOV     DS:[BX].RRECLOW,BP
0596 89 77 23           MOV     DS:[BX].RRECHI,SI
0599 C7 47 0E 0100      MOV     DS:[BX].RECSIZ,100H ;MAKE SURE RECORD SIZE IS SET
059E 8B E9              MOV     BP,CX
05A0 51         DOTF3:  PUSH    CX              ;CX = NUMBER LEFT TO READ
05A1 83 F9 10           CMP     CX,DWBSIZ/100H
05A4 7E 03              JLE     DOTF4
05A6 B9 0010            MOV     CX,DWBSIZ/100H
05A9 56         DOTF4:  PUSH    SI              ;SAVE ADDRESS
05AA 51                 PUSH    CX              ;SAVE RECORD COUNT
05AB 86 E9              XCHG    CH,CL           ;CONVERT TO WORD COUNT
05AD D1 E9              SHR     CX,1
05AF 51                 PUSH    CX              ;SAVE WORD COUNT
05B0 BF 0038 R          MOV     DI,OFFSET DGROUP:DWBUFF ;PUT BYTES HERE
05B3 52                 PUSH    DX
05B4 B8 ---- R          MOV     AX,BIOS_SEG
05B7 8E D8              MOV     DS,AX           ;GET 6845 INDEX REGISTER
                        ASSUME  DS:BIOS_SEG
05B9 8B 16 0063 R       MOV     DX,CRT_ADDR
05BD 06                 PUSH    ES
05BE 1F                 POP     DS              ;DS IS NOW SCREEN DATA SEG
05BF 2E: 8E 06 1291 R   MOV     ES,CS:MYDSEG
                        ASSUME  DS:DGROUP
05C4 83 C2 06           ADD     DX,6            ;GET STATUS REGISTER
05C7 2E: 83 3E 1854 R 00 DOTF1: CMP    CS:ISPS2,0
05CD 75 0B              JNE     DOTF5
05CF EC         DOTF1A: IN      AL,DX
05D0 A8 01              TEST    AL,1
05D2 75 FB              JNE     DOTF1A
05D4 FA                 CLI
05D5 EC         @@:     IN      AL,DX
05D6 A8 01              TEST    AL,1
05D8 74 FB              JE      @@
05DA A5         DOTF5:  MOVSW
05DB E2 EA              LOOP    DOTF1
05DD 5A                 POP     DX              ;FCB
05DE 8C D8              MOV     AX,DS           ;SCREEN BUFF
05E0 59                 POP     CX              ;GET WORD COUNT
05E1 D1 E9              SHR     CX,1            ;CONVERT TO SEG COUNT
05E3 D1 E9              SHR     CX,1
05E5 D1 E9              SHR     CX,1
05E7 03 C1              ADD     AX,CX           ;ADJUST COUNT
05E9 8E C0              MOV     ES,AX           ;SAVE NEW ADDR IN ES
05EB 59                 POP     CX              ;RECORD COUNT
05EC 2E: 8E 1E 1291 R   MOV     DS,CS:MYDSEG    ;
05F1 B4 28              MOV     AH,28H          ;WRITE RANDOM
05F3 CD 21              INT     21H
05F5 5E                 POP     SI              ;OFFSET
05F6 59                 POP     CX              ;NUMBER LEFT
05F7 83 F9 10           CMP     CX,DWBSIZ/100H
```

```
05FA  7E 05                              JLE      DOTF2
05FC  83 E9 10                           SUB      CX,DWBSIZ/100H
05FF  EB 9F                              JMP      DOTF3
0601  E8 02F4 R           DOTF2:         CALL     POPR
0604  2E: 8E 1E 1291 R                   MOV      DS,CS:MYDSEG
0609  8B EA                              MOV      BP,DX
060B  3E: 8B 46 23                       MOV      AX,DS:[BP].RRECHI
060F  3E: 8B 6E 21                       MOV      BP,DS:[BP].RRECLOW
0613  F8                                 CLC
0614  C3                                 RET
0615                              DISKOUT ENDP
                                  ;
0615                              PACIFY  PROC     NEAR

IFNDEF  TSRONLY
                                          EXTRN    PACIFY1:NEAR
0615  E8 0000 E                           CALL     PACIFY1
                                  ENDIF
0618  C3                                  RET
0619                              PACIFY  ENDP
                                  ;
                                          PUBLIC   PAGEX
                                  ;
                                  ;    EXCHANGE MEMORY WITH LIM
                                  ;
                                  ; CALL WITH BX=PAGE NUMBER, DS:DI=SEGMENT NUMBER, CX=NUMBER OF PAGES
                                  ; BP=NUMBER OF WORDS IN LAST PAGE, DX=EMMHANDLE
                                  ;
0619                              PAGEX   PROC     NEAR
0619  1E                                  PUSH     DS
061A  06                                  PUSH     ES
061B  55                                  PUSH     BP
061C  FC                                  CLD
                                          EMM_SAVE_STATE
061D  B4 47             1                 MOV      AH,47H
061F  E8 025F R         1                 CALL     DOEMM
0622  1E                                  PUSH     DS                 ;MOVE DESTINATION SEGMENT TO ES
0623  07                                  POP      ES
0624  33 F6              PEX1:            XOR      SI,SI
0626  B8 4400                             MOV      AX,4400H           ;MAP LOGICAL PAGE IN BX TO PHYS. PG 0
0629  E8 025F R                           CALL     DOEMM
062C  43                                  INC      BX
062D  49                                  DEC      CX
062E  E3 30                               JCXZ     PEX2
0630  81 C6 2000                          ADD      SI,2000H
0634  B8 4401                             MOV      AX,4401H
0637  E8 025F R                           CALL     DOEMM
063A  43                                  INC      BX
063B  49                                  DEC      CX
063C  E3 22                               JCXZ     PEX2
063E  81 C6 2000                          ADD      SI,2000H
0642  B8 4402                             MOV      AX,4402H
0645  E8 025F R                           CALL     DOEMM
0648  43                                  INC      BX
0649  49                                  DEC      CX
064A  E3 14                               JCXZ     PEX2
064C  81 C6 2000                          ADD      SI,2000H
0650  B8 4403                             MOV      AX,4403H
0653  E8 025F R                           CALL     DOEMM
0656  43                                  INC      BX
0657  49                                  DEC      CX
0658  E3 06                               JCXZ     PEX2
```

```
065A  81 C6 2000              ADD     SI,2000H
065E  EB 03                   JMP     SHORT PEX3
0660  5D              PEX2:   POP     BP
0661  03 F5                   ADD     SI,BP
0663  2E: A1 00A0 R   PEX3:   MOV     AX,CS:EMMFR
0667  8E D8                   MOV     DS,AX           ;SET DS TO EMM PAGE FRAME SEG
0669  51                      PUSH    CX
066A  8B CE                   MOV     CX,SI           ;MOVE NUMBER IN LAST PAGE
066C  8B EE                   MOV     BP,SI
066E  33 F6                   XOR     SI,SI
0670  57                      PUSH    DI
0671  FA                      CLI
0672  26: 8B 05      PEX4:    MOV     AX,ES:[DI]
0675  A5                      MOVSW
0676  89 44 FE                MOV     DS:[SI-2],AX
0679  E2 F7                   LOOP    PEX4
067B  FB                      STI
067C  5F                      POP     DI
067D  D1 ED                   SHR     BP,1
067F  D1 ED                   SHR     BP,1
0681  D1 ED                   SHR     BP,1
0683  8C C6                   MOV     SI,ES
0685  03 F5                   ADD     SI,BP           ;PARAGRAPHS PER PAGE
0687  8E C6                   MOV     ES,SI
0689  59                      POP     CX
068A  E3 02                   JCXZ    PEXEND
068C  EB 96                   JMP     PEX1
068E                 PEXEND:  EMM_RESTORE_STATE
068E  B4 48        1          MOV     AH,48H
0690  E8 025F R    1          CALL    DOEMM
0693  07                      POP     ES
0694  1F                      POP     DS
0695  C3                      RET
0696                 PAGEX    ENDP
                     ;
                     ;
                     ;       PUBLIC  PAGEIN
                     ;
                     ;   LOAD EMM PAGES TO SEGMENT
                     ;
                     ; CALL WITH BX=PAGE NUMBER, DI=SEGMENT NUMBER,CX=NUMBER OF PAGES
                     ; BP=NUMBER OF WORDS IN LAST PAGE, DX=EMMHANDLE
                     ;
0696                 PAGEIN   PROC    NEAR
0696  1E                      PUSH    DS
0697  06                      PUSH    ES
0698  FC                      CLD
                              EMM_SAVE_STATE
0699  B4 47        1          MOV     AH,47H
069B  E8 025F R    1          CALL    DOEMM
069E  33 F6                PI1: XOR   SI,SI
06A0  B8 4400                 MOV     AX,4400H        ;MAP LOGICAL PAGE IN BX TO PHYS. PG 0
06A3  E8 025F R               CALL    DOEMM
06A6  43                      INC     BX
06A7  49                      DEC     CX
06A8  E3 30                   JCXZ    MOVEIN
06AA  81 C6 2000              ADD     SI,2000H
06AE  B8 4401                 MOV     AX,4401H
06B1  E8 025F R               CALL    DOEMM
06B4  43                      INC     BX
06B5  49                      DEC     CX
06B6  E3 22                   JCXZ    MOVEIN
```

```
06B8  81 C6 2000              ADD    SI,2000H
06BC  B8 4402                 MOV    AX,4402H
06BF  E8 025F R               CALL   DOEMM
06C2  43                      INC    BX
06C3  49                      DEC    CX
06C4  E3 14                   JCXZ   MOVEIN
06C6  81 C6 2000              ADD    SI,2000H
06CA  B8 4403                 MOV    AX,4403H
06CD  E8 025F R               CALL   DOEMM
06D0  43                      INC    BX
06D1  49                      DEC    CX
06D2  E3 06                   JCXZ   MOVEIN
06D4  81 C6 2000              ADD    SI,2000H
06D8  EB 02                   JMP    SHORT MOVEI1
06DA  03 F5           MOVEIN: ADD    SI,BP
06DC  2E: A1 00A0 R   MOVEI1: MOV    AX,CS:EMMFR
06E0  8E D8                   MOV    DS,AX          ;SET DS TO EMM PAGE FRAME SEG
06E2  51                      PUSH   CX
06E3  8B CE                   MOV    CX,SI          ;MOVE NUMBER IN LAST PAGE
06E5  8B C6                   MOV    AX,SI
06E7  8E C7                   MOV    ES,DI
06E9  33 F6                   XOR    SI,SI
06EB  8B FE                   MOV    DI,SI
06ED  50                      PUSH   AX
06EE  2E: 83 3E 183C R 00     CMP    CS:NOFLICK,0
06F4  75 2E                   JNE    PIN1A
06F6  8C C0                   MOV    AX,ES
06F8  3D A000                 CMP    AX,0A000H
06FB  72 27                   JB     PIN1A
06FD  3D C000                 CMP    AX,0C000H
0700  73 22                   JAE    PIN1A
0702  52                      PUSH   DX
0703  1E                      PUSH   DS
0704  B8 ---- R               MOV    AX,BIOS_SEG
0707  8E D8                   MOV    DS,AX          ;GET 6845 INDEX REGISTER
                              ASSUME DS:BIOS_SEG
0709  8B 16 0063 R            MOV    DX,CRT_ADDR
070D  1F                      POP    DS
070E  83 C2 06                ADD    DX,6           ;GET STATUS REGISTER
0711  EC              PINF1:  IN     AL,DX
0712  A8 01                   TEST   AL,1
0714  75 FB                   JNE    PINF1
0716  FA                      CLI
0717  EC              @@:     IN     AL,DX
0718  A8 01                   TEST   AL,1
071A  74 FB                   JE     @B
071C  A5                      MOVSW
071D  FB                      STI
071E  E2 F1                   LOOP   PINF1
0720  5A                      POP    DX
0721  58                      POP    AX
0722  EB 04                   JMP    SHORT PIN1B 0724  58              PIN1A:  POP    AX
0725  FA                      CLI
0726  F3/ A5                  REP    MOVSW          ;MOVE DATA IN
0728  D1 E8           PIN1B:  SHR    AX,1
072A  D1 E8                   SHR    AX,1
072C  D1 E8                   SHR    AX,1
072E  8C C7                   MOV    DI,ES
0730  03 F8                   ADD    DI,AX          ;PARAGRAPHS PER PAGE
0732  59                      POP    CX
0733  E3 03                   JCXZ   PIEND
```

```
0735  E9 069E R                      JMP      P11
0738                         PIEND:  EMM_RESTORE_STATE
0738  B4 48              1           MOV      AH,48H
073A  E8 025F R          1           CALL     DOEMM
073D  07                                 POP      ES
073E  1F                                 POP      DS
073F  C3                                 RET
0740                         PAGEIN  ENDP
                             ;
                             ;
                             ;       PUBLIC   PAGEOUT
                             ;
                             ;   LOAD SEGMENT TO EMM PAGE
                             ;
                             ; CALL WITH BX=PAGE NUMBER, DI=SEGMENT NUMBER,CX=NUMBER OF PAGES
                             ; DX=EMM HANDLE, BP=WORDS IN LAST PAGE
                             ;
0740                         PAGEOUT PROC    NEAR
0740  1E                             PUSH    DS
0741  06                             PUSH    ES
0742  FC                             CLD
                                     EMM_SAVE_STATE
0743  B4 47              1           MOV     AH,47H
0745  E8 025F R          1           CALL    DOEMM
0748  33 F6                  PO1:    XOR     SI,SI
074A  B8 4400                        MOV     AX,4400H        ;MAP LOGICAL PAGE IN BX TO PHYS. PG 0
074D  E8 025F R                      CALL    DOEMM
0750  43                             INC     BX
0751  49                             DEC     CX
0752  E3 30                          JCXZ    PO2
0754  81 C6 2000                     ADD     SI,2000H
0758  B8 4401                        MOV     AX,4401H
075B  E8 025F R                      CALL    DOEMM
075E  43                             INC     BX
075F  49                             DEC     CX
0760  E3 22                          JCXZ    PO2
0762  81 C6 2000                     ADD     SI,2000H
0766  B8 4402                        MOV     AX,4402H
0769  E8 025F R                      CALL    DOEMM
076C  43                             INC     BX
076D  49                             DEC     CX
076E  E3 14                          JCXZ    PO2
0770  81 C6 2000                     ADD     SI,2000H
0774  B8 4403                        MOV     AX,4403H
0777  E8 025F R                      CALL    DOEMM
077A  43                             INC     BX
077B  49                             DEC     CX
077C  E3 06                          JCXZ    PO2
077E  81 C6 2000                     ADD     SI,2000H
0782  EB 02                          JMP     SHORT PO3
0784  03 F5                  PO2:    ADD     SI,BP
0786  2E: A1 00A0 R          PO3:    MOV     AX,CS:EMMFR
078A  8E C0                          MOV     ES,AX           ;SET DS TO EMM PAGE FRAME SEG
078C  51                             PUSH    CX
078D  8B CE                          MOV     CX,SI           ;MOVE NUMBER IN LAST PAGE
078F  8B C6                          MOV     AX,SI
0791  8E DF                          MOV     DS,DI
0793  33 F6                          XOR     SI,SI
0795  8B FE                          MOV     DI,SI
0797  50                             PUSH    AX
0798  2E: 83 3E 183C R 00            CMP     CS:NOFLICK,0
079E  75 2E                          JNE     POT1A
```

```
07A0  8C C0              MOV     AX,ES
07A2  3D A000            CMP     AX,0A000H
07A5  72 27              JB      POT1A
07A7  3D C000            CMP     AX,0C000H
07AA  73 22              JAE     POT1A
07AC  52                 PUSH    DX
07AD  1E                 PUSH    DS
07AE  B8 ---- R          MOV     AX,BIOS_SEG
07B1  8E D8              MOV     DS,AX              ;GET 6845 INDEX REGISTER
                         ASSUME  DS:BIOS_SEG
07B3  8B 16 0063 R       MOV     DX,CRT_ADDR
                         ASSUME  DS:DGROUP
07B7  1F                 POP     DS
07B8  83 C2 06           ADD     DX,6               ;GET STATUS REGISTER
07BB  EC          POTF1: IN      AL,DX
07BC  A8 01              TEST    AL,1
07BE  75 FB              JNE     POTF1
07C0  FA                 CLI
07C1  EC             aa: IN      AL,DX
07C2  A8 01              TEST    AL,1
07C4  74 FB              JE      aa
07C6  A5                 MOVSW
07C7  FB                 STI
07C8  E2 F1              LOOP    POTF1
07CA  5A                 POP     DX
07CB  58                 POP     AX
07CC  EB 04              JMP     SHORT POT1B

07CE  58          POT1A: POP     AX
07CF  FA                 CLI
07D0  F3/ A5             REP     MOVSW              ;MOVE DATA IN
07D2  D1 E8       POT1B: SHR     AX,1
07D4  D1 E8              SHR     AX,1
07D6  D1 E8              SHR     AX,1
07D8  8C DF              MOV     DI,DS
07DA  03 F8              ADD     DI,AX              ;PARAGRAPHS PER PAGE
07DC  59                 POP     CX
07DD  E3 03              JCXZ    POEND
07DF  E9 0748 R          JMP     PO1
07E2          POEND:     EMM_RESTORE_STATE
07E2  B4 48           1  MOV     AH,48H
07E4  E8 025F R       1  CALL    DOEMM
07E7  07                 POP     ES
07E8  1F                 POP     DS
07E9  C3                 RET
07EA          PAGEOUT    ENDP
              ;
                         PUBLIC  EXTRTN1
              ;
07EA          EXTRTN1 PROC  NEAR     ;CALCULATE RAM 24BIT ADDRESS FROM SEGMENT IN DI
07EA  33 C0              XOR     AX,AX
07EC  D1 E7              SHL     DI,1               ;SET SEGMENT ADDRESS
07EE  D1 D0              RCL     AX,1               ;TO BYTE ADDRESS (*2)
07F0  D1 E7              SHL     DI,1
07F2  D1 D0              RCL     AX,1               ;*4
07F4  D1 E7              SHL     DI,1
07F6  D1 D0              RCL     AX,1               ;*8
07F8  D1 E7              SHL     DI,1
07FA  D1 D0              RCL     AX,1               ;*10H
07FC  89 7C 02           MOV     [SI].BASELO,DI     ;RAM ADDRESS
07FF  88 44 04           MOV     [SI].BASEHI,AL
0802  C6 44 05 93        MOV     [SI].ACCESS,93H
```

```
0806  C3                              RET
0807                          EXTRTN1 ENDP
                              ;
                                      PUBLIC  EXTRTN2
                              ;
0807                          EXTRTN2 PROC    NEAR    ;CALC EXTENDED DESTINATION BASED ON PAGE & BASE
                                                     ;DX = STARTING 1K BLOCK NUMBER (RELATIVE TO 1MB)
                                                     ;BX = 16K PAGE OFFSET FROM DX
0807  8A C6                           MOV     AL,DH           ;MULTIPLY 1K BLOCK NUMBER BY 100H
0809  8A F2                           MOV     DH,DL           ; (COMPUTE BYTE ADDRESS OF FIRST 1K)
080B  32 E4                           XOR     AH,AH
080D  8A D4                           MOV     DL,AH           ;* 100H
080F  D1 E2                           SHL     DX,1
0811  D1 D0                           RCL     AX,1            ;* 2
0813  D1 E2                           SHL     DX,1
0815  D1 D0                           RCL     AX,1            ;*2 =*400H = BYTE LOC OF 1ST 1K BLK
0817  8B E8                           MOV     BP,AX           ; PLACE IN BP:DX
0819  8A C7                           MOV     AL,BH           ; NOW COMPUTE OFFSET FROM FIRST BLK
081B  8A FB                           MOV     BH,BL           ; FROM PAGE NUMBER IN BX
081D  32 E4                           XOR     AH,AH
081F  8A DC                           MOV     BL,AH           ;* 100H
0821  D1 E3                           SHL     BX,1
0823  D1 D0                           RCL     AX,1            ;*2
0825  D1 E3                           SHL     BX,1
0827  D1 D0                           RCL     AX,1            ;*4
0829  D1 E3                           SHL     BX,1
082B  D1 D0                           RCL     AX,1            ;*8
082D  D1 E3                           SHL     BX,1
082F  D1 D0                           RCL     AX,1            ;*10
0831  D1 E3                           SHL     BX,1
0833  D1 D0                           RCL     AX,1            ;*20
0835  D1 E3                           SHL     BX,1
0837  D1 D0                           RCL     AX,1            ;*40H = PAGE * 4000H = BYTE OFFSET
0839  03 DA                           ADD     BX,DX           ; ADD IN OFFSET OF 1ST 1K
083B  13 C5                           ADC     AX,BP           ; GET ADDRESS OF DESTINATION
083D  05 0010                         ADD     AX,10H          ;NOW ADJUST TO +1K
0840  89 5C 02                        MOV     [SI].BASELO,BX
0843  88 44 04                        MOV     [SI].BASEHI,AL
0846  C6 44 05 93                     MOV     [SI].ACCESS,93H
084A  C3                              RET
084B                          EXTRTN2 ENDP
                              ;
                                      PUBLIC  EXTOUT
                              ;
                              ;   LOAD SEGMENT TO EXTENDED MEMORY
                              ;
                              ; CALL WITH BX=PAGE NUMBER, DI=SEGMENT NUMBER,CX=NUMBER OF PAGES
                              ; DX=FIRST 1K,BP = WORDS IN LAST PAGE
                              ;
084B  FFFF                    EXINUSE DW      -1
                              ;
084D                          EXTOUT  PROC    NEAR
084D  2E: FF 06 084B R                INC     CS:EXINUSE
0852  74 03                           JE      EXTOOK
0854  E9 0286 R                       JMP     DOEMME
0857  1E                      EXTOOK: PUSH    DS
0858  06                              PUSH    ES
0859  52                              PUSH    DX              ;NEED TO SAVE OFFSET
085A  2E: 8E 1E 1291 R                MOV     DS,CS:MYDSEG
085F  51                              PUSH    CX              ;SAVE BLOCK COUNT
0860  55                              PUSH    BP              ;AND WORDS IN LAST PAGE
                              ;
                              ;SET UP FIRST RAM SOURCE ADDRESS
0861  BE 4E10 R                       MOV     SI,OFFSET BOTSRC
```

```
                        ;SET UP FIRST EXTENDED MEMORY DESTINATION ADDRESS
0867  BE 4E18 R                 MOV     SI,OFFSET BOTDST
086A  E8 0807 R                 CALL    EXTRTN2
                        ;
086D  50                        POP     BP
086E  59                        POP     CX
086F  55              EX00:     PUSH    BP
0870  51                        PUSH    CX
0871  83 F9 03                  CMP     CX,3
0874  76 05                     JBE     EX01
0876  B9 C000                   MOV     CX,0C000H           ;SET FOR MAX MOVE
0879  EB 11                     JMP     SHORT EX01A
                        ;
                        ;COMPUTE ADDRESS LIMIT OF NEXT MOVE
087B  49              EX01:     DEC     CX                  ; LAST PAGE IS BP WORDS
087C  86 E9                     XCHG    CH,CL               ;* 100H
087E  D1 E1                     SHL     CX,1                ;* 2
0880  D1 E1                     SHL     CX,1                ;* 4
0882  D1 E1                     SHL     CX,1                ;* 8
0884  D1 E1                     SHL     CX,1                ;* 10H
0886  D1 E1                     SHL     CX,1                ;* 20H
0888  03 CD                     ADD     CX,BP               ; = TOTAL NUMBER OF WORDS TO MOVE
088A  D1 E1                     SHL     CX,1                ;* 40H = *4000H
088C  BE 4E10 R       EX01A:    MOV     SI,OFFSET BOTSRC
088F  89 0C                     MOV     [SI].LIMIT,CX       ; MAX PER MOVE IS C000 BYTES
0891  BE 4E18 R                 MOV     SI,OFFSET BOTDST
0894  89 0C                     MOV     [SI].LIMIT,CX       ;SET LIMIT SAME AS SOURCE
0896  51                        PUSH    CX                  ;SAVE BYTE COUNT
0897  D1 E9                     SHR     CX,1                ;CX = NUMBER OF WORDS
0899  BE 4E00 R                 MOV     SI,OFFSET BOTHAND   ;NOW DO MOVE
089C  2E: 8E 06 1291 R          MOV     ES,CS:MYDSEG
08A1  B4 87                     MOV     AH,87H
08A3  9C                        PUSHF
08A4  FA                        CLI
08A5  9A 2CF4 ---- R            CALL    FAR PTR NEWI15
                                INT     15H
08AA  59                        POP     CX                  ;GET BYTE COUNT
08AB  BE 4E10 R                 MOV     SI,OFFSET BOTSRC
08AE  01 4C 02                  ADD     [SI].BASELO,CX
08B1  80 54 04 00               ADC     [SI].BASEHI,0
08B5  BE 4E18 R                 MOV     SI,OFFSET BOTDST
08B8  01 4C 02                  ADD     [SI].BASELO,CX
08BB  80 54 04 00               ADC     [SI].BASEHI,0
08BF  59                        POP     CX
08C0  5D                        POP     BP
08C1  83 F9 03                  CMP     CX,3
08C4  76 05                     JBE     EX02
08C6  83 E9 03                  SUB     CX,3
08C9  EB A4                     JMP     EX00
08CB  5A              EX02:     POP     DX
08CC  07                        POP     ES
08CD  1F                        POP     DS
                                ASSUME  DS:DGROUP
08CE  2E: FF 0E 084B R          DEC     EXINUSE
08D3  C3                        RET
08D4                    EXTOUT  ENDP
                        ;
                                PUBLIC  EXTIN
                        ;
                        ; LOAD IN FROM EXTENDED MEMORY
                        ;
                        ; CALL WITH BX=PAGE NUMBER, DI=SEGMENT NUMBER,CX=NUMBER OF PAGES
```

```
                        ; DX=FIRST 1K,BP = WORDS IN LAST PAGE
                        ;
08D4            EXTIN   PROC    NEAR
08D4  2E: FF 06 084B R          INC     CS:EXINUSE
08D9  74 03                     JE      EXTIOK
08DB  E9 0286 R                 JMP     DOEMME
08DE  1E              EXTIOK:   PUSH    DS
08DF  06                        PUSH    ES
08E0  52                        PUSH    DX
08E1  2E: 8E 1E 1291 R          MOV     DS,CS:MYDSEG
08E6  51                        PUSH    CX              ;SAVE BLOCK COUNT
08E7  55                        PUSH    BP              ;AND WORDS IN LAST PAGE
                        ;
                        ;SET UP FIRST RAM DESTINATION ADDRESS
08E8  BE 4E48 R                 MOV     SI,OFFSET BINDST
08EB  E8 07EA R                 CALL    EXTRTN1
                        ;
                        ;SET UP FIRST EXTENDED MEMORY SOURCE ADDRESS
08EE  BE 4E40 R                 MOV     SI,OFFSET BINSRC
08F1  E8 0807 R                 CALL    EXTRTN2
                        ;
08F4  5D                        POP     BP
08F5  59                        POP     CX
08F6  55              EX10:     PUSH    BP
08F7  51                        PUSH    CX
08F8  83 F9 03                  CMP     CX,3
08FB  76 05                     JBE     EX11
08FD  B9 C000                   MOV     CX,0C000H       ;SET FOR MAX MOVE
0900  EB 11                     JMP     SHORT EX11A
                        ;
                        ;COMPUTE ADDRESS LIMIT OF NEXT MOVE
0902  49              EX11:     DEC     CX              ; LAST PAGE IS BP WORDS
0903  86 E9                     XCHG    CH,CL           ;* 100H
0905  D1 E1                     SHL     CX,1            ;* 2
0907  D1 E1                     SHL     CX,1            ;* 4
0909  D1 E1                     SHL     CX,1            ;* 8
090B  D1 E1                     SHL     CX,1            ;* 10H
090D  D1 E1                     SHL     CX,1            ;* 20H
090F  03 CD                     ADD     CX,BP           ; = TOTAL NUMBER OF WORDS TO MOVE
0911  D1 E1                     SHL     CX,1            ;* 40H = *4000H
0913  BE 4E40 R       EX11A:    MOV     SI,OFFSET BINSRC
0916  89 0C                     MOV     [SI].LIMIT,CX   ; MAX PER MOVE IS C000 BYTES
0918  BE 4E48 R                 MOV     SI,OFFSET BINDST
091B  89 0C                     MOV     [SI].LIMIT,CX   ;SET LIMIT SAME AS SOURCE
091D  51                        PUSH    CX              ;SAVE BYTE COUNT
091E  D1 E9                     SHR     CX,1            ;CX = NUMBER OF WORDS
0920  BE 4E30 R                 MOV     SI,OFFSET BINHAND ;NOW DO MOVE
0923  2E: 8E 06 1291 R          MOV     ES,CS:MYDSEG
0928  B4 87                     MOV     AH,87H
092A  9C                        PUSHF
092B  FA                        CLI
092C  9A 2CF4 ---- R            CALL    FAR PTR NEWI15_
                        ;       INT     15H
0931  59                        POP     CX              ;GET BYTE COUNT
0932  BE 4E40 R                 MOV     SI,OFFSET BINSRC
0935  01 4C 02                  ADD     [SI].BASELO,CX
0938  80 54 04 00               ADC     [SI].BASEHI,0
093C  BE 4E48 R                 MOV     SI,OFFSET BINDST
093F  01 4C 02                  ADD     [SI].BASELO,CX
0942  80 54 04 00               ADC     [SI].BASEHI,0
0946  59                        POP     CX
0947  5D                        POP     BP
```

```
0948  83 F9 03                CMP     CX,3
094B  76 05                   JBE     EXI2
094D  83 E9 03                SUB     CX,3
0950  EB A4                   JMP     EXI0
0952  5A              EXI2:   POP     DX
0953  07                      POP     ES
0954  1F                      POP     DS
                              ASSUME  DS:DGROUP
0955  2E: FF 0E 084B R        DEC     CS:EXINUSE
095A  C3                      RET
095B                  EXTIN   ENDP
                      ;
                              PUBLIC  EXTX
                      ;
                      ; LOAD IN FROM EXTENDED MEMORY
                      ;
                      ; CALL WITH BX=PAGE NUMBER, DS:DI=SEGMENT NUMBER,CX=NUMBER OF PAGES
                      ; DX=FIRST 1K,BP = WORDS IN LAST PAGE
                      ;
095B                  EXTX    PROC    NEAR
095B  2E: FF 06 084B R        INC     CS:EXINUSE
0960  74 03                   JE      EXTXOK
0962  E9 0286 R               JMP     DOEMME
0965  1E              EXTXOK: PUSH    DS
0966  06                      PUSH    ES
0967  52                      PUSH    DX
0968  51                      PUSH    CX                      ;SAVE BLOCK COUNT
0969  55                      PUSH    BP                      ;AND WORDS IN LAST PAGE
                      ;
                      ;SET UP FIRST RAM DESTINATION ADDRESS
096A  1E                      PUSH    DS
096B  57                      PUSH    DI                      ;SAVE RAM SEGMENT
096C  2E: 88 3E 1291 R        MOV     DI,CS:MYDSEG            ;WILL READ INTO DWBUFF
0971  8E DF                   MOV     DS,DI
0973  BE 4E48 R               MOV     SI,OFFSET BINDST
0976  E8 07EA R               CALL    EXTRTN1
0979  81 44 02 0038 R         ADD     [SI].BASELO,OFFSET DGROUP:DWBUFF
097E  80 54 04 00             ADC     [SI].BASEHI,0
0982  BE 4E40 R               MOV     SI,OFFSET BINSRC        ;NOW SOURCE IN EXTENDED
0985  E8 0807 R               CALL    EXTRTN2
0988  2E: 8E 06 1291 R        MOV     ES,CS:MYDSEG            ;AND COPY REVERSED FOR OUTGOING
098D  BF 4E18 R               MOV     DI,OFFSET BOTDST        ;DESTINATION IN EXTENDED
0990  B9 0008                 MOV     CX,SIZE DESCRIPT
0993  FC                      CLD
0994  F3/ A4                  REP     MOVSB
0996  BE 4E48 R               MOV     SI,OFFSET BINDST        ;AND DWBUFF IS OUTGOING SOURCE
0999  BF 4E10 R               MOV     DI,OFFSET BOTSRC
099C  B9 0008                 MOV     CX,SIZE DESCRIPT
099F  F3/ A4                  REP     MOVSB
09A1  5F                      POP     DI                      ;RESTORE ADDRESS OF RAM BUFFER
09A2  07                      POP     ES                      ; NOTE: NOW IN ES:DI
09A3  5D                      POP     BP                      ;WORDS
09A4  59                      POP     CX                      ;PAGES
09A5  55              EXX0:   PUSH    BP
09A6  51                      PUSH    CX
09A7  83 F9 03                CMP     CX,3
09AA  76 05                   JBE     EXX1
09AC  B9 C000                 MOV     CX,0C000H               ;SET FOR MAX MOVE
09AF  EB 11                   JMP     SHORT EXX1A
                      ;
                      ;COMPUTE ADDRESS LIMIT OF NEXT MOVE
09B1  49              EXX1:   DEC     CX                      ; LAST PAGE IS BP WORDS
```

```
0982  86 E9              XCHG    CH,CL              ;* 100H
0984  D1 E1              SHL     CX,1               ;* 2
0986  D1 E1              SHL     CX,1               ;* 4
0988  D1 E1              SHL     CX,1               ;* 8
098A  D1 E1              SHL     CX,1               ;* 10H
098C  D1 E1              SHL     CX,1               ;* 20H
098E  03 CD              ADD     CX,BP              ; = TOTAL NUMBER OF WORDS TO MOVE
09C0  D1 E1              SHL     CX,1               ;* 40H = *4000H
                         ;
                         ;LOOP FOR EXCHANG
09C2  51         EXX1A:  PUSH    CX
09C3  81 F9 1000         CMP     CX,DWBSIZ
09C7  76 03              JBE     EXX1B
09C9  B9 1000            MOV     CX,DWBSIZ          ;SIZE OF BUFFER
09CC  2E: 8E 1E 1291 R EXX1B: MOV DS,CS:MYDSEG
09D1  BE 4E10 R          MOV     SI,OFFSET BOTSRC.LIMIT  ;SET UP INCOMING & OUTGOING
09D4  89 0C              MOV     [SI],CX            ; MAX PER MOVE IS C000 BYTES
09D6  BE 4E18 R          MOV     SI,OFFSET BOTDST.LIMIT
09D9  89 0C              MOV     [SI],CX            ;SET LIMIT SAME AS SOURCE
09DB  BE 4E40 R          MOV     SI,OFFSET BINSRC.LIMIT
09DE  89 0C              MOV     [SI],CX            ; MAX PER MOVE IS C000 BYTES
09E0  BE 4E48 R          MOV     SI,OFFSET BINDST.LIMIT
09E3  89 0C              MOV     [SI],CX            ;SET LIMIT SAME AS SOURCE
09E5  51                 PUSH    CX                 ;SAVE BYTE COUNT
09E6  D1 E9              SHR     CX,1               ;CX = NUMBER OF WORDS
09E8  51                 PUSH    CX                 ;SAVE WORD COUNT
09E9  06                 PUSH    ES
09EA  2E: 8E 06 1291 R   MOV     ES,CS:MYDSEG
09EF  BE 4E30 R          MOV     SI,OFFSET BINHAND  ;NOW READ IN UP TO DWBSIZ BYTES
09F2  B4 87              MOV     AH,87H
09F4  9C                 PUSHF
09F5  FA                 CLI
09F6  9A 2CF4 ---- R     CALL    FAR PTR NEWI15     ; BYTES ARE NOW IN DWBUFF
09FB  07                 POP     ES
09FC  59                 POP     CX                 ;WORD COUNT
09FD  51                 PUSH    CX                 ;SAVE FOR WRITE OUT TO EXTENDED
09FE  57                 PUSH    DI
09FF  BE 0038 R          MOV     SI,OFFSET DGROUP:DWBUFF
0A02  26: 8B 05   EXX5:  MOV     AX,WORD PTR ES:[DI]
0A05  A5                 MOVSW
0A06  89 44 FE           MOV     WORD PTR DS:[SI-2],AX
0A09  E2 F7              LOOP    EXX5
0A0B  5F                 POP     DI
0A0C  59                 POP     CX                 ;RESTORE WORD COUNT
0A0D  06                 PUSH    ES
0A0E  2E: 8E 06 1291 R   MOV     ES,CS:MYDSEG
0A13  BE 4E00 R          MOV     SI,OFFSET BOTHAND  ;NOW MOVE DWBUFF BACK OUT TO SAME SPOT
0A16  B4 87              MOV     AH,87H
0A18  9C                 PUSHF
0A19  FA                 CLI
0A1A  9A 2CF4 ---- R     CALL    FAR PTR NEWI15
0A1F  07                 POP     ES                 ;RESTORE SEGMENT
0A20  59                 POP     CX                 ;GET BYTE COUNT
0A21  BE 4E40 R          MOV     SI,OFFSET BINSRC
0A24  01 4C 02           ADD     [SI].BASELO,CX     ;ADJUST EXTENDED MEMORY POINTER
0A27  80 54 04 00        ADC     [SI].BASEHI,0
0A2B  BE 4E18 R          MOV     SI,OFFSET BOTDST   ; FOR NEXT MOVE
0A2E  01 4C 02           ADD     [SI].BASELO,CX
0A31  80 54 04 00        ADC     [SI].BASEHI,0
0A35  8C C1              MOV     CX,ES
0A37  81 C1 0100         ADD     CX,100H
0A3B  8E C1              MOV     ES,CX
0A3D  59                 POP     CX                 ;NOW REMAINDER IN THIS PASS
```

```
0A3E  81 F9 1000              CMP     CX,DWBSIZ
0A42  76 07                   JBE     EXX4
0A44  81 E9 1000              SUB     CX,DWBSIZ
0A48  E9 09C2 R               JMP     EXX1A
0A4B  59              EXX4:   POP     CX
0A4C  5D                      POP     BP
0A4D  83 F9 03                CMP     CX,3
0A50  76 06                   JBE     EXX2
0A52  83 E9 03                SUB     CX,3
0A55  E9 09A5 R               JMP     EXX0
0A58  5A              EXX2:   POP     DX
0A59  07                      POP     ES
0A5A  1F                      POP     DS
                              ASSUME  DS:DGROUP
0A5B  2E: FF 0E 084B R        DEC     CS:EXINUSE
0A60  C3                      RET
0A61                  EXTX    ENDP
                      ;
                              PUBLIC  INSWAP
                      ;
0A61  FFFF            INSWAP  DW      -1
                      ;
                              PUBLIC  SAVINTS
                      ;
0A63                  SAVINTS PROC    NEAR
0A63  E8 02E2 R               CALL    PUSHR
0A66  BF 4082 R               MOV     DI,OFFSET DGROUP:VECTBL2
0A69  33 F6                   XOR     SI,SI
0A6B  8E DE                   MOV     DS,SI
0A6D  2E: 8E 06 1291 R        MOV     ES,CS:MYDSEG
0A72  B9 0200                 MOV     CX,VECSIZ
0A75  FA                      CLI
0A76  FC                      CLD
0A77  F3/ A5                  REP     MOVSW                   ;STORE APPL INTS TEMPORARILY
0A79  FB                      STI
0A7A  BE 3C82 R               MOV     SI,OFFSET DGROUP:VECTBL1
0A7D  33 FF                   XOR     DI,DI
0A7F  8E C7                   MOV     ES,DI
0A81  2E: 8E 1E 1291 R        MOV     DS,CS:MYDSEG
0A86  B9 0200                 MOV     CX,VECSIZ
0A89  FA                      CLI
0A8A  90                      NOP
0A8B  90                      NOP
0A8C  F3/ A5                  REP     MOVSW
0A8E  FB                      STI
0A8F  E8 02F4 R               CALL    POPR
0A92  C3                      RET
0A93                  SAVINTS ENDP
                      ;
                              PUBLIC  LITTLEX
                      ;
0A93                  LITTLEX PROC    NEAR
0A93  8B F7                   MOV     SI,DI                   ;SAVE DI
0A95  E8 02E2 R               CALL    PUSHR
0A98  8B FE                   MOV     DI,SI
0A9A  53                      PUSH    BX
0A9B  2E: 8E 1E 1291 R        MOV     DS,CS:MYDSEG
0AA0  8A 47 62                MOV     AL,[BX].XRUN
0AA3  32 E4                   XOR     AH,AH
0AA5  8B F0                   MOV     SI,AX
0AA7  8B 57 43                MOV     DX,[BX].EMMHNDL
0AAA  83 FE 00                CMP     SI,0
0AAD  74 03                   JE      LTLX0A
```

```
0AAF  88 57 31              MOV      DX,[BX].FIRSTP
0AB2  88 47 35      LTLX0A: MOV      AX,[BX].PAGES
0AB5  88 5F 33              MOV      BX,[BX].CYCLE     ;POINT TO FIRST FREE AREA
0AB8  43                    INC      BX                ;BX = FIRST OUTGOING
0AB9  55           LTLX0:   PUSH     BP                ;SAVE WORDS IN LAST PAGE
0ABA  51                    PUSH     CX                ;SAVE REMAINING COUNT
0ABB  57                    PUSH     DI                ; SAVE SEGMENT
0ABC  83 F9 01              CMP      CX,1              ;LAST BATCH?
0ABF  76 06                 JBE      LTLX1
0AC1  BD 2000               MOV      BP,2000H          ;IF NOT, THAN FULL 16K IN LAST PAGE
0AC4  B9 0001               MOV      CX,1              ;WRITE 64K
0AC7  51           LTLX1:   PUSH     CX                ;NUMBER OF PAGES TO WRITE
0AC8  53                    PUSH     BX                ;AND NUMBER OF FIRST PAGE
0AC9  55                    PUSH     BP                ;AND WORDS IN LAST PAGE
0ACA  50                    PUSH     AX                ;AND PAGE NUMBER OF FIRST PAGE
0ACB  56                    PUSH     SI
0ACC  83 FE 00              CMP      SI,0
0ACF  75 05                 JNE      LTLX1A
0AD1  E8 0740 R             CALL     PAGEOUT
0AD4  EB 03                 JMP      SHORT LTLX1B
0AD6  E8 0840 R    LTLX1A:  CALL     EXTOUT
0AD9  5E           LTLX1B:  POP      SI
0ADA  58                    POP      AX                ;RESTORE PAGE NUMBER OF FIRST PAGE
0ADB  5D                    POP      BP                ;AND WORDS IN LAST PAGE
0ADC  5B                    POP      BX                ;AND NUMBER OF FIRST PAGE
0ADD  59                    POP      CX                ;NUMBER OF PAGES TO WRITE
0ADE  43                    INC      BX                ; READ IN FROM NEXT 64K
0ADF  5F                    POP      DI                ; READING SAME 64K JUST WRITTEN
0AE0  3B D8                 CMP      BX,AX             ; PAST END OF FILE/BUFFER?
0AE2  72 03                 JB       LTLX2
0AE4  BB 0001               MOV      BX,1              ; LOAD FIRST PAGE INTO BX
0AE7  57           LTLX2:   PUSH     DI                ;SAVE SEGMENT
0AE8  51                    PUSH     CX                ;NUMBER OF PAGES TO WRITE
0AE9  53                    PUSH     BX                ;AND NUMBER OF FIRST PAGE
0AEA  55                    PUSH     BP                ;AND WORDS IN LAST PAGE
0AEB  50                    PUSH     AX                ;AND PAGE NUMBER OF FIRST PAGE
0AEC  56                    PUSH     SI
0AED  83 FE 00              CMP      SI,0
0AF0  75 05                 JNE      LTLX2A
0AF2  E8 0696 R             CALL     PAGEIN
0AF5  EB 03                 JMP      SHORT LTLX2B
0AF7  E8 0804 R    LTLX2A:  CALL     EXTIN
0AFA  5E           LTLX2B:  POP      SI
0AFB  58                    POP      AX                ;RESTORE PAGE NUMBER OF LAST PAGE
0AFC  5D                    POP      BP                ;AND WORDS IN LAST PAGE
0AFD  5B                    POP      BX                ;AND NUMBER OF FIRST PAGE
0AFE  59                    POP      CX                ;NUMBER OF PAGES WRITTEN
0AFF  5F                    POP      DI                ;AND SEGMENT NUMBER WE JUST READ INTO
0B00  81 C7 0400            ADD      DI,400H           ; ADJUST SEGMENT POINTER
0B04  59                    POP      CX                ; AND REMAINING PAGES
0B05  5D                    POP      BP                ; AND WORDS IN LAST PAGE
0B06  83 F9 01              CMP      CX,1              ;IF 4 PAGES OR LESS THAN DONE
0B09  76 03                 JBE      LTLX3
0B0B  49                    DEC      CX                ;NEXT
0B0C  EB AB                 JMP      LTLX0
0B0E  4B           LTLX3:   DEC      BX                ;ADJUST RELATIVE TO FIRST PAGE
0B0F  8B C3                 MOV      AX,BX
0B11  2E: 8E 1E 1291 R      MOV      DS,CS:MYDSEG
0B16  5B                    POP      BX
0B17  89 47 33              MOV      [BX].CYCLE,AX
0B1A  E8 02F4 R             CALL     POPR
0B1D  C3                    RET
0B1E                LITTLEX ENDP
```

```
081E                            SVIDEO  PROC    NEAR
081E  E8 02E2 R                         CALL    PUSHR
0821  80 7F 62 01                       CMP     [BX].XRUN,1
0825  75 04                             JNE     @F
0827  B0 C1                             MOV     AL,0C1H
0829  E6 20                             OUT     20H,AL
082B  8B 57 3F          @@:             MOV     DX,WORD PTR [BX].LOCALS
082E  8E 47 41                          MOV     ES,WORD PTR [BX].LOCALS+2
0831  8E 5F 41                          MOV     DS,WORD PTR [BX].LOCALS+2
0834  83 C2 11                          ADD     DX,11H
0837  52                                PUSH    DX
0838  9A 0000 ---- E                    CALL    SAVEIBM
083D  5A                                POP     DX
083E  83 EA 11                          SUB     DX,11H
0841  2E: 83 3E 183E R 00               CMP     CS:_PALRES,0
0847  74 06                             JE      @F
0849  B8 1002                           MOV     AX,1002H
084C  E8 17E8 R                         CALL    DOBIOS
084F  E8 02F4 R         @@:             CALL    POPR
0852  C3                                RET
0853                            SVIDEO  ENDP
                                ;
                                        PUBLIC  RVIDEO
                                ;
0853                            RVIDEO  PROC    NEAR
0853  E8 02E2 R                         CALL    PUSHR
0856  8B 47 3F                          MOV     AX,WORD PTR [BX].LOCALS
0859  05 0011                           ADD     AX,11H                     ;ADJUST FOR PALETTE
085C  50                                PUSH    AX
085D  8E 47 41                          MOV     ES,WORD PTR [BX].LOCALS+2
0860  8E 5F 41                          MOV     DS,WORD PTR [BX].LOCALS+2
0863  9A 0000 ---- E                    CALL    RESIBM
0868  58                                POP     AX
0869  E8 02F4 R                         CALL    POPR
086C  C3                                RET
086D                            RVIDEO  ENDP
                                ;
                                        PUBLIC  SWAPIN
                                ;
                                ;   SWAP AN APPLICATION OR TSR IN
                                ;
                                ; CALL WITH BX = TSR OFFSET
                                ;
086D                            SWAPIN  PROC    NEAR
086D  2E: FF 06 0A61 R                  INC     CS:INSWAP
0872  75 44                             JNE     SIERR1
0874  E8 02E2 R                         CALL    PUSHR
0877  53                                PUSH    BX

IFDEF   NETWORK_VERSION
0878  2E: A1 00AE R                     MOV     AX,CS:[NETLOG]
087C  2E: 0B 06 00B0 R                  OR      AX,CS:[NETLOG+2]
0881  74 14                             JE      @F
0883  33 C0                             XOR     AX,AX
0885  53                                PUSH    BX
0886  2E: C5 1E 00B6 R                  LDS     BX,DWORD PTR CS:[INNET]
088B  0B 07                             OR      AX,WORD PTR DS:[BX]
088D  2E: C5 1E 00B2 R                  LDS     BX,DWORD PTR CS:[INPOST]
0892  0B 07                             OR      AX,WORD PTR DS:[BX]
0894  5B                                POP     BX
0895  75 1D                             JNE     SIERR
0897                            @@:
```

```
0B97  2E: BE 1E 1291 R              MOV      DS,CS:MYDSEG
                                    ASSUME   DS:DGROUP
0B9C  8C D0                         MOV      AX,SS
0B9E  2E: 3B 06 1291 R              CMP      AX,CS:MYDSEG
0BA3  77 0F                         JA       SIERR
0BA5  80 7F 62 02                   CMP      DS:[BX].XRUN,2
0BA9  74 19                         JE       XSWAP
0BAB  80 7F 62 00                   CMP      DS:[BX].XRUN,0
0BAF  74 13                         JE       XSWAP
0BB1  E9 0CBB R                     JMP      SWAPDI
0BB4  5B                   SIERR:   POP      BX
0BB5  E8 02F4 R                     CALL     POPR
0BB8  2E: FF 0E 0A61 R     SIERR1:  DEC      CS:INSWAP
0BBD  F9                            STC
0BBE  C3                            RET
0BBF  E8 3531 R            SIERR2:  CALL     _BEEP
0BC2  EB F0                         JMP      SHORT SIERR
                           ;
                           ; SWAP TO/FROM EXPANDED MEMORY
                           ;
0BC4  88 57 43             XSWAP:   MOV      DX,DS:[BX].EMMHNDL
0BC7  80 BF 0087 00                 CMP      DS:[BX+SWAP17].RESET,0
0BCC  74 05                         JE       @F
0BCE  2E: FF 06 2AB7 R              INC      CS:INI17
0BD3  80 7F 62 00          @@:      CMP      DS:[BX].XRUN,0
0BD7  75 08                         JNE      @F
0BD9  B4 40                         MOV      AH,40H
0BDB  CD 67                         INT      67H
0BDD  0A E4                         OR       AH,AH
0BDF  75 D3                         JNE      SIERR
0BE1  B9 0001              @@:      MOV      CX,1
0BE4  BD 0200                       MOV      BP,VECSIZ
0BE7  E8 0A63 R                     CALL     SAVINTS
0BEA  80 7F 62 00                   CMP      [BX].XRUN,0
0BEE  8B 47 31                      MOV      AX,[BX].FIRSTP
0BF1  BF 4082 R                     MOV      DI,OFFSET DGROUP:VECTBL2
0BF4  BB 0000                       MOV      BX,0
0BF7  75 05                         JNE      SI0A1
0BF9  E8 0619 R                     CALL     PAGEX
0BFC  EB 05                         JMP      SHORT SI0A2
0BFE  8B D0                SI0A1:   MOV      DX,AX
0C00  E8 095B R                     CALL     EXTX
0C03  2E: 8E 1E 1291 R     SI0A2:   MOV      DS,CS:MYDSEG
0C08  5B                            POP      BX
0C09  53                            PUSH     BX
0C0A  8B 4F 35                      MOV      CX,[BX].PAGES          ;NOW SWAP OUT ENOUGH TO HOLD TSR
0C0D  49                            DEC      CX
0C0E  49                            DEC      CX
0C0F  8B 6F 37                      MOV      BP,[BX].LASTP
0C12  8B 7F 39                      MOV      DI,[BX].SWPSEG
0C15  E8 0A93 R                     CALL     LITTLEX                ;EXCHANGE
0C18  5D                            POP      BP
0C19  8B FB                         MOV      DI,BX
0C1B  E8 0000 E                     CALL     GETCON
0C1E  2E: A1 182D R                 MOV      AX,CS:TINMEM
0C22  89 45 5C                      MOV      DS:[DI].PINMEM,AX
0C25  2E: 89 3E 182D R              MOV      CS:TINMEM,DI
0C2A  89 5D 58                      MOV      WORD PTR DS:[DI].CONSOLE,BX
0C2D  8C 45 5A                      MOV      WORD PTR DS:[DI+2].CONSOLE,ES
0C30  E8 0000 E                     CALL     SETCONS
0C33  8B DF                         MOV      BX,DI
0C35  E8 357B R                     CALL     _DSKBUSY
0C38  0B C0                         OR       AX,AX
```

```
0C3A  75 23                         JNE      S10A4
0C3C  2E: 8E 1E 1291 R              MOV      DS,CS:MYDSEG
0C41  B4 51                         MOV      AH,51H              ;SAVE OLD PSP
0C43  CD 21                         INT      21H
0C45  3E: 89 5E 4E                  MOV      DS:[BP].TSRPSP,BX
0C49  8B 1E 0008 R                  MOV      BX,_PSP
0C4D  8E C3                         MOV      ES,BX
0C4F  B4 50                         MOV      AH,50H              ;SET TO MY PSP
0C51  CD 21                         INT      21H
0C53  B4 2F                         MOV      AH,2FH              ;GET OLD DTA
0C55  CD 21                         INT      21H
0C57  87 DD                         XCHG     BX,BP
0C59  89 6F 50                      MOV      WORD PTR DS:[BX].TSRDTA,BP
0C5C  8C 47 52                      MOV      WORD PTR DS:[BX].TSRDTA+2,ES
0C5F  2E: 83 3E 1844 R 00   S10A4:  CMP      CS:ISEGA,0
0C65  74 21                         JE       S10A3
0C67  33 C0                         XOR      AX,AX
0C69  8E C0                         MOV      ES,AX
0C6B  26: C4 3E 04A8                LES      DI,DWORD PTR ES:[4A8H]
0C70  8C C2                         MOV      DX,ES
0C72  87 7F 54                      XCHG     WORD PTR DS:[BX].ESAVLOC,DI
0C75  87 57 56                      XCHG     WORD PTR DS:[BX].ESAVLOC+2,DX
0C78  33 C0                         XOR      AX,AX
0C7A  8E C0                         MOV      ES,AX
0C7C  FA                            CLI
0C7D  26: 89 3E 04A8                MOV      WORD PTR ES:[4A8H],DI
0C82  26: 89 16 04AA                MOV      WORD PTR ES:[4AAH],DX
0C87  FB                            STI
                                ;
0C88  E8 357B R            S10A3:   CALL     _DSKBUSY
0C8B  0B C0                         OR       AX,AX
0C8D  75 0E                         JNE      S10A5
0C8F  2E: 8E 1E 1291 R              MOV      DS,CS:MYDSEG
0C94  80 7F 47 00                   CMP      [BX].TEXT,0
0C98  74 03                         JE       S10A5
0C9A  E8 0B1E R                     CALL     SVIDEO

0C9D  2E: 8E 1E 1291 R     S10A5:   MOV      DS,CS:MYDSEG
0CA2  33 FF                         XOR      DI,DI
0CA4  8E C7                         MOV      ES,DI
0CA6  BE 4082 R                     MOV      SI,OFFSET DGROUP:VECTBL2
0CA9  B9 0200                       MOV      CX,VECSIZ
0CAC  FC                            CLD
0CAD  FA                            CLI
0CAE  F3/ A5                        REP MOVSW
0CB0  FB                            STI
0CB1  E8 02F4 R                     CALL     POPR
0CB4  2E: FF 0E 0A61 R              DEC      CS:INSWAP
0CB9  F8                            CLC
0CBA  C3                            RET
                                ;
0CBB  80 7F 62 01          SWAPDI:  CMP      DS:[BX].XRUN,1
0CBF  74 04                         JE       SDI1
0CC1  E9 0DF1 R                     JMP      SXRI
0CC4  90                            NOP
0CC5  5D                   SDI1:    POP      BP                  ;PUT DBLK IN BP
                                ;
0CC6  E8 0A63 R                     CALL     SAVINTS
                                ;
0CC9  8B FB                         MOV      DI,BX
0CCB  2E: A1 182D R                 MOV      AX,CS:TIMMEM
0CCF  89 45 5C                      MOV      DS:[DI].PIMMEM,AX
0CD2  2E: 89 3E 182D R              MOV      CS:TIMMEM,DI
```

```
0CD7  E8 0000 E            CALL    GETCON
0CDA  89 5D 58             MOV     WORD PTR DS:[DI].CONSOLE,BX
0CDD  8C 45 5A             MOV     WORD PTR DS:[DI+2].CONSOLE,ES
0CE0  E8 0000 E            CALL    SETCONS
0CE3  8B DF                MOV     BX,DI
0CE5  2E: 8E 1E 1291 R     MOV     DS,CS:MYDSEG
0CEA  B4 51                MOV     AH,51H              ;SAVE OLD PSP
0CEC  CD 21                INT     21H
0CEE  3E: 89 5E 4E         MOV     DS:[BP].TSRPSP,BX
0CF2  8B 1E 0008 R         MOV     BX,_PSP
0CF6  8E C3                MOV     ES,BX
0CF8  B4 50                MOV     AH,50H              ;SET TO MY PSP
0CFA  CD 21                INT     21H
0CFC  B4 2F                MOV     AH,2FH              ;GET OLD DTA
0CFE  CD 21                INT     21H
0D00  87 DD                XCHG    BX,BP
0D02  89 6F 50             MOV     WORD PTR DS:[BX].TSRDTA,BP
0D05  8C 47 52             MOV     WORD PTR DS:[BX].TSRDTA+2,ES
0D08  2E: 83 3E 1844 R 00  CMP     CS:ISEGA,0
0D0E  74 21                JE      SD13
0D10  33 C0                XOR     AX,AX
0D12  8E C0                MOV     ES,AX
0D14  26: C4 3E 04A8       LES     DI,DWORD PTR ES:[4A8H]
0D19  8C C2                MOV     DX,ES
0D1B  87 7F 54             XCHG    WORD PTR DS:[BX].ESAVLOC,DI
0D1E  87 57 56             XCHG    WORD PTR DS:[BX].ESAVLOC+2,DX
0D21  33 C0                XOR     AX,AX
0D23  8E C0                MOV     ES,AX
0D25  FA                   CLI
0D26  26: 89 3E 04A8       MOV     WORD PTR ES:[4A8H],DI
0D2B  26: 89 16 04AA       MOV     WORD PTR ES:[4AAH],DX
0D30  FB                   STI
                           ;
0D31  2E: A1 1291 R  SD13: MOV     AX,CS:MYDSEG
0D35  8E D8                MOV     DS,AX
0D37  8E C0                MOV     ES,AX
0D39  BA 20C4 R            MOV     DX,OFFSET SOFCB
0D3C  8B 2E 000E R         MOV     BP,PAGESOUT
0D40  A1 0010 R            MOV     AX,PAGESOUT+2
0D43  89 6F 4A             MOV     DS:[BX].OUTRECL,BP
0D46  89 47 4C             MOV     DS:[BX].OUTRECH,AX
0D49  8B 4F 35             MOV     CX,[BX].PAGES
0D4C  83 E9 09             SUB     CX,5+VECSIZ/80H     ;ACCOUNT FOR ROOM FOR TSR DBLK & INTS
0D4F  8E 5F 39             MOV     DS,DS:[BX].SWPSEG
0D52  33 FF                XOR     DI,DI
0D54  E8 04D5 R            CALL    DISKOUT             ;WRITE OUT APPL
                           ;
0D57  BF 4082 R            MOV     DI,OFFSET VECTBL2
0D5A  B9 0004              MOV     CX,VECSIZ/80H
0D5D  E8 04D5 R            CALL    DISKOUT             ;SAVE OUT INT VECS
0D60  50                   PUSH    AX
0D61  3B 06 0014 R         CMP     AX,TOPOUT+2         ;CHECK HIGH ORDER
0D65  77 0D                JA      @F                  ;IF BIGGER, UPDATE DISK
0D67  3B 2E 0012 R         CMP     BP,TOPOUT           ;CHECK LOW ORDER
0D6B  77 07                JA      @F
0D6D  B4 0D                MOV     AH,0DH              ;FLUSH DISK BUFFERS
0D6F  CD 21                INT     21H
0D71  EB 24 90             JMP     SDINC
0D74  E8 0000 E      @@:   CALL    CLOSEIT             ;CLOSE FILE
0D77  A3 0014 R            MOV     TOPOUT+2,AX         ;SET NEW HIGHEST WRITTEN
0D7A  89 2E 0012 R         MOV     TOPOUT,BP
0D7E  55                   PUSH    BP
```

```
007F  53                         PUSH    BX
0080  06                         PUSH    ES
0081  B0 45                      MOV     AL,'E'              ;OPEN AN EXISTING FILE
0083  32 E4                      XOR     AH,AH
0085  50                         PUSH    AX
0086  B8 0000 E                  MOV     AX,OFFSET _SWAPNAME
0089  50                         PUSH    AX
008A  B8 20C4 R                  MOV     AX,OFFSET SOFCB
008D  50                         PUSH    AX
008E  E8 0000 E                  CALL    _OPEN_FCB           ;REOPEN SWAP FILE.
0091  83 C4 06                   ADD     SP,6
0094  07                         POP     ES
0095  5B                         POP     BX
0096  5D                         POP     BP
                              ;
0097  58                 SDINC:  POP     AX
0098  2E: 8E 1E 1291 R           MOV     DS,CS:MYDSEG
009D  89 2E 000E R               MOV     PAGESOUT,BP
00A1  A3 0010 R                  MOV     PAGESOUT+2,AX       ;ADJUST RECORD POINTER
00A4  8D 97 0096                 LEA     DX,[BX].TSRFCB      ;POINT TO SWAPIN FCB
00A8  BD 0005                    MOV     BP,5                ;RECORD 0=DBLK DEF, 1-4 = EMMTABLES
00AB  B8 0000                    MOV     AX,0
00AE  8B 4F 35                   MOV     CX,[BX].PAGES
00B1  83 E9 09                   SUB     CX,5+VECSIZ/80H     ;ACCOUNT FOR ROOM FOR TSR DBLK & INTS
00B4  8E 5F 39                   MOV     DS,DS:[BX].SWPSEG
00B7  33 FF                      XOR     DI,DI
00B9  E8 039F R                  CALL    DISKIN              ;READ IN TSR
                              ;
00BC  BF 4082 R                  MOV     DI,OFFSET VECTBL2
00BF  B9 0004                    MOV     CX,VECSIZ/80H       ;NUMBER OF RECORDS IN VECTBL
00C2  E8 039F R                  CALL    DISKIN
00C5  2E: 8E 1E 1291 R           MOV     DS,CS:MYDSEG
00CA  80 7F 47 00                CMP     [BX].TEXT,0
00CE  74 03                      JE      SD14                ;SAVE SCREEN STATE?
00D0  E8 0B1E R                  CALL    SVIDEO
                              ;
00D3  2E: 8E 1E 1291 R   SD14:   MOV     DS,CS:MYDSEG
00D8  BE 4082 R                  MOV     SI,OFFSET VECTBL2
00DB  33 FF                      XOR     DI,DI
00DD  8E C7                      MOV     ES,DI
00DF  B9 0200                    MOV     CX,VECSIZ
00E2  FC                         CLD
00E3  FA                         CLI
00E4  F3/ A5                     REP     MOVSW               ;LOAD IN TSR INTS
00E6  FB                         STI
00E7  E8 02F4 R                  CALL    POPR
00EA  F8                         CLC
00EB  2E: FF 0E 0A61 R           DEC     CS:INSWAP
00F0  C3                         RET
                              ;
                              ;SWAP IN FOR PROGRAMS RUNNING IN EXPANDED MEMORY
                                  PUBLIC  SXRI
00F1  8B 57 43           SXRI:   MOV     DX,DS:[BX].EMMHNDL
00F4  B4 40                      MOV     AH,40H
00F6  CD 67                      INT     67H
00F8  0A E4                      OR      AH,AH
00FA  74 03                      JE      @F
00FC  E9 0BBF R                  JMP     SIERR2
00FF  B9 0001            @@:     MOV     CX,1
0E02  BD 0200                    MOV     BP,VECSIZ
0E05  E8 0A63 R                  CALL    SAVINTS
0E08  2E: 8E 1E 1291 R           MOV     DS,CS:MYDSEG
```

```
OE00  33 C0                        XOR    AX,AX
OE0F  BF 4082 R                    MOV    DI,OFFSET VECTBL2
OE12  BB 0000                      MOV    BX,0
OE15  E8 0619 R                    CALL   PAGEX                    ;TSR INTS NOW IN VECTBL2
OE18  2E: 8E 1E 1291 R             MOV    DS,CS:MYDSEG
OE1D  5B                           POP    BX
OE1E  53                           PUSH   BX
OE1F  8B 57 43                     MOV    DX,DS:[BX].EMMHNDL
OE22  B4 47                        MOV    AH,47H                   ;SAVE CURRENT PAGE CONFIGURATION
OE24  E8 025F R                    CALL   DOEMM
OE27  BB 0001                      MOV    BX,1                     ;START WITH PAGE 1
OE2A  B9 0004                      MOV    CX,4                     ;MAP IN 4 PAGES
OE2D  8A C3                  aa:   MOV    AL,BL
OE2F  FE C8                        DEC    AL                       ;ADJUST RELATIVE TO 0
OE31  B4 44                        MOV    AH,44H                   ;MAP IN A PAGE
OE33  E8 025F R                    CALL   DOEMM                    ;DOIT
OE36  43                           INC    BX                       ;NEXT PAGE
OE37  E2 F4                        LOOP   aa                       ;AND AGAIN
                              ;NOW TSR IS MAPPED IN WITH INTS IN VECTBL2
                              ;
OE39  5D                           POP    BP                       ;BP IS DBLK OF TSR
OE3A  2E: A1 182D R                MOV    AX,CS:TINMEM
OE3E  3E: 89 46 5C                 MOV    DS:[BP].PINMEM,AX
OE42  2E: 89 2E 182D R             MOV    CS:TINMEM,BP
OE47  2E: 8E 1E 1291 R             MOV    DS,CS:MYDSEG
OE4C  E8 0000 E                    CALL   GETCON
OE4F  3E: 89 5E 58                 MOV    WORD PTR DS:[BP].CONSOLE,BX
OE53  3E: 8C 46 5A                 MOV    WORD PTR DS:[BP+2].CONSOLE,ES
OE57  E8 0000 E                    CALL   SETCONS
OE5A  E8 357B R                    CALL   _DSKBUSY                 ;IF DOS IS BUSY, SKIP THIS PART
OE5D  0B C0                        OR     AX,AX                    ;--ASSUME WE ARE IN ISR
OE5F  8B DD                        MOV    BX,BP
OE61  75 1E                        JNE    SXIA4
OE63  B4 51                        MOV    AH,51H                   ;SAVE OLD PSP
OE65  CD 21                        INT    21H
OE67  3E: 89 5E 4E                 MOV    DS:[BP].TSRPSP,BX
OE6B  8B 1E 0008 R                 MOV    BX,_PSP
OE6F  8E C3                        MOV    ES,BX
OE71  B4 50                        MOV    AH,50H                   ;SET TO MY PSP
OE73  CD 21                        INT    21H
OE75  B4 2F                        MOV    AH,2FH                   ;GET OLD DTA
OE77  CD 21                        INT    21H
OE79  87 DD                        XCHG   BX,BP
OE7B  89 6F 50                     MOV    WORD PTR DS:[BX].TSRDTA,BP ;AND SAVE TSR'S DTA
OE7E  8C 47 52                     MOV    WORD PTR DS:[BX].TSRDTA+2,ES
OE81  2E: 83 3E 1844 R 00   SXIA4: CMP    CS:ISEGA,0
OE87  74 21                        JE     SXIA3
OE89  FA                           CLI
OE8A  33 C0                        XOR    AX,AX
OE8C  8E C0                        MOV    ES,AX
OE8E  26: C4 3E 04A8               LES    DI,DWORD PTR ES:[4A8H]
OE93  8C C2                        MOV    DX,ES
OE95  87 7F 54                     XCHG   WORD PTR DS:[BX].ESAVLOC,DI
OE98  87 57 56                     XCHG   WORD PTR DS:[BX].ESAVLOC+2,DX
OE9B  33 C0                        XOR    AX,AX
OE9D  8E C0                        MOV    ES,AX
OE9F  26: 89 3E 04A8               MOV    WORD PTR ES:[4A8H],DI
OEA4  26: 89 16 04AA               MOV    WORD PTR ES:[4AAH],DX
OEA9  FB                           STI
                              ;
OEAA  E8 357B R             SXIA3: CALL   _DSKBUSY
OEAD  0B C0                        OR     AX,AX
```

```
OEAF  75 OE                        JNE    SXIA5
OEB1  2E: 8E 1E 1291 R             MOV    DS,CS:MYDSEG
OEB6  80 7F 47 00                  CMP    [BX].TEXT,0
OEBA  74 03                        JE     SXIA5
OEBC  E8 0B1E R                    CALL   SVIDEO

OEBF  33 FF              SXIA5:    XOR    DI,DI
OEC1  8E C7                        MOV    ES,DI
OEC3  2E: 8E 1E 1291 R             MOV    DS,CS:MYDSEG
OEC8  BE 4082 R                    MOV    SI,OFFSET VECTBL2
OECB  B9 0200                      MOV    CX,VECSIZ
OECE  FC                           CLD
OECF  FA                           CLI
OED0  F3/ A5                       REP MOVSW
OED2  E8 02F4 R                    CALL   POPR
OED5  2E: FF 0E 0A61 R             DEC    CS:INSWAP
OEDA  F8                           CLC
OEDB  FB                           STI
OEDC  C3                           RET
OEDD                     SWAPIN    ENDP
                         ;
                                   PUBLIC SWAPOUT
                         ;
                         ;   SWAP AN APPLICATION OR TSR OUT
                         ;
                         ; CALL WITH BX = TSR OFFSET
                         ;
OEDD                     SWAPOUT PROC NEAR
OEDD  2E: FF 06 0A61 R             INC    CS:INSWAP
OEE2  75 18                        JNE    SOX
OEE4  E8 02E2 R                    CALL   PUSHR
OEE7  2E: 8E 1E 1291 R             MOV    DS,CS:MYDSEG
OEEC  53                           PUSH   BX
OEED  80 7F 62 00                  CMP    DS:[BX].XRUN,0
OEF1  74 0F                        JE     SOO
OEF3  80 7F 62 02                  CMP    DS:[BX].XRUN,2
OEF7  74 09                        JE     SOO
OEF9  E9 0FD7 R                    JMP    SWAPDO
OEFC  BA 4EEA R          SOX:      MOV    DX,OFFSET DGROUP:SWPOERR
OEFF  E9 023E R                    JMP    ERRABT
OF02  B9 0001            SOO:      MOV    CX,1
OF05  8B 57 43                     MOV    DX,[BX].EMMHNDL
OF08  E8 0A63 R                    CALL   SAVINTS               ;SAVE INT TABLE TO TBL2 & EXCHANGE
OF0B  80 BF 0087 00                CMP    DS:[BX+SWAP17].RESET,0
OF10  74 05                        JE     @F
OF12  2E: FF 0E 2AB7 R             DEC    CS:INI17
OF17  E8 357B R          @@:       CALL   _DSKBUSY              ;ARE WE BUSY
OF1A  0B C0                        OR     AX,AX
OF1C  75 0E                        JNE    SOOA5
OF1E  2E: 8E 1E 1291 R             MOV    DS,CS:MYDSEG
OF23  80 7F 47 00                  CMP    [BX].TEXT,0           ;DO WE SAVE
OF27  74 03                        JE     SOOA5
OF29  E8 0853 R                    CALL   RVIDEO
OF2C  BF 4082 R          SOOA5:    MOV    DI,OFFSET VECTBL2
OF2F  2E: 8E 1E 1291 R             MOV    DS,CS:MYDSEG
OF34  BD 0200                      MOV    BP,VECSIZ
OF37  8B 47 31                     MOV    AX,[BX].FIRSTP
OF3A  80 7F 62 00                  CMP    DS:[BX].XRUN,0
OF3E  BB 0000                      MOV    BX,0
OF41  75 05                        JNE    SOOA1
OF43  E8 0619 R                    CALL   PAGEX
OF46  EB 05                        JMP    SHORT SOOA2
OF48  8B D0              SOOA1:    MOV    DX,AX
```

```
OF4A  E8 095B R                     CALL   EXTX
                              ;
OF4D  2E: 8E 1E 1291 R  SOOA2: MOV    DS,CS:MYDSEG
OF52  5B                       POP    BX
OF53  8B 4F 35                 MOV    CX,[BX].PAGES           ;SWAP OUT TSR CODE
OF56  49                       DEC    CX
OF57  49                       DEC    CX
OF58  8B 6F 37                 MOV    BP,[BX].LASTP
OF5B  8B 7F 39                 MOV    DI,[BX].SWPSEG
OF5E  E8 0A93 R                CALL   LITTLEX                 ;XCHG APPL & TSR CODE
OF61  E8 357B R                CALL   _DSKBUSY
OF64  0B C0                    OR     AX,AX
OF66  2E: 8E 1E 1291 R         MOV    DS,CS:MYDSEG
OF6B  75 16                    JNE    SOOA4
OF6D  8B EB                    MOV    BP,BX
OF6F  8B 5F 4E                 MOV    BX,[BX].TSRPSP
OF72  8E C3                    MOV    ES,BX
OF74  B4 50                    MOV    AH,50H
OF76  CD 21                    INT    21H                     ;RESTORE PSP
OF78  1E                       PUSH   DS
OF79  8B DD                    MOV    BX,BP
OF7B  C5 57 50                 LDS    DX,[BX].TSRDTA          ;RESTORE DTA
OF7E  B4 1A                    MOV    AH,1AH
OF80  CD 21                    INT    21H
OF82  1F                       POP    DS
OF83  2E: 83 3E 1844 R 00  SOOA4: CMP  CS:ISEGA,0
OF89  74 21                    JE     SOOA3
OF8B  33 C0                    XOR    AX,AX
OF8D  8E C0                    MOV    ES,AX
OF8F  26: C4 3E 04A8           LES    DI,DWORD PTR ES:[4A8H]
OF94  8C C2                    MOV    DX,ES
OF96  87 7F 54                 XCHG   WORD PTR DS:[BX].ESAVLOC,DI
OF99  87 57 56                 XCHG   WORD PTR DS:[BX].ESAVLOC+2,DX
OF9C  33 C0                    XOR    AX,AX
OF9E  8E C0                    MOV    ES,AX
OFA0  FA                       CLI
OFA1  26: 89 3E 04A8           MOV    WORD PTR ES:[4A8H],DI
OFA6  26: 89 16 04AA           MOV    WORD PTR ES:[4AAH],DX
OFAB  FB                       STI
                              ;
OFAC  C5 57 58         SOOA3: LDS    DX,DS:[BX].CONSOLE      ;GET MS-DOS CONSOLE DRIVER ADDRESS
OFAF  E8 0000 E                CALL   RSETCON
OFB2  8B 47 5C                 MOV    AX,DS:[BX].PINMEM
OFB5  2E: A3 182D R            MOV    CS:TINMEM,AX
OFB9  33 FF                    XOR    DI,DI
OFBB  8E C7                    MOV    ES,DI
OFBD  2E: 8E 1E 1291 R         MOV    DS,CS:MYDSEG
OFC2  BE 4082 R                MOV    SI,OFFSET VECTBL2
OFC5  B9 0200                  MOV    CX,VECSIZ
OFC8  FC                       CLD
OFC9  FA                       CLI
OFCA  F3/ A5                   REP    MOVSW
OFCC  FB                       STI
OFCD  E8 02F4 R                CALL   POPR
OFD0  2E: FF 0E 0A61 R         DEC    CS:INSWAP
OFD5  F8                       CLC
OFD6  C3                       RET
                              ;
OFD7  5B              SWAPDO: POP    BX
OFD8  80 7F 62 01              CMP    DS:[BX].XRUN,1
OFDC  74 03                    JE     SD01
OFDE  E9 10B8 R                JMP    SXRO
OFE1  E8 0A63 R        SD01:   CALL   SAVINTS
```

```
0FE4  2E: 8E 1E 1291 R              MOV    DS,CS:MYDSEG
0FE9  80 7F 47 00                   CMP    [BX].TEXT,0
0FED  74 03                         JE     SD05
0FEF  E8 0B53 R                     CALL   RVIDEO
                                ;
0FF2  8D 97 0096          SD05:     LEA    DX,[BX].TSRFCB         ;POINT TO TSR FCB
0FF6  BD 0005                       MOV    BP,5                   ;RECORD 0=DBLK DEF
0FF9  B8 0000                       MOV    AX,0
0FFC  8B 4F 35                      MOV    CX,[BX].PAGES
0FFF  83 E9 09                      SUB    CX,5+VECSIZ/80H        ;ACCOUNT FOR ROOM FOR TSR DBLK & INTS
1002  8E 5F 39                      MOV    DS,DS:[BX].SWPSEG
1005  33 FF                         XOR    DI,DI
1007  E8 04D5 R                     CALL   DISKOUT                ;WRITE OUT TSR
100A  BF 4082 R                     MOV    DI,OFFSET VECTBL2
100D  B9 0004                       MOV    CX,VECSIZ/80H          ;NUMBER OF RECORDS IN VECTBL
1010  E8 04D5 R                     CALL   DISKOUT
1013  2E: A1 1291 R                 MOV    AX,CS:MYDSEG
1017  8E D8                         MOV    DS,AX
1019  8E C0                         MOV    ES,AX
101B  BA 20C4 R                     MOV    DX,OFFSET SOFCB
101E  8B 6F 4A                      MOV    BP,DS:[BX].OUTRECL
1021  89 2E 000E R                  MOV    PAGESOUT,BP
1025  8B 47 4C                      MOV    AX,DS:[BX].OUTRECH
1028  A3 0010 R                     MOV    PAGESOUT+2,AX
102B  A1 0010 R                     MOV    AX,PAGESOUT+2
102E  8B 4F 35                      MOV    CX,[BX].PAGES
1031  83 E9 09                      SUB    CX,5+VECSIZ/80H        ;ACCOUNT FOR ROOM FOR TSR DBLK & INTS
1034  8E 5F 39                      MOV    DS,DS:[BX].SWPSEG
1037  33 FF                         XOR    DI,DI
1039  E8 039F R                     CALL   DISKIN                 ;WRITE OUT APPL
103C  BF 4082 R                     MOV    DI,OFFSET VECTBL2
103F  B9 0004                       MOV    CX,VECSIZ/80H
1042  E8 039F R                     CALL   DISKIN                 ;SAVE OUT INT VECS
1045  8B EB                         MOV    BP,BX
1047  2E: 8E 1E 1291 R              MOV    DS,CS:MYDSEG
104C  8B 5F 4E                      MOV    BX,[BX].TSRPSP
104F  8E C3                         MOV    ES,BX
1051  B4 50                         MOV    AH,50H
1053  CD 21                         INT    21H                    ;RESTORE PSP
1055  8B DD                         MOV    BX,BP
1057  1E                            PUSH   DS
1058  C5 57 50                      LDS    DX,[BX].TSRDTA         ;RESTORE DTA
105B  B4 1A                         MOV    AH,1AH
105D  CD 21                         INT    21H
105F  1F                            POP    DS
1060  2E: 83 3E 1844 R 00           CMP    CS:ISEGA,0
1066  74 21                         JE     SD03
1068  33 C0                         XOR    AX,AX
106A  8E C0                         MOV    ES,AX
106C  26: C4 3E 04A8                LES    DI,DWORD PTR ES:[4A8H]
1071  8C C2                         MOV    DX,ES
1073  87 7F 54                      XCHG   WORD PTR DS:[BX].ESAVLOC,DI
1076  87 57 56                      XCHG   WORD PTR DS:[BX].ESAVLOC+2,DX
1079  33 C0                         XOR    AX,AX
107B  8E C0                         MOV    ES,AX
107D  FA                            CLI
107E  26: 89 3E 04A8                MOV    WORD PTR ES:[4A8H],DI
1083  26: 89 16 04AA                MOV    WORD PTR ES:[4AAH],DX
1088  FB                            STI
                                ;
1089  C5 57 58            SD03:     LDS    DX,DS:[BX].CONSOLE     ;GET MS-DOS CONSOLE DRIVER ADDRESS
108C  E8 0000 E                     CALL   RSETCON
```

```
108F  88 47 5C                MOV    AX,DS:[BX].PINMEM
1092  2E: A3 182D R           MOV    CS:TINMEM,AX
1096  BE 4082 R               MOV    SI,OFFSET VECTBL2
1099  2E: 8E 1E 1291 R        MOV    DS,CS:MYDSEG
109E  33 FF                   XOR    DI,DI
10A0  8E C7                   MOV    ES,DI
10A2  B9 0200                 MOV    CX,VECSIZ
10A5  FC                      CLD
10A6  FA                      CLI
10A7  F3/ A5                  REP MOVSW                    ;LOAD IN TSR INTS
10A9  FB                      STI
10AA  B4 00                   MOV    AH,00H
10AC  CD 21                   INT    21H
10AE  E8 02F4 R               CALL   POPR
10B1  2E: FF 0E 0A61 R        DEC    CS:INSWAP
10B6  F8                      CLC
10B7  C3                      RET
                              ;
                              ;SWAP OUT A TSR RUNNING IN XPANDED MEMORY
                                     PUBLIC SXRO
10B8  E8 0A63 R        SXRO:  CALL   SAVINTS              ;SAVE INT TABLE TO TBL2 & EXCHANGE
10BB  E8 357B R               CALL   _DSKBUSY             ;ARE WE BUSY
10BE  0B C0                   OR     AX,AX
10C0  75 0E                   JNE    SX0A5
10C2  2E: 8E 1E 1291 R        MOV    DS,CS:MYDSEG
10C7  80 7F 47 00             CMP    [BX].TEXT,0
10CB  74 03                   JE     SX0A5                ;DO WE SAVE
10CD  E8 0853 R               CALL   RVIDEO               ;RESTORE STATE
                              ;
10D0  8B 57 43         SX0A5: MOV    DX,[BX].EMMHNDL      ;NOW SAFE TO RESTORE PAGE MAP
10D3  B4 48                   MOV    AH,48H
10D5  E8 025F R               CALL   DOEMM                ;WE DON'T NEED TSR STUFF ANY MORE
10D8  53                      PUSH   BX
10D9  2E: 8E 1E 1291 R        MOV    DS,CS:MYDSEG
10DE  BF 4082 R               MOV    DI,OFFSET VECTBL2
10E1  BD 0200                 MOV    BP,VECSIZ
10E4  33 C0                   XOR    AX,AX                ;INTS IN PAGE 0
10E6  8B D8                   MOV    BX,AX
10E8  B9 0001                 MOV    CX,1
10EB  E8 0619 R               CALL   PAGEX
10EE  E8 357B R               CALL   _DSKBUSY             ;DOS BUSY?
10F1  0B C0                   OR     AX,AX
10F3  5B                      POP    BX
10F4  2E: 8E 1E 1291 R        MOV    DS,CS:MYDSEG
10F9  75 16                   JNE    SX0A4
10FB  8B EB                   MOV    BP,BX
10FD  8B 5F 4E                MOV    BX,[BX].TSRPSP
1100  8E C3                   MOV    ES,BX
1102  B4 50                   MOV    AH,50H
1104  CD 21                   INT    21H                  ;RESTORE PSP
1106  1E                      PUSH   DS
1107  8B DD                   MOV    BX,BP
1109  C5 57 50                LDS    DX,[BX].TSRDTA       ;RESTORE DTA
110C  B4 1A                   MOV    AH,1AH
110E  CD 21                   INT    21H
1110  1F                      POP    DS
1111  2E: 83 3E 1844 R 00 SX0A4: CMP CS:ISEGA,0
1117  74 17                   JE     SX0A3
1119  FA                      CLI
111A  33 C0                   XOR    AX,AX
111C  8E C0                   MOV    ES,AX
111E  26: C4 3E 04A8          LES    DI,DWORD PTR ES:[4A8H]
1123  8C C2                   MOV    DX,ES
```

```
1125  87 7F 54                    XCHG    WORD PTR DS:[BX].ESAVLOC,DI
1128  87 57 56                    XCHG    WORD PTR DS:[BX]:ESAVLOC+2,DX
112B  33 C0                       XOR     AX,AX
112D  8E C0                       MOV     ES,AX
                              ;   MOV     WORD PTR ES:[4A8H],DI
                              ;   MOV     WORD PTR ES:[4AAH],DX
112F  FB                          STI
                              ;
1130  C5 57 58         SXOA3:     LDS     DX,DS:[BX].CONSOLE      ;GET MS-DOS CONSOLE DRIVER ADDRESS
1133  E8 0000 E                   CALL    RSETCON
1136  8B 47 5C                    MOV     AX,DS:[BX].PINMEM
1139  2E: A3 182D R               MOV     CS:TINMEM,AX
113D  33 FF                       XOR     DI,DI
113F  8E C7                       MOV     ES,DI
1141  2E: 8E 1E 1291 R            MOV     DS,CS:MYDSEG
1146  BE 4082 R                   MOV     SI,OFFSET VECTBL2
1149  B9 0200                     MOV     CX,VECSIZ
114C  FC                          CLD
114D  FA                          CLI
114E  F3/ A5                      REP MOVSW
1150  FB                          STI
1151  E8 02F4 R                   CALL    POPR
1154  2E: FF 0E 0A61 R            DEC     CS:INSWAP
1159  F8                          CLC
115A  C3                          RET
                              ;
115B              SWAPOUT ENDP
                              ;
                              PUBLIC  _ENKB
                              ;
115B              _ENKB    PROC   NEAR
115B  50                          PUSH    AX
115C  B0 61                       MOV     AL,061H
115E  E6 20                       OUT     20H,AL
1160  58                          POP     AX
1161  C3                          RET
1162              _ENKB    ENDP
                              ;
1162              KBINTON  PROC   NEAR
1162  50                          PUSH    AX
1163  FA                          CLI
1164  E4 21                       IN      AL,21H
1166  24 B8                       AND     AL,01011100B   ;TYRN ON DISK,KB,TIMER,FLOPPY
1168  EB 00                       JMP     $+2
116A  E6 21                       OUT     21H,AL
116C  FB                          STI
116D  58                          POP     AX
116E  C3                          RET
116F              KBINTON  ENDP
                              ;
                              PUBLIC  TRY2SWP
                              ;
116F              TRY2SWP  PROC   NEAR
116F  53                          PUSH    BX
1170  1E                          PUSH    DS
1171  2E: 8E 1E 1291 R            MOV     DS,CS:MYDSEG
1176  BB 2222 R                   MOV     BX,OFFSET DGROUP:_DBLK
1179  83 3E 0028 R 00             CMP     _ACTIVE,0
117E  75 2C                       JNE     TSEND
1180  2E: 83 3E 0A61 R 00         CMP     CS:INSWAP,0
1186  7D 24                       JGE     TSEND
1188  80 3F 00        TS1:        CMP     BYTE PTR DS:[BX],0
```

```
1188  74 1F                            JE       TSEND
118D  80 7F 30 00                      CMP      DS:[BX].DOSSTRT,0
1191  74 1D                            JE       TS3
1193  80 7F 15 00                      CMP      DS:[BX].INMEM,0
1197  75 17                            JNE      TS3
1199  80 7F 48 00                      CMP      DS:[BX].ISTSR,0
119D  74 11                            JE       TS3
119F  FA                               CLI
11A0  2E: FF 06 009A R                 INC      CS:SWITCHEM
11A5  74 15                            JE       TS4
11A7  2E: FF 0E 009A R                 DEC      CS:SWITCHEM
11AC  FB                      TSEND:   STI
11AD  1F                               POP      DS
11AE  5B                               POP      BX
11AF  C3                               RET
11B0  81 C3 00E5              TS3:     ADD      BX,SIZE TSR
11B4  81 FB 387F R                     CMP      BX,OFFSET DGROUP:_DBLMEM
11B8  73 F2                            JAE      TSEND
11BA  EB CC                            JMP      TS1
11BC  C6 47 30 00             TS4:     MOV      BYTE PTR DS:[BX].DOSSTRT,0
11C0  C6 47 15 FF                      MOV      BYTE PTR DS:[BX].INMEM,0FFH
11C4  2E: 8C 16 24A9 R                 MOV      CS:OLDSS,SS
11C9  2E: 89 26 24A7 R                 MOV      CS:OLDSP,SP
11CE  2E: 8E 16 1291 R                 MOV      SS,CS:MYDSEG
11D3  BC 3C80 R                        MOV      SP,OFFSET DGROUP:LOCSTK
11D6  FB                               STI
11D7  E8 0B60 R                        CALL     SWAPIN
11DA  73 03                            JNC      TS7
11DC  E9 1277 R                        JMP      TS4ERR
11DF  FA                      TS7:     CLI
11E0  8E 57 41                         MOV      SS,WORD PTR DS:[BX].LOCALS+2
11E3  8B 67 3F                         MOV      SP,WORD PTR DS:[BX].LOCALS
11E6  2E: FF 36 24A9 R                 PUSH     CS:[OLDSS]
11EB  2E: FF 36 24A7 R                 PUSH     CS:[OLDSP]
11F0  2E: FF 0E 009A R                 DEC      CS:SWITCHEM
11F5  FB                               STI
11F6  2E: FF 36 1821 R                 PUSH     WORD PTR CS:[DOSFLG]
11FB  E8 02E2 R                        CALL     PUSHR
11FE  2E: 83 3E 009E R 00              CMP      CS:SIMKB,0
1204  2E: C7 06 009E R 0000            MOV      CS:SIMKB,0
120B  75 0F                            JNE      TS6
120D  2E: 8E 1E 1291 R                 MOV      DS,CS:MYDSEG
1212  80 3E 207F R 00                  CMP      _SOUND,0
1217  74 00                            JE       SDIMB
1219  EB 1F 90                SDIMB:   JMP      TS5
121C  80 7F 62 01             TS6:     CMP      DS:[BX].XRUN,1
1220  75 07                            JNE      @F
1222  E8 1162 R                        CALL     KBINTON
1225  90                               NOP
1226  90                               NOP
1227  EB 02                            JMP      SHORT TS6A
1229                          @@:      ;PUSH    DS
                                       ;LDS     SI,CS:[DOS_CRIT]
                                       ;MOV     AL,BYTE PTR DS:[SI]
                                       ;MOV     BYTE PTR DS:[SI],1
1229  CD 09                            INT      9                    ;PROCESS KBINT
                                       ;MOV     BYTE PTR DS:[SI],AL
                                       ;POP     DS
122B  B0 0B                   TS6A:    MOV      AL,00001011b         ; tell 8259A we want the ISR
122D  E6 20                            OUT      20H,AL               ; 8259A command reg
122F  EB 00                            JMP      SHORT $+2            ; may be a AT
1231  E4 20                            IN       AL,20H               ; AL=mask of active INTs
1233  A8 02                            TEST     AL,2                 ; test IRQ 1
1235  74 03                            JE       TS5
```

```
1237  E8 115B R              CALL    _ENKB
123A  8C C8          TS5:    MOV     AX,CS
123C  BA 2198 R              MOV     DX,OFFSET PGROUP:UNGETC
123F  B9 1530 R              MOV     CX,OFFSET PGROUP:KBHIT
1242  BE 00A2 R              MOV     SI,OFFSET PGROUP:TIDLE
1245  BF 1821 R              MOV     DI,OFFSET PGROUP:DOSFLG
1248  BD 1888 R              MOV     BP,OFFSET PGROUP:MSFUN
124B  E8 1162 R              CALL    KBINTON
124E  FF 5F 38               CALL    DWORD PTR DS:[BX].XFERADD
1251  E8 02F4 R              CALL    POPR
1254  2E: 8F 06 1821 R       POP     WORD PTR CS:[DOSFLG]
1259  FA                     CLI
125A  2E: FF 06 009A R       INC     CS:SWITCHEM
125F  2E: 8F 06 24A7 R       POP     CS:[OLDSP]
1264  2E: 8F 06 24A9 R       POP     CS:[OLDSS]
1269  2E: 8E 16 1291 R       MOV     SS,CS:MYDSEG
126E  BC 3C80 R              MOV     SP,OFFSET DGROUP:LOCSTK
1271  FB                     STI
1272  E8 0EDD R              CALL    SWAPOUT
1275  EB 03                  JMP     SHORT TS4A
1277  E8 3491 R      TS4ERR: CALL    SOUND
127A  FA             TS4A:   CLI
127B  2E: 8E 16 24A9 R       MOV     SS,CS:OLDSS
1280  2E: 8B 26 24A7 R       MOV     SP,CS:OLDSP
1285  2E: FF 0E 009A R       DEC     CS:SWITCHEM
128A  C6 47 15 00            MOV     BYTE PTR DS:[BX].INMEM,0
128E  E9 11AC R              JMP     TSEND
1291                 TRY2SWP ENDP
                     ;
                             PUBLIC  MYDSEG
                     ;
1291  ---- R         MYDSEG  DW      DGROUP
                     ;
                             PUBLIC  HRDSWP
                     ;
                     ;   CHECK FOR SWAP-IN ON HARDWARE INT - REGS DON'T MATTER
                     ;
                     ; CALL WITH BP=TSR STRUCTURE INTERRUPT NUMBER, LOCAL STACK FRAME
                     ; SI = OFFSET OF INTERRUPT VECTOR IN PAGE 0
                     ;
1293                 HRDSWP  PROC    NEAR
1293  FA                     CLI
1294  2E: 83 3E 0A61 R 00    CMP     CS:INSWAP,0
129A  7D 0A                  JGE     CHKSX
129C  E8 17DA R              CALL    GGROUP
129F  83 3E 0028 R 00        CMP     _ACTIVE,0
12A4  74 00                  JE      CHKS0
12A6  C3             CHKSX:  RET
12A7  81 C7 00E5     CHKS3:  ADD     DI,SIZE TSR
12AB  81 FF 387F R           CMP     DI,OFFSET _DBLKEN
12AF  73 F5                  JAE     CHKSX
12B1  EB 03                  JMP     SHORT CHKS1
12B3  BF 2222 R      CHKS0:  MOV     DI,OFFSET _DBLK
12B6  80 3D 00       CHKS1:  CMP     BYTE PTR DS:[DI],0
12B9  74 EB                  JE      CHKSX
12BB  80 7D 15 00            CMP     BYTE PTR DS:[DI].INMEM,0
12BF  75 E6                  JNE     CHKS3
12C1  80 7D 62 01            CMP     BYTE PTR DS:[DI].XRUN,1
12C5  74 E0                  JE      CHKS3
12C7  80 7D 48 00            CMP     BYTE PTR DS:[DI].ISTSR,0
12CB  74 DA                  JE      CHKS3
12CD  3E: 80 7B 69 00 CHKS1A: CMP    BYTE PTR DS:[DI+BP].COUNT,0
12D2  74 D3                  JE      CHKS3
```

```
1204  83 FD OF                        CMP      BP,SWAPNET
1207  74 06                           JE       CHKS1B
1209  3E: FE 4B 69                    DEC      BYTE PTR DS:[DI+BP].COUNT
120D  75 C8                           JNE      CHKS3
12DF  C6 45 15 FF         CHKS1B:     MOV      BYTE PTR DS:[DI].INMEM,0FFH
12E3  E4 21                           IN       AL,21H
12E5  8A E0                           MOV      AH,AL
12E7  50                              PUSH     AX
12E8  83 FD OF                        CMP      BP,SWAPNET
12EB  74 09                           JE       @F
12ED  83 FD 02                        CMP      BP,SWAP8
12F0  74 04                           JE       @F
12F2  B0 FF                           MOV      AL,0FFH
12F4  E6 21                           OUT      21H,AL
12F6  88 DF               @@:         MOV      BX,DI
12F8  E8 0B6D R                       CALL     SWAPIN
12FB  73 03                           JNC      @F
12FD  E9 7E 90                        JMP      HRDNOS
1300  1E                  @@:         PUSH     DS
1301  50                              PUSH     AX
1302  2E: 83 3E 1840 R 00             CMP      CS:_NETBEEP,0
1308  74 03                           JE       @F
130A  E8 3531 R                       CALL     _BEEP
130D  33 C0               @@:         XOR      AX,AX
130F  8E D8                           MOV      DS,AX
1311  2E: 8B 0E 2527 R                MOV      CX,CS:SKIPCNT
1316  83 FD 02                        CMP      BP,SWAP8
1319  75 07                           JNE      @F
131B  2E: C6 06 2529 R 01             MOV      CS:DTIMER,1
      90
1322  9C                  @@:         PUSHF
1323  FA                              CLI
1324  FF 1C                           CALL     DWORD PTR DS:[SI]
1326  83 FD OF                        CMP      BP,SWAPNET
1329  74 07                           JE       @F
132B  83 FD 02                        CMP      BP,SWAP8
132E  75 3B                           JNE      SKPL2
1330  E2 F0                           LOOP     @B
1332  2E: 88 0E 2529 R    @@:         MOV      CS:DTIMER,CL
1337  2E: 89 0E 2527 R                MOV      CS:SKIPCNT,CX
133C  58                              POP      AX
133D  8A C4                           MOV      AL,AH
133F  E6 21                           OUT      21H,AL
1341  E8 2E3D R                       CALL     _RENABL
1344  83 FD OF                        CMP      BP,SWAPNET
1347  74 OF                           JE       SKPL3
1349  2E: 83 3E 2527 R 04 SKPLOOP:    CMP      CS:SKIPCNT,4
134F  7E F8                           JLE      SKPLOOP
1351  2E: 89 0E 2527 R                MOV      CS:SKIPCNT,CX
1356  EB 14                           JMP      SHORT SKPL1
1358  E4 21               SKPL3:      IN       AL,21H
135A  50                              PUSH     AX
135B  0C 02                           OR       AL,2
135D  E6 21                           OUT      21H,AL
135F  FB                  SKPL3A:     STI
1360  2E: 8E 1E 1291 R                MOV      DS,CS:MYDSEG
1365  80 7D 78 00                     CMP      DS:[DI+SWAPNET].COUNT,0
1369  75 F4                           JNE      SKPL3A
136B  58                  SKPL2:      POP      AX
136C  1F                  SKPL1:      POP      DS
136D  8B DF                           MOV      BX,DI
136F  E8 0EDD R                       CALL     SWAPOUT
```

```
1372  2E: 83 3E 1840 R 00    aa:      CMP     CS:_NETBEEP,0
1378  74 03                            JE      HRDNOS
137A  E8 3531 R                        CALL    _BEEP
137D  FA                     HRDNOS:  CLI
137E  58                              POP     AX
137F  E6 21                            OUT     21H,AL
1381  3E: 8A 43 7C                     MOV     AL,BYTE PTR DS:[DI+BP].RESET
1385  83 FD 0F                         CMP     BP,SWAPNET
1388  74 04                            JE      CHKS1C
138A  3E: 88 43 69                     MOV     BYTE PTR DS:[DI+BP].COUNT,AL
138E  C6 45 15 00            CHKS1C:  MOV     BYTE PTR DS:[DI].INMEM,0
1392  C3                              RET
1393                         HRDSWP   ENDP
                             ;
                             ;        PUBLIC  SFTSWP
                             ;
                             ;   CHECK FOR SWAP-IN ON SOFTWARE INT - REGS MATTER!!
                             ;
                             ; CALL WITH BP=TSR STRUCTURE INTERRUPT NUMBER, USER STACK FRAME
                             ; SI = OFFSET OF INTERRUPT VECTOR IN PAGE 0
                             ;
                                      PUBLIC  SSFL,SSAX,SSBP,SSDI,SSSI,SSDS,UNLDKBF
1393  90                              EVEN
1394  0000                   DUMMY    DW      0
1396  0000                   SSFL     DW      0
1398  0000                   SSAX     DW      0
139A  0000                   SSBP     DW      0
139C  0000                   SSDI     DW      0
139E  0000                   SSSI     DW      0
13A0  0000                   SSDS     DW      0
13A2  0000                   LCHAR    DW      0
13A4  0000                   UNLDKBF  DW      0
13A6  00                     LCFLG    DB      0
                             ;
13A7                         SFTSWP   PROC    NEAR
13A7  2E: 83 3E 0A61 R 00             CMP     CS:INSWAP,0
13AD  7D 0F                           JGE     SHKX
13AF  9C                              PUSHF
13B0  FA                              CLI
13B1  2E: FF 06 009A R                INC     CS:SWITCHEM
13B6  74 07                           JE      SS1
13B8  2E: FF 0E 009A R                DEC     CS:SWITCHEM
13BD  9D                              POPF
13BE  C3                     SHKX:    RET
13BF  2E: 8C 16 24A9 R       SS1:     MOV     CS:OLDSS,SS
13C4  2E: 89 26 24A7 R                MOV     CS:OLDSP,SP
13C9  2E: 8E 16 1291 R                MOV     SS,CS:MYDSEG
13CE  BC 3C80 R                       MOV     SP,OFFSET DGROUP:LOCSTK
13D1  FB                              STI
13D2  1E                              PUSH    DS
13D3  2E: 8E 1E 1291 R                MOV     DS,CS:MYDSEG
13D8  83 3E 0028 R 00                 CMP     _ACTIVE,0
13DD  74 03                           JE      SS0
13DF  EB 2C 90                        JMP     SHKS2
13E2  BF 2222 R              SS0:     MOV     DI,OFFSET _DBLK
13E5  80 3D 00               SHKS1:   CMP     BYTE PTR DS:[DI],0
13E8  74 23                           JE      SHKS2
13EA  80 7D 15 00                     CMP     BYTE PTR DS:[DI].INMEM,0
13EE  75 13                           JNE     SHKS3
13F0  80 7D 62 01                     CMP     BYTE PTR DS:[DI].XRUN,1
13F4  74 00                           JE      SHKS3
13F6  3E: 80 7B 69 00                 CMP     BYTE PTR DS:[DI+BP].COUNT,0
13FB  74 06                           JE      SHKS3
13FD  3E: FE 4B 69                    DEC     BYTE PTR DS:[DI+BP].COUNT
```

```
1401  74 1F                          JE      SHKS4
1403  81 C7 00E5          SHKS3:     ADD     DI,SIZE TSR
1407  81 FF 387F R                   CMP     DI,OFFSET _DBLKEN
140B  72 D8                          JB      SHKS1
140D  1F                  SHKS2:     POP     DS
140E  FA                             CLI
140F  2E: FF 0E 009A R               DEC     CS:SWITCHEM
1414  7D 0A                          JGE     SHKS5
1416  2E: 8E 16 24A9 R               MOV     SS,CS:OLDSS
141B  2E: 8B 26 24A7 R               MOV     SP,CS:OLDSP
1420  9D                  SHKS5:     POPF
1421  C3                             RET
1422  C6 45 15 FF         SHKS4:     MOV     BYTE PTR DS:[DI].INMEM,OFFH
1426  53                             PUSH    BX
1427  8B DF                          MOV     BX,DI
1429  E8 0B6D R                      CALL    SWAPIN
142C  73 03                          JNC     SS2A
142E  E9 0286 R                      JMP     DOEMME
1431  5B                  SS2A:      POP     BX
1432  1F                             POP     DS
1433  2E: FF 36 1487 R               PUSH    WORD PTR CS:[SS2]
1438  50                             PUSH    AX
1439  8B C6                          MOV     AX,SI
143B  2E: A2 1488 R                  MOV     BYTE PTR CS:[SS2+1],AL
143F  58                             POP     AX
1440  2E: 87 3E 139C R               XCHG    DI,CS:SSDI
1445  2E: 87 36 139E R               XCHG    SI,CS:SSSI
144A  2E: 87 2E 139A R               XCHG    BP,CS:SSBP
144F  2E: 83 3E 13A4 R 00            CMP     CS:UNLDKBF,0
1455  74 30                          JE      SS2
1457  CD 16                          INT     16H
1459  2E: 8F 06 1487 R               POP     WORD PTR CS:[SS2]
145E  9C                             PUSHF
145F  50                             PUSH    AX
1460  B4 01               @@:        MOV     AH,1
1462  CD 16                          INT     16H
1464  74 1D                          JZ      @F
1466  2E: A3 13A2 R                  MOV     CS:LCHAR,AX
146A  2E: C6 06 13A6 R 01            MOV     CS:LCFLG,1
1470  9A 2198 ---- R                 CALL    FAR PTR UNGETC
1475  72 0C                          JC      @F
1477  2E: C6 06 13A6 R 00            MOV     CS:LCFLG,0
147D  B4 00                          MOV     AH,0
147F  CD 16                          INT     16H
1481  EB DD                          JMP     @B
1483  58                  @@:        POP     AX
1484  EB 09 90                       JMP     SS2B
1487  CD FF               SS2:       INT     0FFH
1489  2E: 8F 06 1487 R               POP     WORD PTR CS:[SS2]
148E  9C                             PUSHF
148F  F8                  SS2B:      CLC
1490  1E                             PUSH    DS
1491  57                             PUSH    DI
1492  55                             PUSH    BP
1493  53                             PUSH    BX
1494  2E: 8E 1E 1291 R               MOV     DS,CS:MYDSEG
1499  2E: 8B 3E 139C R               MOV     DI,CS:SSDI
149E  2E: 8B 2E 139A R               MOV     BP,CS:SSBP
14A3  8B DF                          MOV     BX,DI
14A5  E8 0EDD R                      CALL    SWAPOUT
14A8  3E: 8A 5B 7C                   MOV     BL,BYTE PTR DS:[DI+BP].RESET
14AC  3E: 88 5B 69                   MOV     BYTE PTR DS:[DI+BP].COUNT,BL
```

```
14B0  C6 45 15 00            MOV     BYTE PTR DS:[DI].INMEM,0
14B4  5B                     POP     BX
14B5  5D                     POP     BP
14B6  5F                     POP     DI
14B7  1F                     POP     DS
14B8  2E: 8F 06 1396 R       POP     CS:[SSFL]
14BD  FA                     CLI
14BE  2E: FF 0E 009A R       DEC     CS:SWITCHEM
14C3  7D 0A                  JGE     SS3
14C5  2E: 8E 16 24A9 R       MOV     SS,CS:OLDSS
14CA  2E: 8B 26 24A7 R       MOV     SP,CS:OLDSP
14CF  2E: 8F 06 1394 R  SS3: POP     CS:[DUMMY]        ;THROW AWAY OLD FLAGS
14D4  2E: FF 36 1396 R       PUSH    CS:[SSFL]         ;GET FLAGS FROM IRET
14D9  9D                     POPF
14DA  2E: 8F 06 1394 R       POP     CS:[DUMMY]        ;THROW AWAY SFTSWP RETURN ADDRESS
14DF  2E: 83 3E 13A4 R 00    CMP     CS:UNLDKBF,0
14E5  74 05                  JE      @F
14E7  2E: 8F 06 13A4 R       POP     CS:UNLDKBF
14EC  2E: 8F 06 1396 R  @@:  POP     CS:[SSFL]         ;RESTORE PREVIOUS CS LOCATIONS
14F1  2E: 8F 06 139C R       POP     CS:[SSDI]
14F6  2E: 8F 06 139E R       POP     CS:[SSSI]
14FB  2E: 8F 06 139A R       POP     CS:[SSBP]
                             ;
1500                    SFTSWPF PROC FAR
1500  CA 0002                RET     2                 ; RETURN FROM INTERRUPT
1503                    SFTSWPF ENDP
                             ;
1503                    SFTSWP  ENDP
                             ;
                             PUBLIC  WAITKB
                             ;
1503                    WAITKB  PROC NEAR
1503  2E: 83 3E 1854 R 00    CMP     CS:ISPS2,0
1509  74 0C                  JE      NOWAIT
150B  51                     PUSH    CX
150C  50                     PUSH    AX
150D  33 C9                  XOR     CX,CX
150F  E4 64             @@:  IN      AL,64H
1511  A8 02                  TEST    AL,2
1513  E0 FA                  LOOPNZ  @B
1515  58                     POP     AX
1516  59                     POP     CX
1517  C3               NOWAIT: RET
1518                    WAITKB  ENDP
                             ;
                             PUBLIC  SCANNR,KBHIT,SNDKCMD,MOUSE
                             ;
                             PUBLIC  DOMOUSE
                             ;
1518                    DOMOUSE PROC NEAR
1518  9C                     PUSHF
1519  FA                     CLI
151A  2E: FF 1E 005E R       CALL    DWORD PTR CS:[OLDI33]
151F  C3                     RET
1520                    DOMOUSE ENDP
                             ;
1520  00 00             MOUSE   DB   0,0
                             ;
1522                    SNDKCMD PROC NEAR
1522  2E: 83 3E 1854 R 00    CMP     CS:ISPS2,0
1528  74 05                  JE      NOKBSND
152A  E8 1503 R              CALL    WAITKB
```

```
152D  E6 64                              OUT     64H,AL
152F  C3                    NOKBSND: RET
1530                        SNDKCMD ENDP
                            ;
1530  00 00                 KBHIT   DB      0,0
1532  00                    KBSKIP  DB      0
                            ;
1533                        SCANNR  PROC    NEAR
1533  2E: 80 3E 1532 R 00           CMP     CS:KBSKIP,0
1539  75 26                         JNE     SKIPKB
153B  50                            PUSH    AX
153C  2E: 83 3E 1858 R 00           CMP     CS:_ISAT,0
1542  74 27                         JE      @F
1544  2E: 83 3E 1854 R 00           CMP     CS:ISPS2,0
154A  75 1F                         JNE     @F
154C  2E: 83 3E 1842 R 00           CMP     CS:_SLOWKB,0
1552  74 17                         JE      @F
1554  E4 60                         IN      AL,60H
1556  3C E0                         CMP     AL,0E0H
1558  75 11                         JNE     @F
155A  2E: C6 06 1532 R 02           MOV     CS:KBSKIP,2
1560  58                            POP     AX
1561  2E: FE 0E 1532 R     SKIPKB:  DEC     CS:KBSKIP
1566  2E: FF 2E 006A R              JMP     DWORD PTR CS:[OLDKB1]

1568  2E: FF 06 009A R     @@:      INC     CS:SWITCHEM
1570  75 12                         JNE     SCANRO
1572  2E: 8C 16 24A9 R              MOV     CS:OLDSS,SS
1577  2E: 89 26 24A7 R              MOV     CS:OLDSP,SP
157C  2E: 8E 16 1291 R              MOV     SS,CS:MYDSEG
1581  BC 3C80 R                     MOV     SP,OFFSET LOCSTK
1584  E8 02E2 R            SCANRO:  CALL    PUSHR
1587  BB ---- R                     MOV     BX,BIOS_SEG
158A  8E DB                         MOV     DS,BX
158C  8A 1E 0017                    MOV     BL,BYTE PTR DS:[17H]
1590  80 E3 0F                      AND     BL,0FH
1593  2E: 8E 1E 1291 R              MOV     DS,CS:MYDSEG
1598  88 1E 1E37 R                  MOV     MYSHIFT,BL
159C  B0 A7                         MOV     AL,0A7H
159E  E8 1522 R                     CALL    SNDKCMD
15A1  E8 1503 R                     CALL    WAITKB
15A4  E4 60                         IN      AL,60H
15A6  A8 80                         TEST    AL,80H
15A8  75 06                         JNE     @F
15AA  2E: 83 0E 00A2 R 08           OR      CS:TIDLE,I09FLG
15B0  2E: 83 3E 009A R 00  @@:      CMP     CS:SWITCHEM,0
15B6  75 0D                         JNE     SCANOB
15B8  50                            PUSH    AX
15B9  BD 0003                       MOV     BP,SWAP9
15BC  BE 0024                       MOV     SI,9*4
15BF  E8 1293 R                     CALL    HRDSWP
15C2  58                            POP     AX
15C3  EB 00                         JMP     SHORT SCANOB
15C5  3C F0                SCANOB:  CMP     AL,0F0H
15C7  73 45                         JAE     SC3J
15C9  0A C0                         OR      AL,AL
15CB  74 41                         JE      SC3J
15CD  3C EE                         CMP     AL,0EEH
15CF  74 3D                         JE      SC3J
15D1  3C AA                         CMP     AL,0AAH
15D3  74 39                         JE      SC3J
15D5  3C E0                         CMP     AL,0E0H
15D7  74 35                         JE      SC3J
15D9  3C E1                         CMP     AL,0E1H
```

```
15DB  74 31              JE             SC3J
15DD  1E                 PUSH           DS
15DE  07                 POP            ES
15DF  8A E0              MOV            AH,AL
15E1  24 7F              AND            AL,7FH
15E3  BF 1E33 R          MOV            DI,OFFSET DGROUP:SHTBL
15E6  B9 0004            MOV            CX,4
15E9  FC                 CLD
15EA  F2/ AE             REPNE SCASB
15EC  75 23              JNE            SCANR3
15EE  83 E9 04           SUB            CX,4
15F1  F7 D9              NEG            CX
15F3  49                 DEC            CX
15F4  50                 PUSH           AX
15F5  B0 01              MOV            AL,1
15F7  D2 E0              SHL            AL,CL
15F9  F6 C4 80           TEST           AH,80H
15FC  74 08              JE             SCANR1
15FE  34 FF              XOR            AL,0FFH
1600  20 06 1E37 R       AND            MYSHIFT,AL
1604  EB 04              JMP            SHORT SCANR2
1606  08 06 1E37 R  SCANR1:  OR         MYSHIFT,AL
160A  58            SCANR2:  POP        AX
160B  E9 1689 R          JMP            SCANR5
160E  E9 1759 R     SC3J:    JMP        SCANR7
1611  83 3E 0024 R 00  SCANR3: CMP      _MAPACT,0
1616  74 0F              JE             SCAN0A
1618  8A C4              MOV            AL,AH
161A  32 E4              XOR            AH,AH
161C  A8 80              TEST           AL,80H
161E  75 3C              JNE            SCAN3X
1620  50                 PUSH           AX
1621  E8 2E42 R          CALL           _UNGETC
1624  58                 POP            AX
1625  EB 35              JMP            SHORT SCAN3X
1627  83 3E 0028 R 00  SCAN0A: CMP      _ACTIVE,0
162C  75 E0              JNE            SC3J
162E  80 3E 1F38 R 00    CMP            _ACTKEY,0
1633  74 06              JE             SCAN0C
1635  3A 06 1F38 R       CMP            AL,_ACTKEY
1639  75 7E              JNE            SCANR5
163B  8A 26 1E37 R  SCAN0C: MOV         AH,MYSHIFT
163F  22 26 1F39 R       AND            AH,_ACTSHIFT
1643  3A 26 1F39 R       CMP            AH,_ACTSHIFT
1647  75 70              JNE            SCANR5
1649  E8 17DA R          CALL           GGROUP
                         ASSUME         DS:DGROUP
164C  83 3E 0028 R 00    CMP            _ACTIVE,0
1651  74 03              JE             SCAN3C
1653  E9 1759 R          JMP            SCANR7
1656  C7 06 0026 R 0001 SCAN3C: MOV     _AFTRDOS,1
165C  E4 61         SCAN3X: IN          AL,61H
165E  8A E0              MOV            AH,AL
1660  0C 80              OR             AL,80H
1662  EB 00              JMP            $+2
1664  E6 61              OUT            61H,AL
1666  8A C4              MOV            AL,AH
1668  EB 00              JMP            $+2
166A  E6 61              OUT            61H,AL
166C  E8 2E3D R          CALL           _RENABL
166F  E8 02F4 R          CALL           POPR
1672  FA                 CLI
1673  2E: FF 0E 009A R   DEC            CS:SWITCHEM
```

```
1678  7D 0A                        JGE      SCAN3B
167A  2E: 8E 16 24A9 R             MOV      SS,CS:OLDSS
167F  2E: 88 26 24A7 R             MOV      SP,CS:OLDSP
1684  55                  SCAN3B:  PUSH     BP
1685  E8 357B R                    CALL     _DSKBUSY
1688  0B C0                        OR       AX,AX
168A  75 17                        JNE      SCAN3A
168C  E8 23E2 R                    CALL     TRY2POP
168F  E8 116F R                    CALL     TRY2SWP

IFNDEF   TSRONLY  ;***************************************************
1692  1E                           PUSH     DS
1693  2E: 8E 1E 1291 R             MOV      DS,CS:MYDSEG
1698  83 3E 0000 E 00              CMP      _SWAP_FLAG,0
169D  1F                           POP      DS
169E  74 03                        JE       SCAN3A
16A0  E8 0000 E                    CALL     APSWAP
                          ENDIF             ;***************************************************

16A3  5D                  SCAN3A:  POP      BP
16A4  1E                  SCAN3A1: PUSH     DS
16A5  2E: 8E 1E 1291 R             MOV      DS,CS:MYDSEG
16AA  83 3E 002B R 00              CMP      _ACTIVE,0
16AF  1F                           POP      DS
16B0  75 05                        JNE      @F
16B2  B0 A8                        MOV      AL,0A8H
16B4  E8 1522 R                    CALL     SNDKCMD
16B7  58                  @@:      POP      AX
16B8  CF                           IRET
16B9  E8 17DA R           SCANR5:  CALL     GGROUP
                                   ASSUME   DS:DGROUP
16BC  BB 2222 R                    MOV      BX,OFFSET _DBLK
16BF  83 3E 002B R 00              CMP      _ACTIVE,0
16C4  75 07                        JNE      SCN7J
16C6  83 3E 002C R 00              CMP      _KSWAP,0
16CB  75 03                        JNE      SCANR6
16CD  E9 1759 R           SCN7J:   JMP      SCANR7
16D0  80 3F 00            SCANR6:  CMP      BYTE PTR [BX],0
16D3  74 F8                        JE       SCN7J
16D5  80 7F 15 00                  CMP      BYTE PTR [BX].INMEM,0
16D9  75 71                        JNE      SCAN6A
16DB  80 7F 2A 00                  CMP      [BX].KEYSON,0
16DF  74 68                        JE       SCAN6A
16E1  57                           PUSH     DI
16E2  33 FF                        XOR      DI,DI
16E4  80 79 16 FF         SCAN6C:  CMP      BYTE PTR [BX+DI].KEY,0FFH
16E8  74 15                        JE       SCAN6F
16EA  80 79 16 00                  CMP      BYTE PTR [BX+DI].KEY,0
16EE  74 05                        JE       SCAN6B
16F0  38 41 16                     CMP      BYTE PTR [BX+DI].KEY,AL
16F3  75 0A                        JNE      SCAN6F
16F5  50                  SCAN6B:  PUSH     AX
16F6  A0 1E37 R                    MOV      AL,MYSHIFT
16F9  3A 41 20                     CMP      AL,[BX+DI].SHIFTS
16FC  58                           POP      AX
16FD  74 09                        JE       SCAN6D
16FF  47                  SCAN6F:  INC      DI
1700  83 FF 0A                     CMP      DI,10
1703  72 DF                        JB       SCAN6C
1705  5F                  SCAN6E:  POP      DI
1706  EB 44                        JMP      SHORT SCAN6A
1708  5F                  SCAN6D:  POP      DI
```

```
1709  80 7F 48 00                     CMP    DS:[BX].ISTSR,0
170D  74 5E                           JE     SCAN6G
170F  2E: 83 3E 00AC R 00             CMP    CS:NOKBFL,0
1715  75 56                           JNE    SCAN6G
1717  2E: 83 3E 185C R 00             CMP    CS:INFUN10,0
171D  75 4E                           JNE    SCAN6G
171F  80 7F 62 01                     CMP    DS:[BX].XRUN,1
1723  75 0A                           JNE    @F
1725  FA                              CLI
1726  E4 21                           IN     AL,21H
1728  0C 02                           OR     AL,2
172A  EB 00                           JMP    $+2
172C  E6 21                           OUT    21H,AL
172E  FB                              STI
172F  C6 47 30 FF          @@:        MOV    BYTE PTR [BX].DOSSTRT,0FFH
1733  2E: F7 06 1823 R 0037           TEST   CS:DSKFLG,(I13FLG OR I25FLG OR I26FLG OR I17FLG OR I14FLG)
173A  75 31                           JNE    SCAN6G
173C  2E: C7 06 009E R 0001           MOV    CS:SIMKB,1
1743  80 7F 62 01                     CMP    DS:[BX].XRUN,1
1747  75 5D                           JNE    SCANR8
1749  E9 165C R                       JMP    SCAN3X
174C  81 C3 00E5           SCAN6A:    ADD    BX,SIZE ISR
1750  81 FB 387F R                    CMP    BX,OFFSET _DBLKEN
1754  73 03                           JAE    SCANR7
1756  E9 16D0 R                       JMP    SCANR6
1759  24 7F                SCANR7:    AND    AL,7FH
175B  3C 03                           CMP    AL,03H
175D  75 1B                           JNE    SC71
175F  F6 06 1E37 R 04                 TEST   MYSHIFT,4
1764  74 14                           JE     SC71
1766  E9 165C R                       JMP    SCAN3X
1769  C6 47 15 00          SCAN6H:    MOV    BYTE PTR [BX].INMEM,0
176D  80 7F 48 00          SCAN6G:    CMP    BYTE PTR [BX].ISTSR,0
1771  74 54                           JE     SCANAP
1773  C6 47 30 FF                     MOV    BYTE PTR [BX].DOSSTRT,0FFH
1777  E9 165C R                       JMP    SCAN3X
177A  E8 02F4 R            SC71:      CALL   POPR
177D  FA                              CLI
177E  2E: FF 0E 009A R                DEC    CS:SWITCHEM
1783  7D 0A                           JGE    SCAN7A
1785  2E: 8E 16 24A9 R                MOV    SS,CS:OLDSS
178A  2E: 8B 26 24A7 R                MOV    SP,CS:OLDSP
178F  2E: 83 3E 00AC R 00  SCAN7A:    CMP    CS:NOKBFL,0
1795  75 26                           JNE    SCANAD
1797  B0 0B                           MOV    AL,00001011b      ; tell 8259A we want the ISR
1799  E6 20                           OUT    20H,AL            ; 8259A command reg
179B  EB 00                           JMP    SHORT $+2         ; may be a AT
179D  E4 20                           IN     AL,20H            ; AL=mask of active INTs
179F  A8 02                           TEST   AL,2              ; test IRQ 1
17A1  75 1A                           JNE    SCANAD
17A3  E9 16A4 R                       JMP    SCAN3A1
17A6  E8 02F4 R            SCANR8:    CALL   POPR
17A9  2E: FF 0E 009A R                DEC    CS:SWITCHEM
17AE  7D 0A                           JGE    SCAN8A
17B0  2E: 8E 16 24A9 R                MOV    SS,CS:OLDSS
17B5  2E: 8B 26 24A7 R                MOV    SP,CS:OLDSP
17BA  E9 1684 R            SCAN8A:    JMP    SCAN3B
17BD  9C                   SCANAD:    PUSHF
17BE  FA                              CLI
17BF  2E: FF 1E 006A R                CALL   DWORD PTR CS:[OLDKBI]
17C4  E9 16A4 R                       JMP    SCAN3A1
17C7  C7 06 0000 E 0001    SCANAP:    MOV    _SWAP_FLAG,1
17CD  89 1E 0000 E                    MOV    _APPOUT,BX
```

```
17D1  C7 06 0000 E 0000              MOV     _FTIME,0
17D7  E9 165C R                      JMP     SCAN3X
17DA                         SCANNR  ENDP
                             ;
                                     PUBLIC  GGROUP
                             ;
17DA                         GGROUP  PROC    NEAR
17DA  2E: 8E 1E 1291 R               MOV     DS,CS:MYDSEG
17DF  C3                             RET
17E0                         GGROUP  ENDP
                             ;
                                     PUBLIC  DODOS
                             ;
17E0                         DODOS   PROC    NEAR
17E0  9C                             PUSHF
17E1  FA                             CLI
17E2  9A 1888 ---- R                 CALL    FAR PTR MSFUN
17E7  C3                             RET
17E8                         DODOS   ENDP
                             ;
                                     PUBLIC  DOBIOS
                             ;
17E8                         DOBIOS  PROC    NEAR
17E8  9C                             PUSHF
17E9  FA                             CLI
17EA  2E: FF 1E 0022 R               CALL    DWORD PTR CS:[OLDI10]
17EF  C3                             RET
17F0                         DOBIOS  ENDP
                             ;
                                     PUBLIC  NEWCPM
                             ;
17F0                         NEWCPM  PROC    FAR
17F0  58                             POP     AX
17F1  58                             POP     AX
17F2  2E: 8F 06 1394 R               POP     CS:DUMMY
17F7  9C                             PUSHF
17F8  50                             PUSH    AX
17F9  2E: FF 36 1394 R               PUSH    CS:DUMMY
17FE  80 F9 24                       CMP     CL,24H
1801  77 06                          JA      NEWC1
1803  8A E1                          MOV     AH,CL
1805  FA                             CLI
1806  E9 1888 R                      JMP     NEAR PTR MSFUN
1809  32 C0                  NEWC1:  XOR     AL,AL
180B  CF                             IRET
180C                         NEWCPM  ENDP
                             ;
                                     EXTRN   MYDOS:NEAR
                             ;
                                     PUBLIC  DOSFLG,ISEGA,NOFLICK,DSKFLG,GFUNTBL,MSFUN3,_ISAT
                                     PUBLIC  ISVGA,ISMCGA,ISHERC,IS8087,ISMOUSE,EXTVGA,DOS_ERR
                                     PUBLIC  ISPS2,ISEBDA,EBDASEG,_PALRES,_CED,EBDDRVR,TINMEM
                                     PUBLIC  PS2PD,_NETBEEP,_SLOWKB
                             ;
180C  00 18 1B 1C 1D 1E      RESTBL  DB      0,18H,1BH,1CH,1DH,1EH,1FH,20H,26H,31H,32H,4BH,4CH,52H
      1F 20 26 31 32 4B
      4C 52
181A  53 55 5D 60 61 FF              DB      53H,55H,05dh,060H,061H,0FFH,0FFH
      FF
= 0015                       RESNUM  EQU     $-RESTBL
1821  0000                   DOSFLG  DW      0
1823  0000                   DSKFLG  DW      0
1825  00000000               DOS_CRIT DD     0
```

```
1829  00000000              DOS_ERR  DD    0
182D  0000                   TIMMEM   DW    0
182F  0000                   SAVGRO   DW    0
1831  0000 0000              KBRSS    DW    0,0
1835  0000                   EBDASEG  DW    0
1837  00000000               EBDDRVR  DD    0
183B  00                              DB    0
183C  0000                   NOFLICK  DW    0
183E  0001                   _PALRES  DW    1
1840  0000                   _NETBEEP DW    0
1842  0000                   _SLOWKB  DW    0
1844  0000                   ISEGA    DW    0
1846  0000                   EGAMEM   DW    0
1848  0000                   ISVGA    DW    0
184A  0000                   ISMCGA   DW    0
184C  0000                   ISHERC   DW    0
184E  0000                   ISMOUSE  DW    0
1850  0000                   EXTVGA   DW    0
1852  0000                   ISEBDA   DW    0
1854  0000                   ISPS2    DW    0
1856  0000                   PS2PD    DW    0
1858  0000                   _ISAT    DW    0
185A  0000                   _CED     DW    0
185C  0000                   INFUN10  DW    0
185E  0000 0000              IS8087   DW    0,0
                                      EVEN
1862  1A22 R                 GFUNTBL  DW    OFFSET PGROUP:GFUN0
1864  1A25 R                          DW    OFFSET PGROUP:GFUN1
1866  1A36 R                          DW    OFFSET PGROUP:GFUN2
1868  1A44 R                          DW    OFFSET PGROUP:GFUN3
186A  1B11 R                          DW    OFFSET PGROUP:GFUN4
186C  1B2E R                          DW    OFFSET PGROUP:GFUN5
186E  1B38 R                          DW    OFFSET PGROUP:GFUN6
1870  1B43 R                          DW    OFFSET PGROUP:GFUN7
1872  1B50 R                          DW    OFFSET PGROUP:GFUN8
1874  1B55 R                          DW    OFFSET PGROUP:GFUN9
1876  1B67 R                          DW    OFFSET PGROUP:GFUN10
1878  1C3F R                          DW    OFFSET PGROUP:GFUN11
187A  1E07 R                          DW    OFFSET PGROUP:GFUN12
187C  1E52 R                          DW    OFFSET PGROUP:GFUN13
187E  1E90 R                          DW    OFFSET PGROUP:GFUN14
1880  1EA3 R                          DW    OFFSET PGROUP:GFUN15
1882  1EB1 R                          DW    OFFSET PGROUP:GFUN16
1884  1EBF R                          DW    OFFSET PGROUP:GFUN17
1886  1F08 R                          DW    OFFSET PGROUP:GFUN18
= 0013                       NUMFUN   EQU   ($-GFUNTBL)/2
                             ;
                                      PUBLIC  MSFUN
                             ;
1888                         MSFUN    PROC  FAR
1888  55                              PUSH  BP
1889  8B EC                           MOV   BP,SP
188B  FF 76 06                        PUSH  [BP+06]
188E  8B 6E 00                        MOV   BP,[BP]
1891  FB                              STI
1892  06                              PUSH  ES
1893  57                              PUSH  DI
1894  51                              PUSH  CX
1895  50                              PUSH  AX
1896  0E                              PUSH  CS
1897  07                              POP   ES
1898  BF 180C R                       MOV   DI,OFFSET PGROUP:RESTBL
1898  B9 0015                         MOV   CX,RESNUM
```

```
189E  8A C4                           MOV      AL,AH
18A0  FC                              CLD
18A1  F2/ AE                          REPNE SCASB
18A3  58                              POP      AX
18A4  59                              POP      CX
18A5  5F                              POP      DI
18A6  07                              POP      ES
18A7  74 05                           JE       MSFN2X
18A9  80 FC 63                        CMP      AH,63H
18AC  72 55                           JB       MSFUN2
18AE  2E: C7 06 1821 R FFFF  MSFN2X:  MOV      CS:DOSFLG,-1
18B5  3D 4B00                         CMP      AX,4B00H
18B8  75 03                           JNE      MSF2X1
18BA  E8 0000 E                       CALL     RUNNAM
18BD  80 FC 4C          MSF2X1:       CMP      AH,4CH
18C0  75 3A                           JNE      MSF2X2
18C2  1E                              PUSH     DS
18C3  2E: 8E 1E 1291 R                MOV      DS,CS:MYDSEG
18C8  C6 06 0000 E 00                 MOV      _APPNAME,0
18CD  FF 0E 0000 E                    DEC      _APPLEVEL
18D1  56                              PUSH     SI
18D2  57                              PUSH     DI
18D3  51                              PUSH     CX
18D4  06                              PUSH     ES
18D5  75 20                           JNE      MSF2X3
18D7  2E: 8E 06 1291 R                MOV      ES,CS:MYDSEG
18DC  8B 3E 0000 E                    MOV      DI,_APPIN
18E0  0B FF                           OR       DI,DI
18E2  74 13                           JE       MSF2X3
18E4  83 C7 06                        ADD      DI,6
18E7  26: 80 3D 28                    CMP      BYTE PTR ES:[DI],'('
18EB  75 0A                           JNE      MSF2X3
18ED  47                              INC      DI
18EE  BE 4F5F R                       MOV      SI,OFFSET COMSTR
18F1  B9 0008                         MOV      CX,8
18F4  FC                              CLD
18F5  F3/ A4                          REP MOVSB
18F7  07                MSF2X3:       POP      ES
18F8  59                              POP      CX
18F9  5F                              POP      DI
18FA  5E                              POP      SI
18FB  1F                              POP      DS
18FC  9D                MSF2X2:       POPF
18FD  5D                              POP      BP
18FE  2E: FF 2E 0072 R                JMP      DWORD PTR CS:[OLDMF]
1903  3D 5757           MSFUN2:       CMP      AX,5757H
1906  74 0A                           JE       GENJMP
1908  3D 5758                         CMP      AX,5758H
190B  75 19                           JNE      MSFUN3
190D  9D                              POPF
190E  5D                              POP      BP
190F  E9 1A0C R                       JMP      MSFUN3
1912  E9 1F31 R         GENJMP:       JMP      GENIE
1915  B8 5000                         MOV      AX,5000H
1918  2E: FF 1E 0072 R                CALL     DWORD PTR CS:[OLDMF]
191D  4F FC 49 50 53                  DB       "O",0FCH,"IPS"
1922  F3/ AE                          REP SCASB
1924  74 4B                           JE       MSFUNB
1926  80 FC 01          MSFUN3:       CMP      AH,1
1929  74 46                           JE       MSFUNB
192B  80 FC 07                        CMP      AH,7
192E  7C 52                           JL       MSFUNX
1930  80 FC 09                        CMP      AH,9
1933  7C 3C                           JL       MSFUNB
```

```
1935  80 FC 0C                         CMP     AH,12
1938  74 37                            JE      MSFUNB
193A  80 FC 0A                         CMP     AH,10
193D  75 43                            JNE     MSFUNX
193F  2E: C7 06 1821 R 0000             MOV     CS:DOSFLG,0
1946  2E: 83 3E 185A R 00               CMP     CS:_CED,0
194C  74 23                            JE      MSFUNB
194E  2E: FF 06 185C R                 INC     CS:INFUN10
1953  2E: FF 06 1821 R                 INC     CS:DOSFLG
1958  9D                                POPF
1959  5D                                POP     BP
195A  9C                                PUSHF
195B  FA                                CLI
195C  2E: FF 1E 0072 R                 CALL    DWORD PTR CS:[OLDMF]
1961  9C                                PUSHF
1962  50                                PUSH    AX
1963  1E                                PUSH    DS
1964  2E: FF 0E 1821 R                 DEC     CS:DOSFLG
1969  2E: FF 0E 185C R                 DEC     CS:INFUN10
196E  EB 5F 90                         JMP     MSFY1

1971  9D            MSFUNB:             POPF
1972  5D                                POP     BP
1973  FB                                STI
1974  E8 0000 E                        CALL    MYDOS
1977  9C                                PUSHF
1978  50                                PUSH    AX
1979  1E                                PUSH    DS
197A  EB 58 90                         JMP     MSFUNY
197D  4F FC 49 50 53                   DB      "O",0FCH,"IPS"
1982  80 FC 4D      MSFUNX:            CMP     AH,4DH
1985  74 2B                            JE      MSFUNW
1987  80 FC 4C                         CMP     AH,4CH
198A  74 26                            JE      MSFUNW
198C  80 FC 4F                         CMP     AH,4FH
198F  74 21                            JE      MSFUNW
1991  2E: 83 3E 1821 R 00  MSFNWA:     CMP     CS:DOSFLG,0
1997  7D 20                            JGE     MSFUNV
1999  80 FC 0C                         CMP     AH,12
199C  7F 14                            JG      MSFUNW
199E  80 FC 09                         CMP     AH,9
19A1  74 1B                            JE      MSFUN7
19A3  80 FC 02                         CMP     AH,2
19A6  74 16                            JE      MSFUN7
19A8  80 FC 06                         CMP     AH,6
19AB  74 11                            JE      MSFUN7
19AD  80 FC 07                         CMP     AH,7
19B0  74 0C                            JE      MSFUN7
19B2  2E: C7 06 1821 R 0000 MSFUNW:    MOV     CS:DOSFLG,0
19B9  2E: FF 06 1821 R    MSFUNV:     INC     CS:DOSFLG
19BE  9D            MSFUN7:            POPF
19BF  5D                                POP     BP
19C0  9C                                PUSHF
19C1  FA                                CLI
19C2  2E: FF 1E 0072 R                 CALL    DWORD PTR CS:[OLDMF]
19C7  9C                                PUSHF
19C8  50                                PUSH    AX
19C9  1E                                PUSH    DS
19CA  2E: FF 0E 1821 R                 DEC     CS:DOSFLG
19CF  74 03         MSFY1:             JE      MSFUNY
19D1  EB 20 90                         JMP     STRTDN
19D4  E8 17DA R     MSFUNY:            CALL    GGROUP
19D7  E8 2928 R                        CALL    PBSIZE
```

```
19DA  80 FC 5A                       CMP    AH,90
19DD  72 03                          JB     @F
19DF  E8 295F R                      CALL   PRINTIT
19E2  E8 357B R            @@:       CALL   _DSKBUSY
19E5  0B C0                          OR     AX,AX
19E7  75 17                          JNE    STRTDN
19E9  83 3E 0026 R 00                CMP    _AFTRDOS,0
19EE  74 03                          JE     MSFY0
19F0  EB 15 90                       JMP    STRTWN
19F3  E8 116F R            MSFY0:    CALL   TRY2SWP

IFNDEF  TSRONLY ;********************************************
19F6  83 3E 0000 E 00                CMP    _SWAP_FLAG,0
19FB  74 03                          JE     STRTDN
19FD  E8 0000 E            .         CALL   APSWAP
                           ENDIF            ;********************************************

1A00  1F                   STRTDN:   POP    DS
1A01  58                             POP    AX
1A02  9D                             POPF
1A03  FB                             STI
1A04  CA 0002                        RET    2
1A07  E8 23E2 R            STRTWN:   CALL   TRY2POP
1A0A  EB F4                          JMP    STRTDN
                           ;
                                     ASSUME DS:DGROUP
                                     ASSUME ES:NOTHING
                           ;
1A0C  FB                   MSFUN3:   STI
1A0D  32 FF                          XOR    BH,BH
1A0F  83 FB 13                       CMP    BX,NUMFUN
1A12  76 05                          JBE    @F
1A14  2E: FF 2E 0072 R               JMP    DWORD PTR CS:[OLDMF]
1A19  D1 E3                @@:       SHL    BX,1
1A1B  1E                             PUSH   DS
1A1C  06                             PUSH   ES
1A1D  2E: FF A7 1862 R               JMP    WORD PTR CS:[GFUNTBL+BX]
                           ;
1A22  E9 36C4 R            GFUN0:    JMP    _ROLLOUT
                           ;
1A25  E8 17DA R            GFUN1:    CALL   GGROUP
1A28  A1 0008 R                      MOV    AX,_PSP
1A2B  8B 1E 000A R                   MOV    BX,_HLEN
1A2F  07                             POP    ES
1A30  1F                             POP    DS
1A31  FB                             STI
1A32  F8                             CLC
1A33  CA 0002                        RETF   2
                           ;
1A36  07                   GFUN2:    POP    ES
1A37  1F                             POP    DS
1A38  8C CB                          MOV    BX,CS
1A3A  8E C3                          MOV    ES,BX
1A3C  BB 1888 R                      MOV    BX,OFFSET PGROUP:MSFUN
1A3F  FB                             STI
1A40  F8                             CLC
1A41  CA 0002                        RETF   2
                           ;
1A44  2E: 8E 06 1291 R     GFUN3:    MOV    ES,CS:MYDSEG
                                     ASSUME ES:DGROUP
                                     ASSUME DS:NOTHING
1A49  BF 2222 R                      MOV    DI,OFFSET DGROUP:_DBLK
1A4C  26: 80 3D 00         GFUN3A:   CMP    BYTE PTR ES:[DI],0
```

```
1A50  74 10                             JE       GFUN3B
1A52  81 C7 00E5                        ADD      DI,SIZE TSR
1A56  81 FF 387F R                      CMP      DI,OFFSET DGROUP:_DBLKEN
1A5A  72 F0                             JB       GFUN3A
1A5C  07                                POP      ES
1A5D  1F                                POP      DS
1A5E  F9                                STC
1A5F  CA 0002                           RET      2
1A62  B9 00E5              GFUN3B:      MOV      CX,SIZE TSR
1A65  57                                PUSH     DI
1A66  FC                                CLD
1A67  26: A0 1E32 R                     MOV      AL,ES:_CHNSTRT
1A6B  26: C6 06 1E32 R FF               MOV      ES:_CHNSTRT,-1
1A71  88 44 2B                          MOV      DS:[SI].EMMCHN,AL
1A74  F3/ A4                            REP MOVSB
1A76  E8 17DA R                         CALL     GGROUP
1A79  BE 3C82 R                         MOV      SI,OFFSET VECTBL1
                                        ASSUME   ES:NOTHING
1A7C  33 FF                             XOR      DI,DI
1A7E  8E C7                             MOV      ES,DI
1A80  B9 0200                           MOV      CX,VECSIZ
1A83  FA                                CLI
1A84  90                                NOP
1A85  90                                NOP
1A86  FC                                CLD
1A87  F3/ A5                            REP MOVSW
1A89  2E: 83 3E 1844 R 00               CMP      CS:ISEGA,0
1A8F  74 0F                             JE       GFUN3C
1A91  2E: A1 1291 R                     MOV      AX,CS:MYDSEG
1A95  26: C7 06 04A8 1A16 R             MOV      WORD PTR ES:[4A8H],OFFSET DGROUP:EGASAVE
1A9C  26: A3 04AA                       MOV      WORD PTR ES:[4AAH],AX
1AA0  2E: C5 16 003A R     GFUN3C:      LDS      DX,DWORD PTR CS:[OLD11B]
1AA5  B8 251B                           MOV      AX,251BH
1AA8  CD 21                             INT      21H
1AAA  5F                                POP      DI
1AAB  2E: 83 3E 00A8 R 00               CMP      CS:GENFLG,0
1AB1  74 44                             JE       GFUN3F
1AB3  E8 17DA R                         CALL     GGROUP
                                        ASSUME   DS:DGROUP
1AB6  33 DB                             XOR      BX,BX
1AB8  2E: 8B 0E 00A8 R                  MOV      CX,CS:GENFLG
1ABD  83 BF 1F54 R 00      GFUN3D:      CMP      WORD PTR DS:[BX+GFTBL+4],0
1AC2  74 05                             JE       GFUN3E
1AC4  83 C3 06                          ADD      BX,6
1AC7  EB F4                             JMP      GFUN3D
1AC9  89 BF 1F54 R         GFUN3E:      MOV      WORD PTR DS:[BX+GFTBL+4],DI
1ACD  E2 EE                             LOOP     GFUN3D
1ACF  2E: 89 0E 00A8 R                  MOV      CS:GENFLG,CX
1AD4  E8 17DA R                         CALL     GGROUP
1AD7  2E: 8E 06 1291 R                  MOV      ES,CS:MYDSEG
1ADC  C6 45 49 01                       MOV      DS:[DI].ISGENIE,1
1AE0  8B 87 1F50 R                      MOV      AX,DS:[BX+GFTBL]
1AE4  89 45 3B                          MOV      WORD PTR DS:[DI].XFERADD,AX
1AE7  8B 87 1F52 R                      MOV      AX,DS:[BX+GFTBL+2]
1AEB  89 45 3D                          MOV      WORD PTR DS:[DI].XFERADD+2,AX
1AEE  B9 0014                           MOV      CX,20
1AF1  BE 1F3A R                         MOV      SI,OFFSET GENNAME
1AF4  FC                                CLD
1AF5  F3/ A4                            REP MOVSB
1AF7                       GFUN3F:

IFDEF    NETWORK_VERSION
                           ;
```

```
                        ;ASSIGN ALL PENDING MCBS TO TSR - ASSUMES LOTS OF THINGS
                        ;
1AF7 2E: A1 00AE R              MOV     AX,CS:NETLOG
1AFB 2E: 0B 06 0080 R           OR      AX,CS:[NETLOG+2]
1B00 74 05                      JE      @F
1B02 2E: FF 1E 00AE R           CALL    DWORD PTR CS:[NETLOG]
1B07                    @@:
                        ENDIF

1B07 07                         POP     ES
1B08 1F                         POP     DS
1B09 B8 4C00                    MOV     AX,4C00H
1B0C 2E: FF 2E 0072 R           JMP     DWORD PTR CS:[OLDMF]
                        ;
1B11 57                 GFUN4:  PUSH    DI
1B12 E8 17DA R                  CALL    GGROUP
1B15 33 FF                      XOR     DI,DI
1B17 8E C7                      MOV     ES,DI
1B19 BE 3C82 R                  MOV     SI,OFFSET VECTBL1
1B1C B9 0200                    MOV     CX,VECSIZ
1B1F FA                         CLI
1B20 FC                         CLD
1B21 F3/ A5                     REP MOVSW
1B23 E8 2318 R                  CALL    RESETIC
1B26 FB                         STI
1B27 5F                         POP     DI
1B28 07                 GFNEND: POP     ES
1B29 1F                         POP     DS
1B2A F8                         CLC
1B2B CA 0002                    RETF    2
                        ;
1B2E 2E: 8B 16 1291 R   GFUN5:  MOV     DX,CS:MYDSEG
1B33 B8 0000 E                  MOV     AX,OFFSET _SWAP_DIRECTORY
1B36 EB F0                      JMP     GFNEND
                        ;
                        ; ALLOCATE EXTENDED MEMORY
1B38 2E: 8E 1E 1291 R   GFUN6:  MOV     DS,CS:MYDSEG
1B3D 29 16 001A R               SUB     _EXTFREE,DX
1B41 EB E5                      JMP     GFNEND
                        ;
                        ; RE-ACTIVATE HEADROOM
1B43 E8 02E2 R          GFUN7:  CALL    PUSHR
1B46 9A 3666 ---- R             CALL    FAR PTR SETEM
1B4B E8 02F4 R                  CALL    POPR
1B4E EB D8                      JMP     GFNEND
                        ;
                        ; DE-ACTIVATE HEADROOM
1B50 E8 364B R          GFUN8:  CALL    _HROFF
1B53 EB D3                      JMP     GFNEND
                        ;
1B55 E8 17DA R          GFUN9:  CALL    GGROUP
1B58 8B 1E 0000 E               MOV     BX,_APPIN
1B5C 0B DB                      OR      BX,BX
1B5E 74 05                      JE      GFUN9A
1B60 8A 5F 2C                   MOV     BL,[BX].APPSEQ
1B63 32 FF                      XOR     BH,BH
1B65 EB C1              GFUN9A: JMP     GFNEND
                        ;
                                PUBLIC  GFUN10
                        ;
1B67 8C D8              GFUN10: MOV     AX,DS
1B69 2E: 8E 1E 1291 R           MOV     DS,CS:MYDSEG
1B6E BB 2222 R                  MOV     BX,OFFSET _DBLK
```

```
1B71  80 3F 00              GFN10C: CMP     BYTE PTR DS:[BX],0
1B74  74 60                         JE      GF10ERR
1B76  80 7F 48 00                   CMP     DS:[BX].ISTSR,0
1B7A  75 50                         JNE     GFN10B
1B7C  38 57 2C                      CMP     DS:[BX].APPSEQ,DL
1B7F  75 4B                         JNE     GFN10B
1B81  80 7F 15 00                   CMP     DS:[BX].INMEM,0
1B85  75 4F                         JNE     GF10ERR
1B87  E8 02E2 R                     CALL    PUSHR
1B8A  0B F6                         OR      SI,SI
1B8C  74 25                         JE      GFN10D
1B8E  80 7F 2C 00                   CMP     DS:[BX].APPSEQ,0
1B92  74 1F                         JE      GFN10D
1B94  8E D8                         MOV     DS,AX
1B96  2E: 8E 06 1291 R              MOV     ES,CS:MYDSEG
1B9B  BF 0000 E                     MOV     DI,OFFSET _BATCH
1B9E  26: 89 7F 2D                  MOV     ES:[BX].BATCHP,DI
1BA2  26: C6 47 2F 01               MOV     ES:[BX].BATCHFL,1
1BA7  FC                            CLD
1BA8  AC                    @@:     LODSB
1BA9  AA                            STOSB
1BAA  0A C0                         OR      AL,AL
1BAC  75 FA                         JNE     @B
1BAE  2E: 8E 1E 1291 R              MOV     DS,CS:MYDSEG
1BB3  C7 06 0000 E 0001     GFN10D: MOV     _SWAP_FLAG,1
1BB9  89 1E 0000 E                  MOV     _APPOUT,BX
1BBD  C7 06 0000 E 0000             MOV     _FTIME,0

IFNDEF  TSRONLY ;************************************
1BC3  E8 0000 E                     CALL    APSWAP
                            ENDIF           ;************************************

1BC6  E8 02F4 R                     CALL    POPR
1BC9  E9 1B28 R                     JMP     GFNEND
1BCC  81 C3 00E5            GFN10B: ADD     BX,SIZE TSR
1BD0  3B 1E 387F R                  CMP     BX,_DBLKEN
1BD4  72 9B                         JB      GFN10C
1BD6  07                    GF10ERR:POP     ES
1BD7  1F                            POP     DS
1BD8  F9                            STC
1BD9  CA 0002                       RETF    2
1BDC  E9 1B28 R             GFN10A: JMP     GFNEND
                            ;
1BDF  0000                  CPARBLK DW      0
1BE1  1BED ---- R                   DD      CCOMLIN
1BE5  0000 ---- E                   DD      DGROUP:CFCB0
1BE9  0000 ---- E                   DD      DGROUP:CFCB1
1BED  0050[                 CCOMLIN DB      80 DUP(0)
         00
            ]

;
                                    PUBLIC  GFUN11,_LTSR
                            ;
1C3D  0000                  _LTSR   DW      0
                            ;
1C3F  FA                    GFUN11: CLI
1C40  2E: FF 06 009A R              INC     CS:SWITCHEM
1C45  7E 03                         JLE     @F
1C47  E9 1DEF R                     JMP     GF11ERR
1C4A  2E: 8C 16 24A9 R      @@:     MOV     CS:[OLDSS],SS          ;SET UP LOCAL STACK FRAME
```

```
1C4F  2E: 89 26 24A7 R                MOV     CS:[OLDSP],SP
1C54  2E: 8E 16 1291 R                MOV     SS,CS:MYDSEG
1C59  BC 3C80 R                       MOV     SP,OFFSET LOCSTK
1C5C  FB                              STI
1C5D  1E                              PUSH    DS                          ;SAVE CALLER'S DATA SEG
1C5E  2E: 8E 1E 1291 R                MOV     DS,CS:MYDSEG                ;POINT TO MYDSEG
1C63  B8 00E5                         MOV     AX,SIZE TSR                 ;SIZE OF A TSR STRUCTURE
1C66  F6 E2                           MUL     DL                          ;MULTIPLY BY NUMBER OF TSR
1C68  05 2222 R                       ADD     AX,OFFSET _DBLK             ;ADD IN OFFSET OF FIRST
1C6B  3D 387F R                       CMP     AX,OFFSET _DBLKEN           ;TOO BIG?
1C6E  76 04                           JBE     @F
1C70  1F              GF11EJ:         POP     DS
1C71  E9 1DEF R                       JMP     GF11ERR
1C74  8B D8           @@:             MOV     BX,AX                       ;MOVE TSR POINTER TO BX
1C76  80 3F 00                        CMP     BYTE PTR DS:[BX],0          ;ANYTHING THERE?
1C79  74 F5                           JE      GF11EJ                      ;
1C7B  80 7F 48 01                     CMP     DS:[BX].ISTSR,1             ;IS IT A TSR
1C7F  75 EF                           JNE     GF11EJ                      ;
1C81  80 7F 15 00                     CMP     DS:[BX].INMEM,0             ;IS IT ALREADY LOADED
1C85  75 E9                           JNE     GF11EJ
1C87  8B 3E 0000 E                    MOV     DI,_APPIN                   ;GET CURRENT APPLICATION NUMBER
1C8B  33 C0                           XOR     AX,AX                       ;ASSUME ZERO
1C8D  0B FF                           OR      DI,DI                       ;ANY LOADED APP
1C8F  74 17                           JE      @F                          ;SKIP IF NOT
1C91  81 BD 00E3 5248                 CMP     WORD PTR DS:[DI].INIDIC,5248H
1C97  74 0F                           JE      @F
1C99  56                              PUSH    SI
1C9A  8B B5 00E3                      MOV     SI,WORD PTR DS:[DI].INIDIC  ;SEE IF A TSR ALREADY IN PART.
1C9E  80 7C 15 00                     CMP     BYTE PTR [SI].INMEM,0
1CA2  5E                              POP     SI
1CA3  75 CB                           JNE     GF11EJ
1CA5  8A 45 2C                        MOV     AL,[DI].APPSEQ              ;GET SEQUENCE NUMBER OF LOADED
1CA8  0B FF           @@:             OR      DI,DI                       ;IF NO APPIN
1CAA  75 15                           JNE     @F
1CAC  2E: 83 3E 1C3D R 00             CMP     CS:_LTSR,0                  ;IF NO LOADED TSR
1CB2  74 00                           JE      @F
1CB4  56                              PUSH    SI
1CB5  2E: 8B 36 1C3D R                MOV     SI,CS:_LTSR                 ;CHECK IF STILL IN MEM
1CBA  80 7C 15 00                     CMP     BYTE PTR [SI].INMEM,0
1CBE  5E                              POP     SI
1CBF  75 AF                           JNE     GF11EJ

1CC1  FE C0           @@:             INC     AL                          ;SET RELATIVE TO ONE
1CC3  88 47 15                        MOV     [BX].INMEM,AL               ;AND MARK INMEM FLAG
1CC6  07                              POP     ES                          ;NOW GET CALLER'S DATA SEG
1CC7  8B FE                           MOV     DI,SI                       ;POINT AT COMMAND STRING
1CC9  56                              PUSH    SI                          ;SAVE POINTER FOR LATER
1CCA  33 C0                           XOR     AX,AX                       ;FIND THE ZERO BYTE
1CCC  B9 0050                         MOV     CX,80                       ;NOW TAKE 80 BYTES AT MOST
1CCF  FC                              CLD                                 ; AND SCAN FOR NULL
1CD0  F2/ AE                          REPNE   SCASB
1CD2  06                              PUSH    ES                          ;MOVE CALLER'S DATA SEG TO DS
1CD3  1F                              POP     DS
1CD4  0E                              PUSH    CS
1CD5  07                              POP     ES                          ;AND POINT ES TO ME
1CD6  BF 1BED R                       MOV     DI,OFFSET CCOMLIN           ;POINT AT SPACE FOR COMMAND
1CD9  F7 D9                           NEG     CX                          ;NOW ADJUST COUNT TO NEG
1CDB  83 C1 4F                        ADD     CX,79                       ;ADJUST POSITIVE
1CDE  8B C1                           MOV     AX,CX                       ;LOAD INTO AX
1CE0  05 0003                         ADD     AX,3                        ;ACCOUNT FOR /C AND <CR>
1CE3  5E                              POP     SI                          ;RESTORE POINTER TO COMMAND
1CE4  AA                              STOSB                               ;STORE NUMBER OF BYTES
1CE5  B8 432F                         MOV     AX,'C/'                     ;AND A /C
```

```
1CE9  F3/ A4                REP MOVSB                                ;MOVE IN USER'S COMMAND LINE
1CEB  B0 00                 MOV     AL,0DH                           ;AND END IT ALL WITH A <CR>
1CED  AA                    STOSB
1CEE  53                    PUSH    BX                               ;SAVE TSR OFFSET
1CEF  B4 51                 MOV     AH,51H                           ;GET CURRENT PSP
1CF1  CD 21                 INT     21H
1CF3  58                    POP     AX                               ;TSR OFFSET IN AX
1CF4  53                    PUSH    BX                               ;SAVE PSP FOR LATER
1CF5  8B D8                 MOV     BX,AX                            ;GET BACK OFFSET
1CF7  2E: A1 1291 R         MOV     AX,CS:MYDSEG                     ;SET DATA SEGS
1CFB  8E D8                 MOV     DS,AX
1CFD  8E C0                 MOV     ES,AX
1CFF  E8 086D R             CALL    SWAPIN                           ;SWAP IN THE TSR
1D02  58                    POP     AX                               ;GET BACK PSP
1D03  73 03                 JNC     @F
1D05  E9 1DD8 R             JMP     GF11SE                           ;IF ERROR SKIP OUT
1D08  FA              @@:   CLI
1D09  8E 57 41              MOV     SS,WORD PTR DS:[BX].LOCALS+2     ;SET UP A STACK FRAME FROM TSR
1D0C  8B 67 3F              MOV     SP,WORD PTR DS:[BX].LOCALS
1D0F  2E: FF 36 24A9 R      PUSH    CS:[OLDSS]                       ;SAVE OLD STACK FRAME
1D14  2E: FF 36 24A7 R      PUSH    CS:[OLDSP]
1D19  50                    PUSH    AX                               ;AND CALLER'S PSP
1D1A  8B 2E 0000 E          MOV     BP,_APPIN
1D1E  0B ED                 OR      BP,BP
1D20  75 07                 JNE     @F
1D22  2E: 89 1E 1C3D R      MOV     CS:_LTSR,BX
1D27  EB 05                 JMP     SHORT GF11B
1D29  3E: 89 9E 00E3        @@:   MOV     WORD PTR DS:[BP].INIDIC,BX
1D2E  2E: FF 0E 009A R      GF11B:  DEC     CS:SWITCHEM              ;ALLOW LOCAL STACK FRAME
1D33  FB                    STI
1D34  80 7F 62 04           CMP     DS:[BX].XRUN,4                   ;XRUNNING?
1D38  75 03                 JNE     @F
1D3A  EB 2C 90              JMP     GF11A
1D3D  2E: 8E 1E 1291 R      @@:   MOV     DS,CS:MYDSEG
1D42  8B 16 000C R          MOV     DX,_MAXPARA
1D46  8C D0                 MOV     AX,SS                            ;GET TSR STACK SEG
1D48  2D 0011               SUB     AX,11H                           ;ADJUST FOR PSP
1D4B  8E D8                 MOV     DS,AX                            ;POINT TO MEM CTL BLK FOR LAST
1D4D  03 06 0003            ADD     AX,WORD PTR DS:[3]               ;GET SIZE OF SEG
1D51  40                    INC     AX
1D52  8E D8                 MOV     DS,AX
1D54  C6 06 0000 5A         MOV     BYTE PTR DS:[0],5AH              ;SET THIS AS LAST ALLOCATION
1D59  C7 06 0001 0000       MOV     WORD PTR DS:[1],0                ;AND NOT ALLOCATED
1D5F  8C D8                 MOV     AX,DS
1D61  2B D0                 SUB     DX,AX
1D63  4A                    DEC     DX
1D64  89 16 0003            MOV     WORD PTR DS:[3],DX               ;SET AS REST OF MEMORY
1D68  B8 2522               GF11A:  MOV     AX,2522H                 ;SET UP RETURN ADDRESS
1D6B  BA 1D7F R             MOV     DX,OFFSET GF11EX
1D6E  0E                    PUSH    CS
1D6F  1F                    POP     DS
1D70  CD 21                 INT     21H                              ;
1D72  E8 0000 E             CALL    GETCSPEC                         ;FIND COMSPEC=
1D75  0E                    PUSH    CS                               ;SET ES=CS
1D76  07                    POP     ES
1D77  BB 1BDF R             MOV     BX,OFFSET CPARBLK                ;POINT BX AT PARAM BLOCK
1D7A  B8 4B00               MOV     AX,4B00H                         ;AND GO FOR IT
1D7D  CD 21                 INT     21H

1D7F  FA              GF11EX: CLI                                    ;GET HERE WHEN PROGRAM EXITS
1D80  2E: FF 06 009A R      INC     CS:SWITCHEM                      ;NO STACK SWITCHING
1D85  2E: 8E 1E 1291 R      MOV     DS,CS:MYDSEG
```

```
1D8A  8B 1E 0000 E            MOV    BX,_APPIN              ;GET CURRENT APP
1D8E  0B DB                   OR     BX,BX
1D90  75 07                   JNE    @F
1D92  2E: 8B 1E 1C3D R        MOV    BX,CS:_LTSR
1D97  EB 04                   JMP    SHORT GF11EY
1D99  8B 9F 00E3         @@:  MOV    BX,WORD PTR [BX].INIDIC ;GET OFFSET OF MYTSR
1D9D  8B 47 3F        GF11EY: MOV    AX,WORD PTR DS:[BX].LOCALS
1DA0  2D 0006                 SUB    AX,6
1DA3  8E 57 41                MOV    SS,WORD PTR DS:[BX].LOCALS+2 ;SET UP A STACK FRAME FROM TSR
1DA6  8B E0                   MOV    SP,AX
1DA8  58                      POP    AX                     ;GET BACK PSP
1DA9  2E: 8F 06 24A7 R        POP    CS:[OLDSP]             ;OLD STACK FRAME POINTER
1DAE  2E: 8F 06 24A9 R        POP    CS:[OLDSS]
1DB3  2E: 8E 16 1291 R        MOV    SS,CS:MYDSEG           ;SET UP A LOCAL STACK
1DB8  BC 3C80 R               MOV    SP,OFFSET DGROUP:LOCSTK
1DBB  FB                      STI
1DBC  2E: 8E 1E 1291 R        MOV    DS,CS:MYDSEG
1DC1  50                      PUSH   AX                     ;SAVE PSP
1DC2  53                      PUSH   BX
1DC3  8B 1E 0008 R            MOV    BX,_PSP
1DC7  B4 50                   MOV    AH,50H
1DC9  CD 21                   INT    21H
1DCB  5B                      POP    BX
1DCC  E8 0EDD R               CALL   SWAPOUT                ;UNLOAD THE TSR
1DCF  C6 47 15 00             MOV    [BX].INMEM,0           ;NOT IN MEMORY
1DD3  5B                      POP    BX                     ;GET BACK PSP
1DD4  B4 50                   MOV    AH,50H                 ;AND SET CALLER'S PSP BACK
1DD6  CD 21                   INT    21H
1DD8  FA              GF11SE: CLI
1DD9  2E: FF 0E 009A R        DEC    CS:SWITCHEM
1DDE  2E: 8E 16 24A9 R        MOV    SS,CS:[OLDSS]          ;RESTORE STACK FRAME
1DE3  2E: 8B 26 24A7 R        MOV    SP,CS:[OLDSP]
1DE8  FB                      STI
1DE9  07                      POP    ES
1DEA  1F                      POP    DS
1DEB  F8                      CLC
1DEC  CA 0002                 RETF   2
1DEF  FA             GF11ERR: CLI
1DF0  2E: FF 0E 009A R        DEC    CS:SWITCHEM
1DF5  7D 0A                   JGE    @F
1DF7  2E: 8E 16 24A9 R        MOV    SS,CS:OLDSS
1DFC  2E: 8B 26 24A7 R        MOV    SP,CS:OLDSP
1E01  07                 @@:  POP    ES                     ;ERROR RETURN
1E02  1F                      POP    DS
1E03  F9                      STC
1E04  CA 0002                 RETF   2
1E07  B8 00E5         GFUN12: MOV    AX,SIZE TSR
1E0A  F7 E2                   MUL    DX
1E0C  05 2222 R               ADD    AX,OFFSET _DBLK
1E0F  8B D8                   MOV    BX,AX
1E11  2E: 8E 1E 1291 R        MOV    DS,CS:MYDSEG
1E16  C6 47 15 FF             MOV    [BX].INMEM,OFFH
1E1A  FA                      CLI
1E1B  2E: FF 06 009A R        INC    CS:SWITCHEM
1E20  7E 03                   JLE    @F
1E22  EB 22 90                JMP    GF12ERR
1E25  2E: 8C 16 24A9 R   @@:  MOV    CS:[OLDSS],SS          ;SET UP LOCAL STACK FRAME
1E2A  2E: 89 26 24A7 R        MOV    CS:[OLDSP],SP
1E2F  2E: 8E 16 1291 R        MOV    SS,CS:MYDSEG
1E34  BC 3C80 R               MOV    SP,OFFSET LOCSTK
1E37  FB                      STI
1E38  E8 0860 R               CALL   SWAPIN
1E3B  FA                      CLI
```

```
1E3C  2E: 8E 16 24A9 R              MOV    SS,CS:[OLDSS]        ;RESTORE STACK FRAME
1E41  2E: 8B 26 24A7 R              MOV    SP,CS:[OLDSP]
1E46  2E: FF 0E 009A R  GF12ERR:DEC CS:SWITCHEM
1E4B  FB                            STI
1E4C  07                            POP    ES
1E4D  1F                            POP    DS
1E4E  F8                            CLC
1E4F  CA 0002                       RETF   2

1E52  B8 00E5         GFUN13: MOV   AX,SIZE TSR
1E55  F7 E2                   MUL   DX
1E57  05 2222 R               ADD   AX,OFFSET _DBLK
1E5A  8B D8                   MOV   BX,AX
1E5C  2E: 8E 1E 1291 R        MOV   DS,CS:MYDSEG
1E61  FA                      CLI
1E62  2E: FF 06 009A R        INC   CS:SWITCHEM
1E67  7E 03                   JLE   0F
1E69  EB 22 90                JMP   GF13ERR
1E6C  2E: 8C 16 24A9 R  00:   MOV   CS:[OLDSS],SS        ;SET UP LOCAL STACK FRAME
1E71  2E: 89 26 24A7 R        MOV   CS:[OLDSP],SP
1E76  2E: 8E 16 1291 R        MOV   SS,CS:MYDSEG
1E7B  BC 3C80 R               MOV   SP,OFFSET LOCSTK
1E7E  FB                      STI
1E7F  E8 0EDD R               CALL  SWAPOUT
1E82  FA                      CLI
1E83  2E: 8E 16 24A9 R        MOV   SS,CS:[OLDSS]        ;RESTORE STACK FRAME
1E88  2E: 8B 26 24A7 R        MOV   SP,CS:[OLDSP]
1E8D  2E: FF 0E 009A R  GF13ERR:DEC CS:SWITCHEM
1E92  FB                      STI
1E93  C6 47 15 00             MOV   [BX].INMEM,0H
1E97  07                      POP   ES
1E98  1F                      POP   DS
1E99  F8                      CLC
1E9A  CA 0002                 RETF  2
1E9D  E8 357B R       GFUN14: CALL  _DSKBUSY
1EA0  E9 1B28 R               JMP   GFNEND

1EA3  2E: 8E 1E 1291 R GFUN15: MOV  DS,CS:MYDSEG
1EA8  C7 06 002C R 0001       MOV   _KSWAP,1
1EAE  E9 1B28 R               JMP   GFNEND

1EB1  2E: 8E 1E 1291 R GFUN16: MOV  DS,CS:MYDSEG
1EB6  C7 06 002C R 0000       MOV   _KSWAP,0
1EBC  E9 1B28 R               JMP   GFNEND

1EBF  2E: 8E 06 1291 R GFUN17: MOV  ES,CS:MYDSEG
1EC4  51                      PUSH  CX
1EC5  52                      PUSH  DX
1EC6  57                      PUSH  DI
1EC7  BB 2222 R               MOV   BX,OFFSET _DBLK
1ECA  26: 80 3F 00    GF17A:  CMP   BYTE PTR ES:[BX],0
1ECE  74 1F                   JE    GF17N
1ED0  8B FB                   MOV   DI,BX
1ED2  B9 0014                 MOV   CX,20
1ED5  56                      PUSH  SI
1ED6  FC                      CLD
1ED7  F3/ A6                  REPE CMPSB
1ED9  74 1A                   JE    GF17E
1EDB  4E                      DEC   SI
1EDC  4F                      DEC   DI
1EDD  26: 80 3D 00            CMP   BYTE PTR ES:[DI],0
```

```
1EE1  74 12                       JE       GF17E
1EE3  80 3C 00                    CMP      BYTE PTR DS:[SI],0
1EE6  74 00                       JE       GF17E
1EE8  5E                          POP      SI
1EE9  81 C3 00E5                  ADD      BX,SIZE TSR
1EED  EB DB                       JMP      GF17A
1EEF  B8 FFFF         GF17N:      MOV      AX,0FFFFH
1EF2  EB 0E 90                    JMP      GF17EN
1EF5  8B C3           GF17E:      MOV      AX,BX
1EF7  2D 2222 R                   SUB      AX,OFFSET _DBLK
1EFA  B9 00E5                     MOV      CX,SIZE TSR
1EFD  33 D2                       XOR      DX,DX
1EFF  F7 F1                       DIV      CX
1F01  5E                          POP      SI
1F02  5F              GF17EN:     POP      DI
1F03  5A                          POP      DX
1F04  59                          POP      CX
1F05  E9 1B28 R                   JMP      GFNEND

1F08  B8 00E5         GFUN18:     MOV      AX,SIZE TSR
1F0B  F7 E2                       MUL      DX
1F0D  05 2222 R                   ADD      AX,OFFSET _DBLK
1F10  8B D8                       MOV      BX,AX
1F12  2E: 8E 1E 1291 R            MOV      DS,CS:MYDSEG
1F17  8C C8                       MOV      AX,CS
1F19  BA 2198 R                   MOV      DX,OFFSET PGROUP:UNGETC
1F1C  B9 1530 R                   MOV      CX,OFFSET PGROUP:KBHIT
1F1F  BE 00A2 R                   MOV      SI,OFFSET PGROUP:TIDLE
1F22  BF 1821 R                   MOV      DI,OFFSET PGROUP:DOSFLG
1F25  BD 1888 R                   MOV      BP,OFFSET PGROUP:MSFUN
1F28  E8 1162 R                   CALL     KBINTON
1F2B  FF 5F 3B                    CALL     DWORD PTR DS:[BX].XFERADD
1F2E  E9 1B28 R                   JMP      GFNEND

ASSUME   DS:DGROUP
                                  ASSUME   ES:NOTHING

;
1F31  0B D2           GENIE:      OR       DX,DX                   ;ONLY CONCERENED WITH LOG
1F33  75 03                       JNE      GENIE1
1F35  E9 1926 R       GENIE2:     JMP      MSFUN3
1F38  2E: 83 3E 00AA R 00  GENIE1: CMP     CS:GENIN,0
1F3E  74 F5                       JE       GENIE2
1F40  9D                          POPF
1F41  5D                          POP      BP
1F42  53                          PUSH     BX
1F43  50                          PUSH     AX
1F44  1E                          PUSH     DS
1F45  E8 170A R                   CALL     GGROUP
1F48  8B 1E 207C R                MOV      BX,GENFUN
1F4C  FF 06 207C R                INC      GENFUN
1F50  2E: FF 06 00A8 R            INC      CS:GENFLG
1F55  D1 E3                       SHL      BX,1
1F57  8B C3                       MOV      AX,BX
1F59  D1 E3                       SHL      BX,1
1F5B  03 D8                       ADD      BX,AX
1F5D  89 97 1F50 R                MOV      [BX+GFTBL],DX
1F61  89 BF 1F52 R                MOV      [BX+GFTBL+2],DI
1F65  BA 1FB7 R                   MOV      DX,OFFSET GENDISP
1F68  03 D3                       ADD      DX,BX
1F6A  BF 1F3A R                   MOV      DI,OFFSET DGROUP:GENNAME
1F6D  2E: 8E 06 1291 R            MOV      ES,CS:MYDSEG
1F72  B9 0013                     MOV      CX,19
```

```
1F75  1F                         POP     DS
1F76  56                         PUSH    SI
1F77  AC              GENIE3:    LODSB
1F78  0A C0                      OR      AL,AL
1F7A  74 03                      JE      GENIE4
1F7C  AA                         STOSB
1F7D  E2 F8                      LOOP    GENIE3
1F7F  32 C0           GENIE4:    XOR     AL,AL
1F81  E3 02                      JCXZ    @F
1F83  F3/ AA                     REP STOSB
1F85  5E              @@:        POP     SI
1F86  8C CF                      MOV     DI,CS
1F88  BD 1FB6 R                  MOV     BP,OFFSET GENROLL
1F8B  58                         POP     AX
1F8C  5B                         POP     BX
1F8D  9C                         PUSHF
1F8E  FA                         CLI
1F8F  2E: FF 1E 0072 R           CALL    DWORD PTR CS:[OLDMF]
1F94  CA 0002                    RETF    2
1F97                  MSFUN      ENDP
                      ;
                                 PUBLIC  GENDISP,GENROLL,GENIE,GFUN3,_CLRGEN
                      ;
1F97                  _CLRGEN    PROC    NEAR    ;CLEAR/UNLOAD A GENIE TSR
1F97  55                         PUSH    BP
1F98  8B EC                      MOV     BP,SP
1F9A  57                         PUSH    DI
1F9B  BF 1F54 R                  MOV     DI,OFFSET GFTBL+4
1F9E  8B 5E 04                   MOV     BX,[BP+04]
1FA1  B9 0018                    MOV     CX,24
1FA4  39 1D           @@:        CMP     WORD PTR DS:[DI],BX
1FA6  74 07                      JE      @F
1FA8  83 C7 06                   ADD     DI,6
1FAB  E2 F7                      LOOP    @B
1FAD  EB 04                      JMP     SHORT CLRGDN
1FAF  C7 05 0000      @@:        MOV     WORD PTR DS:[DI],0
1FB3  5F              CLRGDN:    POP     DI
1FB4  5D                         POP     BP
1FB5  C3                         RET
1FB6                  _CLRGEN    ENDP
                      ;
1FB6                  GENROLL    PROC    FAR
1FB6  CB                         RET                     ;PRETEND TO DO A GENIE ROLLOUT
1FB7                  GENROLL    ENDP
                      ;
1FB7                  GENDISP    PROC    FAR
1FB7  B8 0000                    MOV     AX,0
1FBA  E9 204D R                  JMP     GENDISJ
1FBD  B8 0006                    MOV     AX,1*6
1FC0  E9 204D R                  JMP     GENDISJ
1FC3  B8 000C                    MOV     AX,2*6
1FC6  E9 204D R                  JMP     GENDISJ
1FC9  B8 0012                    MOV     AX,3*6
1FCC  EB 7F 90                   JMP     GENDISJ
1FCF  B8 0018                    MOV     AX,4*6
1FD2  EB 79 90                   JMP     GENDISJ
1FD5  B8 001E                    MOV     AX,5*6
1FD8  EB 73 90                   JMP     GENDISJ
1FDB  B8 0024                    MOV     AX,6*6
1FDE  EB 6D 90                   JMP     GENDISJ
1FE1  B8 002A                    MOV     AX,7*6
1FE4  EB 67 90                   JMP     GENDISJ
1FE7  B8 0030                    MOV     AX,8*6
```

```
1FEA  EB 61 90              JMP     GENDISJ
1FED  B8 0036               MOV     AX,9*6
1FF0  EB 5B 90              JMP     GENDISJ
1FF3  B8 003C               MOV     AX,10*6
1FF6  EB 55 90              JMP     GENDISJ
1FF9  B8 0042               MOV     AX,11*6
1FFC  EB 4F 90              JMP     GENDISJ
1FFF  B8 0048               MOV     AX,12*6
2002  EB 49 90              JMP     GENDISJ
2005  B8 004E               MOV     AX,13*6
2008  EB 43 90              JMP     GENDISJ
200B  B8 0054               MOV     AX,14*6
200E  EB 3D 90              JMP     GENDISJ
2011  B8 005A               MOV     AX,15*6
2014  EB 37 90              JMP     GENDISJ
2017  B8 0060               MOV     AX,16*6
201A  EB 31 90              JMP     GENDISJ
201D  B8 0066               MOV     AX,17*6
2020  EB 2B 90              JMP     GENDISJ
2023  B8 006C               MOV     AX,18*6
2026  EB 25 90              JMP     GENDISJ
2029  B8 0072               MOV     AX,19*6
202C  EB 1F 90              JMP     GENDISJ
202F  B8 0078               MOV     AX,20*6
2032  EB 19 90              JMP     GENDISJ
2035  B8 007E               MOV     AX,21*6
2038  EB 13 90              JMP     GENDISJ
203B  B8 0084               MOV     AX,22*6
203E  EB 0D 90              JMP     GENDISJ
2041  B8 008A               MOV     AX,23*6
2044  EB 07 90              JMP     GENDISJ
2047  B8 0090               MOV     AX,24*6
204A  EB 01 90              JMP     GENDISJ
                            ;
204D                GENDISJ:
204D  E8 02E2 R             CALL    PUSHR
2050  E8 17DA R             CALL    GGROUP
2053  8B F0                 MOV     SI,AX
2055  8B 9C 1F54 R          MOV     BX,[GFTBL+4+SI]
2059  0B DB                 OR      BX,BX
205B  74 13                 JE      GDSP1
205D  FA                    CLI
205E  80 7F 15 00           CMP     DS:[BX].INMEM,0
2062  75 0C                 JNE     GDSP1
2064  2E: FF 06 009A R      INC     CS:SWITCHEM
2069  74 0C                 JE      GDSP0
206B  2E: FF 0E 009A R      DEC     CS:SWITCHEM
2070  E8 02F4 R     GDSP1:  CALL    POPR
2073  E8 3531 R             CALL    _BEEP
2076  CB                    RET
2077  2E: FF 36 1821 R  GDSP0: PUSH CS:[DOSFLG]
207C  2E: C7 06 1821 R 0000  MOV   CS:DOSFLG,0
2083  2E: 8C 16 24A9 R       MOV   CS:OLDSS,SS
2088  2E: 89 26 24A7 R       MOV   CS:OLDSP,SP
208D  2E: 8E 16 1291 R       MOV   SS,CS:MYDSEG
2092  BC 3C80 R             MOV     SP,OFFSET DGROUP:LOCSTK
2095  C6 47 15 FF           MOV     DS:[BX].INMEM,0FFH
2099  FB                    STI
209A  E8 0B6D R             CALL    SWAPIN
209D  73 03                 JNC     @F
209F  E9 2125 R             JMP     GDISPE
20A2  FA            @@:     CLI
20A3  8E 57 41              MOV     SS,WORD PTR DS:[BX].LOCALS+2
```

```
20A6  8B 67 3F                        MOV      SP,WORD PTR DS:[BX].LOCALS
20A9  2E: FF 36 24A9 R                PUSH     CS:[OLDSS]
20AE  2E: FF 36 24A7 R                PUSH     CS:[OLDSP]
20B3  2E: FF 0E 009A R                DEC      CS:SWITCHEM
20B8  FB                              STI
20B9  FF 9C 1F50 R                    CALL     DWORD PTR DS:[SI+GFTBL]
20BD  2E: FF 36 1530 R                PUSH     WORD PTR CS:[KBHIT]
20C2  2E: C6 06 1530 R 01             MOV      CS:KBHIT,1              ;SET TO NOT READ FROM BUFFER
20C8  32 E4               GDSP3B:     XOR      AH,AH                   ;GET TICK COUNT
20CA  CD 1A                           INT      1AH
20CC  83 C2 09                        ADD      DX,9                    ;BUMP BY 9
20CF  83 D1 00                        ADC      CX,0
20D2  8B F1                           MOV      SI,CX                   ;SAVE IN SI:DI
20D4  8B FA                           MOV      DI,DX
20D6  2E: 83 26 00A2 R F7             AND      CS:TIDLE,NOT IO9FLG     ;CLEAR OUT KB BIT
20DC  B4 01               GDSP3A:     MOV      AH,1
20DE  CD 16                           INT      16H                     ;CHECK KB BUFF
20E0  75 17                           JNZ      @F                      ;GOT ONE!
20E2  32 E4                           XOR      AH,AH
20E4  CD 1A                           INT      1AH                     ;GET TICK COUNT
20E6  3B F1                           CMP      SI,CX                   ;TIME OUT?
20E8  72 1A                           JB       GDSP2                   ;YUP
20EA  3B FA                           CMP      DI,DX
20EC  76 16                           JBE      GDSP2                   ;LOW ORDER TIME OUT
                                                                       ;YUP
20EE  2E: F7 06 00A2 R 0008           TEST     CS:TIDLE,IO9FLG         ;KEY STRUCK?
20F5  75 00                           JNE      GDSP2
20F7  EB E3                           JMP      GDSP3A                  ;NO TIME OUT, LOOP BACK
20F9  B4 00               @@:         MOV      AH,0
20FB  CD 16                           INT      16H
20FD  9A 2198 ---- R                  CALL     FAR PTR UNGETC
2102  EB C4                           JMP      GDSP3B
2104  2E: 8F 06 1530 R    GDSP2:      POP      WORD PTR CS:KBHIT
2109  FA                              CLI
210A  2E: FF 06 009A R                INC      CS:SWITCHEM
210F  2E: 8F 06 24A7 R                POP      CS:[OLDSP]
2114  2E: 8F 06 24A9 R                POP      CS:[OLDSS]
2119  2E: 8E 16 1291 R                MOV      SS,CS:MYDSEG
211E  BC 3C80 R                       MOV      SP,OFFSET DGROUP:LOCSTK
2121  FB                              STI
2122  E8 0EDD R                       CALL     SWAPOUT
2125  FA                  GDISPE:     CLI
2126  2E: FF 0E 009A R                DEC      CS:SWITCHEM
212B  2E: 8E 16 24A9 R                MOV      SS,CS:OLDSS
2130  2E: 8B 26 24A7 R                MOV      SP,CS:OLDSP
2135  2E: 8F 06 1821 R                POP      CS:[DOSFLG]
213A  C6 47 15 00                     MOV      DS:[BX].INMEM,0
213E  FB                              STI
213F  E8 02F4 R                       CALL     POPR
2142  CB                              RET
2143                     GENDISP ENDP
                              ;
                                     PUBLIC   RSETEM
                              ;
2143                     RSETEM  PROC NEAR
2143  E8 02E2 R                       CALL     PUSHR
2146  BE 00BE R                       MOV      SI,OFFSET INTTBL
2149  E8 0000 E                       CALL     SETCONS
214C  E8 2153 R                       CALL     RSETM1
214F  E8 02F4 R                       CALL     POPR
2152  C3                              RET
2153  2E: AC              RSETM1: LODS BYTE PTR CS:[SI]
2155  3C FF                           CMP      AL,0FFH
2157  74 14                           JE       RSETM2
```

```
2159  2E: 8B 1C                        MOV      BX,CS:[SI]
215C  2E: C5 17                        LDS      DX,DWORD PTR CS:[BX]
215F  B4 25                            MOV      AH,25H
2161  9C                               PUSHF
2162  FA                               CLI
2163  2E: FF 1E 0072 R                 CALL     DWORD PTR CS:[OLDMF]
2168  83 C6 04              RSETM4:    ADD      SI,4
216B  EB E6                            JMP      RSETM1
216D  33 C0                 RSETM2:    XOR      AX,AX
216F  8E C0                            MOV      ES,AX
2171  2E: C5 16 007A R                 LDS      DX,DWORD PTR CS:[OLDCPM]
2176  26: 89 16 00C1                   MOV      WORD PTR ES:[0C1H],DX
217B  26: 8C 1E 00C3                   MOV      WORD PTR ES:[0C3H],DS
2180  2E: 83 3E 1844 R 00              CMP      CS:ISEGA,0
2186  74 0F                            JE       RSETM3
2188  2E: C5 16 007E R                 LDS      DX,DWORD PTR CS:[OLDCSAV]
218D  26: 89 16 04A8                   MOV      WORD PTR ES:[4A8H],DX
2192  26: 8C 1E 04AA                   MOV      WORD PTR ES:[4AAH],DS
2197  C3                    RSETM3:    RET
2198                        RSETEM     ENDP
                            ;
                                       PUBLIC   UNGETC
                            ;
2198                        UNGETC     PROC     FAR
2198  E8 02E2 R                        CALL     PUSHR
219B  E8 17DA R                        CALL     GGROUP
219E  1E                               PUSH     DS
219F  07                               POP      ES
21A0  FC                               CLD
21A1  FA                               CLI
21A2  2E: 83 3E 13A4 R 00              CMP      CS:UNLDKBF,0
21A8  74 1B                            JE       UNGET2
21AA  8B 3E 19FE R                     MOV      DI,KBIHEAD
21AE  AB                               STOSW
21AF  81 FF 1A16 R                     CMP      DI,OFFSET KBIEND
21B3  72 03                            JB       @F
21B5  BF 1A02 R                        MOV      DI,OFFSET KBIUFF
21B8  3B 3E 1A00 R          @@:        CMP      DI,KBITAIL
21BC  74 24                            JE       UNGET3
21BE  89 3E 19FE R                     MOV      KBIHEAD,DI
21C2  F8                               CLC
21C3  EB 19                            JMP      SHORT UNGET0
21C5  8B 3E 1076 R          UNGET2:    MOV      DI,MYBHEAD
21C9  AB                               STOSW
21CA  81 FF 187A R                     CMP      DI,OFFSET MYBEND
21CE  72 03                            JB       UNGET1
21D0  BF 107A R                        MOV      DI,OFFSET MYBUFF
21D3  3B 3E 1078 R          UNGET1:    CMP      DI,MYBTAIL
21D7  74 09                            JE       UNGET3
21D9  89 3E 1076 R                     MOV      MYBHEAD,DI
21DD  F8                               CLC
21DE  E8 02F4 R             UNGET0:    CALL     POPR
21E1  CB                               RET
21E2  F9                    UNGET3:    STC
21E3  EB F9                            JMP      SHORT UNGET0
21E5                        UNGETC     ENDP
                            ;
                                       PUBLIC   IBM16
                            ;
21E5                        IBM16      PROC     FAR
21E5  2E: 83 3E 13A4 R 00              CMP      CS:UNLDKBF,0
21EB  74 03                            JE       @F
21ED  E9 22C1 R                        JMP      I16B
```

```
21F0  1E                        aa:      PUSH    DS
21F1  50                                 PUSH    AX
21F2  E8 17DA R                          CALL    GGROUP
21F5  A1 19FE R                          MOV     AX,KBIHEAD
21F8  3B 06 1A00 R                       CMP     AX,KBITAIL
21FC  58                                 POP     AX
21FD  1F                                 POP     DS
21FE  75 13                              JNE     aF
2200  2E: 80 3E 13A6 R 00                CMP     CS:LCFLG,0
2206  74 3F                              JE      I16NORM
2208  F6 C4 EF                           TEST    AH,0EFH
220B  74 3A                              JE      I16NORM
220D  2E: A1 13A2 R                      MOV     AX,CS:LCHAR
2211  EB 2B                              JMP     SHORT I16NZ
2213  F6 C4 EE          aa:      TEST    AH,0EEH
2216  75 2F                              JNE     I16NORM
2218  1E                                 PUSH    DS
2219  56                                 PUSH    SI
221A  53                                 PUSH    BX
221B  8B D8                              MOV     BX,AX
221D  E8 17DA R                          CALL    GGROUP
2220  FA                                 CLI
2221  FC                                 CLD
2222  8B 36 1A00 R                       MOV     SI,KBITAIL
2226  AD                                 LODSW
2227  81 FE 1A16 R                       CMP     SI,OFFSET KBIEND
222B  72 03                              JB      aF
222D  BE 1A02 R                          MOV     SI,OFFSET DGROUP:KBIUFF
2230  F6 C7 EF          aa:      TEST    BH,0EFH
2233  75 06                              JNE     aF
2235  89 36 1A00 R                       MOV     KBITAIL,SI
2239  0B F6                              OR      SI,SI
223B  5B                aa:      POP     BX
223C  5E                         POP     SI
223D  1F                         POP     DS
223E  55                I16NZ:   PUSH    BP
223F  8B EC                      MOV     BP,SP
2241  83 66 06 BF                AND     WORD PTR SS:[BP+06],NOT 40H
2245  5D                         POP     BP
2246  CF                         IRET
2247  2E: FF 36 139A R  I16NORM:PUSH     CS:[SSBP]
224C  2E: FF 36 139E R           PUSH    CS:[SSSI]
2251  2E: FF 36 139C R           PUSH    CS:[SSDI]
2256  2E: FF 36 1396 R           PUSH    CS:[SSFL]
225B  2E: 89 2E 139A R           MOV     WORD PTR CS:[SSBP],BP
2260  2E: 89 36 139E R           MOV     WORD PTR CS:[SSSI],SI
2265  2E: 89 3E 139C R           MOV     WORD PTR CS:[SSDI],DI
226A  BD 000A                    MOV     BP,SWAP16A
226D  BE 0016                    MOV     SI,16H
2270  F6 C4 EF                   TEST    AH,0EFH
2273  75 0F                      JNE     aF
2275  2E: FF 36 13A4 R           PUSH    CS:UNLDKBF
227A  2E: C7 06 13A4 R 0001      MOV     CS:UNLDKBF,1
2281  BD 0009                    MOV     BP,SWAP16
2284  E8 13A7 R         aa:      CALL    SFTSWP
2287  2E: 83 3E 13A4 R 00        CMP     CS:UNLDKBF,0
228D  74 05                      JE      aF
228F  2E: 8F 06 13A4 R           POP     CS:UNLDKBF
2294  2E: 88 2E 139A R  aa:      MOV     BP,WORD PTR CS:[SSBP]
2299  2E: 8B 36 139E R           MOV     SI,WORD PTR CS:[SSSI]
229E  2E: 8B 3E 139C R           MOV     DI,WORD PTR CS:[SSDI]
22A3  2E: 8F 06 1396 R           POP     CS:[SSFL]
22A8  2E: 8F 06 139C R           POP     CS:[SSDI]
```

```
22AD  2E: 8F 06 139E R              POP     CS:[SSSI]
22B2  2E: 8F 06 139A R              POP     CS:[SSBP]
22B7  EB 08                         JMP     SHORT I16B
22B9  5D                    I16C:   POP     BP
22BA  EB 26                         JMP     SHORT I16D
22BC  2E: FF 2E 0032 R      I16C1:  JMP     DWORD PTR CS:[OLDI16]
22C1  50                    I16B:   PUSH    AX
22C2  E8 357B R                     CALL    _DSKBUSY
22C5  3D 0000                       CMP     AX,0
22C8  58                            POP     AX
22C9  75 17                         JNE     I16D
22CB  E8 23E2 R                     CALL    TRY2POP
22CE  E8 116F R                     CALL    TRY2SWP

IFNDEF TSRONLY  ;********************************
22D1  1E                            PUSH    DS
22D2  2E: 8E 1E 1291 R              MOV     DS,CS:MYDSEG
22D7  83 3E 0000 E 00               CMP     _SWAP_FLAG,0
22DC  1F                            POP     DS
22DD  74 03                         JE      I16D
22DF  E8 0000 E                     CALL    APSWAP
                            ENDIF           ;********************************

22E2  50                    I16D:   PUSH    AX
22E3  80 E4 EF                      AND     AH,0EFH
22E6  80 FC 01                      CMP     AH,1
22E9  58                            POP     AX
22EA  77 D0                         JA      I16C1
22EC  72 10                         JB      I16D3
22EE  9C                            PUSHF
22EF  FA                            CLI
22F0  2E: FF 1E 0032 R              CALL    DWORD PTR CS:[OLDI16]
22F5  74 02                         JE      @F
22F7  90                            NOP
22F8  90                            NOP
22F9  CA 0002               @@:     RETF    2
22FC  74 15                         JE      I16CJ
22FE  F6 C4 10              I16D3:  TEST    AH,10H
2301  50                            PUSH    AX
2302  B4 01                         MOV     AH,1
2304  74 02                         JE      I16D4
2306  B4 11                         MOV     AH,11H
2308  FB                    I16D4:  STI
2309  9C                            PUSHF
230A  FA                            CLI
230B  2E: FF 1E 0032 R              CALL    DWORD PTR CS:[OLDI16]
2310  58                            POP     AX
2311  74 02                         JZ      I16A3
2313  EB A7                 I16CJ:  JMP     I16C1
2315  EB AA                 I16A3:  JMP     I16B
2317                        IBM116  ENDP
                            ;
                                    PUBLIC  DUMMYR
                            ;
2317                        DUMMYR  PROC    FAR
2317  CB                            RET
2318                        DUMMYR  ENDP
                            ;
                                    PUBLIC  RESETIC
                            ;
2318                        RESETIC PROC    NEAR
2318  2E: 83 3E 00AC R 00           CMP     CS:NOKBFL,0
231E  74 01                         JE      @F
```

```
2320  C3                              RET
2321  50                       aa:    PUSH    AX

;re-initialize interrupt controller 1

2322  E4 21                           IN      AL,21H              ;GET CURRENT VALUE OF IMR
2324  8A E0                           MOV     AH,AL
2326  B0 11                           MOV     AL,11H              ;BIT4=1 -> INIT BIT0=ICW4 NEEDED
2328  2E: 83 3E 1858 R 00             CMP     CS:_ISAT,0          ;IF NOT A PCAT SKIP
232E  75 02                           JNE     aF                  ;IF PCAT BIT1=0 -> NO SLAVE
2330  B0 13                           MOV     AL,13H              ;BIT1=1 -> SLAVE PRESENT (NOT SINGLE)
2332  E6 20                    aa:    OUT     20H,AL              ;START INIT PROCESS
2334  EB 00                           JMP     $+2
2336  B0 08                           MOV     AL,08H              ;ADDRESS / 4 (IRQ0 MAPPED TO INT 8)
2338  E6 21                           OUT     21H,AL              ;THIS FOR BOTH PC AND AT
233A  EB 00                           JMP     $+2                 ;
233C  B0 09                           MOV     AL,09H              ;IF PCXT THEN NEXT IS ICW4 - NO SLAVE
233E  2E: 83 3E 1858 R 00             CMP     CS:_ISAT,0          ;BIT3=1 -> BUFFERED, BIT1=1 -> X86 MODE
2344  74 08                           JE      aF
2346  B0 04                           MOV     AL,04H              ;IF PCAT THEN ICW3 IS BIT4=CASCADE
2348  E6 21                           OUT     21H,AL              ;  SLAVE INTERRUPT THROUGH IRQ2
234A  EB 00                           JMP     $+2
234C  B0 01                           MOV     AL,01H              ;IF PCAT THEN NOT BUFFERED, X86 MODE
234E  E6 21                    aa:    OUT     21H,AL
2350  EB 00                           JMP     $+2
2352  8A C4                           MOV     AL,AH               ;ENABLE TIMER, KEYBOARD, SLAVE CASCADE,
2354  E6 21                           OUT     21H,AL              ;  DISKETTE (SERIAL PORTS OFF)
2356  2E: 83 3E 1858 R 00             CMP     CS:_ISAT,0
235C  74 20                           JE      NOSLAVE

;now initialize slave (PCAT only)

235E  E4 A1                           IN      AL,0A1H
2360  8A E0                           MOV     AH,AL
2362  B0 11                           MOV     AL,11H              ;BIT4=1 -> INIT BIT0=ICW4 NEEDED
2364  E6 A0                           OUT     0A0H,AL             ;START INIT PROCESS
2366  EB 00                           JMP     $+2
2368  B0 70                           MOV     AL,70H              ;ADDRESS / 4 (IRQ8 MAPPED TO INT 70)
236A  E6 A1                           OUT     0A1H,AL
236C  EB 00                           JMP     $+2
236E  B0 02                           MOV     AL,02H              ;IF PCAT THEN ICW3 IS BIT0-2 IS CASCADE
2370  E6 A1                           OUT     0A1H,AL             ;  SLAVE INTERRUPT GOES THROUGH IRQ2
2372  EB 00                           JMP     $+2
2374  B0 01                           MOV     AL,01H              ;IF PCAT THEN NOT BUFFERED, X86 MODE
2376  E6 A1                           OUT     0A1H,AL
2378  EB 00                           JMP     $+2
237A  8A C4                           MOV     AL,AH               ;ENABLE RTC, REDIRECT CASCADE,
237C  E6 A1                           OUT     0A1H,AL             ;  HARD DISK 237E  58                       NOSLAVE:POP    AX
237F  C3                               RET
2380                           RESETIC ENDP
                               ;
                                       PUBLIC  PUSHINT
                               ;
2380                           PUSHINT PROC   NEAR
2380  5A                               POP    DX
2381  33 C0                            XOR    AX,AX
2383  8E D8                            MOV    DS,AX
2385  FF 36 0020                       PUSH   WORD PTR DS:[8*4]
2389  FF 36 0022                       PUSH   WORD PTR DS:[8*4+2]
238D  FF 36 0024                       PUSH   WORD PTR DS:[9*4]
2391  FF 36 0026                       PUSH   WORD PTR DS:[9*4+2]
2395  FF 36 0084                       PUSH   WORD PTR DS:[21H*4]
```

```
2399  FF 36 0086                     PUSH     WORD PTR DS:[21H*4+2]
239D  FA                             CLI
239E  8C C8                          MOV      AX,CS
23A0  C7 06 0020 252B R              MOV      WORD PTR DS:[8*4],OFFSET PGROUP:TINTER
23A6  A3 0022                        MOV      WORD PTR DS:[8*4+2],AX
23A9  C7 06 0024 1533 R              MOV      WORD PTR DS:[9*4],OFFSET PGROUP:SCANNR
23AF  A3 0026                        MOV      WORD PTR DS:[9*4+2],AX
23B2  C7 06 0084 1888 R              MOV      WORD PTR DS:[21H*4],OFFSET PGROUP:MSFUN
23B8  A3 0086                        MOV      WORD PTR DS:[21H*4+2],AX
23BB  E8 2318 R                      CALL     RESETIC
23BE  FB                             STI
23BF  FF E2                          JMP      DX
23C1                       PUSHINT ENDP
                           ;
                                     PUBLIC   POPINT
                           ;
23C1                       POPINT  PROC     NEAR
23C1  5A                             POP      DX
23C2  FA                             CLI
23C3  33 C0                          XOR      AX,AX
23C5  8E D8                          MOV      DS,AX
23C7  8F 06 0086                     POP      WORD PTR DS:[21H*4+2]
23CB  8F 06 0084                     POP      WORD PTR DS:[21H*4]
23CF  8F 06 0026                     POP      WORD PTR DS:[9*4+2]
23D3  8F 06 0024                     POP      WORD PTR DS:[9*4]
23D7  8F 06 0022                     POP      WORD PTR DS:[8*4+2]
23DB  8F 06 0020                     POP      WORD PTR DS:[8*4]
23DF  FB                             STI
23E0  FF E2                          JMP      DX
23E2                       POPINT  ENDP
                           ;
                                     EXTRN    _PWSTRT:NEAR
                                     PUBLIC   TRY2POP
                           ;
23E2                       TRY2POP PROC     NEAR
23E2  50                             PUSH     AX
23E3  1E                             PUSH     DS
                                     ASSUME   DS:DGROUP
23E4  FA                             CLI
23E5  2E: 8E 1E 1291 R               MOV      DS,CS:MYDSEG
23EA  2E: 83 3E 0A61 R 00            CMP      CS:INSWAP,0
23F0  7D 07                          JGE      T2CJ
23F2  83 3E 0026 R 00                CMP      _AFTRDOS,0
23F7  75 03                          JNE      @F
23F9  E9 24A3 R            T2CJ:    JMP      TRY2C
23FC  C7 06 0026 R 0000    @@:      MOV      _AFTRDOS,0
2402  83 3E 0028 R 00               CMP      _ACTIVE,0
2407  75 F0                          JNE      T2CJ
2409  2E: FF 06 009A R               INC      CS:SWITCHEM
240E  74 03                          JE       @F
2410  E9 2492 R                      JMP      TRY2B
2413  2E: 8C 16 24A9 R     @@:      MOV      CS:OLDSS,SS
2418  2E: 89 26 24A7 R              MOV      CS:OLDSP,SP
241D  2E: 8E 16 1291 R              MOV      SS,CS:MYDSEG
2422  BC 3C80 R                     MOV      SP,OFFSET DGROUP:LOCSTK
2425  FF 06 0028 R         TRY2A:   INC      _ACTIVE
2429  E8 02E2 R                     CALL     PUSHR
242C  E4 21                          IN       AL,21H
242E  8A E0                          MOV      AH,AL
2430  E4 A1                          IN       AL,0A1H
2432  50                             PUSH     AX
2433  E4 61                          IN       AL,61H
2435  8A E0                          MOV      AH,AL
```

```
2438  2E: 83 3E 1854 R 00              CMP     CS:ISPS2,0
243E  74 05                            JE      NOAUX
2440  B0 A7                            MOV     AL,0A7H
2442  E8 1522 R                        CALL    SNDKCMD
2445  E8 356E R              NOAUX:    CALL    _BEEPOFF
2448  FB                               STI
2449  E8 2380 R                        CALL    PUSHINT
244C  2E: FF 36 182D R                 PUSH    CS:TIMMEM
2451  2E: C7 06 182D R FFFF            MOV     CS:TIMMEM,-1
2458  2E: A1 1291 R                    MOV     AX,CS:MYDSEG
245C  8E D8                            MOV     DS,AX
245E  8E C0                            MOV     ES,AX
2460  E8 0000 E                        CALL    HRSTART
2463  2E: 8F 06 182D R                 POP     CS:TIMMEM
2468  E8 23C1 R                        CALL    POPINT
246B  2E: 83 3E 1854 R 00              CMP     CS:ISPS2,0
2471  74 05                            JE      NOAUX1
2473  B0 A8                            MOV     AL,0A8H
2475  E8 1522 R                        CALL    SNDKCMD
2478  58                     NOAUX1:   POP     AX
2479  FA                               CLI
247A  8A C4                            MOV     AL,AH
247C  E6 61                            OUT     61H,AL
247E  58                               POP     AX
247F  E6 A1                            OUT     0A1H,AL
2481  8A C4                            MOV     AL,AH
2483  E6 21                            OUT     21H,AL
2485  E8 02F4 R                        CALL    POPR
2488  FF 0E 0028 R                     DEC     _ACTIVE
248C  C7 06 0026 R 0000                MOV     _AFTRDOS,0
2492  2E: FF 0E 009A R       TRY2B:    DEC     CS:SWITCHEM
2497  7D 0A                            JGE     TRY2C
2499  2E: 8E 16 24A9 R                 MOV     SS,CS:OLDSS
249E  2E: 8B 26 24A7 R                 MOV     SP,CS:OLDSP
24A3  FB                     TRY2C:    STI
24A4  1F                               POP     DS
24A5  58                               POP     AX
24A6  C3                               RET
24A7                         TRY2POP ENDP
                             ;
                             ;
                                       PUBLIC  OLDSS,OLDSP
                             ;
24A7  0000                   OLDSP     DW      0
24A9  0000                   OLDSS     DW      0
                             ;
                                       PUBLIC  _SETINTR
                             ;
24AB                         _SETINTR PROC  NEAR
24AB  FB                               STI
24AC  C3                               RET
24AD                         _SETINTR ENDP
                             ;
                                       PUBLIC  _CLRINTR
                             ;
24AD                         _CLRINTR PROC  NEAR
24AD  FA                               CLI
24AE  C3                               RET
24AF                         _CLRINTR  ENDP
                             ;
                                       PUBLIC  _DOCAD
                             ;
```

```
24AF                        _DOCAD   PROC    NEAR
24AF  E8 2E3D R                      CALL    _RENABL
24B2  FB                             STI
24B3  FC                             CLD
24B4  B8 ---- R                      MOV     AX,BIOS_SEG
24B7  8E D8                          MOV     DS,AX
24B9  C7 06 0072 1234                MOV     WORD PTR DS:[72H],1234H
24BF  EA E05B ---- R                 JMP     MTR_RESET
24C4                        _DOCAD   ENDP
                            ;
                                     PUBLIC  NEWI13
                            ;
24C4                        NEWI13   PROC    NEAR
24C4  9C                             PUSHF
24C5  2E: 83 0E 1823 R 01            OR      WORD PTR CS:DSKFLG,I13FLG
24CB  2E: 83 0E 00A2 R 01            OR      WORD PTR CS:TIDLE,I13FLG
24D1  FA                             CLI
24D2  2E: FF 1E 0026 R               CALL    DWORD PTR CS:[OLDI13]
24D7  9C                             PUSHF
24D8  2E: 83 26 1823 R FE            AND     WORD PTR CS:DSKFLG,(NOT I13FLG)
24DE  9D                             POPF
24DF  CA 0002                        RETF    2
24E2                        NEWI13   ENDP
                            ;
                                     PUBLIC  NEWI25
                            ;
24E2                        NEWI25   PROC    NEAR
24E2  9C                             PUSHF
24E3  2E: 83 0E 1823 R 02            OR      WORD PTR CS:DSKFLG,I25FLG
24E9  2E: 83 0E 00A2 R 02            OR      WORD PTR CS:TIDLE,I25FLG
24EF  9D                             POPF
24F0  2E: FF 1E 004A R               CALL    DWORD PTR CS:[OLDI25]
24F5  9C                             PUSHF
24F6  2E: 83 26 1823 R FD            AND     WORD PTR CS:DSKFLG,(NOT I25FLG)
24FC  9D                             POPF
24FD  CB                             RETF
24FE                        NEWI25   ENDP
                            ;
                                     PUBLIC  NEWI26
                            ;
24FE                        NEWI26   PROC    NEAR
24FE  9C                             PUSHF
24FF  2E: 83 0E 1823 R 04            OR      WORD PTR CS:DSKFLG,I26FLG
2505  2E: 83 0E 00A2 R 04            OR      WORD PTR CS:TIDLE,I26FLG
250B  9D                             POPF
250C  2E: FF 1E 004E R               CALL    DWORD PTR CS:[OLDI26]
2511  9C                             PUSHF
2512  2E: 83 26 1823 R FB            AND     WORD PTR CS:DSKFLG,(NOT I26FLG)
2518  9D                             POPF
2519  CB                             RETF
251A                        NEWI26   ENDP
                            ;
251A  4A 4F 4E 50 45 4E              DB      "JONPENNER"
      4E 45 52
2523  0003                  TIMECNT  DW      3
2525  FFFF                  TIMER    DW      -1
2527  0000                  SKIPCNT  DW      0
2529  00                    DTIMER   DB      0
                            ;
                                     PUBLIC  TINTER,AFTRSHFT,SKIPCNT
                            ;
252A  00                    AFTRSHFT DB      0
                            ;
```

```
252B                        TINTER  PROC    FAR
252B  2E: FF 06 2527 R              INC     CS:SKIPCNT
2530  2E: FF 06 2525 R              INC     CS:TIMER
2535  74 19                         JE      TINTRO
2537  2E: FF 0E 2525 R              DEC     CS:TIMER
253C  50                            PUSH    AX
253D  B0 0B                         MOV     AL,00001011b    ; tell 8259A we want the ISR
253F  E6 20                         OUT     20H,AL          ; 8259A command reg
2541  EB 00                         JMP     SHORT $+2       ; may be a AT
2543  E4 20                         IN      AL,20H          ; AL=mask of active INTs
2545  A8 01                         TEST    AL,1            ; test IRQ 1
2547  58                            POP     AX
2548  75 01                         JNE     @F
254A  CF                            IRET
254B  2E: FF 2E 006E R      @@:     JMP     DWORD PTR CS:[OLDTIM]
2550  9C                    TINTRO: PUSHF
2551  FA                            CLI
2552  2E: FF 1E 006E R              CALL    DWORD PTR CS:[OLDTIM]
2557  FA                            CLI
2558  E8 295F R                     CALL    PRINTIT
255B  2E: FF 06 009A R              INC     CS:SWITCHEM
2560  74 08                         JE      TINTR1
2562  2E: FF 0E 009A R              DEC     CS:SWITCHEM
2567  E9 2706 R                     JMP     NOTIME
256A  2E: 8C 16 24A9 R      TINTR1: MOV     CS:OLDSS,SS
256F  2E: 89 26 24A7 R              MOV     CS:OLDSP,SP
2574  2E: 8E 16 1291 R              MOV     SS,CS:MYDSEG
2579  BC 3C80 R                     MOV     SP,OFFSET DGROUP:LOCSTK
257C  E8 02E2 R                     CALL    PUSHR
257F  2E: 8E 1E 1291 R              MOV     DS,CS:MYDSEG
2584  2E: 80 3E 1530 R 00           CMP     CS:KBHIT,0
258A  75 37                         JNE     NOFEED
258C  FF 0E 0036 R                  DEC     _DELAY_COUNT
2590  7F 37                         JG      NOFEED1
2592  8B 1E 1078 R          FEEDIT: MOV     BX,MYBTAIL
2596  3B 1E 1076 R                  CMP     BX,MYBHEAD
259A  74 27                         JE      NOFEED
259C  8B 07                         MOV     AX,WORD PTR DS:[BX]
259E  43                            INC     BX
259F  43                            INC     BX
25A0  81 FB 187A R                  CMP     BX,OFFSET DGROUP:MYBEND
25A4  72 03                         JB      I16D2
25A6  BB 107A R                     MOV     BX,OFFSET DGROUP:MYBUFF
25A9  53                    I16D2:  PUSH    BX
25AA  50                            PUSH    AX
25AB  E8 2E42 R                     CALL    _UNGETC
25AE  83 C4 02                      ADD     SP,2
25B1  5B                            POP     BX
25B2  0B C0                         OR      AX,AX
25B4  75 00                         JNE     NOFEED
25B6  89 1E 1078 R                  MOV     MYBTAIL,BX
25BA  83 3E 0034 R 00               CMP     _DELAY,0
25BF  75 02                         JNE     NOFEED
25C1  EB CF                         JMP     SHORT FEEDIT
                              ;
25C3  A1 0034 R             NOFEED: MOV     AX,_DELAY
25C6  A3 0036 R                     MOV     _DELAY_COUNT,AX
25C9  E8 3578 R             NOFEED1:CALL    _DSKBUSY
25CC  0B C0                         OR      AX,AX
25CE  75 13                         JNE     TINT1B
25D0  FB                            STI
25D1  BD 0002                       MOV     BP,SWAP8
25D4  BE 0020                       MOV     SI,8*4
```

```
25D7  E8 1293 R                    CALL    HRDSWP
25DA  BE 0020                      MOV     SI,8*4
25DD  BD 000F                      MOV     BP,SWAPNET
25E0  E8 1293 R                    CALL    HRDSWP
25E3  FB                   TINT1B: STI
25E4  2E: 83 3E 00A2 R 00          CMP     CS:TIDLE,0
25EA  74 15                        JE      TINTR3
25EC  2E: C7 06 00A2 R 0000 TINT1A: MOV    CS:TIDLE,0
25F3  2E: C7 06 00A4 R 0000        MOV     CS:IDLEMIN,0
25FA  2E: C7 06 00A6 R 0444        MOV     CS:TICKS,18*60+12
2601  2E: FF 0E 00A6 R     TINTR3: DEC     CS:TICKS
2606  75 0C                        JNE     TINTR4
2608  2E: FF 06 00A4 R              INC    CS:IDLEMIN
260D  2E: C7 06 00A6 R 0444        MOV     CS:TICKS,18*60+12
2614  B8 ---- R            TINTR4: MOV     AX,BIOS_SEG
2617  8E D8                        MOV     DS,AX
                                   ASSUME  DS:BIOS_SEG 2619  8B 0E 006C R                 MOV     CX,TIMER_LOW
261D  8B 16 006E R                 MOV     DX,TIMER_HI
2621  8B 3E 0017                   MOV     DI,DS:[17H]          ;GET SHIFT FLAGS
                                   ASSUME  DS:DGROUP 2625  2E: 8E 1E 1291 R             MOV     DS,CS:MYDSEG
262A  BB 2222 R                    MOV     BX,OFFSET _DBLK
262D  83 E7 0F                     AND     DI,0FH
2630  83 FF 0F                     CMP     DI,0FH
2633  75 09                        JNE     @F
2635  2E: C6 06 252A R 01          MOV     CS:AFTRSHFT,1
263B  EB 19 90                     JMP     TINTR5
263E  2E: 80 3E 252A R 00   @@:    CMP     CS:AFTRSHFT,0
2644  74 10                        JE      TINTR5
2646  0B FF                        OR      DI,DI
2648  75 0C                        JNE     TINTR5
264A  2E: C6 06 252A R 00          MOV     CS:AFTRSHFT,0
2650  C7 06 0026 R 0001            MOV     _AFTRDOS,1
2656  80 3F 00             TINTR5: CMP     BYTE PTR DS:[BX],0
2659  75 03                        JNE     @F
265B  E9 26E3 R                    JMP     TINT5D
265E  80 7F 15 00          @@:     CMP     DS:[BX].INMEM,0
2662  75 72                        JNE     TINT5B
2664  80 7F 48 00                  CMP     DS:[BX].ISTSR,0
2668  74 28                        JE      TINT5A
266A  80 7F 62 01                  CMP     DS:[BX].XRUN,1
266E  74 66                        JE      TINT5B
2670  80 7F 30 00                  CMP     DS:[BX].DOSSTRT,0
2674  75 60                        JNE     TINT5B
2676  83 7F 63 00                  CMP     DS:[BX].IDLECNT,0
267A  74 16                        JE      TINT5A
267C  2E: A1 00A4 R                MOV     AX,CS:IDLEMIN
2680  39 47 63                     CMP     DS:[BX].IDLECNT,AX
2683  77 00                        JA      TINT5A
2685  C6 47 30 FF                  MOV     DS:[BX].DOSSTRT,0FFH
2689  2E: C7 06 00A2 R 00FF        MOV     CS:TIDLE,0FFH
2690  EB 30                        JMP     SHORT TINT5C
2692  8B 47 67             TINT5A: MOV     AX,DS:[BX].AT_HIGH
2695  0B 47 65                     OR      AX,DS:[BX].AT_LOW
2698  74 3C                        JE      TINT5B
269A  39 57 67                     CMP     DS:[BX].AT_HIGH,DX
269D  75 37                        JNE     TINT5B
269F  39 4F 65                     CMP     DS:[BX].AT_LOW,CX
26A2  77 32                        JA      TINT5B
26A4  33 C9                        XOR     CX,CX
26A6  89 4F 67                     MOV     DS:[BX].AT_HIGH,CX
```

```
26A9  89 4F 65                      MOV     DS:[BX].AT_LOW,CX
26AC  80 7F 48 00                   CMP     DS:[BX].ISTSR,0
26B0  75 12                         JNE     @F
26B2  C7 06 0000 E 0001             MOV     _SWAP_FLAG,1
26B8  89 1E 0000 E                  MOV     _APPOUT,BX
26BC  C7 06 0000 E 0000             MOV     _FTIME,0
26C2  EB 1F                         JMP     SHORT TINT5D
26C4  C6 47 30 FF         @@:       MOV     DS:[BX].DOSSTRT,0FFH
                                    MOV     CS:TIDLE,0FFH
26C8  2E: C7 06 00A2 R 0OFF         MOV     CS:IDLEMIN,0
26CF  2E: C7 06 00A4 R 0000 TINT5C: MOV     CS:IDLEMIN,0
26D6  81 C3 00E5          TINT5B:   ADD     BX,SIZE TSR
26DA  81 FB 387F R                  CMP     BX,OFFSET _DBLKEM
26DE  73 03                         JAE     TINT5D
26E0  E9 2656 R                     JMP     TINTR5
26E3  E8 357B R           TINT5D:   CALL    _DSKBUSY
26E6  0B C0                         OR      AX,AX
26E8  75 07                         JNE     TINTR6
26EA  83 3E 0000 E 00               CMP     _SHOWFLG,0
26EF  75 3F                         JNE     TINT7B
26F1  E8 02F4 R           TINTR6:   CALL    POPR
26F4  FA                            CLI
26F5  2E: FF 0E 009A R              DEC     CS:SWITCHEM
26FA  7D 0A                         JGE     TINTR2
26FC  2E: 8E 16 24A9 R              MOV     SS,CS:OLDSS
2701  2E: 8B 26 24A7 R              MOV     SP,CS:OLDSP
2706                      TINTR2:
2706  2E: FF 0E 2525 R    NOTIME:   DEC     CS:TIMER
270B  50                            PUSH    AX
270C  E8 357B R                     CALL    _DSKBUSY
270F  0B C0                         OR      AX,AX
2711  58                            POP     AX
2712  75 1B                         JNE     NOT1
2714  1E                            PUSH    DS
2715  2E: 8E 1E 1291 R              MOV     DS,CS:MYDSEG
271A  83 3E 0026 R 00               CMP     _AFTRDOS,0
271F  74 03                         JE      @F
2721  E8 23E2 R                     CALL    TRY2POP
2724  83 3E 0000 E 00     @@:       CMP     _SWAP_FLAG,0
2729  1F                            POP     DS
272A  74 03                         JE      NOT1

IFNDEF    TSRONLY ;****************************************
272C  E8 0000 E                     CALL    APSWAP
                          ENDIF             ;****************************************

272F  CF                  NOT1:     IRET
2730  8B 36 0000 E        TINT7B:   MOV     SI,_APPIN
2734  0B F6                         OR      SI,SI
2736  74 B9                         JE      TINTR6
2738  B8 ---- R                     MOV     AX,BIOS_SEG
273B  8E C0                         MOV     ES,AX
                                    ASSUME  ES:BIOS_SEG
273D  26: A0 0049 R                 MOV     AL,ES:[CRT_MODE]
2741  3C 02                         CMP     AL,2
2743  74 08                         JE      TINTR7
2745  3C 03                         CMP     AL,3
2747  74 04                         JE      TINTR7
2749  3C 07                         CMP     AL,7
274B  75 A4                         JNE     TINTR6
274D  BB B800             TINTR7:   MOV     BX,0B800H
2750  26: A1 0010 R                 MOV     AX,ES:[EQUIPMENT]
2754  25 0030                       AND     AX,30H
```

```
2772  2E: 83 3E 183C R 00            CMP     CS:NOFLICK,0
2778  75 0F                          JNE     TIN71C
277A  8A D8                          MOV     BL,AL
277C  EC              TIN71A: IN     AL,DX
277D  A8 01                          TEST    AL,1
277F  75 FB                          JNE     TIN71A
2781  FA                             CLI
2782  EC              TIN71B: IN     AL,DX
2783  A8 01                          TEST    AL,1
2785  74 FB                          JE      TIN71B
2787  8A C3                          MOV     AL,BL
2789  AB              TIN71C: STOSW
278A  FB                             STI
278B  E2 E4                          LOOP    TIN71
278D  E9 26F1 R                      JMP     TINTR6
2790                  TINTER  ENDP
                      ;
                              PUBLIC  COMBINT
                      ;
2790                  COMBINT PROC    FAR
2790  1E                             PUSH    DS
2791  2E: 8E 1E 1291 R               MOV     DS,CS:MYDSEG
2796  83 3E 0032 R 00                CMP     _NOCOM2,0
2798  1F                             POP     DS
279C  75 05                          JNE     COMB5
279E  2E: FF 2E 0016 R               JMP     DWORD PTR CS:[OLDIOB]
27A3  2E: FF 06 009A R  COMB5: INC   CS:SWITCHEM
27A8  75 12                          JNE     COMB1
27AA  2E: 8C 16 24A9 R               MOV     CS:OLDSS,SS
27AF  2E: 89 26 24A7 R               MOV     CS:OLDSP,SP
27B4  2E: 8E 16 1291 R               MOV     SS,CS:MYDSEG
27B9  BC 3C80 R                      MOV     SP,OFFSET DGROUP:LOCSTK
27BC  E8 02E2 R       COMB1:  CALL   PUSHR
27BF  BD 0005                        MOV     BP,SWAPC
27C2  BE 0030                        MOV     SI,0CH*4
27C5  E8 1293 R                      CALL    MRDSWP
27C8  9C                             PUSHF
27C9  FA                             CLI
27CA  2E: FF 1E 0016 R               CALL    DWORD PTR CS:[OLDIOB]
27CF  B0 0B           COMB3:  MOV    AL,00001011b            ; tell 8259A we want the ISR
27D1  E6 20                          OUT     20H,AL                  ; 8259A command reg
27D3  EB 00                          JMP     SHORT $+2               ; may be a AT
27D5  E4 20                          IN      AL,20H                  ; AL=mask of active INTs
27D7  A8 08                          TEST    AL,8                    ; test IRQ 1
27D9  74 1B                          JE      COMB4
27DB  BA 02FD                        MOV     DX,2FDH
27DE  EC                             IN      AL,DX
27DF  A8 01                          TEST    AL,1
27E1  74 EC                          JE      COMB3
27E3  B2 FB                          MOV     DL,0FBH
27E5  EC                             IN      AL,DX
27E6  8A E0                          MOV     AH,AL
27E8  24 7F                          AND     AL,7FH
27EA  EE                             OUT     DX,AL
27EB  B2 F8                          MOV     DL,0F8H
27ED  EC                             IN      AL,DX
27EE  B2 FB                          MOV     DL,0FBH
27F0  8A C4                          MOV     AL,AH
27F2  EE                             OUT     DX,AL
27F3  E8 2E3D R                      CALL    _RENABL
27F6  E8 02F4 R       COMB4:  CALL   POPR
27F9  2E: FF 0E 009A R               DEC     CS:SWITCHEM
27FE  7D 0A                          JGE     COMB2
```

```
2757  30 0030                              CMP     AX,30H
275A  75 02                                JNE     TINT7A
275C  B7 B0                                MOV     BH,0B0H
275E  26: 8B 16 0063 R       TINT7A: MOV   DX,ES:[CRT_ADDR]
2763  83 C2 06                             ADD     DX,6
2766  8E C3                                MOV     ES,BX
                                           ASSUME  ES:NOTHING
2768  BF 0076                              MOV     DI,(79-20)*2
276B  B9 0014                              MOV     CX,20
276E  B4 70                                MOV     AH,70H
2770  FC                                   CLD
2771  AC                     TIN71:  LODSB
2800  2E: 8E 16 24A9 R                     MOV     SS,CS:OLDSS
2805  2E: 8B 26 24A7 R                     MOV     SP,CS:OLDSP
280A  CF                     COMB2:  IRET
280B                         COMBINT ENDP
                             ;
                                           PUBLIC  COMCINT
                             ;
280B                         COMCINT PROC  FAR
280B  1E                                   PUSH    DS
280C  2E: 8E 1E 1291 R                     MOV     DS,CS:MYDSEG
2811  83 3E 0030 R 00                      CMP     _NOCOMM,0
2816  1F                                   POP     DS
2817  75 05                                JNE     COMC5
2819  2E: FF 2E 001A R                     JMP     DWORD PTR CS:[OLDIOC]
281E  2E: FF 06 009A R       COMC5:  INC   CS:SWITCHEM
2823  75 12                                JNE     COMC1
2825  2E: 8C 16 24A9 R                     MOV     CS:OLDSS,SS
282A  2E: 89 26 24A7 R                     MOV     CS:OLDSP,SP
282F  2E: 8E 16 1291 R                     MOV     SS,CS:MYDSEG
2834  BC 3C80 R                            MOV     SP,OFFSET DGROUP:LOCSTK
2837  E8 02E2 R              COMC1:  CALL  PUSHR
283A  BD 0005                              MOV     BP,SWAPC
283D  BE 0030                              MOV     SI,0CH*4
2840  E8 1293 R                            CALL    WRDSWP
2843  9C                                   PUSHF
2844  FA                                   CLI
2845  2E: FF 1E 001A R                     CALL    DWORD PTR CS:[OLDIOC]
284A  B0 0B                  COMC3:  MOV   AL,00001011b    ; tell 8259A we want the ISR
284C  E6 20                                OUT     20H,AL          ; 8259A command reg
284E  EB 00                                JMP     SHORT $+2       ; may be a AT
2850  E4 20                                IN      AL,20H          ; AL=mask of active INTs
2852  A8 10                                TEST    AL,16           ; test IRQ 4
2854  74 1B                                JE      COMC4
2856  BA 03FD                              MOV     DX,3FDH
2859  EC                                   IN      AL,DX
285A  A8 01                                TEST    AL,1
285C  74 EC                                JE      COMC3
285E  B2 FB                                MOV     DL,0FBH
2860  EC                                   IN      AL,DX
2861  8A E0                                MOV     AH,AL
2863  24 7F                                AND     AL,7FH
2865  EE                                   OUT     DX,AL
2866  B2 F8                                MOV     DL,0F8H
2868  EC                                   IN      AL,DX
2869  B2 FB                                MOV     DL,0FBH
286B  8A C4                                MOV     AL,AH
286D  EE                                   OUT     DX,AL
286E  E8 2E3D R                            CALL    _RENABL
2871  EB 83                  COMC4:  JMP   COMB4
2873                         COMCINT ENDP
```

```
                        PUBLIC  PRNFINT
                    ;
                    PRNFINT PROC    FAR
2873
2873  2E: FF 2E 001E R        JMP     DWORD PTR CS:[OLDIOF]
2878  2E: FF 06 009A R        INC     CS:SWITCHEM
287D  74 0A                   JE      PRNF1
287F  2E: FF 0E 009A R        DEC     CS:SWITCHEM
2884  2E: FF 2E 001E R        JMP     DWORD PTR CS:[OLDIOF]
2889  2E: 8C 16 24A9 R  PRNF1:  MOV   CS:OLDSS,SS
288E  2E: 89 26 24A7 R        MOV     CS:OLDSP,SP
2893  2E: 8E 16 1291 R        MOV     SS,CS:MYDSEG
2898  BC 3C80 R               MOV     SP,OFFSET DGROUP:LOCSTK
289B  E8 02E2 R               CALL    PUSHR
289E  BD 0006                 MOV     BP,SWAPF
28A1  BE 003C                 MOV     SI,0FH*4
28A4  E8 1293 R               CALL    HRDSWP
28A7  E8 02F4 R               CALL    POPR
28AA  2E: FF 0E 009A R        DEC     CS:SWITCHEM
28AF  7D 0A                   JGE     PRNF2
28B1  2E: 8E 16 24A9 R        MOV     SS,CS:OLDSS
28B6  2E: 8B 26 24A7 R        MOV     SP,CS:OLDSP
28BB  2E: FF 2E 001E R  PRNF2:  JMP   DWORD PTR CS:[OLDIOF]
28C0                   PRNFINT ENDP
                    ;
                        PUBLIC  NEWI28
                    ;
28C0                    NEWI28 PROC   NEAR
28C0  FB                      STI
28C1  2E: FF 36 139A R        PUSH    CS:[SSBP]
28C6  2E: FF 36 139E R        PUSH    CS:[SSSI]
28CB  2E: FF 36 139C R        PUSH    CS:[SSDI]
28D0  2E: FF 36 1396 R        PUSH    CS:[SSFL]
28D5  2E: 89 2E 139A R        MOV     WORD PTR CS:[SSBP],BP
28DA  2E: 89 36 139E R        MOV     WORD PTR CS:[SSSI],SI
28DF  2E: 89 3E 139C R        MOV     WORD PTR CS:[SSDI],DI
28E4  BD 0000                 MOV     BP,SWAP28
28E7  BE 0028                 MOV     SI,28H
28EA  E8 13A7 R               CALL    SFTSWP
28ED  2E: 8B 2E 139A R        MOV     BP,WORD PTR CS:[SSBP]
28F2  2E: 8B 36 139E R        MOV     SI,WORD PTR CS:[SSSI]
28F7  2E: 8B 3E 139C R        MOV     DI,WORD PTR CS:[SSDI]
28FC  2E: 8F 06 1396 R        POP     CS:[SSFL]
2901  2E: 8F 06 139C R        POP     CS:[SSDI]
2906  2E: 8F 06 139E R        POP     CS:[SSSI]
290B  2E: 8F 06 139A R        POP     CS:[SSBP]
2910  2E: FF 2E 005A R        JMP     DWORD PTR CS:[OLDI28]
2915                    NEWI28 ENDP
                        PUBLIC  DOI17
                    ;
2915                    DOI17  PROC   NEAR
2915  2E: 83 3E 2958 R 00     CMP     CS:I17SFL,0
291B  74 03                   JE      @F
291D  CD 17                   INT     17H
291F  C3                      RET
2920  9C                @@:   PUSHF
2921  FA                      CLI
2922  2E: FF 1E 0036 R        CALL    DWORD PTR CS:[OLDI17]
2927  C3                      RET
2928                    DOI17  ENDP
                    ;
                        PUBLIC  PBSIZE
                    ;
2928                    PBSIZE PROC   NEAR
```

```
2928  1E                              PUSH    DS
2929  53                              PUSH    BX
292A  50                              PUSH    AX
292B  E8 17DA R                       CALL    GGROUP
292E  A1 187A R                       MOV     AX,PRTHEAD
2931  8B 1E 187C R                    MOV     BX,PRTTAIL
2935  3B D8                           CMP     BX,AX
2937  75 05                           JNE     @F
2939  B4 00                           MOV     AH,0
293B  EB 18 90                        JMP     PBSEND
293E  77 07             @@:           JA      @F
2940  2B C3                           SUB     AX,BX
2942  8A E0                           MOV     AH,AL
2944  EB 0F 90                        JMP     PBSEND
2947  51                @@:           PUSH    CX
2948  2D 187E R                       SUB     AX,OFFSET PRTBUFF
294B  B9 19FE R                       MOV     CX,OFFSET PRTEND
294E  2B CB                           SUB     CX,BX
2950  03 C1                           ADD     AX,CX
2952  59                              POP     CX
2953  8A E0                           MOV     AH,AL
2955  5B                PBSEND: POP   BX
2956  8A C3                           MOV     AL,BL
2958  5B                              POP     BX
2959  1F                              POP     DS
295A  C3                              RET
295B                    PBSIZE  ENDP
                        ;
                                PUBLIC  PRINTIT,I17SFL,INPRINT
                        ;
295B  0000              I17SFL  DW      0
295D  FFFF              INPRINT DW      -1
                        ;
295F                    PRINTIT PROC
295F  FA                              CLI
2960  2E: 80 3E 2AB9 R 00              CMP     CS:_NOI17,0
2966  75 22                            JNE     PRTX1
2968  2E: FF 06 295D R                 INC     CS:INPRINT
296D  75 16                            JNE     PRTX
296F  2E: 83 3E 0A61 R 00              CMP     CS:INSWAP,0
2975  7D 0E                            JGE     PRTX
2977  53                               PUSH    BX
2978  2E: FF 06 009A R                 INC     CS:SWITCHEM
297D  74 0C                            JE      @F
297F  2E: FF 0E 009A R                 DEC     CS:SWITCHEM
2984  5B                               POP     BX
2985  2E: FF 0E 295D R  PRTX:   DEC     CS:INPRINT
298A  C3                PRTX1:  RET
298B  2E: 8C 16 24A9 R  @@:     MOV     CS:OLDSS,SS
2990  2E: 89 26 24A7 R          MOV     CS:OLDSP,SP
2995  2E: 8E 16 1291 R          MOV     SS,CS:MYDSEG
299A  BC 3C80 R                 MOV     SP,OFFSET DGROUP:LOCSTK
299D  FB                        STI
299E  1E                        PUSH    DS
299F  E8 17DA R                 CALL    GGROUP
29A2  8B 1E 187C R              MOV     BX,PRTTAIL
29A6  3B 1E 187A R              CMP     BX,PRTHEAD
29AA  74 32                     JE      PRTS2
29AC  83 3E 0028 R 00           CMP     _ACTIVE,0
29B1  75 2B                     JNE     PRTS2
29B3  BB 2222 R                 MOV     BX,OFFSET _DBLK
29B6  80 3F 00         PRTS1:   CMP     BYTE PTR DS:[BX],0
29B9  74 59                     JE      PRTS2A
```

```
29BB  80 7F 15 00                CMP      BYTE PTR DS:[BX].INMEM,0
29BF  75 11                      JNE      PRTS3
29C1  80 7F 62 01                CMP      BYTE PTR DS:[BX].XRUN,1
29C5  74 0B                      JE       PRTS3
29C7  80 7F 74 00                CMP      BYTE PTR DS:[BX+SWAP17].COUNT,0
29CB  74 05                      JE       PRTS3
29CD  FE 4F 74                   DEC      BYTE PTR DS:[BX+SWAP17].COUNT
29D0  74 26                      JE       PRTS4
29D2  81 C3 00E5      PRTS3:     ADD      BX,SIZE TSR
29D6  81 FB 387F R               CMP      BX,OFFSET _DBLKEN
29DA  72 DA                      JB       PRTS1
29DC  EB 36                      JMP      SHORT PRTS2A
29DE  1F              PRTS2:     POP      DS
29DF  FA                         CLI
29E0  2E: FF 0E 009A R           DEC      CS:SWITCHEM
29E5  7D 0A                      JGE      PRTS5
29E7  2E: 8E 16 24A9 R           MOV      SS,CS:OLDSS
29EC  2E: 8B 26 24A7 R           MOV      SP,CS:OLDSP
29F1  5B              PRTS5:     POP      BX
29F2  2E: FF 0E 295D R           DEC      CS:INPRINT
29F7  C3                         RET
29F8  C6 47 15 FF     PRTS4:     MOV      BYTE PTR DS:[BX].INMEM,0FFH
29FC  50                         PUSH     AX
29FD  E8 357B R                  CALL     _DSKBUSY
2A00  0B C0                      OR       AX,AX
2A02  58                         POP      AX
2A03  75 07                      JNE      NOP2J
2A05  53                         PUSH     BX
2A06  E8 0B6D R                  CALL     SWAPIN
2A09  5B                         POP      BX
2A0A  73 03                      JNC      @F
2A0C  E9 2A95 R       NOP2J:     JMP      NOPRT2
2A0F  2E: FF 06 295B R @@:       INC      CS:I17SFL
2A14  2E: FF 06 2AB7 R PRTS2A:   INC      CS:IN117
2A19  1E                         PUSH     DS
2A1A  50                         PUSH     AX
2A1B  51                         PUSH     CX
2A1C  52                         PUSH     DX
2A1D  56                         PUSH     SI
2A1E  E8 17DA R                  CALL     GGROUP
2A21  8B 36 187C R               MOV      SI,PRTTAIL
2A25  3B 36 187A R    PRT0:      CMP      SI,PRTHEAD
2A29  74 3E                      JE       NOPRT
2A2B  B9 0100                    MOV      CX,100H
2A2E  AD                         LODSW
2A2F  8B D0                      MOV      DX,AX
2A31  B4 02           PRT1:      MOV      AH,2
2A33  E8 2915 R                  CALL     DOI17
2A36  F6 C4 08                   TEST     AH,8
2A39  75 2E                      JNE      NOPRT
2A3B  80 E4 90                   AND      AH,90H
2A3E  80 FC 90                   CMP      AH,90H
2A41  E0 EE                      LOOPNZ   PRT1
2A43  75 24                      JNZ      NOPRT
2A45  FC                         CLD
2A46  B9 000A                    MOV      CX,10
2A49  AC              PRT2:      LODSB
2A4A  32 E4                      XOR      AH,AH
2A4C  E8 2915 R                  CALL     DOI17
2A4F  F6 C4 29                   TEST     AH,29H
2A52  74 06                      JE       PRT3
2A54  4E                         DEC      SI
2A55  E2 F2                      LOOP     PRT2
```

```
2A57  EB 10 90                        JMP      NOPRT
2A5A  81 FE 19FE R         PRT3:      CMP      SI,OFFSET PRTEND
2A5E  72 03                           JB       @F
2A60  BE 187E R                       MOV      SI,OFFSET PRTBUFF
2A63  89 36 187C R         @@:        MOV      PRTTAIL,SI
2A67  EB BC                           JMP      PRT0
2A69  B4 02                NOPRT:     MOV      AH,2
2A6B  E8 2915 R                       CALL     DOI17
2A6E  F6 C4 08                        TEST     AH,8
2A71  74 05                           JE       @F
2A73  B4 01                           MOV      AH,1
2A75  E8 2915 R                       CALL     DOI17
2A78  5E                   @@:        POP      SI
2A79  5A                              POP      DX
2A7A  59                              POP      CX
2A7B  58                              POP      AX
2A7C  1F                              POP      DS
2A7D  2E: FF 0E 2AB7 R                DEC      CS:INI17
2A82  2E: FF 0E 295B R                DEC      CS:I17SFL
2A87  7D 07                           JGE      @F
2A89  2E: FF 06 295B R                INC      CS:I17SFL
2A8E  EB 00                           JMP      SHORT NOPRT1
2A90  53                   @@:        PUSH     BX
2A91  E8 0EDD R                       CALL     SWAPOUT
2A94  5B                              POP      BX
2A95  C6 47 74 01          NOPRT2:    MOV      BYTE PTR DS:[BX+SWAP17].COUNT,1
2A99  C6 47 15 00                     MOV      BYTE PTR DS:[BX].INMEM,0
2A9D  1F                   NOPRT1:    POP      DS
2A9E  FA                              CLI
2A9F  2E: FF 0E 009A R                DEC      CS:SWITCHEM
2AA4  7D 0A                           JGE      @F
2AA6  2E: 8E 16 24A9 R                MOV      SS,CS:OLDSS
2AAB  2E: 8B 26 24A7 R                MOV      SP,CS:OLDSP
2AB0  5B                   @@:        POP      BX
2AB1  2E: FF 0E 295D R                DEC      CS:INPRINT
2AB6  C3                              RET
2AB7                       PRINTIT ENDP
                           ;
                                      PUBLIC   NEWI17,INI17,_NOI17
                           ;
2AB7  FFFF                 INI17      DW       -1
2AB9  01                   _NOI17     DB       1
                           ;
2ABA                       NEWI17  PROC  NEAR
2ABA  2E: 80 3E 2AB9 R 00             CMP      CS:_NOI17,0
2AC0  74 05                           JE       @F
2AC2  2E: FF 2E 0036 R                JMP      DWORD PTR CS:[OLDI17]
2AC7  2E: FF 06 2AB7 R     @@:        INC      CS:INI17
2ACC  74 09                           JE       @F
2ACE  2E: FF 0E 2AB7 R     I17NJ:     DEC      CS:INI17
2AD3  EB 65 90                        JMP      I17NORM
2AD6  FB                              STI
2AD7  80 FC 02             @@:        CMP      AH,2
2ADA  77 F2                           JA       I17NJ
2ADC  80 FC 00                        CMP      AH,0
2ADF  74 08                           JE       I17Z
2AE1  B4 90                           MOV      AH,90H
2AE3  2E: FF 0E 2AB7 R     @@:        DEC      CS:INI17
2AE8  CF                              IRET
2AE9  06                   I17Z:      PUSH     ES
2AEA  1E                              PUSH     DS
2AEB  57                              PUSH     DI
2AEC  56                              PUSH     SI
```

```
2AED  50                        PUSH    AX
2AEE  E8 17DA R      I17TRY:    CALL    GGROUP
2AF1  1E                        PUSH    DS
2AF2  07                        POP     ES
2AF3  FA                        CLI
2AF4  8B 36 187A R              MOV     SI,PRTHEAD
2AF8  8B FE                     MOV     DI,SI
2AFA  83 C6 03                  ADD     SI,3
2AFD  81 FE 19FE R              CMP     SI,OFFSET PRTEND
2B01  72 03                     JB      @F
2B03  BE 187E R                 MOV     SI,OFFSET PRTBUFF
2B06  3B 36 187C R   @@:        CMP     SI,PRTTAIL
2B0A  75 0F                     JNE     @F                  ;ANY ROOM IN PRINT BUFFER
2B0C  FB                        STI
2B0D  50                        PUSH    AX
2B0E  E8 357B R                 CALL    _DSKBUSY
2B11  0B C0                     OR      AX,AX
2B13  58                        POP     AX
2B14  75 D8                     JNE     I17TRY
2B16  E8 23E2 R                 CALL    TRY2POP             ;IF DOS NOT BUSY THEN TRY2POP
2B19  EB D3                     JMP     I17TRY
2B1B  8B C2          @@:        MOV     AX,DX
2B1D  AB                        STOSW
2B1E  58                        POP     AX
2B1F  AA                        STOSB
2B20  89 36 187A R              MOV     PRTHEAD,SI
2B24  E8 2928 R                 CALL    PBSIZE
2B27  80 FC 96                  CMP     AH,150
2B2A  B4 90                     MOV     AH,90H
2B2C  72 02                     JB      @F
2B2E  B4 10                     MOV     AH,10H
2B30  5E             @@:        POP     SI
2B31  5F                        POP     DI
2B32  1F                        POP     DS
2B33  07                        POP     ES
2B34  2E: FF 0E 2AB7 R          DEC     CS:INI17
2B39  CF                        IRET
2B3A  2E: FF 2E 0036 R I17NORM: JMP     DWORD PTR CS:[OLDI17]
2B3F                 NEWI17     ENDP
                                ;
                                PUBLIC  NEWI14
                                ;
2B3F                 NEWI14     PROC    NEAR
2B3F  FB                        STI
2B40  2E: FF 36 139A R          PUSH    CS:[SSBP]
2B45  2E: FF 36 139E R          PUSH    CS:[SSSI]
2B4A  2E: FF 36 139C R          PUSH    CS:[SSDI]
2B4F  2E: FF 36 1396 R          PUSH    CS:[SSFL]
2B54  2E: 83 0E 00A2 R 20       OR      CS:TIDLE,I14FLG
2B5A  2E: 89 2E 139A R          MOV     WORD PTR CS:[SSBP],BP
2B5F  2E: 89 36 139E R          MOV     WORD PTR CS:[SSSI],SI
2B64  2E: 89 3E 139C R          MOV     WORD PTR CS:[SSDI],DI
2B69  BD 0008                   MOV     BP,SWAP14
2B6C  BE 0014                   MOV     SI,14H
2B6F  E8 13A7 R                 CALL    SFTSWP
2B72  2E: 8B 2E 139A R          MOV     BP,WORD PTR CS:[SSBP]
2B77  2E: 8B 36 139E R          MOV     SI,WORD PTR CS:[SSSI]
2B7C  2E: 8B 3E 139C R          MOV     DI,WORD PTR CS:[SSDI]
2B81  2E: 8F 06 1396 R          POP     CS:[SSFL]
2B86  2E: 8F 06 139C R          POP     CS:[SSDI]
2B8B  2E: 8F 06 139E R          POP     CS:[SSSI]
2B90  2E: 8F 06 139A R          POP     CS:[SSBP]
2B95  2E: FF 2E 002A R          JMP     DWORD PTR CS:[OLDI14]
```

```
                    PUBLIC  NEWI5
                ;
2B9A            NEWI5   PROC    NEAR
2B9A  FB                STI
2B9B  2E: FF 36 139A R          PUSH    CS:[SSBP]
2BA0  2E: FF 36 139E R          PUSH    CS:[SSSI]
2BA5  2E: FF 36 139C R          PUSH    CS:[SSDI]
2BAA  2E: FF 36 1396 R          PUSH    CS:[SSFL]
2BAF  2E: 89 2E 139A R          MOV     WORD PTR CS:[SSBP],BP
2BB4  2E: 89 36 139E R          MOV     WORD PTR CS:[SSSI],SI
2BB9  2E: 89 3E 139C R          MOV     WORD PTR CS:[SSDI],DI
2BBE  BD 0001                   MOV     BP,SWAP5
2BC1  BE 0005                   MOV     SI,05H
2BC4  E8 13A7 R                 CALL    SFTSWP
2BC7  2E: 8B 2E 139A R          MOV     BP,WORD PTR CS:[SSBP]
2BCC  2E: 8B 36 139E R          MOV     SI,WORD PTR CS:[SSSI]
2BD1  2E: 8B 3E 139C R          MOV     DI,WORD PTR CS:[SSDI]
2BD6  2E: 8F 06 1396 R          POP     CS:[SSFL]
2BDB  2E: 8F 06 139C R          POP     CS:[SSDI]
2BE0  2E: 8F 06 139E R          POP     CS:[SSSI]
2BE5  2E: 8F 06 139A R          POP     CS:[SSBP]
2BEA  2E: FF 2E 0012 R          JMP     DWORD PTR CS:[OLDI5]
2BEF            NEWI5   ENDP
                ;
                    PUBLIC  NEWUDI1
                ;
2BEF            NEWUDI1 PROC    NEAR
2BEF  FB                STI
2BF0  2E: FF 36 139A R          PUSH    CS:[SSBP]
2BF5  2E: FF 36 139E R          PUSH    CS:[SSSI]
2BFA  2E: FF 36 139C R          PUSH    CS:[SSDI]
2BFF  2E: FF 36 1396 R          PUSH    CS:[SSFL]
2C04  2E: 89 2E 139A R          MOV     WORD PTR CS:[SSBP],BP
2C09  2E: 89 36 139E R          MOV     WORD PTR CS:[SSSI],SI
2C0E  2E: 89 3E 139C R          MOV     WORD PTR CS:[SSDI],DI
2C13  BD 0010                   MOV     BP,SWAPU1
2C16  2E: 8B 36 0141 R          MOV     SI,CS:UDIINT1
2C1B  E8 13A7 R                 CALL    SFTSWP
2C1E  2E: 8B 2E 139A R          MOV     BP,WORD PTR CS:[SSBP]
2C23  2E: 8B 36 139E R          MOV     SI,WORD PTR CS:[SSSI]
2C28  2E: 8B 3E 139C R          MOV     DI,WORD PTR CS:[SSDI]
2C2D  2E: 8F 06 1396 R          POP     CS:[SSFL]
2C32  2E: 8F 06 139C R          POP     CS:[SSDI]
2C37  2E: 8F 06 139E R          POP     CS:[SSSI]
2C3C  2E: 8F 06 139A R          POP     CS:[SSBP]
2C41  2E: FF 2E 0082 R          JMP     DWORD PTR CS:[OLDUDI1]
2C46            NEWUDI1 ENDP
                ;
                    PUBLIC  NEWUDI2
                ;
2C46            NEWUDI2 PROC    NEAR
2C46  FB                STI
2C47  2E: FF 36 139A R          PUSH    CS:[SSBP]
2C4C  2E: FF 36 139E R          PUSH    CS:[SSSI]
2C51  2E: FF 36 139C R          PUSH    CS:[SSDI]
2C56  2E: FF 36 1396 R          PUSH    CS:[SSFL]
2C5B  2E: 89 2E 139A R          MOV     WORD PTR CS:[SSBP],BP
2C60  2E: 89 36 139E R          MOV     WORD PTR CS:[SSSI],SI
2C65  2E: 89 3E 139C R          MOV     WORD PTR CS:[SSDI],DI
2C6A  BD 0011                   MOV     BP,SWAPU2
2C6D  2E: 8B 36 0143 R          MOV     SI,CS:UDIINT2
2C72  E8 13A7 R                 CALL    SFTSWP
```

```
2C75  2E: 88 2E 139A R            MOV     BP,WORD PTR CS:[SSBP]
2C7A  2E: 88 36 139E R            MOV     SI,WORD PTR CS:[SSSI]
2C7F  2E: 88 3E 139C R            MOV     DI,WORD PTR CS:[SSDI]
2C84  2E: 8F 06 1396 R            POP     CS:[SSFL]
2C89  2E: 8F 06 139C R            POP     CS:[SSDI]
2C8E  2E: 8F 06 139E R            POP     CS:[SSSI]
2C93  2E: 8F 06 139A R            POP     CS:[SSBP]
2C98  2E: FF 2E 0086 R            JMP     DWORD PTR CS:[OLDUDI2]
2C9D                       NEWUDI2 ENDP
                           ;
                                   PUBLIC  NEWUDI3
                           ;
2C9D                       NEWUDI3 PROC    NEAR
2C9D  FB                           STI
2C9E  2E: FF 36 139A R            PUSH    CS:[SSBP]
2CA3  2E: FF 36 139E R            PUSH    CS:[SSSI]
2CA8  2E: FF 36 139C R            PUSH    CS:[SSDI]
2CAD  2E: FF 36 1396 R            PUSH    CS:[SSFL]
2CB2  2E: 89 2E 139A R            MOV     WORD PTR CS:[SSBP],BP
2CB7  2E: 89 36 139E R            MOV     WORD PTR CS:[SSSI],SI
2CBC  2E: 89 3E 139C R            MOV     WORD PTR CS:[SSDI],DI
2CC1  BD 0012                     MOV     BP,SWAPU3
2CC4  2E: 88 36 0145 R            MOV     SI,CS:UDIINT3
2CC9  E8 13A7 R                   CALL    SFTSWP
2CCC  2E: 88 2E 139A R            MOV     BP,WORD PTR CS:[SSBP]
2CD1  2E: 88 36 139E R            MOV     SI,WORD PTR CS:[SSSI]
2CD6  2E: 88 3E 139C R            MOV     DI,WORD PTR CS:[SSDI]
2CDB  2E: 8F 06 1396 R            POP     CS:[SSFL]
2CE0  2E: 8F 06 139C R            POP     CS:[SSDI]
2CE5  2E: 8F 06 139E R            POP     CS:[SSSI]
2CEA  2E: 8F 06 139A R            POP     CS:[SSBP]
2CEF  2E: FF 2E 008A R            JMP     DWORD PTR CS:[OLDUDI3]
2CF4                       NEWUDI3 ENDP
                           ;
                                   PUBLIC  NEWI15
                           ;
2CF4                       NEWI15  PROC    FAR
2CF4  80 FC 88                    CMP     AH,88H
2CF7  74 05                       JE      NEW15A
2CF9  2E: FF 2E 002E R            JMP     DWORD PTR CS:[OLDI15]
2CFE  1E                  NEW15A: PUSH    DS
2CFF  2E: 8E 1E 1291 R            MOV     DS,CS:MYDSEG
2D04  A1 001A R                   MOV     AX,_EXTFREE
2D07  1F                          POP     DS
2D08  CF                          IRET
2D09                       NEWI15  ENDP
                           ;
                           ;************************************************;
                           ;
                                   INCLUDE WINDOW.ASM
                         C         PAGE    ,132
                         C ;
                         C ;****************** INCLUDE FOR IC.ASM ****************************;
                         C ;
                         C ;
                         C ;
                         C         PUBLIC  _CLRWIN,_MVCUR,_OUTS,_OUTC,_INKEY,_BEEP,_GETCP
                         C         PUBLIC  SCNUM,BUFOFF,_FLUSH,BUFFPTR
                         C ;
2D09  00                 C SCNUM   DB      0
2D0A  0000               C BUFOFF  DW      0
2D0C  0000               C BUFFPTR DW      0                       ;POINTER TO EMM WINDOW PAGE
                         C ;
```

```
            C           PUBLIC  _GETSHI
            C    ;
2D0E        C   _GETSHI PROC    NEAR
2D0E  55    C           PUSH    BP
2D0F  1E    C           PUSH    DS
2D10  B8 ---- R    C    MOV     AX,BIOS_SEG
2D13  8E D8  C           MOV     DS,AX
            C           ASSUME  DS:BIOS_SEG
2D15  A0 0017 R   C     MOV     AL,KB_FLAG
2D18  32 E4  C           XOR     AH,AH
2D1A  1F    C           POP     DS
            C           ASSUME  DS:DGROUP
2D1B  5D    C           POP     BP
2D1C  C3    C           RET
2D1D        C   _GETSHI ENDP
            C   ;
            C           PUBLIC  GETADRS
            C   ;
2D1D        C   GETADRS PROC    NEAR
2D1D  51    C           PUSH    CX
2D1E  86 E0  C           XCHG    AH,AL
2D20  8B C8  C           MOV     CX,AX
2D22  32 E4  C           XOR     AH,AH
2D24  B1 50  C           MOV     CL,80
2D26  F6 E1  C           MUL     CL
2D28  02 C5  C           ADD     AL,CH
2D2A  80 D4 00   C       ADC     AH,0
2D2D  D1 C0  C           ROL     AX,1
2D2F  2E: 03 06 2D0A R   C   ADD     AX,CS:BUFOFF
2D34  59    C           POP     CX
2D35  C3    C           RET
2D36        C   GETADRS ENDP
            C   ;
            C           PUBLIC  _BORDER
            C   ;
2D36        C   _BORDER PROC    NEAR
2D36  58    C           POP     AX
2D37  0E    C           PUSH    CS
2D38  50    C           PUSH    AX
2D39        C   _BORDER ENDP
            C   ;
2D39        C   BORDRW  PROC    FAR             ; i=hilight(ulx,uly,llx,lly);
2D39  55    C           PUSH    BP
2D3A  8B EC  C           MOV     BP,SP
2D3C  57    C           PUSH    DI
2D3D  56    C           PUSH    SI
2D3E  8A 5E 0A   C       MOV     BL,[BP+10]
2D41  8A 7E 0C   C       MOV     BH,[BP+12]
2D44  8A 56 06   C       MOV     DL,[BP+06]
2D47  8A 76 08   C       MOV     DH,[BP+08]
2D4A  8B 46 0E   C       MOV     AX,[BP+14]
2D4D  A2 207E R  C       MOV     _BCOLOR,AL
2D50  8B 46 0C   C       MOV     AX,[BP+12]
2D53  3A F7  C           CMP     DH,BH
2D55  75 03  C           JNE     BRD1
2D57  E9 2E39 R  C       JMP     BORDRD
2D5A  53    C   BRD1:   PUSH    BX
2D5B  2E: 8A 3E 2D09 R   C   MOV     BH,CS:SCNUM
            C           SETC
2D60  B4 02  C1          MOV     AH,2
2D62  E8 17E8 R  C1      CALL    DOBIOS
2D65  53    C           PUSH    BX
2D66  8A 1E 207E R   C   MOV     BL,DS:_BCOLOR
```

```
2D6A B8 09C9        C           MOV     AX,09C9H
2D6D B9 0001        C           MOV     CX,1
2D70 E8 17E8 R      C           CALL    DOBIOS
2D73 5B             C           POP     BX
2D74 52             C           PUSH    DX
2D75 8A D3          C           MOV     DL,BL
                    C           SETC
2D77 B4 02          C1          MOV     AH,2
2D79 E8 17E8 R      C1          CALL    DOBIOS
2D7C 53             C           PUSH    BX
2D7D 8A 1E 207E R   C           MOV     BL,DS:_BCOLOR
2D81 B8 09BB        C           MOV     AX,09BBH
2D84 E8 17E8 R      C           CALL    DOBIOS
2D87 5B             C           POP     BX
2D88 5A             C           POP     DX
2D89 5B             C           POP     BX
2D8A 52             C           PUSH    DX
2D8B 53             C           PUSH    BX
2D8C 2E: 8A 3E 2D09 R  C        MOV     BH,CS:SCNUM
2D91 FE C2          C           INC     DL
                    C           SETC
2D93 B4 02          C1          MOV     AH,2
2D95 E8 17E8 R      C1          CALL    DOBIOS
2D98 B8 09CD        C           MOV     AX,09CDH
2D9B 8A CB          C           MOV     CL,BL
2D9D 2A CA          C           SUB     CL,DL
2D9F 32 ED          C           XOR     CH,CH
2DA1 2E: 8A 3E 2D09 R  C        MOV     BH,CS:SCNUM
2DA6 53             C           PUSH    BX
                    C           MOV     BL,DS:_BCOLOR
2DA7 8A 1E 207E R   C           CALL    DOBIOS
2DAB E8 17E8 R      C           POP     BX
2DAE 5B             C           POP     BX
2DAF 5B             C           POP     DX
2DB0 5A             C  BORDRL:  INC     DH
2DB1 FE C6          C           CMP     DH,BH
2DB3 3A F7          C           JE      BORDRB
2DB5 74 32          C           PUSH    BX
2DB7 53             C           MOV     BH,CS:SCNUM
2DB8 2E: 8A 3E 2D09 R  C        SETC
                    C1          MOV     AH,2
2DBD B4 02          C1          CALL    DOBIOS
2DBF E8 17E8 R      C           MOV     CX,1
2DC2 B9 0001        C           PUSH    BX
2DC5 53             C           MOV     BL,DS:_BCOLOR
2DC6 8A 1E 207E R   C           MOV     AX,09BAH
2DCA B8 09BA        C           CALL    DOBIOS
2DCD E8 17E8 R      C           POP     BX
2DD0 5B             C           PUSH    DX
2DD1 52             C           MOV     DL,BL
2DD2 8A D3          C           SETC
                    C1          MOV     AH,2
2DD4 B4 02          C1          CALL    DOBIOS
2DD6 E8 17E8 R      C           PUSH    BX
2DD9 53             C           MOV     BL,DS:_BCOLOR
2DDA 8A 1E 207E R   C           MOV     AX,09BAH
2DDE B8 09BA        C           CALL    DOBIOS
2DE1 E8 17E8 R      C           POP     BX
2DE4 5B             C           POP     DX
2DE5 5A             C           POP     BX
2DE6 5B             C           JMP     BORDRL
2DE7 EB C8          C  BORDRB:  PUSH    BX
2DE9 53             C           MOV     BH,CS:SCNUM
2DEA 2E: 8A 3E 2D09 R  C
```

```
                    C           SETC
2DEF  B4 02         C1          MOV     AH,2
2DF1  E8 17E8 R     C1          CALL    DOBIOS
2DF4  53            C           PUSH    BX
2DF5  8A 1E 207E R  C           MOV     BL,DS:_BCOLOR
2DF9  B8 09C8       C           MOV     AX,09C8H
2DFC  E8 17E8 R     C           CALL    DOBIOS
2DFF  5B            C           POP     BX
2E00  52            C           PUSH    DX
2E01  8A D3         C           MOV     DL,BL
                    C           SETC
2E03  B4 02         C1          MOV     AH,2
2E05  E8 17E8 R     C1          CALL    DOBIOS
2E08  53            C           PUSH    BX
2E09  8A 1E 207E R  C           MOV     BL,DS:_BCOLOR
2E0D  B8 09BC       C           MOV     AX,09BCH
2E10  E8 17E8 R     C           CALL    DOBIOS
2E13  5B            C           POP     BX
2E14  5A            C           POP     DX
2E15  5B            C           POP     BX
2E16  2E: 8A 3E 2009 R  C       MOV     BH,CS:SCNUM
2E1B  FE C2         C           INC     DL
                    C           SETC
2E1D  B4 02         C1          MOV     AH,2
2E1F  E8 17E8 R     C1          CALL    DOBIOS
2E22  B8 09CD       C           MOV     AX,09CDH
2E25  8A CB         C           MOV     CL,BL
2E27  2A CA         C           SUB     CL,DL
2E29  32 ED         C           XOR     CH,CH
2E2B  2E: 8A 3E 2009 R  C       MOV     BH,CS:SCNUM
2E30  53            C           PUSH    BX
2E31  8A 1E 207E R  C           MOV     BL,DS:_BCOLOR
2E35  E8 17E8 R     C           CALL    DOBIOS
2E38  5B            C           POP     BX
2E39  5E            C  BORDRD:  POP     SI
2E3A  5F            C           POP     DI
2E3B  5D            C           POP     BP
2E3C  CB            C           RET
2E3D               C  BORDRW    ENDP
                    C  ;
                    C           PUBLIC  _RENABL
                    C  ;
2E3D               C  _RENABL   PROC    NEAR
2E3D  B0 20         C           MOV     AL,20H
2E3F  E6 20         C           OUT     020H,AL
2E41  C3            C           RET
2E42               C  _RENABL   ENDP
                    C  ;
                    C           PUBLIC  _UNGETC
                    C  ;
2E42               C  _UNGETC   PROC    NEAR
2E42  9C            C           PUSHF
2E43  55            C           PUSH    BP
2E44  8B EC         C           MOV     BP,SP
2E46  1E            C           PUSH    DS
2E47  8B 56 06      C           MOV     DX,[BP+06]
2E4A  56            C           PUSH    SI
2E4B  06            C           PUSH    ES
2E4C  FA            C  IBMU3A:  CLI
2E4D  B8 ---- R     C           MOV     AX,BIOS_SEG
2E50  8E D8         C           MOV     DS,AX
                    C           ASSUME  DS:BIOS_SEG
2E52  8B 1E 001C R  C           MOV     BX,[BUFFER_TAIL]
```

```
2E56  88 F3              C           MOV     SI,BX
2E58  43                 C           INC     BX
2E59  43                 C           INC     BX
2E5A  81 FB 003E R       C           CMP     BX,OFFSET KB_BUFFER_END
2E5E  75 03              C           JNE     IBMU3B
2E60  BB 001E R          C           MOV     BX,OFFSET KB_BUFFER
2E63  3B 1E 001A R       C  IBMU3B:  CMP     BX,[BUFFER_HEAD]
2E67  75 05              C           JNE     IBMU3C
2E69  B8 FFFF            C           MOV     AX,0FFFFH
2E6C  EB 08              C           JMP     SHORT IBMUND
2E6E  89 14              C  IBMU3C:  MOV     WORD PTR [SI],DX
2E70  89 1E 001C R       C           MOV     [BUFFER_TAIL],BX
2E74  33 C0              C           XOR     AX,AX
                         C           ASSUME  DS:DGROUP
2E76  07                 C  IBMUND:  POP     ES
2E77  5E                 C           POP     SI
2E78  1F                 C           POP     DS
2E79  5D                 C           POP     BP
2E7A  9D                 C           POPF
2E7B  C3                 C           RET
2E7C                     C  _UNGETC ENDP
                         C  ;
2E7C                     C  _FLUSH  PROC    NEAR
2E7C  9C                 C           PUSHF
2E7D  1E                 C           PUSH    DS
2E7E  50                 C           PUSH    AX
2E7F  FA                 C           CLI
2E80  B8 ---- R          C           MOV     AX,BIOS_SEG
2E83  8E D8              C           MOV     DS,AX
                         C           ASSUME  DS:BIOS_SEG
2E85  FA                 C           CLI
2E86  B8 001E R          C           MOV     AX,OFFSET KB_BUFFER
2E89  A3 001A R          C           MOV     DS:[BUFFER_HEAD],AX
2E8C  A3 001C R          C           MOV     DS:[BUFFER_TAIL],AX
2E8F  E8 17DA R          C           CALL    GGROUP
                         C           ASSUME  DS:DGROUP
2E92  B8 107A R          C           MOV     AX,OFFSET MYBUFF
2E95  A3 1076 R          C           MOV     MYBHEAD,AX
2E98  A3 1078 R          C           MOV     MYBTAIL,AX
2E9B  58                 C  FLUSH1:  POP     AX
2E9C  1F                 C           POP     DS
2E9D  9D                 C           POPF
2E9E  C3                 C           RET
2E9F                     C  _FLUSH  ENDP
                         C  ;
                         C           PUBLIC  _FATWIN
                         C  ;
2E9F                     C  _FATWIN PROC    NEAR
2E9F  55                 C           PUSH    BP
2EA0  8B EC              C           MOV     BP,SP
2EA2  57                 C           PUSH    DI
2EA3  56                 C           PUSH    SI
2EA4  8A 56 08           C           MOV     DL,[BP+08]
2EA7  8A 76 0A           C           MOV     DH,[BP+10]
2EAA  8A 4E 04           C           MOV     CL,[BP+04]
2EAD  8A 6E 06           C           MOV     CH,[BP+06]
2EB0  BB 0007            C           MOV     BX,07H
2EB3  BF 2109 R          C           MOV     DI,OFFSET DGROUP:FATBUF
2EB6  9A 3080 ---- R     C           CALL    FAR PTR OPENW
2EBB  5E                 C           POP     SI
2EBC  5F                 C           POP     DI
2EBD  5D                 C           POP     BP
2EBE  C3                 C           RET
2EBF                     C  _FATWIN ENDP
```

```
                    C           PUBLIC  _CFAT
                    C   ;
2EBF                C   _CFAT   PROC    NEAR
2EBF  55            C           PUSH    BP
2EC0  8B EC         C           MOV     BP,SP
2EC2  57            C           PUSH    DI
2EC3  56            C           PUSH    SI
2EC4  BF 2109 R     C           MOV     DI,OFFSET FATBUF
2EC7  9A 31B5 ---- R  C         CALL    FAR PTR CLOSEW
2ECC  5E            C           POP     SI
2ECD  5F            C           POP     DI
2ECE  5D            C           POP     BP
2ECF  C3            C           RET
2ED0                C   _CFAT   ENDP
                    C   ;
                    C           PUBLIC  _CWIND
                    C   ;
2ED0                C   _CWIND  PROC    NEAR
2ED0  55            C           PUSH    BP
2ED1  8B EC         C           MOV     BP,SP
2ED3  57            C           PUSH    DI
2ED4  56            C           PUSH    SI
2ED5  1E            C           PUSH    DS
2ED6  06            C           PUSH    ES
2ED7  83 3E 0000 E 00  C        CMP     _USEEMM,0
2EDC  74 56         C           JE      CWDSK
2EDE  2E: 8B 16 009C R  C       MOV     DX,CS:EMMHAND
                    C           EMM_SAVE_STATE
2EE3  B4 47         C1          MOV     AH,47H
2EE5  E8 025F R     C1          CALL    DOEMM
2EE8  B8 4400       C           MOV     AX,4400H
2EEB  BB 0001       C           MOV     BX,1
2EEE  E8 025F R     C           CALL    DOEMM
2EF1  B8 4401       C           MOV     AX,4401H
2EF4  BB 0002       C           MOV     BX,2
2EF7  E8 025F R     C           CALL    DOEMM
2EFA  8B 1E 0000 E  C           MOV     BX,_LEVEL
2EFE  D1 E3         C           SHL     BX,1
2F00  03 1E 0000 E  C           ADD     BX,_LEVEL
2F04  D1 E3         C           SHL     BX,1
2F06  81 C3 103A R  C           ADD     BX,OFFSET WDSKPTR
2F0A  2E: 8B 3E 2D0C R  C       MOV     DI,CS:BUFFPTR
2F0F  2B 7F 04      C           SUB     DI,WORD PTR [BX+4]
2F12  2E: 89 3E 2D0C R  C       MOV     CS:BUFFPTR,DI
2F17  2E: A1 00A0 R C           MOV     AX,EMMFR
2F1B  8E D8         C           MOV     DS,AX
2F1D  8E C0         C           MOV     ES,AX
2F1F  9A 31B5 ---- R  C         CALL    FAR PTR CLOSEW
2F24  2E: 8B 16 009C R  C       MOV     DX,CS:EMMHAND
                    C           EMM_RESTORE_STATE
2F29  B4 48         C1          MOV     AH,48H
2F2B  E8 025F R     C1          CALL    DOEMM
2F2E  07            C   CWEND:  POP     ES
2F2F  1F            C           POP     DS
2F30  5E            C           POP     SI
2F31  5F            C           POP     DI
2F32  5D            C           POP     BP
2F33  C3            C           RET
2F34  8B 1E 0000 E  C   CWDSK:  MOV     BX,_LEVEL
2F38  D1 E3         C           SHL     BX,1
2F3A  03 1E 0000 E  C           ADD     BX,_LEVEL
```

```
2F3E  D1 E3                  C           SHL     BX,1
2F40  81 C3 103A R           C           ADD     BX,OFFSET WDSKPTR
2F44  8B 47 02               C           MOV     AX,[BX+2]
2F47  8B 2F                  C           MOV     BP,[BX]
2F49  89 2E 000E R           C           MOV     PAGESOUT,BP
2F4D  A3 0010 R              C           MOV     PAGESOUT+2,AX
2F50  BF 0038 R              C           MOV     DI,OFFSET DWBUFF
2F53  8B 4F 04               C           MOV     CX,[BX+4]
2F56  BA 20C4 R              C           MOV     DX,OFFSET SOFCB
2F59  E8 039F R              C           CALL    DISKIN
2F5C  BF 0038 R              C           MOV     DI,OFFSET DWBUFF
2F5F  9A 31B5 ---- R         C           CALL    FAR PTR CLOSEW
2F64  EB C8                  C           JMP     SHORT CWEND
2F66                         C  _CWIND   ENDP
                             C  ;
                             C  ;
                             C           PUBLIC  _WINDOW
                             C  ;
2F66                         C  _WINDOW PROC    NEAR
2F66  55                     C           PUSH    BP
2F67  8B EC                  C           MOV     BP,SP
2F69  57                     C           PUSH    DI
2F6A  56                     C           PUSH    SI
2F6B  1E                     C           PUSH    DS
2F6C  06                     C           PUSH    ES
2F6D  8A 46 0A               C           MOV     AL,[BP+10]
2F70  2A 46 06               C           SUB     AL,[BP+06]
2F73  8A 4E 08               C           MOV     CL,[BP+08]
2F76  2A 4E 04               C           SUB     CL,[BP+04]
2F79  FE C1                  C           INC     CL
2F7B  32 E4                  C           XOR     AH,AH
2F7D  40                     C           INC     AX
2F7E  F6 E1                  C           MUL     CL
2F80  D1 E0                  C           SHL     AX,1
2F82  05 0032                C           ADD     AX,50
2F85  50                     C           PUSH    AX
2F86  8A 56 08               C           MOV     DL,[BP+08]
2F89  8A 76 0A               C           MOV     DH,[BP+10]
2F8C  8A 4E 04               C           MOV     CL,[BP+04]
2F8F  8A 6E 06               C           MOV     CH,[BP+06]
2F92  83 3E 0000 E 00        C           CMP     _USEEMM,0
2F97  74 61                  C           JE      WINDSK
2F99  52                     C           PUSH    DX
2F9A  2E: 8B 16 009C R       C           MOV     DX,CS:EMMHAND
                             C           EMM_SAVE_STATE
2F9F  B4 47                  C1          MOV     AH,47H
2FA1  E8 025F R              C1          CALL    DOEMM
2FA4  2E: A1 00A0 R          C           MOV     AX,EMMFR
2FA8  8E C0                  C           MOV     ES,AX
2FAA  8E D8                  C           MOV     DS,AX
2FAC  B8 4400                C           MOV     AX,4400H
2FAF  BB 0001                C           MOV     BX,1
2FB2  E8 025F R              C           CALL    DOEMM
2FB5  B8 4401                C           MOV     AX,4401H
2FB8  BB 0002                C           MOV     BX,2
2FBB  E8 025F R              C           CALL    DOEMM
2FBE  5A                     C           POP     DX
2FBF  8B 5E 0C               C           MOV     BX,[BP+12]
2FC2  2E: 8B 3E 200C R       C           MOV     DI,CS:BUFFPTR
2FC7  9A 3080 ---- R         C           CALL    FAR PTR OPENW
2FCC  2E: 8E 1E 1291 R       C           MOV     DS,CS:MYDSEG
2FD1  8B 1E 0000 E           C           MOV     BX,_LEVEL
```

```
2FD5  D1 E3                  C              SHL      BX,1
2FD7  03 1E 0000 E           C              ADD      BX,_LEVEL
2FDB  D1 E3                  C              SHL      BX,1
2FDD  81 C3 103A R           C              ADD      BX,OFFSET WDSKPTR
2FE1  58                     C              POP      AX
2FE2  89 47 04               C              MOV      WORD PTR [BX+4],AX
2FE5  2E: 01 06 2D0C R       C              ADD      CS:BUFFPTR,AX
2FEA  2E: 88 16 009C R       C              MOV      DX,CS:EMMHAND
                             C              EMM_RESTORE_STATE
2FEF  B4 48                  C1             MOV      AH,48H
2FF1  E8 025F R              C1             CALL     DOEMM
2FF4  07                     C   WINEND:    POP      ES
2FF5  1F                     C              POP      DS
2FF6  5E                     C              POP      SI
2FF7  5F                     C              POP      DI
2FF8  5D                     C              POP      BP
2FF9  C3                     C              RET
2FFA  88 5E 0C               C   WINDSK:    MOV      BX,[BP+12]
2FFD  BF 0038 R              C              MOV      DI,OFFSET DWBUFF
3000  9A 3080 ---- R         C              CALL     FAR PTR OPENW
3005  58                     C              POP      AX
3006  8A CC                  C              MOV      CL,AH
3008  32 ED                  C              XOR      CH,CH
300A  41                     C              INC      CX
300B  51                     C              PUSH     CX                ;SAVE FOR LATER
300C  BA 20C4 R              C              MOV      DX,OFFSET SOFCB
300F  A1 0010 R              C              MOV      AX,PAGESOUT+2
3012  8B 2E 000E R           C              MOV      BP,PAGESOUT
3016  BF 0038 R              C              MOV      DI,OFFSET DWBUFF
3019  E8 04D5 R              C              CALL     DISKOUT
301C  50                     C              PUSH     AX
301D  3B 06 0014 R           C              CMP      AX,TOPOUT+2       ;CHECK HIGH ORDER
3021  77 00                  C              JA       @F                ;IF BIGGER, UPDATE DISK
3023  3B 2E 0012 R           C              CMP      BP,TOPOUT         ;CHECK LOW ORDER
3027  77 07                  C              JA       @F
3029  B4 00                  C              MOV      AH,00H            ;FLUSH DISK BUFFERS
302B  CD 21                  C              INT      21H
302D  EB 23 90               C              JMP      WNDSK2
3030  E8 0000 E              C   @@:        CALL     CLOSEIT           ;CLOSE FILE
3033  A3 0014 R              C              MOV      TOPOUT+2,AX       ;SET NEW HIGHEST WRITTEN
3036  89 2E 0012 R           C              MOV      TOPOUT,BP
303A  55                     C              PUSH     BP
303B  53                     C              PUSH     BX
303C  06                     C              PUSH     ES
303D  52                     C              PUSH     DX
303E  B0 45                  C              MOV      AL,'E'            ;OPEN AN EXISTING FILE
3040  32 E4                  C              XOR      AH,AH
3042  50                     C              PUSH     AX
3043  B8 0000 E              C              MOV      AX,OFFSET _SWAPNAME
3046  50                     C              PUSH     AX
3047  52                     C              PUSH     DX
3048  E8 0000 E              C              CALL     _OPEN_FCB         ;REOPEN SWAP FILE
304B  83 C4 06               C              ADD      SP,6
304E  5A                     C              POP      DX
304F  07                     C              POP      ES
3050  5B                     C              POP      BX
3051  5D                     C              POP      BP
                             C   ;
3052  58                     C   WNDSK2:    POP      AX
                             C   ;
3053  8B 1E 0000 E           C              MOV      BX,_LEVEL
3057  D1 E3                  C              SHL      BX,1
```

```
3059  03 1E 0000 E              c           ADD      BX,_LEVEL
305D  D1 E3                     c           SHL      BX,1
305F  81 C3 103A R              c           ADD      BX,OFFSET WDSKPTR
3063  89 0E 000E R              c           MOV      CX,PAGESOUT
3067  89 0F                     c           MOV      WORD PTR [BX],CX
3069  88 0E 0010 R              c           MOV      CX,PAGESOUT+2
306D  89 4F 02                  c           MOV      WORD PTR [BX+2],CX
3070  89 2E 000E R              c           MOV      PAGESOUT,BP
3074  A3 0010 R                 c           MOV      PAGESOUT+2,AX
3077  58                        c           POP      AX
3078  89 47 04                  c           MOV      WORD PTR [BX+4],AX       ;GET WINDOW SIZE
307B  E9 2FF4 R                 c           JMP      WINEND
307E                            c  _WINDOW  ENDP
                                c  ;
                                c  ;
                                c           PUBLIC   COLORS,OPENW,CLOSEW
                                c  ;
307E  0007                      c  COLORS   DW       7
                                c  ;
3080                            c  OPENW    PROC     FAR
3080  55                        c           PUSH     BP
3081  06                        c           PUSH     ES
3082  52                        c           PUSH     DX
3083  51                        c           PUSH     CX
3084  53                        c           PUSH     BX
3085  2E: 8A 3E 2D09 R          c           MOV      BH,CS:SCNUM
308A  89 0D                     c           MOV      [DI],CX
308C  89 55 02                  c           MOV      [DI+2],DX
308F  B4 03                     c           MOV      AH,3
3091  E8 17E8 R                 c           CALL     DOBIOS
3094  E8 3402 R                 c           CALL     GETPOS
3097  89 55 04                  c           MOV      [DI+4],DX
309A  89 4D 06                  c           MOV      [DI+6],CX
309D  89 5D 08                  c           MOV      [DI+8],BX
30A0  2E: A1 307E R             c           MOV      AX,CS:COLORS
30A4  89 45 0A                  c           MOV      [DI+10],AX
30A7  B9 B800                   c           MOV      CX,0B800H
30AA  CD 11                     c           INT      11H
30AC  25 0030                   c           AND      AX,30H
30AF  3D 0030                   c           CMP      AX,30H
30B2  75 02                     c           JNE      OPENW1
30B4  B5 B0                     c           MOV      CH,0B0H
30B6  8E C1                     c  OPENW1:  MOV      ES,CX
30B8  8B E9                     c           MOV      BP,CX
30BA  89 4D 0C                  c           MOV      [DI+12],CX
30BD  5B                        c           POP      BX
30BE  2E: 89 1E 307E R          c  OPENW2:  MOV      CS:COLORS,BX
30C3  58                        c           POP      AX
30C4  50                        c           PUSH     AX
30C5  E8 2D1D R                 c           CALL     GETADRS
30C8  8B F0                     c           MOV      SI,AX
30CA  BA 03DA                   c           MOV      DX,3DAH
30CD  59                        c           POP      CX
30CE  5B                        c           POP      BX
30CF  83 C7 0E                  c           ADD      DI,14
30D2  F7 C5 0800                c           TEST     BP,800H
30D6  75 02                     c           JNE      W0
30D8  B2 BA                     c           MOV      DL,0BAH
30DA  8B C1                     c  W0:      MOV      AX,CX
30DC  50                        c  W1:      PUSH     AX
30DD  2E: 83 3E 183C R 00       c           CMP      CS:NOFLICK,0
30E3  75 08                     c           JNE      W2B
```

```
30E5  EC              C  W2:     IN      AL,DX
30E6  A8 01           C          TEST    AL,1
30E8  75 FB           C          JNE     W2
30EA  FA              C          CLI
30EB  EC              C  W2A:    IN      AL,DX
30EC  A8 01           C          TEST    AL,1
30EE  74 FB           C          JE      W2A
30F0  26: 88 04       C  W2B:    MOV     AX,WORD PTR ES:[SI]
30F3  89 05           C          MOV     DS:[DI],AX
30F5  FB              C          STI
30F6  83 C7 02        C          ADD     DI,2
30F9  83 C6 02        C          ADD     SI,2
30FC  58              C          POP     AX
30FD  FE C0           C          INC     AL
30FF  3A C3           C          CMP     AL,BL
3101  7E D9           C          JLE     W1
3103  8A C1           C          MOV     AL,CL
3105  FE C4           C          INC     AH
3107  3A E7           C          CMP     AH,BH
3109  7F 11           C          JG      W4
310B  8B C8           C          MOV     CX,AX
310D  B8 0050         C          MOV     AX,80
3110  2A C3           C          SUB     AL,BL
3112  02 C1           C          ADD     AL,CL
3114  FE C8           C          DEC     AL
3116  D1 E0           C          SHL     AX,1
3118  03 F0           C          ADD     SI,AX,
311A  EB BE           C          JMP     W0
311C  07              C  W4:     POP     ES
311D  5D              C          POP     BP
311E  33 C0           C          XOR     AX,AX
3120  CB              C          RET
3121                  C  OPENW   ENDP
                      C  ;
                      C  ;
                      C  ; clrwin(buf)
                      C  ; char *buf;
                      C  ;
3121                  C  _CLRWIN PROC    NEAR
3121  58              C          POP     AX
3122  0E              C          PUSH    CS
3123  50              C          PUSH    AX
3124                  C  _CLRWIN ENDP
                      C  ;
3124                  C  CLRWND  PROC    FAR
3124  8B C5           C          MOV     AX,BP
3126  2B C4           C          SUB     AX,SP
3128  55              C          PUSH    BP
3129  8B EC           C          MOV     BP,SP
312B  57              C          PUSH    DI
312C  56              C          PUSH    SI
312D  8A 76 0C        C          MOV     DH,[BP+12]
3130  8A 56 0A        C          MOV     DL,[BP+10]
3133  8A 6E 08        C          MOV     CH,[BP+08]
3136  8A 4E 06        C          MOV     CL,[BP+06]
3139  2E: 8A 3E 307E R C         MOV     BH,BYTE PTR CS:COLORS
313E  3D 000A         C          CMP     AX,10
3141  7E 09           C          JLE     CLRW1
3143  80 7E 0E 00     C          CMP     BYTE PTR [BP+14],0
3147  74 03           C          JE      CLRW1
3149  80 F7 77        C          XOR     BH,077H
314C  2E: 83 3E 183C R 00 C CLRW1: CMP   CS:NOFLICK,0
3152  75 1E           C          JNE     CLRW2
```

```
3154  B8 0600              c           MOV      AX,600H
3157  E8 17E8  R           c           CALL     DOBIOS
315A  1E                   c           PUSH     DS
315B  B8 ---- R            c           MOV      AX,BIOS_SEG
315E  8E D8                c           MOV      DS,AX
                           c           ASSUME   DS:BIOS_SEG
3160  A0 0065  R           c           MOV      AL,CRT_MSET
3163  8B 16 0063 R         c           MOV      DX,CRT_ADDR
3167  83 C2 04             c           ADD      DX,4
316A  24 DF                c           AND      AL,0DFH
316C  EE                   c           OUT      DX,AL
316D  1F                   c           POP      DS
                           c           ASSUME   DS:DGROUP
316E  5E                   c  CLRDON:  POP      SI
316F  5F                   c           POP      DI
3170  5D                   c           POP      BP
3171  CB                   c           RET
3172  06                   c  CLRW2:   PUSH     ES
3173  51                   c           PUSH     CX
3174  B9 B800              c           MOV      CX,0B800H
3177  CD 11                c           INT      11H
3179  25 0030              c           AND      AX,30H
317C  3D 0030              c           CMP      AX,30H
317F  75 02                c           JNE      CLRWW1
3181  B5 B0                c           MOV      CH,0B0H
3183  8E C1                c  CLRWW1:  MOV      ES,CX
3185  58                   c           POP      AX
3186  50                   c           PUSH     AX
3187  E8 2D1D R            c           CALL     GETADRS
318A  8B F8                c           MOV      DI,AX
318C  59                   c           POP      CX
318D  8B C3                c           MOV      AX,BX
318F  2A D1                c           SUB      DL,CL
3191  FE C2                c           INC      DL
3193  2A F5                c           SUB      DH,CH
3195  FE C6                c           INC      DH
3197  8A CA                c           MOV      CL,DL
3199  32 ED                c           XOR      CH,CH
319B  8A D6                c           MOV      DL,DH
319D  32 F6                c           XOR      DH,DH
319F  BB 0050              c           MOV      BX,80
31A2  2B D9                c           SUB      BX,CX
31A4  D1 E3                c           SHL      BX,1
31A6  B0 20                c           MOV      AL,20H
                           c           CLD
31A8  FC                   c  CLRW3:   PUSH     CX
31A9  51                   c           REP      STOSW
31AA  F3/ AB                c           POP      CX
31AC  59                   c           ADD      DI,BX
31AD  03 FB                c           DEC      DX
31AF  4A                   c           JNE      CLRW3
31B0  75 F7                c           POP      ES
31B2  07                   c           JMP      CLRDON
31B3  EB B9                c  CLRWND   ENDP
31B5                       c  ;
                           c  CLOSEW   PROC     FAR
31B5                       c           PUSH     BP
31B5  55                   c           MOV      CX,[DI+12]
31B6  8B 4D 0C             c           PUSH     DI
31B9  57                   c           PUSH     ES
31BA  06                   c           MOV      ES,CX
31BB  8E C1                c           MOV      DX,[DI+2]
31BD  8B 55 02             c
```

```
31C0  8B 05              C              MOV     AX,[DI]
31C2  52                 C              PUSH    DX
31C3  50                 C              PUSH    AX
31C4  E8 2D1D R          C              CALL    GETADRS
31C7  8B F0              C              MOV     SI,AX
31C9  BA 03DA            C              MOV     DX,3DAH
31CC  59                 C              POP     CX
31CD  5B                 C              POP     BX
31CE  8B 6D 0C           C              MOV     BP,[DI+12]
31D1  83 C7 0E           C              ADD     DI,14
31D4  F7 C5 0800         C              TEST    BP,800H
31D8  75 02              C              JNE     CW0
31DA  B2 BA              C              MOV     DL,0BAH
31DC  8B C1              C  CW0:        MOV     AX,CX
31DE  50                 C  CW1:        PUSH    AX
31DF  2E: 83 3E 183C R 00  C            CMP     CS:NOFLICK,0
31E5  75 08              C              JNE     CW2B
31E7  EC                 C  CW2:        IN      AL,DX
31E8  A8 01              C              TEST    AL,1
31EA  75 FB              C              JNE     CW2
31EC  FA                 C              CLI
31ED  EC                 C  CW2A:       IN      AL,DX
31EE  A8 01              C              TEST    AL,1
31F0  74 FB              C              JE      CW2A
31F2  8B 05              C  CW2B:       MOV     AX,WORD PTR DS:[DI]
31F4  26: 89 04          C              MOV     WORD PTR ES:[SI],AX
31F7  FB                 C              STI
31F8  83 C7 02           C              ADD     DI,2
31FB  83 C6 02           C              ADD     SI,2
31FE  58                 C              POP     AX
31FF  FE C0              C              INC     AL
3201  3A C3              C              CMP     AL,BL
3203  7E D9              C              JLE     CW1
3205  8A C1              C              MOV     AL,CL
3207  FE C4              C              INC     AH
3209  3A E7              C              CMP     AH,BH
320B  7F 11              C              JG      CW4
320D  8B C8              C              MOV     CX,AX
320F  B8 0050            C              MOV     AX,80
3212  2A C3              C              SUB     AL,BL
3214  02 C1              C              ADD     AL,CL
3216  FE C8              C              DEC     AL
3218  D1 E0              C              SHL     AX,1
321A  03 F0              C              ADD     SI,AX
321C  EB BE              C              JMP     CW0
321E  07                 C  CW4:        POP     ES
321F  5F                 C              POP     DI
3220  8B 55 04           C              MOV     DX,[DI+4]
3223  8B 4D 06           C              MOV     CX,[DI+6]
3226  2E: 8A 3E 2D09 R   C              MOV     BH,CS:SCNUM
322B  57                 C              PUSH    DI
322C  B4 02              C              MOV     AH,2
322E  E8 17E8 R          C              CALL    DOBIOS
3231  2E: 8A 3E 2D09 R   C              MOV     BH,CS:SCNUM
3236  B4 01              C              MOV     AH,1
3238  E8 17E8 R          C              CALL    DOBIOS
323B  5F                 C              POP     DI
323C  8B 45 0A           C              MOV     AX,[DI+10]
323F  2E: A3 307E R      C              MOV     CS:COLORS,AX
3243  33 C0              C              XOR     AX,AX
```

```
3245  5D                         c            POP     BP
3246  CB                         c            RET
3247                             c   CLOSEW   ENDP
                                 c   ;
                                 c            PUBLIC  _PAINT
                                 c   ;
3247                             c   _PAINT   PROC    NEAR
3247  55                         c            PUSH    BP
3248  8B EC                      c            MOV     BP,SP
324A  57                         c            PUSH    DI
324B  56                         c            PUSH    SI
324C  8A 56 08                   c            MOV     DL,[BP+08]
324F  8A 76 0A                   c            MOV     DH,[BP+10]
3252  8A 5E 04                   c            MOV     BL,[BP+04]
3255  8A 7E 06                   c            MOV     BH,[BP+06]
3258  8B 4E 0C                   c            MOV     CX,[BP+12]
325B  06                         c            PUSH    ES
325C  55                         c            PUSH    BP
325D  53                         c            PUSH    BX
325E  B9 B800                    c            MOV     CX,0B800H
3261  CD 11                      c            INT     11H
3263  25 0030                    c            AND     AX,30H
3266  3D 0030                    c            CMP     AX,30H
3269  75 02                      c            JNE     NOPNT1
326B  B5 B0                      c            MOV     CH,0B0H
326D  8E C1                      c   NOPNT1:  MOV     ES,CX
326F  8B E9                      c            MOV     BP,CX
3271  5B                         c            POP     BX
3272  8B C3                      c            MOV     AX,BX
3274  52                         c            PUSH    DX
3275  50                         c            PUSH    AX
3276  E8 2D1D R                  c            CALL    GETADRS
3279  8B F0                      c            MOV     SI,AX
327B  46                         c            INC     SI
327C  BA 03DA                    c            MOV     DX,3DAH
327F  59                         c            POP     CX
3280  5B                         c            POP     BX
3281  F7 C5 0800                 c            TEST    BP,800H
3285  5D                         c            POP     BP
3286  75 02                      c            JNE     PN0
3288  B2 BA                      c            MOV     DL,0BAH
328A  8B C1                      c   PN0:     MOV     AX,CX
328C  50                         c   PN1:     PUSH    AX
328D  53                         c            PUSH    BX
328E  8B 5E 0C                   c            MOV     BX,[BP+12]
3291  2E: 83 3E 183C R 00        c            CMP     CS:NOFLICK,0
3297  75 08                      c            JNE     PN2B
3299  EC                         c   PN2:     IN      AL,DX
329A  A8 01                      c            TEST    AL,1
329C  75 FB                      c            JNE     PN2
329E  FA                         c            CLI
329F  EC                         c   PN2A:    IN      AL,DX
32A0  A8 01                      c            TEST    AL,1
32A2  74 FB                      c            JE      PN2A
32A4  26: 88 1C                  c   PN2B:    MOV     BYTE PTR ES:[SI],BL
32A7  FB                         c            STI
32A8  83 C6 02                   c            ADD     SI,2
32AB  5B                         c            POP     BX
32AC  58                         c            POP     AX
32AD  FE C0                      c            INC     AL
32AF  3A C3                      c            CMP     AL,BL
32B1  7E D9                      c            JLE     PN1
```

```
32B3  8A C1              c              MOV    AL,CL
32B5  FE C6              c              INC    AH
32B7  3A E7              c              CMP    AH,BH
32B9  7F 0F              c              JG     PN4
32BB  8B C8              c              MOV    CX,AX
32BD  B8 004F            c              MOV    AX,79
32C0  2A C3              c              SUB    AL,BL
32C2  02 C1              c              ADD    AL,CL
32C4  D1 E0              c              SHL    AX,1
32C6  03 F0              c              ADD    SI,AX
32C8  EB C0              c              JMP    PN0
32CA  07                 c    PN4:      POP    ES
32CB  5E                 c              POP    SI
32CC  5F                 c              POP    DI
32CD  5D                 c              POP    BP
32CE  33 C0              c              XOR    AX,AX
32D0  C3                 c              RET
32D1                     c    _PAINT    ENDP
                         c    ;
32D1                     c    _MVCUR    PROC   NEAR
32D1  58                 c              POP    AX
32D2  0E                 c              PUSH   CS
32D3  50                 c              PUSH   AX
32D4                     c    _MVCUR    ENDP
                         c    ;
32D4                     c    MVCURF    PROC   FAR
32D4  55                 c              PUSH   BP
32D5  8B EC              c              MOV    BP,SP
32D7  57                 c              PUSH   DI
32D8  56                 c              PUSH   SI
32D9  8A 76 08           c              MOV    DH,[BP+08]
32DC  8A 56 06           c              MOV    DL,[BP+06]
32DF  2E: 8A 3E 2D09 R   c              MOV    BH,CS:SCNUM
32E4  B4 02              c              MOV    AH,2
32E6  E8 17E8 R          c              CALL   DOBIOS
32E9  5E                 c              POP    SI
32EA  5F                 c              POP    DI
32EB  5D                 c              POP    BP
32EC  CB                 c              RET
32ED                     c    MVCURF    ENDP
                         c    ;
32ED  0007               c    LASTCOL DW       7
                         c    ;
32EF                     c    _OUTS     PROC   NEAR
32EF  58                 c              POP    AX
32F0  0E                 c              PUSH   CS
32F1  50                 c              PUSH   AX
32F2                     c    _OUTS     ENDP
                         c    ;
32F2                     c    OUTSF     PROC   FAR
32F2  55                 c              PUSH   BP
32F3  57                 c              PUSH   DI
32F4  56                 c              PUSH   SI
32F5  2E: 8A 3E 2D09 R   c              MOV    BH,CS:SCNUM
32FA  E8 3402 R          c              CALL   GETPOS
32FD  8B C2              c              MOV    AX,DX
32FF  E8 2D1D R          c              CALL   GETADRS
3302  8B CA              c              MOV    CX,DX
3304  8B F8              c              MOV    DI,AX
3306  CD 11              c              INT    11H
3308  8B EC              c              MOV    BP,SP
330A  06                 c              PUSH   ES
```

```
330B  1E                      C            PUSH    DS
330C  25 0030                 C            AND     AX,30H
330F  3D 0030                 C            CMP     AX,30H
3312  B8 8000                 C            MOV     AX,0B000H
3315  BA 03BA                 C            MOV     DX,03BAH
3318  74 04                   C            JE      OUTSF1
331A  B4 B8                   C            MOV     AH,0B8H
331C  B2 DA                   C            MOV     DL,0DAH
331E  8E C0                   C  OUTSF1:   MOV     ES,AX
3320  2E: 8B 1E 307E R        C            MOV     BX,CS:COLORS
3325  80 7E 0A 00             C            CMP     BYTE PTR [BP+10],0
3329  74 03                   C            JE      OUTS4
332B  83 F3 77                C            XOR     BX,77H
332E  32 FF                   C  OUTS4:    XOR     BH,BH
3330  2E: 89 1E 32ED R        C            MOV     WORD PTR CS:LASTCOL,BX
3335  8A E3                   C            MOV     AH,BL
3337  C5 76 0C                C            LDS     SI,[BP+12]
333A  FC                      C            CLD
333B  AC                      C  OUTS1:    LODSB
333C  0A C0                   C            OR      AL,AL
333E  74 1D                   C            JE      OUTS2
3340  2E: 83 3E 183C R 00     C            CMP     CS:NOFLICK,0
3346  75 0F                   C            JNE     OUTS1C
3348  8A D8                   C            MOV     BL,AL
334A  EC                      C  OUTS1A:   IN      AL,DX
334B  A8 01                   C            TEST    AL,1
334D  75 FB                   C            JNE     OUTS1A
334F  FA                      C            CLI
3350  EC                      C  OUTS1B:   IN      AL,DX
3351  A8 01                   C            TEST    AL,1
3353  74 FB                   C            JE      OUTS1B
3355  8A C3                   C            MOV     AL,BL
3357  AB                      C  OUTS1C:   STOSW
3358  FB                      C            STI
3359  FE C1                   C            INC     CL
335B  EB DE                   C            JMP     SHORT OUTS1
335D  8B D1                   C  OUTS2:    MOV     DX,CX
335F  2E: 8A 3E 2D09 R        C            MOV     BH,CS:SCNUM
3363                          C            MOV     AH,2
3364  B4 02                   C            MOV     AH,2
3366  E8 17E8 R               C            CALL    DOBIOS
3369  1F                      C            POP     DS
336A  07                      C            POP     ES
336B  5E                      C            POP     SI
336C  5F                      C            POP     DI
336D  5D                      C            POP     BP
336E  CB                      C            RET
336F                          C  OUTSF     ENDP
                              C  ;
336F                          C  _OUTC     PROC    NEAR
336F  58                      C            POP     AX
3370  0E                      C            PUSH    CS
3371  50                      C            PUSH    AX
3372                          C  _OUTC     ENDP
                              C  ;
3372                          C  OUTCF     PROC    FAR
3372  8B D5                   C            MOV     DX,BP
3374  2B D4                   C            SUB     DX,SP
3376  55                      C            PUSH    BP
3377  8B EC                   C            MOV     BP,SP
3379  57                      C            PUSH    DI
337A  56                      C            PUSH    SI
337B  2E: 8B 1E 32ED R        C            MOV     BX,CS:LASTCOL
3380  D1 EA                   C            SHR     DX,1
```

```
3382  83 FA 03           c            CMP    DX,3
3385  7C 10              c            JL     OUTC3
3387  8A 4E 08           c            MOV    CL,[BP+08]
338A  2E: 8A 1E 307E R   c            MOV    BL,BYTE PTR CS:COLORS
338F  80 F9 00           c            CMP    CL,0
3392  74 03              c            JE     OUTC3
3394  83 F3 77           c            XOR    BX,77H
3397  2E: 89 1E 32ED R   c    OUTC3:  MOV    WORD PTR CS:LASTCOL,BX
339C  2E: 8A 3E 2D09 R   c            MOV    BH,CS:SCNUM
33A1  8B 46 06           c    OUTC1:  MOV    AX,[BP+06]
33A4  B4 09              c            MOV    AH,9
33A6  B9 0001            c            MOV    CX,1
33A9  E8 17E8 R          c            CALL   DOBIOS
33AC  E8 3402 R          c            CALL   GETPOS
33AF  FE C2              c            INC    DL
33B1  80 FA 4F           c            CMP    DL,4FH
33B4  7C 04              c            JL     OUTC4
33B6  32 D2              c            XOR    DL,DL
33B8  FE C6              c            INC    DH
33BA  B4 02              c    OUTC4:  MOV    AH,2
33BC  E8 17E8 R          c            CALL   DOBIOS
33BF  5E                 c            POP    SI
33C0  5F                 c            POP    DI
33C1  5D                 c            POP    BP
33C2  CB                 c            RET
33C3                     c    OUTCF   ENDP
                         c    ;
33C3                     c    _INKEY  PROC   NEAR
33C3  58                 c            POP    AX
33C4  0E                 c            PUSH   CS
33C5  50                 c            PUSH   AX
33C6                     c    _INKEY  ENDP
                         c    ;
33C6                     c    INKEYF  PROC   FAR
33C6  55                 c            PUSH   BP
33C7  56                 c            PUSH   SI
33C8  57                 c            PUSH   DI
33C9  FB                 c            STI
33CA  33 C0              c            XOR    AX,AX
33CC  9C                 c            PUSHF
33CD  FA                 c            CLI
33CE  9A 21E5 ---- R     c            CALL   FAR PTR IBMI16
33D3  5F                 c            POP    DI
33D4  5E                 c            POP    SI
33D5  5D                 c            POP    BP
33D6  CB                 c            RET
33D7                     c    INKEYF  ENDP
                         c    ;
                         c            PUBLIC _CHECKEY
                         c    ;
33D7                     c    _CHECKEY PROC  NEAR
33D7  58                 c            POP    AX
33D8  0E                 c            PUSH   CS
33D9  50                 c            PUSH   AX
33DA                     c    _CHECKEY ENDP
                         c    ;
33DA                     c    CHECFAR PROC   FAR
33DA  9C                 c            PUSHF
33DB  55                 c            PUSH   BP
33DC  8B EC              c            MOV    BP,SP
33DE  56                 c            PUSH   SI
33DF  83 7E 08 00        c            CMP    WORD PTR [BP+08],0
33E3  74 03              c            JE     CHKEY2
```

```
33E5  E8 23E2 R        C         CALL    TRY2POP
33E8  1E               C CHKEY2: PUSH    DS
33E9  B8 ---- R        C         MOV     AX,BIOS_SEG
33EC  8E D8            C         MOV     DS,AX
                       C         ASSUME  DS:BIOS_SEG
33EE  33 C0            C         XOR     AX,AX
33F0  FA               C         CLI
33F1  8B 36 001A R     C         MOV     SI,[BUFFER_HEAD]
33F5  3B 36 001C R     C         CMP     SI,[BUFFER_TAIL]
33F9  74 02            C         JE      CHKEY1
33FB  8B 04            C         MOV     AX,WORD PTR DS:[SI]
33FD  1F               C CHKEY1: POP     DS
                       C         ASSUME  DS:DGROUP
33FE  5E               C         POP     SI
33FF  5D               C         POP     BP
3400  9D               C         POPF
3401  CB               C         RET
3402                   C CHECFAR ENDP
                       C ;
                       C         PUBLIC  GETPOS
                       C ;
3402                   C GETPOS  PROC    NEAR
3402  1E               C         PUSH    DS
3403  51               C         PUSH    CX
3404  50               C         PUSH    AX
3405  B8 ---- R        C         MOV     AX,BIOS_SEG
3408  8E D8            C         MOV     DS,AX
                       C         ASSUME  DS:BIOS_SEG
340A  8B 16 0063 R     C         MOV     DX,DS:[CRT_ADDR]
340E  8B 0E 004A R     C         MOV     CX,DS:[CRT_COLS]
3412  B0 0E            C         MOV     AL,0EH
3414  EE               C         OUT     DX,AL
3415  EB 00            C         JMP     $+2
3417  42               C         INC     DX
3418  EC               C         IN      AL,DX
3419  8A E0            C         MOV     AH,AL
341B  4A               C         DEC     DX
341C  B0 0F            C         MOV     AL,0FH
341E  EE               C         OUT     DX,AL
341F  EB 00            C         JMP     $+2
3421  42               C         INC     DX
3422  EC               C         IN      AL,DX
3423  8B 16 004E R     C         MOV     DX,DS:[CRT_START]
3427  D1 EA            C         SHR     DX,1
3429  2B C2            C         SUB     AX,DX
342B  33 D2            C         XOR     DX,DX
342D  F7 F1            C         DIV     CX
342F  8A F0            C         MOV     DH,AL
3431  58               C         POP     AX
3432  59               C         POP     CX
3433  1F               C         POP     DS
                       C         ASSUME  DS:DGROUP
3434  C3               C         RET
3435                   C GETPOS  ENDP
                       C ;
3435                   C _GETCP  PROC    NEAR
3435  58               C         POP     AX
3436  0E               C         PUSH    CS
3437  50               C         PUSH    AX
3438                   C _GETCP  ENDP
                       C ;
3438                   C GETCPF  PROC    FAR
3438  55               C         PUSH    BP
```

```
3439  56                    C           PUSH    SI
343A  57                    C           PUSH    DI
343B  2E: 8A 3E 2D09 R      C           MOV     BH,CS:SCNUM
3440  B4 03                 C           MOV     AH,3
3442  E8 17E8 R             C           CALL    DOBIOS
3445  E8 3402 R             C           CALL    GETPOS
3448  8A C6                 C           MOV     AL,DH
344A  32 E4                 C           XOR     AH,AH
344C  32 F6                 C           XOR     DH,DH
344E  8B EC                 C           MOV     BP,SP
3450  8B 7E 0A              C           MOV     DI,[BP+10]
3453  36: 89 15             C           MOV     WORD PTR SS:[DI],DX
3456  8B 7E 0C              C           MOV     DI,[BP+12]
3459  36: 89 05             C           MOV     WORD PTR SS:[DI],AX
345C  5F                    C           POP     DI
345D  5E                    C           POP     SI
345E  5D                    C           POP     BP
345F  CB                    C           RET
3460                        C  GETCPF   ENDP
                            C  ;
                            C           PUBLIC  _CUROFF
                            C  ;
3460                        C  _CUROFF  PROC    NEAR
3460  58                    C           POP     AX
3461  0E                    C           PUSH    CS
3462  50                    C           PUSH    AX
3463                        C  _CUROFF  ENDP
                            C  ;
3463                        C  CUROFFF  PROC    FAR
3463  55                    C           PUSH    BP
3464  56                    C           PUSH    SI
3465  57                    C           PUSH    DI
3466  B4 01                 C           MOV     AH,1
3468  B9 2627               C           MOV     CX,2627H
346B  E8 17E8 R             C           CALL    DOBIOS
346E  5F                    C           POP     DI
346F  5E                    C           POP     SI
3470  5D                    C           POP     BP
3471  CB                    C           RET
3472                        C  CUROFFF  ENDP
                            C  ;
                            C           PUBLIC  _CURON
                            C  ;
3472                        C  _CURON   PROC    NEAR
3472  58                    C           POP     AX
3473  0E                    C           PUSH    CS
3474  50                    C           PUSH    AX
3475                        C  _CURON   ENDP
                            C  ;
3475                        C  CURONF   PROC    FAR
3475  55                    C           PUSH    BP
3476  57                    C           PUSH    DI
3477  56                    C           PUSH    SI
3478  CD 11                 C           INT     11H
347A  25 0030               C           AND     AX,30H
347D  3D 0030               C           CMP     AX,30H
3480  B4 01                 C           MOV     AH,1
3482  B9 0607               C           MOV     CX,607H
3485  75 03                 C           JNE     CURON1
3487  B9 0A0B               C           MOV     CX,0A0BH
348A  E8 17E8 R             C  CURON1:  CALL    DOBIOS
348D  5E                    C           POP     SI
```

```
348E  5F            c           POP     DI
348F  5D            c           POP     BP
3490  CB            c           RET
3491                c   CURONF  ENDP
                    c   ;
                    c           PUBLIC  SOUND
                    c   ;
3491                c   SOUND   PROC    NEAR
3491  9C            c           PUSHF
3492  50            c           PUSH    AX
3493  51            c           PUSH    CX
3494  53            c           PUSH    BX
3495  52            c           PUSH    DX
3496  FA            c           CLI
3497  BB 6000       c           MOV     BX,6000H
349A  54            c           PUSH    SP
349B  58            c           POP     AX
349C  3B C4         c           CMP     AX,SP
349E  74 02         c           JE      SOUND0
34A0  B6 20         c           MOV     DH,20H
34A2  B8 0086       c   SOUND0: MOV     AX,10110110B
34A5  E6 43         c           OUT     43H,AL
34A7  EB 00         c           JMP     SHORT $+2
34A9  8B C3         c           MOV     AX,BX
34AB  E6 42         c           OUT     42H,AL
34AD  EB 00         c           JMP     SHORT $+2
34AF  8A C4         c           MOV     AL,AH
34B1  E6 42         c           OUT     42H,AL
34B3  E4 61         c           IN      AL,61H
34B5  0C 03         c           OR      AL,3
34B7  E6 61         c           OUT     61H,AL
34B9  B9 8000       c           MOV     CX,8000H
34BC  E2 FE         c   SOUND3: LOOP    SOUND3
34BE  E4 61         c           IN      AL,61H
34C0  EB 00         c           JMP     SHORT $+2
34C2  24 FC         c           AND     AL,0FCH
34C4  E6 61         c           OUT     61H,AL
34C6  B8 0086       c           MOV     AX,10110110B
34C9  E6 43         c           OUT     43H,AL
34CB  EB 00         c           JMP     SHORT $+2
34CD  B8 0533       c           MOV     AX,533H
34D0  E6 42         c           OUT     42H,AL
34D2  EB 00         c           JMP     SHORT $+2
34D4  8A C4         c           MOV     AL,AH
34D6  E6 42         c           OUT     42H,AL
34D8  5A            c           POP     DX
34D9  5B            c           POP     BX
34DA  59            c           POP     CX
34DB  58            c           POP     AX
34DC  9D            c           POPF
34DD  C3            c           RET
34DE                c   SOUND   ENDP
                    c   ;
                    c           PUBLIC  SOUND1
                    c   ;
34DE                c   SOUND1  PROC    NEAR
34DE  9C            c           PUSHF
34DF  50            c           PUSH    AX
34E0  51            c           PUSH    CX
34E1  53            c           PUSH    BX
34E2  52            c           PUSH    DX
34E3  FA            c           CLI
34E4  BB 6000       c           MOV     BX,6000H
```

```
34E7  BA 5000         C            MOV    DX,5000H
34EA  54              C            PUSH   SP
34EB  58              C            POP    AX
34EC  3B C4           C            CMP    AX,SP
34EE  74 02           C            JE     S1UND0
34F0  B6 20           C            MOV    DH,20H
34F2  B8 0086         C  S1UND0:   MOV    AX,101101108
34F5  E6 43           C            OUT    43H,AL
34F7  EB 00           C            JMP    SHORT $+2
34F9  8B C3           C            MOV    AX,BX
34FB  E6 42           C            OUT    42H,AL
34FD  EB 00           C            JMP    SHORT $+2
34FF  8A C4           C            MOV    AL,AH
3501  E6 42           C            OUT    42H,AL
3503  E4 61           C            IN     AL,61H
3505  0C 03           C            OR     AL,3
3507  E6 61           C            OUT    61H,AL
3509  8B CA           C            MOV    CX,DX
350B  E2 FE           C  S1UND3:   LOOP   S1UND3
350D  D1 EB           C            SHR    BX,1
350F  73 E1           C            JNC    S1UND0
3511  E4 61           C            IN     AL,61H
3513  EB 00           C            JMP    SHORT $+2
3515  24 FC           C            AND    AL,0FCH
3517  E6 61           C            OUT    61H,AL
3519  B8 0086         C            MOV    AX,101101108
351C  E6 43           C            OUT    43H,AL
351E  EB 00           C            JMP    SHORT $+2
3520  B8 0533         C            MOV    AX,533H
3523  E6 42           C            OUT    42H,AL
3525  EB 00           C            JMP    SHORT $+2
3527  8A C4           C            MOV    AL,AH
3529  E6 42           C            OUT    42H,AL
352B  5A              C            POP    DX
352C  5B              C            POP    BX
352D  59              C            POP    CX
352E  58              C            POP    AX
352F  9D              C            POPF
3530  C3              C            RET
3531                  C  SOUND1    ENDP
                      C  ;
                      C  ;
                      C  ;
3531                  C  _BEEP     PROC   NEAR
3531  9A 3537 ---- R  C            CALL   FAR PTR BEEPF
3536  C3              C            RET
3537                  C  _BEEP     ENDP
                      C  ;
3537                  C  BEEPF     PROC   FAR
3537  50              C            PUSH   AX
3538  1E              C            PUSH   DS
3539  B8 ---- R       C            MOV    AX,DGROUP
353C  8E D8           C            MOV    DS,AX
353E  B8 0086         C            MOV    AX,101101108
3541  E6 43           C            OUT    43H,AL
3543  EB 00           C            JMP    SHORT $+2
3545  B8 0533         C            MOV    AX,533H
3548  E6 42           C            OUT    42H,AL
354A  EB 00           C            JMP    SHORT $+2
354C  8A C4           C            MOV    AL,AH
354E  E6 42           C            OUT    42H,AL
3550  E4 61           C            IN     AL,61H
3552  EB 00           C            JMP    SHORT $+2
```

```
3554  OC 03           c              OR       AL,3
3556  E6 61           c              OUT      61H,AL
3558  B9 8000         c              MOV      CX,8000H
355B  E2 FE           c    BEEP1:    LOOP     BEEP1
355D  E8 356E R       c              CALL     _BEEPOFF
3560  1F              c              POP      DS
3561  58              c              POP      AX
3562  CB              c              RET
3563                  c    BEEPF     ENDP
                      c    ;
                      c              PUBLIC   BEEPON
                      c    ;
3563                  c    BEEPON    PROC     NEAR
3563  50              c              PUSH     AX
3564  E4 61           c              IN       AL,61H
3566  EB 00           c              JMP      SHORT $+2
3568  OC 03           c              OR       AL,3
356A  E6 61           c              OUT      61H,AL
356C  58              c              POP      AX
356D  C3              c              RET
356E                  c    BEEPON    ENDP
                      c    ;
                      c    ;
                      c              PUBLIC   _BEEPOFF
                      c    ;
356E                  c    _BEEPOFF  PROC     NEAR
356E  50              c              PUSH     AX
356F  E4 61           c              IN       AL,61H
3571  EB 00           c              JMP      SHORT $+2
3573  24 FC           c              AND      AL,0FCH
3575  E6 61           c              OUT      61H,AL
3577  58              c              POP      AX
3578  C3              c              RET
3579                  c    _BEEPOFF  ENDP
                      c    ;
3579  0000            c    INBIOS    DW       0
                      c    ;
                      c              PUBLIC   _DSKBUSY
                      c    ;
357B                  c    _DSKBUSY  PROC     NEAR
357B  58              c              POP      AX
357C  0E              c              PUSH     CS
357D  50              c              PUSH     AX
357E                  c    _DSKBUSY  ENDP
                      c    ;
357E                  c    DSKBUF    PROC     FAR
357E  1E              c              PUSH     DS
357F  53              c              PUSH     BX
3580  0E              c              PUSH     CS
3581  1F              c              POP      DS
                      c              ASSUME   DS:PGROUP
3582  A1 1821 R       c              MOV      AX,DOSFLG
3585  0B 06 1823 R    c              OR       AX,DSKFLG
3589  0B 06 3579 R    c              OR       AX,INBIOS
358D  C5 1E 1825 R    c              LDS      BX,DOS_CRIT
3591  0A 07           c              OR       AL,BYTE PTR DS:[BX]
                      c
                      c    IFDEF    NETWORK_VERSION
3593  2E: 8B 1E 00AE R  c            MOV      BX,CS:[NETLOG]
3598  2E: 0B 1E 00B0 R  c            OR       BX,CS:[NETLOG+2]
359D  74 0E           c              JE       @F
359F  2E: C5 1E 00B6 R  c            LDS      BX,DWORD PTR CS:[INNET]
35A4  0B 07           c              OR       AX,WORD PTR DS:[BX]
```

```
35A6  2E: C5 1E 00B2 R    C           LDS     BX,DWORD PTR CS:[INPOST]
35AB  0B 07               C           OR      AX,WORD PTR DS:[BX]
35AD                      C @@:
                          C ENDIF
                          C
                          C           ASSUME  DS:DGROUP
35AD  5B                  C DSKB3:    POP     BX
35AE  1F                  C           POP     DS
35AF  CB                  C           RET
35B0                      C DSKBUF    ENDP
                          C ;
                          C           PUBLIC  _SETCOLOR
                          C
35B0                      C _SETCOLOR PROC    NEAR
35B0  55                  C           PUSH    BP
35B1  8B EC               C           MOV     BP,SP
35B3  8B 46 04            C           MOV     AX,[BP+04]
35B6  2E: A3 307E R       C           MOV     CS:COLORS,AX
35BA  5D                  C           POP     BP
35BB  C3                  C           RET
35BC                      C _SETCOLOR ENDP
                          C ;
                          C           EXTRN   _MENU:NEAR
                          C ;
35BC                      C FMENU     PROC    FAR
35BC  E9 0000 E           C           JMP     _MENU
35BF                      C FMENU     ENDP
                          C ;
                          C           PUBLIC  MYBRK
                          C ;
35BF                      C MYBRK     PROC    FAR
35BF  CF                  C           IRET
35C0                      C MYBRK     ENDP
                          C ;
                          C ;******************* END OF INCLUDE FILE ***************************;
                          C ;
                          C ;
                          C ;
                            ;*********************************************************************;
                            ;
35C0  00                    FATCOD    DB      0
                            ;
                                      PUBLIC  FABRT
                            ;
                                      EXTRN   _FATHAND:NEAR
                            ;
35C1                        FABRT     PROC    FAR
35C1  87 D5                           XCHG    DX,BP
35C3  87 CF                           XCHG    CX,DI
35C5  E8 02E2 R                       CALL    PUSHR
35C8  2E: 8B 1E 1291 R                MOV     BX,CS:MYDSEG
35CD  8E DB                           MOV     DS,BX
35CF  8E C3                           MOV     ES,BX
35D1  FF 06 0028 R                    INC     _ACTIVE
35D5  FB                              STI
35D6  8B EC                           MOV     BP,SP
35D8  56                              PUSH    SI
35D9  52                              PUSH    DX
35DA  50                              PUSH    AX
35DB  51                              PUSH    CX
35DC  E8 0000 E                       CALL    _FATHAND
35DF  8B E5                           MOV     SP,BP
35E1  FA                              CLI
```

```
35E2  2E: A2 35C0 R              MOV       CS:FATCOD,AL
35E6  FF 0E 0028 R               DEC       _ACTIVE
35EA  3D 0002                    CMP       AX,2
35ED  E8 02F4 R                  CALL      POPR
35F0  74 09                      JE        FATAB1
35F2  87 D5                      XCHG      DX,BP
35F4  87 CF                      XCHG      CX,DI
35F6  2E: A0 35C0 R              MOV       AL,CS:FATCOD
35FA  CF                         IRET
35FB  83 C4 08         FATAB1:   ADD       SP,08H
35FE  FB                         STI
35FF  5B                         POP       BX
3600  59                         POP       CX
3601  5A                         POP       DX
3602  5E                         POP       SI
3603  5F                         POP       DI
3604  5D                         POP       BP
3605  1F                         POP       DS
3606  07                         POP       ES
3607  B4 19                      MOV       AH,19H
3609  CD 21                      INT       21H
360B  E8 3531 R                  CALL      _BEEP
360E  B8 FFFF                    MOV       AX,0FFFFH
3611  F9                         STC
3612  CA 0002                    RET       2
3615             FABRT  ENDP
                 ;
                        PUBLIC   _FATDEV
                 ;
3615             _FATDEV PROC    NEAR
3615  55                         PUSH      BP
3616  8B EC                      MOV       BP,SP
3618  57                         PUSH      DI
3619  56                         PUSH      SI
361A  1E                         PUSH      DS
361B  06                         PUSH      ES
361C  FF 76 04                   PUSH      [BP+04]
361F  1F                         POP       DS
3620  8B 76 06                   MOV       SI,[BP+06]
3623  83 C6 0A                   ADD       SI,10
3626  2E: 8E 06 1291 R           MOV       ES,CS:MYDSEG
362B  BF 4F06 R                  MOV       DI,OFFSET DEVNAM
362E  B9 0008                    MOV       CX,8
3631  FC                         CLD
3632  F3/ A4                     REP MOVSB
3634  E8 17DA R                  CALL      GGROUP
3637  BE 4F06 R                  MOV       SI,OFFSET DEVNAM
363A  1E                         PUSH      DS
363B  56                         PUSH      SI
363C  33 C0                      XOR       AX,AX
363E  50                         PUSH      AX
363F  E8 32EF R                  CALL      _OUTS
3642  58                         POP       AX
3643  58                         POP       AX
3644  58                         POP       AX
3645  07                         POP       ES
3646  1F                         POP       DS
3647  5E                         POP       SI
3648  5F                         POP       DI
3649  5D                         POP       BP
364A  C3                         RET
```

```
364B                         _FATDEV  ENDP
                                ;
                                      PUBLIC  _HROFF
                                ;
364B                         _HROFF   PROC
364B  55                              PUSH    BP
364C  57                              PUSH    DI
364D  56                              PUSH    SI
364E  1E                              PUSH    DS
364F  06                              PUSH    ES
3650  E8 2143 R                       CALL    RSETEM
3653  B8 ---- R                       MOV     AX,PGROUP
3656  8E D8                           MOV     DS,AX
3658  BA 1888 R                       MOV     DX,OFFSET PGROUP:MSFUN
365B  B8 2521                         MOV     AX,2521H
365E  CD 21                           INT     21H
3660  07                              POP     ES
3661  1F                              POP     DS
3662  5E                              POP     SI
3663  5F                              POP     DI
3664  5D                              POP     BP
3665  C3                              RET
3666                         _HROFF   ENDP
                                ;
                                      PUBLIC  SETEM
                                ;
3666                         SETEM    PROC    FAR
3666  9C                              PUSHF
3667  E8 02E2 R                       CALL    PUSHR
                                      ASSUME  DS:PGROUP
366A  B8 ---- R                       MOV     AX,PGROUP
366D  8E D8                           MOV     DS,AX
366F  BE 008E R                       MOV     SI,OFFSET PGROUP:INTTBL
3672  E8 36AC R                       CALL    SETEM1
3675  2E: 8E 1E 1291 R                MOV     DS,CS:MYDSEG
                                      ASSUME  DS:DGROUP
367A  83 3E 0020 R 00                 CMP     _EMMAVAIL,0
367F  74 0D                           JE      SETEM3
3681  B8 ---- R                       MOV     AX,PGROUP
3684  8E D8                           MOV     DS,AX
                                      ASSUME  DS:PGROUP
3686  BA 0147 R                       MOV     DX,OFFSET NEW167
3689  B8 2567                         MOV     AX,2567H
368C  CD 21                           INT     21H
368E  2E: 83 3E 1844 R 00   SETEM3:   CMP     CS:ISEGA,0
3694  74 11                           JE      SETEM6
3696  B8 ---- R                       MOV     AX,BIOS_SEG
3699  8E D8                           MOV     DS,AX
                                      ASSUME  DS:BIOS_SEG
369B  C7 06 00A8 R 1A16 R             MOV     WORD PTR DS:[CRT_SAV_PTR],OFFSET DGROUP:EGASAVE
36A1  C7 06 00AA R ---- R             MOV     WORD PTR DS:[CRT_SAV_PTR+2],DGROUP
36A7  E8 02F4 R            SETEM6:    CALL    POPR
36AA  9D                              POPF
36AB  CB                   SETEM4:    RETF
36AC  AC                   SETEM1:    LODSB
36AD  3C FF                           CMP     AL,0FFH
36AF  74 11                           JE      SETEM5
36B1  B4 25                           MOV     AH,25H
36B3  8B 54 02                        MOV     DX,DS:[SI+2]
36B6  83 FA 00                        CMP     DX,0
36B9  74 02                           JE      SETEM2
36BB  CD 21                           INT     21H
```

```
368D  83 C6 04              SETEM2:  ADD    SI,4
36C0  EB EA                          JMP    SETEM1
36C2  C3                    SETEM5:  RETN
                                     ASSUME DS:DGROUP
36C3                        SETEM    ENDP
                            ;
36C3  00                    RFLG     DB     0
                            ;
                                     PUBLIC _ROLLOUT
                            ;
36C4                        _ROLLOUT PROC   NEAR
36C4  2E: C6 06 36C3 R 00            MOV    CS:RFLG,0
36CA  FA                             CLI
36CB  2E: 8E 1E 1291 R      ROLDON:  MOV    DS,CS:HYDSEG
36D0  E8 0A63 R                      CALL   SAVINTS
36D3  EB 03                          JMP    SHORT ROLL2
36D5  E9 37F4 R             ROLLEJ:  JMP    ROLLER
36D8  8B 1E 0008 R          ROLL2:   MOV    BX,_PSP
36DC  03 1E 000A R                   ADD    BX,_HLEN
36E0  8E C3                 ROL2B:   MOV    ES,BX
36E2  26: C6 06 0000 5A              MOV    BYTE PTR ES:[0],5AH
36E8  A1 000C R                      MOV    AX,_MAXPARA
36EB  2B C3                          SUB    AX,BX
36ED  48                             DEC    AX
36EE  26: A3 0003                    MOV    WORD PTR ES:[3],AX
36F2  33 C0                          XOR    AX,AX
36F4  26: A3 0001                    MOV    WORD PTR ES:[1],AX
36F8  E8 17DA R             ROL2A:   CALL   GGROUP
36FB  C7 06 0028 R 0001              MOV    _ACTIVE,1
3701  E8 2143 R                      CALL   RSETEM
3704  8B 1E 0008 R                   MOV    BX,_PSP
3708  8E C3                          MOV    ES,BX
370A  B4 50                          MOV    AH,50H
370C  CD 21                          INT    21H
370E  2E: 8E 1E 1291 R               MOV    DS,CS:HYDSEG
3713  BA 20C4 R                      MOV    DX,OFFSET SOFCB
3716  B4 10                          MOV    AH,10H
3718  CD 21                          INT    21H
371A  BA 0000 E                      MOV    DX,OFFSET _SWAPNAME
371D  B4 41                          MOV    AH,41H
371F  CD 21                          INT    21H
3721  26: FF 36 002C                 PUSH   ES:[2CH]
3726  B4 49                          MOV    AH,49H
3728  CD 21                          INT    21H
372A  72 A9                          JC     ROLLEJ
372C  07                             POP    ES
372D  B4 49                          MOV    AH,49H
372F  CD 21                          INT    21H
3731  72 A2                          JC     ROLLEJ
3733  2E: 8B 16 009C R               MOV    DX,CS:EMMHAND
3738  83 FA FF                       CMP    DX,-1
373B  74 05                          JE     ROLLO
373D  B4 45                          MOV    AH,45H
373F  E8 025F R                      CALL   DOEMM
3742  BB 2222 R             ROLLO:   MOV    BX,OFFSET DGROUP:_DBLK
3745  E8 17DA R                      CALL   GGROUP
3748  80 3F 00              ROLL1:   CMP    BYTE PTR DS:[BX],0
374B  74 5C                          JE     ROLL3
374D  80 7F 62 00                    CMP    [BX].XRUN,0
3751  75 07                          JNE    ROLL4
```

```
3753  8B 57 43                      MOV      DX,[BX].EMMHNDL
3756  B4 45                         MOV      AH,45H
3758  CD 67                         INT      67H
375A  8A 57 2B        ROLL4:        MOV      DL,DS:[BX].EMMCHN
375D  80 FA FF        ROLL1C:       CMP      DL,0FFH
3760  74 28                         JE       ROLL1A
3762  32 F6                         XOR      DH,DH
3764  8B FA                         MOV      DI,DX
3766  D1 E7                         SHL      DI,1
3768  8A 8D 1A32 R                  MOV      CL,_EMMTBL[DI].NEXT
376C  B4 45                         MOV      AH,45H
376E  CD 67                         INT      67H
3770  0A E4                         OR       AH,AH
3772  74 12                         JE       @F
3774  3B 57 43                      CMP      DX,DS:[BX].EMMHNDL
3777  74 0D                         JE       @F
3779  80 FC 86                      CMP      AH,86H
377C  75 08                         JNE      @F
377E  B4 48                         MOV      AH,48H
3780  CD 67                         INT      67H
3782  B4 45                         MOV      AH,45H
3784  CD 67                         INT      67H
3786  8A D1           @@:           MOV      DL,CL
3788  EB D3                         JMP      ROLL1C
378A  80 BF 0096 00   ROLL1A:       CMP      BYTE PTR DS:[BX].TSRFCB,0
378F  74 0E                         JE       ROLL1B
3791  80 7F 15 00                   CMP      DS:[BX].INMEM,0
3795  75 08                         JNE      ROLL1B
3797  8D 97 0096                    LEA      DX,DS:[BX].TSRFCB
379B  B4 10                         MOV      AH,10H
379D  CD 21                         INT      21H
379F  81 C3 00E5      ROLL1B:       ADD      BX,SIZE TSR
37A3  81 FB 387F R                  CMP      BX,OFFSET DGROUP:_DBLKEM
37A7  72 9F                         JB       ROLL1
37A9  B8 0002         ROLL3:        MOV      AX,2
37AC  CD 10                         INT      10H
37AE  BA 4F0F R                     MOV      DX,OFFSET DGROUP:ROLMESS
37B1  2E: 8E 1E 1291 R              MOV      DS,CS:MYDSEG
37B6  B4 09                         MOV      AH,9
37B8  CD 21                         INT      21H
37BA  E8 17DA R                     CALL     GGROUP
37BD  8B 1E 0008 R                  MOV      BX,_PSP
37C1  8E C3                         MOV      ES,BX
37C3  B4 50                         MOV      AH,50H
37C5  CD 21                         INT      21H
37C7  2E: 83 3E 00AA R 00           CMP      CS:GENIN,0
37CD  75 19                         JNE      BOTTLE
37CF  2E: A1 00B0 R                 MOV      AX,CS:NETLOG+2
37D3  2E: 0B 06 00AE R              OR       AX,NETLOG
37D8  74 05                         JE       @F
37DA  2E: FF 2E 00BA R              JMP      DWORD PTR CS:[NETOUT]

37DF  B8 4C00         @@:           MOV      AX,4C00H
37E2  CD 21                         INT      21H
37E4  F9                            STC
37E5  07                            POP      ES
37E6  1F                            POP      DS
37E7  CF                            IRET
37E8  B8 5757         BOTTLE:       MOV      AX,5757H
37EB  33 D2                         XOR      DX,DX
37ED  8B DA                         MOV      BX,DX
37EF  4B                            DEC      BX
37F0  8E C3                         MOV      ES,BX
37F2  CD 21                         INT      21H
```

```
37F4  2E: 80 3E 36C3 R 00    ROLLER: CMP     RFLG,0
37FA  75 04                          JNE     STOPIT
37FC  F8                             CLC
37FD  07                             POP     ES
37FE  1F                             POP     DS
37FF  CF                             IRET
3800  BA 4F2C R              STOPIT: MOV     DX,OFFSET DGROUP:ROLM1
3803  2E: 8E 1E 1291 R               MOV     DS,CS:MYDSEG
3808  B4 09                          MOV     AH,9
380A  CD 21                          INT     21H
380C  FB                             STI
380D  E9 24AF R                      JMP     _DOCAD
3810                          _ROLLOUT ENDP
                              ;
                                     PUBLIC  _GETTICK
                              ;
3810                          _GETTICK PROC  NEAR
3810  33 C0                          XOR     AX,AX
3812  CD 1A                          INT     1AH
3814  8A E0                          MOV     AH,AL
3816  03 C2                          ADD     AX,DX
3818  C3                             RET
3819                          _GETTICK ENDP
                              ;
3819                          _TEXT   ENDS
                              ;
                                     END
```

Macros:

| Name | Lines |
|---|---|
| EMM_RESTORE_STATE | 3 |
| EMM_SAVE_STATE | 3 |
| MUL3 | 3 |
| SETC | 2 |
| SETINT | 4 |

Structures and Records:

| Name | Width Shift | # fields Width | Mask | Initial |
|---|---|---|---|---|
| DESCRIPT | 0008 | 0005 | | |
| LIMIT | 0000 | | | |
| BASELO | 0002 | | | |
| BASEHI | 0004 | | | |
| ACCESS | 0005 | | | |
| EFCB | 0007 | 0003 | | |
| EXTEND | 0000 | | | |
| ATTRIB | 0006 | | | |
| EXPTBL | 0002 | 0002 | | |
| NEXT | 0000 | | | |
| PREV | 0001 | | | |
| FCB | 0025 | 000B | | |
| DRIVE | 0000 | | | |
| FNAME | 0001 | | | |
| FEXT | 0009 | | | |
| BLOCK | 000C | | | |
| RECSIZ | 000E | | | |
| FILSIZ | 0010 | | | |
| FDATE | 0014 | | | |

| | | |
|---|---|---|
| RESERV . . . . . . . . . . . . . | 0016 | |
| RELREC . . . . . . . . . . . . . | 0020 | |
| RRECLOW . . . . . . . . . . . | 0021 | |
| RRECHI . . . . . . . . . . . . | 0023 | |
| MCB . . . . . . . . . . . . . . . | 0040 | 000E |
| MCB_COMMAND . . . . . . . . . . | 0000 | |
| MCB_RETCODE . . . . . . . . . . | 0001 | |
| MCB_LSN . . . . . . . . . . . | 0002 | |
| MCB_NUM . . . . . . . . . . . | 0003 | |
| MCB_BUFFER . . . . . . . . . . | 0004 | |
| MCB_LENGTH . . . . . . . . . . | 0008 | |
| MCB_CALLNAME . . . . . . . . . | 000A | |
| MCB_NAME . . . . . . . . . . . | 001A | |
| MCB_RTO . . . . . . . . . . . | 002A | |
| MCB_STO . . . . . . . . . . . | 002B | |
| MCB_POST . . . . . . . . . . . | 002C | |
| MCB_LANA_NUM . . . . . . . . . | 0030 | |
| MCB_CMD_CPLT . . . . . . . . . | 0031 | |
| MCB_RESERVED . . . . . . . . . | 0032 | |
| MYMCB . . . . . . . . . . . . . | 004E | 0008 |
| OLDMCB . . . . . . . . . . . . | 0000 | |
| MMCB_LOC . . . . . . . . . . . | 0040 | |
| MMCB_INUSE . . . . . . . . . . | 0044 | |
| MMCB_TSRNUM . . . . . . . . . | 0045 | |
| MMCB_COUNT . . . . . . . . . . | 0047 | |
| MMCB_POSTED . . . . . . . . . | 0049 | |
| MMCB_POSTAX . . . . . . . . . | 004A | |
| MMCB_BLOCKS . . . . . . . . . | 004C | |
| SWAPINT . . . . . . . . . . . . | 0013 | 0013 |
| SWAP0 . . . . . . . . . . . . | 0000 | |
| SWAP5 . . . . . . . . . . . . | 0001 | |
| SWAP8 . . . . . . . . . . . . | 0002 | |
| SWAP9 . . . . . . . . . . . . | 0003 | |
| SWAPB . . . . . . . . . . . . | 0004 | |
| SWAPC . . . . . . . . . . . . | 0005 | |
| SWAPF . . . . . . . . . . . . | 0006 | |
| SWAP10 . . . . . . . . . . . . | 0007 | |
| SWAP14 . . . . . . . . . . . . | 0008 | |
| SWAP16 . . . . . . . . . . . . | 0009 | |
| SWAP16A . . . . . . . . . . . | 000A | |
| SWAP17 . . . . . . . . . . . . | 000B | |
| SWAP21 . . . . . . . . . . . . | 000C | |
| SWAP28 . . . . . . . . . . . . | 000D | |
| SWAP2A . . . . . . . . . . . . | 000E | |
| SWAPNET . . . . . . . . . . . | 000F | |
| SWAPU1 . . . . . . . . . . . . | 0010 | |
| SWAPU2 . . . . . . . . . . . . | 0011 | |
| SWAPU3 . . . . . . . . . . . . | 0012 | |
| TSR . . . . . . . . . . . . . . | 00E5 | 0029 |
| TSRNAME . . . . . . . . . . . | 0000 | |
| INMEM . . . . . . . . . . . . | 0015 | |
| KEY . . . . . . . . . . . . . | 0016 | |
| SHIFTS . . . . . . . . . . . . | 0020 | |
| KEYSON . . . . . . . . . . . | 002A | |
| EMMCHN . . . . . . . . . . . | 002B | |
| APPSEQ . . . . . . . . . . . | 002C | |
| BATCHP . . . . . . . . . . . | 002D | |
| BATCHFL . . . . . . . . . . . | 002F | |
| DOSSTRT . . . . . . . . . . . | 0030 | |
| FIRSTP . . . . . . . . . . . | 0031 | |
| CYCLE . . . . . . . . . . . . | 0033 | |
| PAGES . . . . . . . . . . . . | 0035 | |
| LASTP . . . . . . . . . . . . | 0037 | |

| Name | Address |
|---|---|
| SWPSEG | 0039 |
| XFERADD | 003B |
| LOCALS | 003F |
| EMMHNDL | 0043 |
| EMMOUTN | 0045 |
| TEXT | 0047 |
| ISTSR | 0048 |
| ISGENIE | 0049 |
| OUTRECL | 004A |
| OUTRECH | 004C |
| TSRPSP | 004E |
| TSRDTA | 0050 |
| ESAVLOC | 0054 |
| CONSOLE | 0058 |
| PINMEM | 005C |
| POSTSEG | 005E |
| POSTNXT | 0060 |
| XRUN | 0062 |
| IDLECNT | 0063 |
| AT_LOW | 0065 |
| AT_HIGH | 0067 |
| COUNT | 0069 |
| RESET | 007C |
| TSRFEXT | 008F |
| TSRFCB | 0096 |
| SWPNAME | 00BB |
| INIDIC | 00E3 |

Segments and Groups:

| Name | Length | Align | Combine | Class |
|---|---|---|---|---|
| BIOS_SEG | 0101 | AT | 0040 | |
| DGROUP | GROUP | | | |
| _DATA | 4F67 | WORD | PUBLIC | 'DATA' |
| CONST | 0000 | WORD | PUBLIC | 'CONST' |
| _BSS | 0000 | WORD | PUBLIC | 'BSS' |
| FGROUP | GROUP | | | |
| BOTTOM | 0000 | BYTE | PUBLIC | 'MGT' |
| IPAGE_SEG | 0074 | AT | 0000 | |
| MTR_SEG | E05B | AT | F000 | |
| PGROUP | GROUP | | | |
| _TEXT | 3819 | PARA | PUBLIC | 'CODE' |
| INIT | 0000 | PARA | PUBLIC | 'CODE' |
| STACK | 0FFC | PARA | STACK | 'STACK' |
| STRINGS_GROUP | GROUP | | | |
| STRINGS_CONST | 0000 | WORD | PUBLIC | 'FAR_DATA' |
| STRINGS_BSS | 0000 | WORD | PUBLIC | 'FAR_DATA' |
| STRINGS | 0000 | WORD | PUBLIC | 'FAR_DATA' |

Symbols:

| Name | Type | Value | Attr | |
|---|---|---|---|---|
| AFTRSHFT | L BYTE | 252A | _TEXT | Global |
| ALT_INPUT | L BYTE | 0019 | BIOS_SEG | |
| ANULL | L BYTE | 000A | _TEXT | Global |
| APSWAP | L NEAR | 0000 | _TEXT | External |
| BEEP1 | L NEAR | 355B | _TEXT | |
| BEEPF | F PROC | 3537 | _TEXT | Length = 002C |
| BEEPON | N PROC | 3563 | _TEXT | Global Length = 0008 |
| BINDST | L QWORD | 4E48 | _DATA | Global |

| | | | | | |
|---|---|---|---|---|---|
| BINHAND | . . . . . . . . . . . . . . | L QWORD | 4E30 | _DATA | Global |
| BINSRC | . . . . . . . . . . . . . . | L QWORD | 4E40 | _DATA | Global |
| BIOS_TIME | . . . . . . . . . . . . | L DWORD | 006C | BIOS_SEG | |
| BORDRB | . . . . . . . . . . . . . | L NEAR | 2DE9 | _TEXT | |
| BORDRD | . . . . . . . . . . . . . | L NEAR | 2E39 | _TEXT | |
| BORDRL | . . . . . . . . . . . . . | L NEAR | 2DB1 | _TEXT | |
| BORDRV | . . . . . . . . . . . . . | F PROC | 2D39 | _TEXT | Length = 0104 |
| BOTDST | . . . . . . . . . . . . . | L QWORD | 4E18 | _DATA | Global |
| BOTHAND | . . . . . . . . . . . . | L QWORD | 4E00 | _DATA | Global |
| BOTSRC | . . . . . . . . . . . . . | L QWORD | 4E10 | _DATA | Global |
| BOTTLE | . . . . . . . . . . . . . | L NEAR | 37E8 | _TEXT | |
| BRD1 | . . . . . . . . . . . . . . . | L NEAR | 2D5A | _TEXT | |
| BSAVBUF | . . . . . . . . . . . . | L BYTE | 4937 | _DATA | Global Length = 04C8 |
| BSEND | . . . . . . . . . . . . . . | L BYTE | 4DFF | _DATA | Global |
| BUFFER_HEAD | . . . . . . . . . | L WORD | 001A | BIOS_SEG | |
| BUFFER_TAIL | . . . . . . . . . | L WORD | 001C | BIOS_SEG | |
| BUFFPTR | . . . . . . . . . . . . | L WORD | 2D0C | _TEXT | Global |
| BUFOFF | . . . . . . . . . . . . . | L WORD | 2D0A | _TEXT | Global |
| CCOMLIN | . . . . . . . . . . . . | L BYTE | 1BED | _TEXT | Length = 0050 |
| CFCB0 | . . . . . . . . . . . . . . | V BYTE | 0000 | _DATA | External |
| CFCB1 | . . . . . . . . . . . . . . | V BYTE | 0000 | _DATA | External |
| CHECFAR | . . . . . . . . . . . . | F PROC | 33DA | _TEXT | Length = 0028 |
| CHKEY1 | . . . . . . . . . . . . . | L NEAR | 33FD | _TEXT | |
| CHKEY2 | . . . . . . . . . . . . . | L NEAR | 33E8 | _TEXT | |
| CHKS0 | . . . . . . . . . . . . . . | L NEAR | 1283 | _TEXT | |
| CHKS1 | . . . . . . . . . . . . . . | L NEAR | 1286 | _TEXT | |
| CHKS1A | . . . . . . . . . . . . . | L NEAR | 12CD | _TEXT | |
| CHKS1B | . . . . . . . . . . . . . | L NEAR | 12DF | _TEXT | |
| CHKS1C | . . . . . . . . . . . . . | L NEAR | 138E | _TEXT | |
| CHKS3 | . . . . . . . . . . . . . . | L NEAR | 12A7 | _TEXT | |
| CHKSX | . . . . . . . . . . . . . . | L NEAR | 12A6 | _TEXT | |
| CLOSEIT | . . . . . . . . . . . . | L NEAR | 0000 | _TEXT | External |
| CLOSEV | . . . . . . . . . . . . . | F PROC | 31B5 | _TEXT | Global Length = 0092 |
| CLRDON | . . . . . . . . . . . . . | L NEAR | 316E | _TEXT | |
| CLRGON | . . . . . . . . . . . . . | L NEAR | 1FB3 | _TEXT | |
| CLRNV1 | . . . . . . . . . . . . . | L NEAR | 3183 | _TEXT | |
| CLRV1 | . . . . . . . . . . . . . . | L NEAR | 314C | _TEXT | |
| CLRV2 | . . . . . . . . . . . . . . | L NEAR | 3172 | _TEXT | |
| CLRV3 | . . . . . . . . . . . . . . | L NEAR | 31A9 | _TEXT | |
| CLRWND | . . . . . . . . . . . . . | F PROC | 3124 | _TEXT | Length = 0091 |
| COLORS | . . . . . . . . . . . . . | L WORD | 307E | _TEXT | Global |
| COMB1 | . . . . . . . . . . . . . . | L NEAR | 27BC | _TEXT | |
| COMB2 | . . . . . . . . . . . . . . | L NEAR | 280A | _TEXT | |
| COMB3 | . . . . . . . . . . . . . . | L NEAR | 27CF | _TEXT | |
| COMB4 | . . . . . . . . . . . . . . | L NEAR | 27F6 | _TEXT | |
| COMB5 | . . . . . . . . . . . . . . | L NEAR | 27A3 | _TEXT | |
| COMBINT | . . . . . . . . . . . . | F PROC | 2790 | _TEXT | Global Length = 007B |
| COMC1 | . . . . . . . . . . . . . . | L NEAR | 2837 | _TEXT | |
| COMC3 | . . . . . . . . . . . . . . | L NEAR | 284A | _TEXT | |
| COMC4 | . . . . . . . . . . . . . . | L NEAR | 2871 | _TEXT | |
| COMC5 | . . . . . . . . . . . . . . | L NEAR | 281E | _TEXT | |
| COMCINT | . . . . . . . . . . . . | F PROC | 2808 | _TEXT | Global Length = 0068 |
| CONSTR | . . . . . . . . . . . . . | L BYTE | 4F5F | _DATA | |
| CPARBLK | . . . . . . . . . . . . | L WORD | 1BDF | _TEXT | |
| CRT_ADDR | . . . . . . . . . . . | L WORD | 0063 | BIOS_SEG | |
| CRT_CMOD | . . . . . . . . . . . | L WORD | 0060 | BIOS_SEG | |
| CRT_COLS | . . . . . . . . . . . | L WORD | 004A | BIOS_SEG | |
| CRT_CURSES | . . . . . . . . . . | L WORD | 0050 | BIOS_SEG | Length = 0008 |
| CRT_INFO | . . . . . . . . . . . | L BYTE | 0087 | BIOS_SEG | |
| CRT_INFO_3 | . . . . . . . . . . | L BYTE | 0088 | BIOS_SEG | |
| CRT_LEN | . . . . . . . . . . . . | L WORD | 004C | BIOS_SEG | |
| CRT_MODE | . . . . . . . . . . . | L BYTE | 0049 | BIOS_SEG | |

| Symbol | Type | Addr | Segment | Attributes |
|---|---|---|---|---|
| CRT_MSET | L BYTE | 0065 | BIOS_SEG | |
| CRT_PAGE | L BYTE | 0062 | BIOS_SEG | |
| CRT_PALETTE | L BYTE | 0066 | BIOS_SEG | |
| CRT_POINTS | L WORD | 0085 | BIOS_SEG | |
| CRT_RFLSG | L WORD | 0072 | BIOS_SEG | |
| CRT_ROWS | L BYTE | 0084 | BIOS_SEG | |
| CRT_SAV_PTR | L DWORD | 00A8 | BIOS_SEG | |
| CRT_START | L WORD | 004E | BIOS_SEG | |
| CRT_STATUS_B | L BYTE | 0100 | BIOS_SEG | |
| CUROFFF | F PROC | 3463 | _TEXT | Length = 000F |
| CURON1 | L NEAR | 348A | _TEXT | |
| CURONF | F PROC | 3475 | _TEXT | Length = 001C |
| CV0 | L NEAR | 31DC | _TEXT | |
| CV2A | L NEAR | 31ED | _TEXT | |
| CV2B | L NEAR | 31F2 | _TEXT | |
| CV4 | L NEAR | 321E | _TEXT | |
| CVDSK | L NEAR | 2F34 | _TEXT | |
| CVEND | L NEAR | 2F2E | _TEXT | |
| CVT1 | L NEAR | 31DE | _TEXT | |
| CVT2 | L NEAR | 31E7 | _TEXT | |
| DCONPTR | L WORD | 0096 | _TEXT | Global |
| DEVNAM | L BYTE | 4F06 | _DATA | Length = 0009 |
| DEX1 | L NEAR | 031B | _TEXT | |
| DEX2 | L NEAR | 033E | _TEXT | |
| DEX2A | L NEAR | 0351 | _TEXT | |
| DEX5 | L NEAR | 035D | _TEXT | |
| DEX6 | L NEAR | 038B | _TEXT | |
| DEXERR | L NEAR | 0313 | _TEXT | |
| DIN1 | L NEAR | 03B4 | _TEXT | |
| DIN1A | L NEAR | 03D5 | _TEXT | |
| DIN2 | L NEAR | 03FC | _TEXT | |
| DIN3 | L NEAR | 03F3 | _TEXT | |
| DIN4 | L NEAR | 042D | _TEXT | |
| DINERR | L NEAR | 03AF | _TEXT | |
| DINF1 | L NEAR | 0490 | _TEXT | |
| DINF1A | L NEAR | 0498 | _TEXT | |
| DINF2 | L NEAR | 04C1 | _TEXT | |
| DINF3 | L NEAR | 0465 | _TEXT | |
| DINF4 | L NEAR | 0475 | _TEXT | |
| DINF5 | L NEAR | 04A3 | _TEXT | |
| DINFL | L NEAR | 0441 | _TEXT | Global |
| DISKIN | N PROC | 039F | _TEXT | Global Length = 0136 |
| DISKOUT | N PROC | 04D5 | _TEXT | Global Length = 0140 |
| DISKX | N PROC | 0303 | _TEXT | Global Length = 009C |
| DOBIOS | N PROC | 17E8 | _TEXT | Global Length = 0008 |
| DODOS | N PROC | 17E0 | _TEXT | Global Length = 0008 |
| DOEX1 | L NEAR | 0283 | _TEXT | |
| DOENN | N PROC | 025F | _TEXT | Global Length = 0083 |
| DOENNE | L NEAR | 0286 | _TEXT | |
| DOENNL | L NEAR | 02E0 | _TEXT | |
| DOI17 | N PROC | 2915 | _TEXT | Global Length = 0013 |
| DOMOUSE | N PROC | 151B | _TEXT | Global Length = 0008 |
| DOSCON | L WORD | 0092 | _TEXT | Global |
| DOSFLG | L WORD | 1821 | _TEXT | Global |
| DOS_CRIT | L DWORD | 1825 | _TEXT | Global |
| DOS_ERR | L DWORD | 1829 | _TEXT | Global |
| DOT1 | L NEAR | 04EA | _TEXT | |
| DOT1A | L NEAR | 050B | _TEXT | |
| DOT2 | L NEAR | 0537 | _TEXT | |
| DOT3 | L NEAR | 052B | _TEXT | |
| DOT4 | L NEAR | 0568 | _TEXT | |
| DOTERR | L NEAR | 04E5 | _TEXT | |

| | | | | | |
|---|---|---|---|---|---|
| DOTF1 | L NEAR | 05C7 | _TEXT | | |
| DOTF1A | L NEAR | 05CF | _TEXT | | |
| DOTF2 | L NEAR | 0601 | _TEXT | | |
| DOTF3 | L NEAR | 05A0 | _TEXT | | |
| DOTF4 | L NEAR | 05A9 | _TEXT | | |
| DOTF5 | L NEAR | 05DA | _TEXT | | |
| DOTFL | L NEAR | 057C | _TEXT | Global | |
| DSKB3 | L NEAR | 35AD | _TEXT | | |
| DSKBUF | F PROC | 357E | _TEXT | Length = 0032 | |
| DSKFLG | L WORD | 1823 | _TEXT | Global | |
| DTIMER | L BYTE | 2529 | _TEXT | | |
| DUMMY | L WORD | 1394 | _TEXT | | |
| DUMMYR | F PROC | 2317 | _TEXT | Global | Length = 0001 |
| DWBSIZ | NUMBER | 1000 | | | |
| DWBUFF | L BYTE | 0038 | _DATA | Global | Length = 1002 |
| EBDASEG | L WORD | 1835 | _TEXT | Global | |
| EBDDRVR | L DWORD | 1837 | _TEXT | Global | |
| EGAMEM | L WORD | 1846 | _TEXT | Global | |
| EGAPAL | L BYTE | 20E9 | _DATA | Global | Length = 0020 |
| EGASAVE | L DWORD | 1A16 | _DATA | Global | Length = 0007 |
| EMFUN | L WORD | 024C | _TEXT | | |
| EMMER1 | L BYTE | 4E9F | _DATA | | |
| EMMER2 | L BYTE | 4EBC | _DATA | | |
| EMMERR | L BYTE | 4E60 | _DATA | | |
| EMMFR | L WORD | 00A0 | _TEXT | Global | |
| EMMHAND | L WORD | 009C | _TEXT | Global | |
| EQUIPMENT | L WORD | 0010 | BIOS_SEG | | |
| ERRABT | N PROC | 023E | _TEXT | Global | Length = 000E |
| EX10 | L NEAR | 08F6 | _TEXT | | |
| EX11 | L NEAR | 0902 | _TEXT | | |
| EX11A | L NEAR | 0913 | _TEXT | | |
| EX12 | L NEAR | 0952 | _TEXT | | |
| EXINUSE | L WORD | 084B | _TEXT | | |
| EX00 | L NEAR | 086F | _TEXT | | |
| EX01 | L NEAR | 087B | _TEXT | | |
| EX01A | L NEAR | 088C | _TEXT | | |
| EX02 | L NEAR | 08CB | _TEXT | | |
| EXTIN | N PROC | 08D4 | _TEXT | Global | Length = 0087 |
| EXTIOK | L NEAR | 08DE | _TEXT | | |
| EXTOOK | L NEAR | 0857 | _TEXT | | |
| EXTOUT | N PROC | 084D | _TEXT | Global | Length = 0087 |
| EXTRTN1 | N PROC | 07EA | _TEXT | Global | Length = 001D |
| EXTRTN2 | N PROC | 0807 | _TEXT | Global | Length = 0044 |
| EXTVGA | L WORD | 1850 | _TEXT | Global | |
| EXTX | N PROC | 095B | _TEXT | Global | Length = 0106 |
| EXTXOK | L NEAR | 0965 | _TEXT | | |
| EXX0 | L NEAR | 09A5 | _TEXT | | |
| EXX1 | L NEAR | 09B1 | _TEXT | | |
| EXX1A | L NEAR | 09C2 | _TEXT | | |
| EXX1B | L NEAR | 09CC | _TEXT | | |
| EXX2 | L NEAR | 0A58 | _TEXT | | |
| EXX4 | L NEAR | 0A4B | _TEXT | | |
| EXX5 | L NEAR | 0A02 | _TEXT | | |
| FABRT | F PROC | 35C1 | _TEXT | Global | Length = 0054 |
| FATAB1 | L NEAR | 35FB | _TEXT | | |
| FATBUF | L BYTE | 2109 | _DATA | Length = 0118 | |
| FATCOD | L BYTE | 35C0 | _TEXT | | |
| FEEDIT | L NEAR | 2592 | _TEXT | | |
| FLUSH1 | L NEAR | 2E98 | _TEXT | | |
| FMENU | F PROC | 35BC | _TEXT | Length = 0003 | |

| | | | | |
|---|---|---|---|---|
| GDISPE | L NEAR | 2125 | _TEXT | |
| GDSP0 | L NEAR | 2077 | _TEXT | |
| GDSP1 | L NEAR | 2070 | _TEXT | |
| GDSP2 | L NEAR | 2104 | _TEXT | |
| GDSP3A | L NEAR | 200C | _TEXT | |
| GDSP3B | L NEAR | 20C8 | _TEXT | |
| GENDISJ | L NEAR | 204D | _TEXT | |
| GENDISP | F PROC | 1FB7 | _TEXT | Global Length = 018C |
| GENFLG | L WORD | 00A8 | _TEXT | Global |
| GENFUN | L WORD | 207C | _DATA | |
| GENIE | L NEAR | 1F31 | _TEXT | Global |
| GENIE1 | L NEAR | 1F38 | _TEXT | |
| GENIE2 | L NEAR | 1F35 | _TEXT | |
| GENIE3 | L NEAR | 1F77 | _TEXT | |
| GENIE4 | L NEAR | 1F7F | _TEXT | |
| GENIN | L WORD | 00AA | _TEXT | Global |
| GENJMP | L NEAR | 1912 | _TEXT | |
| GENNAME | L BYTE | 1F3A | _DATA | Global Length = 0016 |
| GENROLL | F PROC | 1FB6 | _TEXT | Global Length = 0001 |
| GETADRS | N PROC | 2D1D | _TEXT | Global Length = 0019 |
| GETCON | L NEAR | 0000 | _TEXT | External |
| GETCPF | F PROC | 3438 | _TEXT | Length = 0028 |
| GETCSPEC | L NEAR | 0000 | _TEXT | External |
| GETPOS | N PROC | 3402 | _TEXT | Global Length = 0033 |
| GF10ERR | L NEAR | 1BD6 | _TEXT | |
| GF11A | L NEAR | 1D68 | _TEXT | |
| GF11B | L NEAR | 1D2E | _TEXT | |
| GF11EJ | L NEAR | 1C70 | _TEXT | |
| GF11ERR | L NEAR | 1DEF | _TEXT | |
| GF11EX | L NEAR | 1D7F | _TEXT | |
| GF11EY | L NEAR | 1D90 | _TEXT | |
| GF11SE | L NEAR | 1DD8 | _TEXT | |
| GF12ERR | L NEAR | 1E46 | _TEXT | |
| GF13ERR | L NEAR | 1E80 | _TEXT | |
| GF17A | L NEAR | 1ECA | _TEXT | |
| GF17E | L NEAR | 1EF5 | _TEXT | |
| GF17EN | L NEAR | 1F02 | _TEXT | |
| GF17N | L NEAR | 1EEF | _TEXT | |
| GFN10A | L NEAR | 1BDC | _TEXT | |
| GFN10B | L NEAR | 1BCC | _TEXT | |
| GFN10C | L NEAR | 1B71 | _TEXT | |
| GFN10D | L NEAR | 1BB3 | _TEXT | |
| GFNEND | L NEAR | 1B28 | _TEXT | |
| GFTBL | L WORD | 1F50 | _DATA | Global Length = 0096 |
| GFUN0 | L NEAR | 1A22 | _TEXT | |
| GFUN1 | L NEAR | 1A25 | _TEXT | |
| GFUN10 | L NEAR | 1B67 | _TEXT | Global |
| GFUN11 | L NEAR | 1C3F | _TEXT | Global |
| GFUN12 | L NEAR | 1E07 | _TEXT | |
| GFUN13 | L NEAR | 1E52 | _TEXT | |
| GFUN14 | L NEAR | 1E9D | _TEXT | |
| GFUN15 | L NEAR | 1EA3 | _TEXT | |
| GFUN16 | L NEAR | 1EB1 | _TEXT | |
| GFUN17 | L NEAR | 1EBF | _TEXT | |
| GFUN18 | L NEAR | 1F08 | _TEXT | |
| GFUN2 | L NEAR | 1A36 | _TEXT | |
| GFUN3 | L NEAR | 1A44 | _TEXT | Global |
| GFUN3A | L NEAR | 1A4C | _TEXT | |
| GFUN3B | L NEAR | 1A62 | _TEXT | |
| GFUN3C | L NEAR | 1AA0 | _TEXT | |
| GFUN3D | L NEAR | 1AB0 | _TEXT | |
| GFUN3E | L NEAR | 1AC9 | _TEXT | |
| GFUN3F | L NEAR | 1AF7 | _TEXT | |

| | | | | |
|---|---|---|---|---|
| GFUN4 . . . . . . . . . . . . . . | L NEAR | 1811 | _TEXT | |
| GFUN5 . . . . . . . . . . . . . . | L NEAR | 182E | _TEXT | |
| GFUN6 . . . . . . . . . . . . . . | L NEAR | 1838 | _TEXT | |
| GFUN7 . . . . . . . . . . . . . . | L NEAR | 1843 | _TEXT | |
| GFUN8 . . . . . . . . . . . . . . | L NEAR | 1850 | _TEXT | |
| GFUN9 . . . . . . . . . . . . . . | L NEAR | 1855 | _TEXT | |
| GFUN9A . . . . . . . . . . . . . | L NEAR | 1865 | _TEXT | |
| GFUNTBL . . . . . . . . . . . . | L WORD | 1862 | _TEXT | Global |
| GGROUP . . . . . . . . . . . . . | N PROC | 17DA | _TEXT | Global  Length = 0006 |
| HRDNOS . . . . . . . . . . . . . | L NEAR | 137D | _TEXT | |
| HRDSWP . . . . . . . . . . . . . | N PROC | 1293 | _TEXT | Global  Length = 0100 |
| HRSTART . . . . . . . . . . . . | L NEAR | 0000 | _TEXT | External |
| I09FLG . . . . . . . . . . . . . . | WORD | 0008 | | |
| I13FLG . . . . . . . . . . . . . . | WORD | 0001 | | |
| I14FLG . . . . . . . . . . . . . . | WORD | 0020 | | |
| I16A3 . . . . . . . . . . . . . . . | L NEAR | 2315 | _TEXT | |
| I16B . . . . . . . . . . . . . . . . | L NEAR | 22C1 | _TEXT | |
| I16C . . . . . . . . . . . . . . . . | L NEAR | 22B9 | _TEXT | |
| I16C1 . . . . . . . . . . . . . . . | L NEAR | 22BC | _TEXT | |
| I16CJ . . . . . . . . . . . . . . . | L NEAR | 2313 | _TEXT | |
| I16D . . . . . . . . . . . . . . . . | L NEAR | 22E2 | _TEXT | |
| I16D2 . . . . . . . . . . . . . . . | L NEAR | 25A9 | _TEXT | |
| I16D3 . . . . . . . . . . . . . . . | L NEAR | 22FE | _TEXT | |
| I16D4 . . . . . . . . . . . . . . . | L NEAR | 2308 | _TEXT | |
| I16HORN . . . . . . . . . . . . . | L NEAR | 2247 | _TEXT | |
| I16NZ . . . . . . . . . . . . . . . | L NEAR | 223E | _TEXT | |
| I17FLG . . . . . . . . . . . . . . | WORD | 0010 | | |
| I17NJ . . . . . . . . . . . . . . . | L NEAR | 2ACE | _TEXT | |
| I17HORN . . . . . . . . . . . . . | L NEAR | 2B3A | _TEXT | |
| I17SFL . . . . . . . . . . . . . . | L WORD | 295B | _TEXT | Global |
| I17TRY . . . . . . . . . . . . . . | L NEAR | 2AEE | _TEXT | |
| I17Z . . . . . . . . . . . . . . . . | L NEAR | 2AE9 | _TEXT | |
| I25FLG . . . . . . . . . . . . . . | WORD | 0002 | | |
| I26FLG . . . . . . . . . . . . . . | WORD | 0004 | | |
| IBM116 . . . . . . . . . . . . . . | F PROC | 21E5 | _TEXT | Global  Length = 0132 |
| IBMU3A . . . . . . . . . . . . . | L NEAR | 2E4C | _TEXT | |
| IBMU3B . . . . . . . . . . . . . | L NEAR | 2E63 | _TEXT | |
| IBMU3C . . . . . . . . . . . . . | L NEAR | 2E6E | _TEXT | |
| IBMUND . . . . . . . . . . . . . | L NEAR | 2E76 | _TEXT | |
| IDLEMIN . . . . . . . . . . . . . | L WORD | 00A4 | _TEXT | Global |
| INBIOS . . . . . . . . . . . . . . | L WORD | 3579 | _TEXT | |
| INFUN10 . . . . . . . . . . . . . | L WORD | 185C | _TEXT | |
| INI17 . . . . . . . . . . . . . . . | L WORD | 2AB7 | _TEXT | Global |
| INKEYF . . . . . . . . . . . . . . | F PROC | 33C6 | _TEXT | Length = 0011 |
| INKYD . . . . . . . . . . . . . . . | L WORD | 462C | _DATA | Global |
| INNET . . . . . . . . . . . . . . . | L WORD | 0086 | _TEXT | Global |
| INPOST . . . . . . . . . . . . . . | L WORD | 0082 | _TEXT | Global |
| INPRINT . . . . . . . . . . . . . | L WORD | 295D | _TEXT | Global |
| INSWAP . . . . . . . . . . . . . | L WORD | 0A61 | _TEXT | Global |
| INTTBL . . . . . . . . . . . . . . | L BYTE | 008E | _TEXT | Global |
| IS8087 . . . . . . . . . . . . . . | L WORD | 185E | _TEXT | Global |
| ISEBDA . . . . . . . . . . . . . . | L WORD | 1852 | _TEXT | Global |
| ISEGA . . . . . . . . . . . . . . . | L WORD | 1844 | _TEXT | Global |
| ISHERC . . . . . . . . . . . . . . | L WORD | 184C | _TEXT | Global |
| ISMCGA . . . . . . . . . . . . . | L WORD | 184A | _TEXT | Global |
| ISMOUSE . . . . . . . . . . . . | L WORD | 184E | _TEXT | Global |
| ISPS2 . . . . . . . . . . . . . . . | L WORD | 1854 | _TEXT | Global |
| ISVGA . . . . . . . . . . . . . . . | L WORD | 1848 | _TEXT | Global |
| KBHIT . . . . . . . . . . . . . . . | L BYTE | 1530 | _TEXT | Global |
| KBIEND . . . . . . . . . . . . . . | L BYTE | 1A16 | _DATA | Global |

| | | | | |
|---|---|---|---|---|
| KBIHEAD | L WORD | 19FE | _DATA | Global |
| KBINTON | N PROC | 1162 | _TEXT | Length = 0000 |
| KBITAIL | L WORD | 1A00 | _DATA | Global |
| KBIUFF | L WORD | 1A02 | _DATA | Global Length = 000A |
| KBRSS | L WORD | 1831 | _TEXT | |
| KBSKIP | L BYTE | 1532 | _TEXT | |
| KB_BUFFER | L WORD | 001E | BIOS_SEG | Length = 0010 |
| KB_BUFFER_END | L WORD | 003E | BIOS_SEG | |
| KB_FLAG | L BYTE | 0017 | BIOS_SEG | |
| KB_FLAG_1 | L BYTE | 0018 | BIOS_SEG | |
| KB_INT | L WORD | 0024 | IPAGE_SEG | |
| | | | | |
| LASTCOL | L WORD | 32ED | _TEXT | |
| LASTX | L BYTE | 4630 | _DATA | Global |
| LCFLG | L BYTE | 13A6 | _TEXT | |
| LCHAR | L WORD | 13A2 | _TEXT | |
| LITTLEX | N PROC | 0A93 | _TEXT | Global Length = 0088 |
| LOCSTK | L WORD | 3C80 | _DATA | Global |
| LTLX0 | L NEAR | 0AB9 | _TEXT | |
| LTLX0A | L NEAR | 0AB2 | _TEXT | |
| LTLX1 | L NEAR | 0AC7 | _TEXT | |
| LTLX1A | L NEAR | 0AD6 | _TEXT | |
| LTLX1B | L NEAR | 0AD9 | _TEXT | |
| LTLX2 | L NEAR | 0AE7 | _TEXT | |
| LTLX2A | L NEAR | 0AF7 | _TEXT | |
| LTLX2B | L NEAR | 0AFA | _TEXT | |
| LTLX3 | L NEAR | 0B0E | _TEXT | |
| | | | | |
| MDEND | L BYTE | 462C | _DATA | Global |
| MDSTK | L BYTE | 4482 | _DATA | Global Length = 01AA |
| MOUSE | L BYTE | 1520 | _TEXT | Global |
| MOVEI1 | L NEAR | 06DC | _TEXT | |
| MOVEIN | L NEAR | 06DA | _TEXT | |
| MSEBUF | L BYTE | 1E38 | _DATA | Length = 0100 |
| MSF2X1 | L NEAR | 188D | _TEXT | |
| MSF2X2 | L NEAR | 18FC | _TEXT | |
| MSF2X3 | L NEAR | 18F7 | _TEXT | |
| MSFN2X | L NEAR | 18AE | _TEXT | |
| MSFNWA | L NEAR | 1991 | _TEXT | |
| MSFUN | F PROC | 1888 | _TEXT | Global Length = 070F |
| MSFUN2 | L NEAR | 1903 | _TEXT | |
| MSFUN3 | L NEAR | 1A0C | _TEXT | Global |
| MSFUN7 | L NEAR | 19BE | _TEXT | |
| MSFUNB | L NEAR | 1971 | _TEXT | |
| MSFUNV | L NEAR | 1989 | _TEXT | |
| MSFUNW | L NEAR | 1982 | _TEXT | |
| MSFUNX | L NEAR | 1982 | _TEXT | |
| MSFUNY | L NEAR | 19D4 | _TEXT | |
| MSFY0 | L NEAR | 19F3 | _TEXT | |
| MSFY1 | L NEAR | 19CF | _TEXT | |
| MTR_RESET | L FAR | E05B | MTR_SEG | |
| MVCURF | F PROC | 32D4 | _TEXT | Length = 0019 |
| MYBEND | L BYTE | 187A | _DATA | Global |
| MYBHEAD | L WORD | 1076 | _DATA | Global |
| MYBRK | F PROC | 35BF | _TEXT | Global Length = 0001 |
| MYBTAIL | L WORD | 1078 | _DATA | Global |
| MYBUFF | L WORD | 107A | _DATA | Global Length = 0400 |
| MYDOS | L NEAR | 0000 | _TEXT | External |
| MYDSEG | L WORD | 1291 | _TEXT | Global |
| MYDSP | L WORD | 4633 | _DATA | Global |
| MYDSS | L WORD | 4635 | _DATA | Global |
| MYSHIFT | L BYTE | 1E37 | _DATA | Global |

| | | | | | |
|---|---|---|---|---|---|
| M67A2 | L NEAR | 0194 | _TEXT | | |
| M67ALL | L NEAR | 015C | _TEXT | | |
| M67D1 | L NEAR | 0204 | _TEXT | | |
| M67D2 | L NEAR | 0218 | _TEXT | | |
| M67D3 | L NEAR | 0221 | _TEXT | | |
| M67DAL | L NEAR | 01C4 | _TEXT | | |
| M67DO1 | L NEAR | 015B | _TEXT | | |
| M67DON | L NEAR | 01C3 | _TEXT | | |
| M67END | L NEAR | 01C0 | _TEXT | | |
| M67JMP | L NEAR | 0155 | _TEXT | | |
| M67RAL | L NEAR | 0223 | _TEXT | | |
| NETLOG | L WORD | 00AE | _TEXT | Global | |
| NETOUT | L WORD | 00BA | _TEXT | Global | |
| NETWORK_VERSION | NUMBER | 0001 | | | |
| NEW15A | L NEAR | 2CFE | _TEXT | | |
| NEWC1 | L NEAR | 1B09 | _TEXT | | |
| NEWCPM | F PROC | 17F0 | _TEXT | Global | Length = 001C |
| NEWI13 | N PROC | 24C4 | _TEXT | Global | Length = 001E |
| NEWI14 | N PROC | 2B3F | _TEXT | Global | Length = 005B |
| NEWI15 | F PROC | 2CF4 | _TEXT | Global | Length = 0015 |
| NEWI17 | N PROC | 2ABA | _TEXT | Global | Length = 0085 |
| NEWI25 | N PROC | 24E2 | _TEXT | Global | Length = 001C |
| NEWI26 | N PROC | 24FE | _TEXT | Global | Length = 001C |
| NEWI28 | N PROC | 2BC0 | _TEXT | Global | Length = 0055 |
| NEWI5 | N PROC | 2B9A | _TEXT | Global | Length = 0055 |
| NEWI67 | F PROC | 0147 | _TEXT | Global | Length = 00F7 |
| NEWUD11 | N PROC | 2BEF | _TEXT | Global | Length = 0057 |
| NEWUD12 | N PROC | 2C46 | _TEXT | Global | Length = 0057 |
| NEWUD13 | N PROC | 2C9D | _TEXT | Global | Length = 0057 |
| NOAUX | L NEAR | 2445 | _TEXT | | |
| NOAUX1 | L NEAR | 2478 | _TEXT | | |
| NOFEED | L NEAR | 25C3 | _TEXT | | |
| NOFEED1 | L NEAR | 25C9 | _TEXT | | |
| NOFLICK | L WORD | 183C | _TEXT | Global | |
| NOKBFL | L WORD | 00AC | _TEXT | Global | |
| NOKBSND | L NEAR | 152F | _TEXT | | |
| NOP2J | L NEAR | 2A0C | _TEXT | | |
| NOPNT1 | L NEAR | 326D | _TEXT | | |
| NOPRT | L NEAR | 2A69 | _TEXT | | |
| NOPRT1 | L NEAR | 2A9D | _TEXT | | |
| NOPRT2 | L NEAR | 2A95 | _TEXT | | |
| NOSLAVE | L NEAR | 237E | _TEXT | | |
| NOT1 | L NEAR | 272F | _TEXT | | |
| NOTIME | L NEAR | 2706 | _TEXT | | |
| NOWAIT | L NEAR | 1517 | _TEXT | | |
| NSFUN3 | L NEAR | 1926 | _TEXT | | |
| NULL | L WORD | 0000 | _DATA | | |
| NUMFUN | NUMBER | 0013 | | | |
| OLDCPM | L WORD | 007A | _TEXT | Global | |
| OLDCSAV | L WORD | 007E | _TEXT | Global | |
| OLDEMM | L WORD | 0076 | _TEXT | Global | |
| OLDI0B | L WORD | 0016 | _TEXT | | |
| OLDI0C | L WORD | 001A | _TEXT | | |
| OLDI0F | L WORD | 001E | _TEXT | | |
| OLDI10 | L WORD | 0022 | _TEXT | Global | |
| OLDI13 | L WORD | 0026 | _TEXT | | |
| OLDI14 | L WORD | 002A | _TEXT | | |
| OLDI15 | L WORD | 002E | _TEXT | | |
| OLDI16 | L WORD | 0032 | _TEXT | Global | |
| OLDI17 | L WORD | 0036 | _TEXT | | |
| OLDI1B | L WORD | 003A | _TEXT | Global | |
| OLDI1C | L WORD | 003E | _TEXT | Global | |

| | | | | | |
|---|---|---|---|---|---|
| OLD120 | L | WORD | 0052 | _TEXT | |
| OLD123 | L | WORD | 0042 | _TEXT | |
| OLD124 | L | WORD | 0046 | _TEXT | |
| OLD125 | L | WORD | 004A | _TEXT | |
| OLD126 | L | WORD | 004E | _TEXT | |
| OLD127 | L | WORD | 0056 | _TEXT | |
| OLD128 | L | WORD | 005A | _TEXT | |
| OLD133 | L | WORD | 005E | _TEXT | |
| OLD15 | L | WORD | 0012 | _TEXT | |
| OLD167 | L | WORD | 0066 | _TEXT | |
| OLDKBI | L | WORD | 006A | _TEXT | Global |
| OLDMF | L | WORD | 0072 | _TEXT | Global |
| OLDNET | L | WORD | 0062 | _TEXT | Global |
| OLDSP | L | WORD | 24A7 | _TEXT | Global |
| OLDSS | L | WORD | 24A9 | _TEXT | Global |
| OLDTIM | L | WORD | 006E | _TEXT | Global |
| OLDUD11 | L | WORD | 0082 | _TEXT | |
| OLDUD12 | L | WORD | 0086 | _TEXT | |
| OLDUD13 | L | WORD | 008A | _TEXT | |
| OPENV | F | PROC | 3080 | _TEXT | Global Length = 00A1 |
| OPENV1 | L | NEAR | 3086 | _TEXT | |
| OPENV2 | L | NEAR | 308E | _TEXT | |
| OUTC1 | L | NEAR | 33A1 | _TEXT | |
| OUTC3 | L | NEAR | 3397 | _TEXT | |
| OUTC4 | L | NEAR | 338A | _TEXT | |
| OUTCF | F | PROC | 3372 | _TEXT | Length = 0051 |
| OUTDIG | N | PROC | 024E | _TEXT | Length = 0011 |
| OUTS1 | L | NEAR | 3338 | _TEXT | |
| OUTS1A | L | NEAR | 334A | _TEXT | |
| OUTS1B | L | NEAR | 3350 | _TEXT | |
| OUTS1C | L | NEAR | 3357 | _TEXT | |
| OUTS2 | L | NEAR | 335D | _TEXT | |
| OUTS4 | L | NEAR | 332E | _TEXT | |
| OUTSF | F | PROC | 32F2 | _TEXT | Length = 007D |
| OUTSF1 | L | NEAR | 331E | _TEXT | |
| PACIFY | N | PROC | 0615 | _TEXT | Length = 0004 |
| PACIFY1 | L | NEAR | 0000 | _TEXT | External |
| PAGEIN | N | PROC | 0696 | _TEXT | Global Length = 00AA |
| PAGEOUT | N | PROC | 0740 | _TEXT | Global Length = 00AA |
| PAGESOUT | L | WORD | 000E | _DATA | Global |
| PAGEX | N | PROC | 0619 | _TEXT | Global Length = 007D |
| PALETTE | L | BYTE | 4F5E | DATA | Global |
| PALSAV | L | BYTE | 2080 | _DATA | Global Length = 0011 |
| PARAM_TBL | L | DWORD | 0074 | IPAGE_SEG | |
| PBSEND | L | NEAR | 2955 | _TEXT | |
| PBSIZE | N | PROC | 2928 | _TEXT | Global Length = 0033 |
| PEX1 | L | NEAR | 0624 | _TEXT | |
| PEX2 | L | NEAR | 0660 | _TEXT | |
| PEX3 | L | NEAR | 0663 | _TEXT | |
| PEX4 | L | NEAR | 0672 | _TEXT | |
| PEXEND | L | NEAR | 068E | _TEXT | |
| PI1 | L | NEAR | 069E | _TEXT | |
| PIEND | L | NEAR | 0738 | _TEXT | |
| PIN1A | L | NEAR | 0724 | _TEXT | |
| PIN1B | L | NEAR | 0728 | _TEXT | |
| PINF1 | L | NEAR | 0711 | _TEXT | |
| PN0 | L | NEAR | 328A | _TEXT | |
| PN1 | L | NEAR | 328C | _TEXT | |
| PN2 | L | NEAR | 3299 | _TEXT | |
| PN2A | L | NEAR | 329F | _TEXT | |
| PN2B | L | NEAR | 32A4 | _TEXT | |
| PN4 | L | NEAR | 32CA | _TEXT | |

| | | | | | |
|---|---|---|---|---|---|
| PO1 | L | NEAR | 0748 | _TEXT | |
| PO2 | L | NEAR | 0784 | _TEXT | |
| PO3 | L | NEAR | 0786 | _TEXT | |
| POEND | L | NEAR | 07E2 | _TEXT | |
| POPINT | N PROC | | 23C1 | _TEXT | Global Length = 0021 |
| POPR | N PROC | | 02F4 | _TEXT | Global Length = 000F |
| POT1A | L | NEAR | 07CE | _TEXT | |
| POT1B | L | NEAR | 07D2 | _TEXT | |
| POTF1 | L | NEAR | 07BB | _TEXT | |
| PRINTIT | N PROC | | 295F | _TEXT | Global Length = 0158 |
| PRNF1 | L | NEAR | 2889 | _TEXT | |
| PRNF2 | L | NEAR | 288B | _TEXT | |
| PRNFINT | F PROC | | 2873 | _TEXT | Global Length = 004D |
| PRT0 | L | NEAR | 2A25 | _TEXT | |
| PRT1 | L | NEAR | 2A31 | _TEXT | |
| PRT2 | L | NEAR | 2A49 | _TEXT | |
| PRT3 | L | NEAR | 2A5A | _TEXT | |
| PRTBUFF | L | BYTE | 187E | _DATA | Global Length = 0180 |
| PRTEND | L | BYTE | 19FE | _DATA | Global |
| PRTHEAD | L | WORD | 187A | _DATA | Global |
| PRTS1 | L | NEAR | 29B6 | _TEXT | |
| PRTS2 | L | NEAR | 29DE | _TEXT | |
| PRTS2A | L | NEAR | 2A14 | _TEXT | |
| PRTS3 | L | NEAR | 29D2 | _TEXT | |
| PRTS4 | L | NEAR | 29F8 | _TEXT | |
| PRTS5 | L | NEAR | 29F1 | _TEXT | |
| PRTTAIL | L | WORD | 187C | _DATA | Global |
| PRTX | L | NEAR | 2985 | _TEXT | |
| PRTX1 | L | NEAR | 298A | _TEXT | |
| PS2PD | L | WORD | 1856 | _TEXT | Global |
| PUSHINT | N PROC | | 2380 | _TEXT | Global Length = 0041 |
| PUSHR | N PROC | | 02E2 | _TEXT | Global Length = 0012 |
| RESETIC | N PROC | | 2318 | _TEXT | Global Length = 0068 |
| RESIBM | L | FAR | 0000 | _TEXT | External |
| RESMTF | L | FAR | 0000 | _TEXT | External |
| RESNUM | NUMBER | | 0015 | | |
| RESTBL | L | BYTE | 180C | _TEXT | |
| RETAX | L | WORD | 4631 | _DATA | Global |
| RFLG | L | BYTE | 36C3 | _TEXT | |
| ROL2A | L | NEAR | 36F8 | _TEXT | |
| ROL2B | L | NEAR | 36E0 | _TEXT | |
| ROLDON | L | NEAR | 36CB | _TEXT | |
| ROLL0 | L | NEAR | 3742 | _TEXT | |
| ROLL1 | L | NEAR | 3748 | _TEXT | |
| ROLL1A | L | NEAR | 378A | _TEXT | |
| ROLL1B | L | NEAR | 379F | _TEXT | |
| ROLL1C | L | NEAR | 3750 | _TEXT | |
| ROLL2 | L | NEAR | 36D8 | _TEXT | |
| ROLL3 | L | NEAR | 37A9 | _TEXT | |
| ROLL4 | L | NEAR | 375A | _TEXT | |
| ROLLEJ | L | NEAR | 36D5 | _TEXT | |
| ROLLER | L | NEAR | 37F4 | _TEXT | |
| ROLM1 | L | BYTE | 4F2C | _DATA | |
| ROLMESS | L | BYTE | 4F0F | _DATA | |
| RSETCON | L | NEAR | 0000 | _TEXT | External |
| RSETEM | N PROC | | 2143 | _TEXT | Global Length = 0055 |
| RSETM1 | L | NEAR | 2153 | _TEXT | |
| RSETM2 | L | NEAR | 2160 | _TEXT | |
| RSETM3 | L | NEAR | 2197 | _TEXT | |
| RSETM4 | L | NEAR | 2168 | _TEXT | |
| RUNNAM | L | NEAR | 0000 | _TEXT | External |
| RVIDEO | N PROC | | 0853 | _TEXT | Global Length = 001A |

| Symbol | Type | Address | Segment | Notes |
|---|---|---|---|---|
| S1UND0 | L NEAR | 34F2 | _TEXT | |
| S1UND3 | L NEAR | 3508 | _TEXT | |
| SAVEIBM | L FAR | 0000 | _TEXT | External |
| SAVENTF | L FAR | 0000 | _TEXT | External |
| SAVGRO | L WORD | 182F | _TEXT | |
| SAVINTS | N PROC | 0A63 | _TEXT | Global Length = 0030 |
| SBASE | L BYTE | 0000 | STACK | Length = 02AA |
| SC3J | L NEAR | 160E | _TEXT | |
| SC71 | L NEAR | 177A | _TEXT | |
| SCAN0A | L NEAR | 1627 | _TEXT | |
| SCAN0B | L NEAR | 15C5 | _TEXT | |
| SCAN0C | L NEAR | 163B | _TEXT | |
| SCAN3A | L NEAR | 16A3 | _TEXT | |
| SCAN3A1 | L NEAR | 16A4 | _TEXT | |
| SCAN3B | L NEAR | 1684 | _TEXT | |
| SCAN3C | L NEAR | 1656 | _TEXT | |
| SCAN3X | L NEAR | 165C | _TEXT | |
| SCAN6A | L NEAR | 174C | _TEXT | |
| SCAN6B | L NEAR | 16F5 | _TEXT | |
| SCAN6C | L NEAR | 16E4 | _TEXT | |
| SCAN6D | L NEAR | 1708 | _TEXT | |
| SCAN6E | L NEAR | 1705 | _TEXT | |
| SCAN6F | L NEAR | 16FF | _TEXT | |
| SCAN6G | L NEAR | 1760 | _TEXT | |
| SCAN6H | L NEAR | 1769 | _TEXT | |
| SCAN7A | L NEAR | 178F | _TEXT | |
| SCAN8A | L NEAR | 17BA | _TEXT | |
| SCANAD | L NEAR | 17B0 | _TEXT | |
| SCANAP | L NEAR | 17C7 | _TEXT | |
| SCANNR | N PROC | 1533 | _TEXT | Global Length = 02A7 |
| SCANR0 | L NEAR | 1584 | _TEXT | |
| SCANR1 | L NEAR | 1606 | _TEXT | |
| SCANR2 | L NEAR | 160A | _TEXT | |
| SCANR3 | L NEAR | 1611 | _TEXT | |
| SCANR5 | L NEAR | 1689 | _TEXT | |
| SCANR6 | L NEAR | 16D0 | _TEXT | |
| SCANR7 | L NEAR | 1759 | _TEXT | |
| SCANR8 | L NEAR | 17A6 | _TEXT | |
| SCN7J | L NEAR | 16CD | _TEXT | |
| SCNUM | L BYTE | 2D09 | _TEXT | Global |
| SD11 | L NEAR | 0CC5 | _TEXT | |
| SD13 | L NEAR | 0031 | _TEXT | |
| SD14 | L NEAR | 0003 | _TEXT | |
| SDINB | L NEAR | 1219 | _TEXT | |
| SDINC | L NEAR | 0097 | _TEXT | |
| SDO1 | L NEAR | 0FE1 | _TEXT | |
| SDO3 | L NEAR | 1089 | _TEXT | |
| SDO5 | L NEAR | 0FF2 | _TEXT | |
| SETCONS | L NEAR | 0000 | _TEXT | External |
| SETEM | F PROC | 3666 | _TEXT | Global Length = 0050 |
| SETEM1 | L NEAR | 36AC | _TEXT | |
| SETEM2 | L NEAR | 36BD | _TEXT | |
| SETEM3 | L NEAR | 368E | _TEXT | |
| SETEM4 | L NEAR | 36A8 | _TEXT | |
| SETEM5 | L NEAR | 36C2 | _TEXT | |
| SETEM6 | L NEAR | 36A7 | _TEXT | |
| SFTSWP | N PROC | 13A7 | _TEXT | Global Length = 015C |
| SFTSWPF | F PROC | 1500 | _TEXT | Length = 0003 |
| SHKS1 | L NEAR | 13E5 | _TEXT | |
| SHKS2 | L NEAR | 1400 | _TEXT | |
| SHKS3 | L NEAR | 1403 | _TEXT | |
| SHKS4 | L NEAR | 1422 | _TEXT | |
| SHKS5 | L NEAR | 1420 | _TEXT | |

| | | | | | |
|---|---|---|---|---|---|
| SHKX . . . . . . . . . . . . . . . . | L NEAR | 13BE | _TEXT | | |
| SHTBL . . . . . . . . . . . . . . . | L BYTE | 1E33 | _DATA | | |
| SIOA1 . . . . . . . . . . . . . . . | L NEAR | 0BFE | _TEXT | | |
| SIOA2 . . . . . . . . . . . . . . . | L NEAR | 0C03 | _TEXT | | |
| SIOA3 . . . . . . . . . . . . . . . | L NEAR | 0C88 | _TEXT | | |
| SIOA4 . . . . . . . . . . . . . . . | L NEAR | 0C5F | _TEXT | | |
| SIOA5 . . . . . . . . . . . . . . . | L NEAR | 0C9D | _TEXT | | |
| SIERR . . . . . . . . . . . . . . . | L NEAR | 0BB4 | _TEXT | | |
| SIERR1 . . . . . . . . . . . . . . | L NEAR | 0BB8 | _TEXT | | |
| SIERR2 . . . . . . . . . . . . . . | L NEAR | 0BBF | _TEXT | | |
| SIMKB . . . . . . . . . . . . . . . | L WORD | 009E | _TEXT | | |
| SKIPCNT . . . . . . . . . . . . | L WORD | 2527 | _TEXT | Global | |
| SKIPKB . . . . . . . . . . . . . . | L NEAR | 1561 | _TEXT | | |
| SKPL1 . . . . . . . . . . . . . . . | L NEAR | 136C | _TEXT | | |
| SKPL2 . . . . . . . . . . . . . . . | L NEAR | 1368 | _TEXT | | |
| SKPL3 . . . . . . . . . . . . . . . | L NEAR | 1358 | _TEXT | | |
| SKPL3A . . . . . . . . . . . . . . | L NEAR | 135F | _TEXT | | |
| SKPLOOP . . . . . . . . . . . . | L NEAR | 1349 | _TEXT | | |
| SNDKCMD . . . . . . . . . . . . | N PROC | 1522 | _TEXT | Global | Length = 000E |
| SOO . . . . . . . . . . . . . . . . | L NEAR | 0F02 | _TEXT | | |
| SOOA1 . . . . . . . . . . . . . . | L NEAR | 0F48 | _TEXT | | |
| SOOA2 . . . . . . . . . . . . . . | L NEAR | 0F4D | _TEXT | | |
| SOOA3 . . . . . . . . . . . . . . | L NEAR | 0FAC | _TEXT | | |
| SOOA4 . . . . . . . . . . . . . . | L NEAR | 0F83 | _TEXT | | |
| SOOA5 . . . . . . . . . . . . . . | L NEAR | 0F2C | _TEXT | | |
| SOFCB . . . . . . . . . . . . . . | L | 20C4 | _DATA | Global | |
| SOUND . . . . . . . . . . . . . . | N PROC | 3491 | _TEXT | Global | Length = 004D |
| SOUND0 . . . . . . . . . . . . . | L NEAR | 34A2 | _TEXT | | |
| SOUND1 . . . . . . . . . . . . . | N PROC | 34DE | _TEXT | Global | Length = 0053 |
| SOUND3 . . . . . . . . . . . . . | L NEAR | 34BC | _TEXT | | |
| SOX . . . . . . . . . . . . . . . . | L NEAR | 0EFC | _TEXT | | |
| SPSAV . . . . . . . . . . . . . . | L WORD | 462E | _DATA | Global | |
| SS0 . . . . . . . . . . . . . . . . | L NEAR | 13E2 | _TEXT | | |
| SS1 . . . . . . . . . . . . . . . . | L NEAR | 13BF | _TEXT | | |
| SS2 . . . . . . . . . . . . . . . . | L NEAR | 1487 | _TEXT | | |
| SS2A . . . . . . . . . . . . . . . | L NEAR | 1431 | _TEXT | | |
| SS2B . . . . . . . . . . . . . . . | L NEAR | 148F | _TEXT | | |
| SS3 . . . . . . . . . . . . . . . . | L NEAR | 14CF | _TEXT | | |
| SSAX . . . . . . . . . . . . . . . | L WORD | 1398 | _TEXT | Global | |
| SSBP . . . . . . . . . . . . . . . | L WORD | 139A | _TEXT | Global | |
| SSDI . . . . . . . . . . . . . . . | L WORD | 139C | _TEXT | Global | |
| SSDS . . . . . . . . . . . . . . . | L WORD | 13A0 | _TEXT | Global | |
| SSFL . . . . . . . . . . . . . . . | L WORD | 1396 | _TEXT | Global | |
| SSSI . . . . . . . . . . . . . . . | L WORD | 139E | _TEXT | Global | |
| STKEND . . . . . . . . . . . . . | L WORD | 0FFC | STACK | Global | |
| STKRSV . . . . . . . . . . . . . | NUMBER | 02AA | | | |
| STOPIT . . . . . . . . . . . . . | L NEAR | 3800 | _TEXT | | |
| STRTDN . . . . . . . . . . . . . | L NEAR | 1A00 | _TEXT | | |
| STRTUP . . . . . . . . . . . . . | L NEAR | 1A07 | _TEXT | | |
| SVIDEO . . . . . . . . . . . . . | N PROC | 0B1E | _TEXT | Global | Length = 0035 |
| SWAPDI . . . . . . . . . . . . . | L NEAR | 0CBB | _TEXT | | |
| SWAPDO . . . . . . . . . . . . . | L NEAR | 0FD7 | _TEXT | | |
| SWAPIN . . . . . . . . . . . . . | N PROC | 0B60 | _TEXT | Global | Length = 0370 |
| SWAPOUT . . . . . . . . . . . . | N PROC | 0EDD | _TEXT | Global | Length = 027E |
| SWITCHEM . . . . . . . . . . . | L WORD | 009A | _TEXT | Global | |
| SWPOERR . . . . . . . . . . . . | L BYTE | 4EEA | _DATA | | |
| SXIA3 . . . . . . . . . . . . . . | L NEAR | 0EAA | _TEXT | | |
| SXIA4 . . . . . . . . . . . . . . | L NEAR | 0E81 | _TEXT | | |
| SXIA5 . . . . . . . . . . . . . . | L NEAR | 0EBF | _TEXT | | |
| SXOA3 . . . . . . . . . . . . . . | L NEAR | 1130 | _TEXT | | |
| SXOA4 . . . . . . . . . . . . . . | L NEAR | 1111 | _TEXT | | |
| SXOA5 . . . . . . . . . . . . . . | L NEAR | 10D0 | _TEXT | | |
| SXRI . . . . . . . . . . . . . . . | L NEAR | 0DF1 | _TEXT | Global | |
| SXRO . . . . . . . . . . . . . . . | L NEAR | 10B8 | _TEXT | Global | |

| Symbol | Type | Address | Segment | Attributes |
|---|---|---|---|---|
| T2CJ | L NEAR | 23F9 | _TEXT | |
| TICKS | L WORD | 00A6 | _TEXT | |
| TIDLE | L WORD | 00A2 | _TEXT | Global |
| TIMECNT | L WORD | 2523 | _TEXT | |
| TIMER | L WORD | 2525 | _TEXT | |
| TIMER_HI | L WORD | 006E | BIOS_SEG | |
| TIMER_LOW | L WORD | 006C | BIOS_SEG | |
| TIN71 | L NEAR | 2771 | _TEXT | |
| TIN71A | L NEAR | 277C | _TEXT | |
| TIN71B | L NEAR | 2782 | _TEXT | |
| TIN71C | L NEAR | 2789 | _TEXT | |
| TINMEM | L WORD | 182D | _TEXT | Global |
| TINT1A | L NEAR | 25EC | _TEXT | |
| TINT1B | L NEAR | 25E3 | _TEXT | |
| TINT5A | L NEAR | 2692 | _TEXT | |
| TINT5B | L NEAR | 26D6 | _TEXT | |
| TINT5C | L NEAR | 26CF | _TEXT | |
| TINT5D | L NEAR | 26E3 | _TEXT | |
| TINT7A | L NEAR | 275E | _TEXT | |
| TINT7B | L NEAR | 2730 | _TEXT | |
| TINTER | F PROC | 252B | _TEXT | Global Length = 0265 |
| TINTR0 | L NEAR | 2550 | _TEXT | |
| TINTR1 | L NEAR | 256A | _TEXT | |
| TINTR2 | L NEAR | 2706 | _TEXT | |
| TINTR3 | L NEAR | 2601 | _TEXT | |
| TINTR4 | L NEAR | 2614 | _TEXT | |
| TINTR5 | L NEAR | 2656 | _TEXT | |
| TINTR6 | L NEAR | 26F1 | _TEXT | |
| TINTR7 | L NEAR | 2740 | _TEXT | |
| TMPFCB | L | 2098 | _DATA | |
| TMPKB1 | L WORD | 008E | _TEXT | |
| TOPOUT | L WORD | 0012 | _DATA | Global |
| TRY2A | L NEAR | 2425 | _TEXT | |
| TRY2B | L NEAR | 2492 | _TEXT | |
| TRY2C | L NEAR | 24A3 | _TEXT | |
| TRY2POP | N PROC | 23E2 | _TEXT | Global Length = 00C5 |
| TRY2SWP | N PROC | 116F | _TEXT | Global Length = 0122 |
| TS1 | L NEAR | 1188 | _TEXT | |
| TS3 | L NEAR | 11B0 | _TEXT | |
| TS4 | L NEAR | 11BC | _TEXT | |
| TS4A | L NEAR | 127A | _TEXT | |
| TS4ERR | L NEAR | 1277 | _TEXT | |
| TS5 | L NEAR | 123A | _TEXT | |
| TS6 | L NEAR | 121C | _TEXT | |
| TS6A | L NEAR | 1228 | _TEXT | |
| TS7 | L NEAR | 11DF | _TEXT | |
| TSEND | L NEAR | 11AC | _TEXT | |
| TSRSIZE | NUMBER | 00E5 | | Global |
| UDIINT1 | L WORD | 0141 | _TEXT | Global |
| UDIINT2 | L WORD | 0143 | _TEXT | |
| UDIINT3 | L WORD | 0145 | _TEXT | |
| UDITBL | L NEAR | 0131 | _TEXT | Global |
| UNGET0 | L NEAR | 21DE | _TEXT | |
| UNGET1 | L NEAR | 21D3 | _TEXT | |
| UNGET2 | L NEAR | 21C5 | _TEXT | |
| UNGET3 | L NEAR | 21E2 | _TEXT | |
| UNGETC | F PROC | 2198 | _TEXT | Global Length = 0040 |
| UNLDKBF | L WORD | 13A4 | _TEXT | Global |
| VECSIZ | NUMBER | 0200 | | |
| VECTBL1 | L WORD | 3C82 | _DATA | Global Length = 0200 |
| VECTBL2 | L WORD | 4082 | _DATA | Global Length = 0200 |
| VGADACS | L BYTE | 4637 | _DATA | Global Length = 0300 |

| | | | | |
|---|---|---|---|---|
| W0 | L NEAR | 300A | _TEXT | |
| W1 | L NEAR | 300C | _TEXT | |
| W2 | L NEAR | 30E5 | _TEXT | |
| W2A | L NEAR | 30EB | _TEXT | |
| W2B | L NEAR | 30F0 | _TEXT | |
| W4 | L NEAR | 311C | _TEXT | |
| WAITKB | N PROC | 1503 | _TEXT | Global Length = 0015 |
| WDSKPTR | L WORD | 103A | _DATA | Global Length = 001E |
| WINDSK | L NEAR | 2FFA | _TEXT | |
| WINEND | L NEAR | 2FF4 | _TEXT | |
| WNDSK2 | L NEAR | 3052 | _TEXT | |
| XSWAP | L NEAR | 0BC4 | _TEXT | |
| @0 | L NEAR | 0258 | _TEXT | |
| @1 | L NEAR | 027E | _TEXT | |
| @10 | L NEAR | 0897 | _TEXT | |
| @11 | L NEAR | 08D3 | _TEXT | |
| @12 | L NEAR | 08E1 | _TEXT | |
| @13 | L NEAR | 0D74 | _TEXT | |
| @14 | L NEAR | 0DFF | _TEXT | |
| @15 | L NEAR | 0E2D | _TEXT | |
| @16 | L NEAR | 0F17 | _TEXT | |
| @17 | L NEAR | 1229 | _TEXT | |
| @18 | L NEAR | 12F6 | _TEXT | |
| @19 | L NEAR | 1300 | _TEXT | |
| @2 | L NEAR | 03C6 | _TEXT | |
| @20 | L NEAR | 1300 | _TEXT | |
| @21 | L NEAR | 1322 | _TEXT | |
| @22 | L NEAR | 1332 | _TEXT | |
| @23 | L NEAR | 1372 | _TEXT | |
| @24 | L NEAR | 1460 | _TEXT | |
| @25 | L NEAR | 1483 | _TEXT | |
| @26 | L NEAR | 14EC | _TEXT | |
| @27 | L NEAR | 150F | _TEXT | |
| @28 | L NEAR | 1568 | _TEXT | |
| @29 | L NEAR | 15B0 | _TEXT | |
| @3 | L NEAR | 049E | _TEXT | |
| @30 | L NEAR | 1687 | _TEXT | |
| @31 | L NEAR | 172F | _TEXT | |
| @32 | L NEAR | 19E2 | _TEXT | |
| @33 | L NEAR | 1A19 | _TEXT | |
| @34 | L NEAR | 1B07 | _TEXT | |
| @35 | L NEAR | 1BA8 | _TEXT | |
| @36 | L NEAR | 1C4A | _TEXT | |
| @37 | L NEAR | 1C74 | _TEXT | |
| @38 | L NEAR | 1CA8 | _TEXT | |
| @39 | L NEAR | 1CC1 | _TEXT | |
| @4 | L NEAR | 04FC | _TEXT | |
| @40 | L NEAR | 1D08 | _TEXT | |
| @41 | L NEAR | 1D29 | _TEXT | |
| @42 | L NEAR | 1D3D | _TEXT | |
| @43 | L NEAR | 1D99 | _TEXT | |
| @44 | L NEAR | 1E01 | _TEXT | |
| @45 | L NEAR | 1E25 | _TEXT | |
| @46 | L NEAR | 1E6C | _TEXT | |
| @47 | L NEAR | 1F85 | _TEXT | |
| @48 | L NEAR | 1FA4 | _TEXT | |
| @49 | L NEAR | 1FAF | _TEXT | |
| @5 | L NEAR | 05D5 | _TEXT | |
| @50 | L NEAR | 20A2 | _TEXT | |
| @51 | L NEAR | 20F9 | _TEXT | |
| @52 | L NEAR | 21B8 | _TEXT | |

| | | | | | |
|---|---|---|---|---|---|
| 853 . . . . . . . . . . . . . . . . . | L NEAR | 21F0 | _TEXT | | |
| 854 . . . . . . . . . . . . . . . . . | L NEAR | 2213 | _TEXT | | |
| 855 . . . . . . . . . . . . . . . . . | L NEAR | 2230 | _TEXT | | |
| 856 . . . . . . . . . . . . . . . . . | L NEAR | 223B | _TEXT | | |
| 857 . . . . . . . . . . . . . . . . . | L NEAR | 2284 | _TEXT | | |
| 858 . . . . . . . . . . . . . . . . . | L NEAR | 2294 | _TEXT | | |
| 859 . . . . . . . . . . . . . . . . . | L NEAR | 22F9 | _TEXT | | |
| 86 . . . . . . . . . . . . . . . . . | L NEAR | 0717 | _TEXT | | |
| 860 . . . . . . . . . . . . . . . . . | L NEAR | 2321 | _TEXT | | |
| 861 . . . . . . . . . . . . . . . . . | L NEAR | 2332 | _TEXT | | |
| 862 . . . . . . . . . . . . . . . . . | L NEAR | 234E | _TEXT | | |
| 863 . . . . . . . . . . . . . . . . . | L NEAR | 23FC | _TEXT | | |
| 864 . . . . . . . . . . . . . . . . . | L NEAR | 2413 | _TEXT | | |
| 865 . . . . . . . . . . . . . . . . . | L NEAR | 254B | _TEXT | | |
| 866 . . . . . . . . . . . . . . . . . | L NEAR | 263E | _TEXT | | |
| 867 . . . . . . . . . . . . . . . . . | L NEAR | 265E | _TEXT | | |
| 868 . . . . . . . . . . . . . . . . . | L NEAR | 26C4 | _TEXT | | |
| 869 . . . . . . . . . . . . . . . . . | L NEAR | 2724 | _TEXT | | |
| 87 . . . . . . . . . . . . . . . . . | L NEAR | 07C1 | _TEXT | | |
| 870 . . . . . . . . . . . . . . . . . | L NEAR | 2920 | _TEXT | | |
| 871 . . . . . . . . . . . . . . . . . | L NEAR | 293E | _TEXT | | |
| 872 . . . . . . . . . . . . . . . . . | L NEAR | 2947 | _TEXT | | |
| 873 . . . . . . . . . . . . . . . . . | L NEAR | 2968 | _TEXT | | |
| 874 . . . . . . . . . . . . . . . . . | L NEAR | 2A0F | _TEXT | | |
| 875 . . . . . . . . . . . . . . . . . | L NEAR | 2A63 | _TEXT | | |
| 876 . . . . . . . . . . . . . . . . . | L NEAR | 2A78 | _TEXT | | |
| 877 . . . . . . . . . . . . . . . . . | L NEAR | 2A90 | _TEXT | | |
| 878 . . . . . . . . . . . . . . . . . | L NEAR | 2AB0 | _TEXT | | |
| 879 . . . . . . . . . . . . . . . . . | L NEAR | 2AC7 | _TEXT | | |
| 88 . . . . . . . . . . . . . . . . . | L NEAR | 082B | _TEXT | | |
| 880 . . . . . . . . . . . . . . . . . | L NEAR | 2AD7 | _TEXT | | |
| 881 . . . . . . . . . . . . . . . . . | L NEAR | 2AE3 | _TEXT | | |
| 882 . . . . . . . . . . . . . . . . . | L NEAR | 2B06 | _TEXT | | |
| 883 . . . . . . . . . . . . . . . . . | L NEAR | 2B1B | _TEXT | | |
| 884 . . . . . . . . . . . . . . . . . | L NEAR | 2B30 | _TEXT | | |
| 885 . . . . . . . . . . . . . . . . . | L NEAR | 3030 | _TEXT | | |
| 886 . . . . . . . . . . . . . . . . . | L NEAR | 35AD | _TEXT | | |
| 887 . . . . . . . . . . . . . . . . . | L NEAR | 3786 | _TEXT | | |
| 888 . . . . . . . . . . . . . . . . . | L NEAR | 37DF | _TEXT | | |
| 89 . . . . . . . . . . . . . . . . . | L NEAR | 084F | _TEXT | | |
| @CPU . . . . . . . . . . . . . . . | TEXT | 0101h | | | |
| @FILENAME . . . . . . . . . . . . | TEXT | hr | | | |
| @VERSION . . . . . . . . . . . . . | TEXT | 510 | | | |
| _ACTIVE . . . . . . . . . . . . . . | L WORD | 002B | _DATA | Global | |
| _ACTKEY . . . . . . . . . . . . . . | L BYTE | 1F38 | _DATA | Global | |
| _ACTSHIFT . . . . . . . . . . . . . | L BYTE | 1F39 | _DATA | Global | |
| _AFTRDOS . . . . . . . . . . . . . | L WORD | 0026 | _DATA | Global | |
| _APPIN . . . . . . . . . . . . . . | V WORD | 0000 | _DATA | External | |
| _APPLEVEL . . . . . . . . . . . . | V WORD | 0000 | _DATA | External | |
| _APPNAME . . . . . . . . . . . . . | V BYTE | 0000 | _DATA | External | |
| _APPOUT . . . . . . . . . . . . . . | V WORD | 0000 | _DATA | External | |
| _BATCH . . . . . . . . . . . . . . | V BYTE | 0000 | _DATA | External | |
| _BCOLOR . . . . . . . . . . . . . . | L BYTE | 207E | _DATA | Global | |
| _BEEP . . . . . . . . . . . . . . | N PROC | 3531 | _TEXT | Global | Length = 0006 |
| _BEEPOFF . . . . . . . . . . . . . | N PROC | 356E | _TEXT | Global | Length = 0008 |
| _BEHAVED . . . . . . . . . . . . . | L WORD | 0022 | _DATA | | |
| _BORDER . . . . . . . . . . . . . . | N PROC | 2D36 | _TEXT | Global | Length = 0003 |
| _CED . . . . . . . . . . . . . . | L WORD | 185A | _TEXT | Global | |
| _CFAT . . . . . . . . . . . . . . | N PROC | 2EBF | _TEXT | Global | Length = 0011 |
| _CHECKEY . . . . . . . . . . . . . | N PROC | 33D7 | _TEXT | Global | Length = 0003 |
| _CHNSTRT . . . . . . . . . . . . . | L BYTE | 1E32 | _DATA | Global | |
| _CLRGEN . . . . . . . . . . . . . . | N PROC | 1F97 | _TEXT | Global | Length = 001F |
| _CLRINTR . . . . . . . . . . . . . | N PROC | 24AD | _TEXT | Global | Length = 0002 |

| | | | | | |
|---|---|---|---|---|---|
| _CLRWIN | N PROC | 3121 | _TEXT | Global | Length = 0003 |
| _CUROFF | N PROC | 3460 | _TEXT | Global | Length = 0003 |
| _CURON | N PROC | 3472 | _TEXT | Global | Length = 0003 |
| _CWIND | N PROC | 2ED0 | _TEXT | Global | Length = 0096 |
| _DBLK | L | 2222 | _DATA | Global | Length = 0019 |
| _DBLKEN | L WORD | 387F | _DATA | Global | |
| _DELAY | L WORD | 0034 | _DATA | Global | |
| _DELAY_COUNT | L WORD | 0036 | _DATA | Global | |
| _DOCAD | N PROC | 24AF | _TEXT | Global | Length = 0015 |
| _DOSWAP | L WORD | 0016 | _DATA | Global | |
| _DSKBUSY | N PROC | 357B | _TEXT | Global | Length = 0003 |
| _EMMAVAIL | L WORD | 0020 | _DATA | Global | |
| _EMMSIZ | L WORD | 1C32 | _DATA | Global | Length = 0100 |
| _EMMTBL | L 0002 | 1A32 | _DATA | Global | Length = 0100 |
| _ENKB | N PROC | 115B | _TEXT | Global | Length = 0007 |
| _EXTAVAIL | L WORD | 001C | _DATA | Global | |
| _EXTFREE | L WORD | 001A | _DATA | Global | |
| _FATDEV | N PROC | 3615 | _TEXT | Global | Length = 0036 |
| _FATHAND | L NEAR | 0000 | _TEXT | External | |
| _FATWIN | N PROC | 2E9F | _TEXT | Global | Length = 0020 |
| _FLUSH | N PROC | 2E7C | _TEXT | Global | Length = 0023 |
| _FTIME | V WORD | 0000 | _DATA | External | |
| _GETCP | N PROC | 3435 | _TEXT | Global | Length = 0003 |
| _GETSHI | N PROC | 2D0E | _TEXT | Global | Length = 000F |
| _GETTICK | N PROC | 3810 | _TEXT | Global | Length = 0009 |
| _HLEN | L WORD | 000A | _DATA | Global | |
| _HROFF | N PROC | 364B | _TEXT | Global | Length = 0018 |
| _HRSIZE | L WORD | 0018 | _DATA | Global | |
| _INKEY | N PROC | 33C3 | _TEXT | Global | Length = 0003 |
| _ISAT | L WORD | 1858 | _TEXT | Global | |
| _KSWAP | L WORD | 002C | _DATA | Global | |
| _LEVEL | V WORD | 0000 | _DATA | External | |
| _LTSR | L WORD | 1C30 | _TEXT | Global | |
| _MAPACT | L WORD | 0024 | _DATA | Global | |
| _MAXPARA | L WORD | 000C | _DATA | Global | |
| _MAXTSRS | L WORD | 002E | _DATA | Global | |
| _MENU | L NEAR | 0000 | _TEXT | External | |
| _MONOMODE | L WORD | 001E | _DATA | Global | |
| _MVCUR | N PROC | 32D1 | _TEXT | Global | Length = 0003 |
| _NETBEEP | L WORD | 1840 | _TEXT | Global | |
| _NOCOM2 | L WORD | 0032 | _DATA | Global | |
| _NOCOMM | L WORD | 0030 | _DATA | Global | |
| _NO117 | L BYTE | 2AB9 | _TEXT | Global | |
| _OPEN_FCB | L NEAR | 0000 | _TEXT | External | |
| _OUTC | N PROC | 336F | _TEXT | Global | Length = 0003 |
| _OUTS | N PROC | 32EF | _TEXT | Global | Length = 0003 |
| _PAINT | N PROC | 3247 | _TEXT | Global | Length = 008A |
| _PALRES | L WORD | 183E | _TEXT | Global | |
| _PSP | L WORD | 0008 | _DATA | Global | |
| _PWSTRT | L NEAR | 0000 | _TEXT | External | |
| _RENABL | N PROC | 2E3D | _TEXT | Global | Length = 0005 |
| _ROLLOUT | N PROC | 36C4 | _TEXT | Global | Length = 014C |
| _SETCOLOR | N PROC | 35B0 | _TEXT | Global | Length = 000C |
| _SETINTR | N PROC | 24AB | _TEXT | Global | Length = 0002 |
| _SHOWFLG | V WORD | 0000 | _DATA | External | |
| _SLOWKB | L WORD | 1842 | _TEXT | Global | |
| _SOUND | L BYTE | 207F | _DATA | | |
| _SWAPEMM | L WORD | 002A | _DATA | Global | |
| _SWAPNAME | V BYTE | 0000 | _DATA | External | |
| _SWAP_DIRECTORY | V BYTE | 0000 | _DATA | External | |
| _SWAP_FLAG | V WORD | 0000 | _DATA | External | |
| _UNGETC | N PROC | 2E42 | _TEXT | Global | Length = 003A |
| _USEEMM | V WORD | 0000 | _DATA | External | |

```
_WINDOW . . . . . . . . . . . . .        N PROC  2F66      _TEXT   Global  Length = 0118
__ACRTUSED . . . . . . . . . . .          NUMBER  1234              Global 7022 Source Lines
     7068 Total  Lines
     1079 Symbols 46600 + 230677 Bytes symbol space free 0 Warning Errors
         0 Severe  Errors
                                          PAGE    ,132
                                          TITLE   NET BIOS INTERCEPTOR
                                    ;
                                    ;
                                          INCLUDE DEFTSR.ASM
                              C  EFCB    STRUC
0000  00                      C  EXTEND  DB       0
0001  0005[                   C          DB       5 DUP(0)
         00                   C
             ]                C
                              C
0006  00                      C  ATTRIB  DB       0
0007                          C  EFCB    ENDS
                              C  ;
                              C  FCB     STRUC
0000  00                      C  DRIVE   DB       ?
0001  0008[                   C  FNAME   DB       8 DUP(?)
         ??                   C
             ]                C
                              C
0009  0003[                   C  FEXT    DB       3 DUP(?)
         ??                   C
             ]                C
                              C
000C  0000                    C  BLOCK   DW       ?
000E  0000                    C  RECSIZ  DW       ?
0010  00000000                C  FILSIZ  DD       ?
0014  0000                    C  FDATE   DW       ?
0016  000A[                   C  RESERV  DB       10 DUP(?)
         ??                   C
             ]                C
                              C
0020  00                      C  RELREC  DB       ?
0021  0000                    C  RRECLOW DW       ?
0023  0000                    C  RRECHI  DW       ?
0025                          C  FCB     ENDS
                              C  ;
                              C  SWAPINT STRUC
0000  00                      C  SWAP0   DB       0
0001  00                      C  SWAP5   DB       0
0002  00                      C  SWAP8   DB       0
0003  00                      C  SWAP9   DB       0
0004  00                      C  SWAPB   DB       0
0005  00                      C  SWAPC   DB       0
0006  00                      C  SWAPF   DB       0
0007  00                      C  SWAP10  DB       0
0008  00                      C  SWAP14  DB       0
0009  00                      C  SWAP16  DB       0
000A  00                      C  SWAP16A DB       0
000B  00                      C  SWAP17  DB       0
000C  00                      C  SWAP21  DB       0
```

```
0000  00              C   SWAP28   DB    0
000E  00              C   SWAP2A   DB    0
000F  00              C   SWAPNET  DB    0
0010  00              C   SWAPU1   DB    0
0011  00              C   SWAPU2   DB    0
0012  00              C   SWAPU3   DB    0
0013                  C   SWAPINT  ENDS
                      C
                      C   TSR      STRUC
0000  0015[           C   TSRNAME  DB    21 DUP(0)             ;TSR NAME FOR MENU
        00
            ]         C
                      C
0015  00              C   INMEM    DB    0                     ;FLAG SET IF TSR/APP SWAPPED IN
0016  000A[           C   KEY      DB    10 DUP(?)             ;ACTIVATION KEY
        ??
            ]         C
                      C
0020  000A[           C   SHIFTS   DB    10 DUP(?)             ;SHIFT STATE FOR ACTIVATION
        ??
            ]         C
                      C
002A  01              C   KEYSON   DB    1                     ;ARE THE KEYS FOR THIS TSR ACTIVE
002B  FF              C   EMMCHN   DB    -1                    ;POINTER TO START OF CHAIN OF HANDLES
002C  00              C   APPSEQ   DB    0                     ;SEQUENCE NUMBER OF APPLICATION
002D  0000            C   BATCHP   DW    0                     ;POINTER TO BATCH FILE IN BATCH BLOCK
002F  00              C   BATCHFL  DB    0                     ;FLAG IF SHOULD PROCESS BATCH COMMAND
0030  00              C   DOSSTRT  DB    0                     ;ACTIVATION FLAG - SWAP WHEN NOT BUSY
0031  0000            C   FIRSTP   DW    0                     ;PAGE NUMBER OF FIRST PAGE FOR APPL.
0033  0000            C   CYCLE    DW    0                     ;NEXT FREE 64k FOR APPL. SWAP
0035  0000            C   PAGES    DW    0                     ;SIZE OF APPLICATION IN PAGES.
0037  0000            C   LASTP    DW    0                     ;NUMBER OF WORDS IN LAST PAGE
0039  0000            C   SWPSEG   DW    0                     ;SEGMENT FOR SWAP IN
003B  00000000        C   XFERADD  DD    0                     ;LOCATION TO START/CONTINUE TSR/APPL
003F  00000000        C   LOCALS   DD    0                     ;A NEW STACK FRAME FOR AFTER A SWAP
0043  FFFF            C   EMMHNDL  DW    -1                    ;HANDLE OF EMM PAGE MAP FOR TSR/APPL
0045  0000            C   EMMOUTH  DW    0                     ;TEMPORARY HANDLE FOR APPL SWAP OUT
0047  00              C   TEXT     DB    0                     ;FLAG SET IF SHOULD SWITCH TO TEXT
0048  01              C   ISTSR    DB    1                     ;FLAG SET IF IS A TSR
0049  00              C   ISGENIE  DB    0                     ;FLAG SET IF IS A GENIE MODULE
004A  0000            C   OUTRECL  DW    0                     ;1ST RECORD NUMBER OF SWAPPED
004C  0000            C   OUTRECH  DW    0                     ;  APPL CODE IN SWAPOUT FILE
004E  0000            C   TSRPSP   DW    0                     ;SAVE AREA FOR PSP
0050  00000000        C   TSRDTA   DD    0                     ;SAVE AREA FOR OLD DTA
0054  00000000        C   ESAVLOC  DD    0                     ;SAVE FOR EGA SAVE AREA
0058  00000000        C   CONSOLE  DD    0                     ;SAVE AREA FOR DOS CONSOLE DRIVER
005C  0000            C   PINMEM   DW    0                     ;PREVIOUS TSR/APPL IN MEMORY
005E  0000            C   POSTSEQ  DW    0                     ;SEQUENCE NUMBER FOR POSTED MCBS
0060  0000            C   POSTNXT  DW    0                     ;NEXT MCB TO POST SEQUENCE NUMBER
0062  00              C   XRUN     DB    0                     ;0 = XPANDED, 1 = DISK, 2 = EXTENDED
                      C                                        ;4 = RUNNING IN XPANDED
0063  0000            C   IDLECNT  DW    0                     ;NUMBER OF MINUTES IDLE BEFORE SWAP
0065  0000            C   AT_LOW   DW    0                     ;TIME AT WHICH TO SWAP IN - LOW WORD
0067  0000            C   AT_HIGH  DW    0                     ;TIME AT WHICH TO SWAP IN - HIGH WORD
0069  0013[           C   COUNT    DB    SIZE SWAPINT DUP(0)   ;COUNTS OF SWAPIN ON INTERRUPT USU. 1
        00
            ]         C
                      C
007C  0013[           C   RESET    DB    SIZE SWAPINT DUP(0)   ;INITIAL VALUE OF SWAPIN ON INTERRUPT
        00
            ]         C
                      C
```

```
008F  0007[              C  TSRFEXT  DB      7 DUP(0)            ;ROOM FOR FCB EXTENTION
          00              C
                        ]  C
                           C
0096  0025[              C  TSRFCB   DB      25H DUP(0)          ;ROOM FOR DISKSWAP FCB
          00              C
                        ]  C
                           C
00BB  0028[              C  SWPNAME  DB      40 DUP(?)           ;FULL PATH NAME OF SWAP FILE
          ??              C
                        ]  C
                           C
00E3  48 52              C  INIDIC   DB      'HR'
00E5                     C  TSR      ENDS
                         C  ;
                         C           PUBLIC  TSRSIZE
                         C  ;
= 00E5                   C  TSRSIZE  EQU     SIZE TSR
                         C  ;
                         C  EXPTBL   STRUC
0000  FF                 C  NEXT     DB      0FFH
0001  FF                 C  PREV     DB      0FFH
0002                     C  EXPTBL   ENDS
                         C  ;
                         C  DESCRIPT STRUC
0000  0000               C  LIMIT    DW      0
0002  0000               C  BASELO   DW      0
0004  00                 C  BASEHI   DB      0
0005  00                 C  ACCESS   DB      0
0006  0000               C           DW      0
0008                     C  DESCRIPT ENDS
                         C
                         C  ELSE
= 1000                   C  DWBSIZ   EQU     4096
                         C  ENDIF
                                    INCLUDE DEFBIOS.ASM
                         C  ;
= 0200                   C  VECSIZ   EQU     200H                ;SIZE OF INT. VECTOR TABLE IN WORDS
                         C  ;
0000                     C  BIOS_SEG         SEGMENT AT 40H
0010                     C           ORG     10H
0010  0000               C  EQUIPMENT        DW      ?
0017                     C           ORG     17H
0017  00                 C  KB_FLAG  DB      ?
0018  00                 C  KB_FLAG_1        DB      ?
0019  00                 C  ALT_INPUT        DB      ?
001A  0000               C  BUFFER_HEAD      DW      ?
001C  0000               C  BUFFER_TAIL      DW      ?
001E  0010[              C  KB_BUFFER        DW      16 DUP(?)
          ????            C
                        ]  C
                           C
                         C  ;
003E                     C  KB_BUFFER_END    LABEL   WORD
                         C  ;
0049                     C           ORG     49H
0049  00                 C  CRT_MODE DB      ?
004A  0000               C  CRT_COLS DW      ?
004C  0000               C  CRT_LEN  DW      ?
004E  0000               C  CRT_START        DW      ?
0050  0008[              C  CRT_CURSES       DW      8 DUP(?)
          ????            C
                        ]  C
                           C
```

```
0060 0000              C   CRT_CMOD         DW      ?
0062 00                C   CRT_PAGE         DB      ?
0063 0000              C   CRT_ADDR         DW      ?
0065 00                C   CRT_MSET         DB      ?
0066 00                C   CRT_PALETTE      DB      ?
006C                   C           ORG      6CH
006C                   C   BIOS_TIME        LABEL   DWORD
006C 0000              C   TIMER_LOW        DW      0
006E 0000              C   TIMER_HI         DW      0
0072                   C           ORG      72H
0072 0000              C   CRT_RFLSG        DW      ?
0084                   C           ORG      84H
0084 00                C   CRT_ROWS         DB      ?
0085 0000              C   CRT_POINTS       DW      ?
0087 00                C   CRT_INFO         DB      ?
0088 00                C   CRT_INFO_3       DB      ?
00A8                   C           ORG      0A8H
00A8                   C   CRT_SAV_PTR      LABEL   DWORD
0100                   C           ORG      100H
0100 00                C   CRT_STATUS_B     DB      ?
                       C ;
0101                   C   BIOS_SEG         ENDS
                       C ;
0000                   C   IPAGE_SEG        SEGMENT AT 0
                       C ;
0024                   C           ORG      24H
0024                   C   KB_INT   LABEL   WORD
                       C ;
0074                   C           ORG      1DH*4
0074                   C   PARAM_TBL        LABEL   DWORD
                       C ;
0074                   C   IPAGE_SEG        ENDS
                       C ;
0000                   C   MTR_SEG  SEGMENT AT 0F000H
E05B                   C           ORG      0E05BH
E05B                   C   MTR_RESET        LABEL   FAR
                       C ;
E05B                   C   MTR_SEG  ENDS
                       C ;
                       C ;       CONSTANT DEFENITIONS
                       C ;
= 0001                 C   I13FLG   EQU     WORD PTR 0001
= 0002                 C   I25FLG   EQU     WORD PTR 0002
= 0004                 C   I26FLG   EQU     WORD PTR 0004
= 0008                 C   I09FLG   EQU     WORD PTR 0008
= 0010                 C   I17FLG   EQU     WORD PTR 0016
= 0020                 C   I14FLG   EQU     WORD PTR 0032
                           INCLUDE DEFMCB.ASM
= 0001                 C   NETWORK_VERSION EQU 1
                       C ;
                       C ; NET BIOS MESSAGE CONTROL BLOCK DEFINITION
                       C ;
                       C   MCB      STRUC
0000 00                C   MCB_COMMAND      DB      ?       ;COMMAND FIELD
0001 00                C   MCB_RETCODE      DB      ?       ;RETURN FIELD
0002 00                C   MCB_LSN          DB      ?       ;LOCAL SESSION NUMBER
0003 00                C   MCB_NUM          DB      ?       ;NUMBER OF APPLICATION NAME
0004 00000000          C   MCB_BUFFER       DD      ?       ;POINTER TO MESSAGE BUFFER
0008 0000              C   MCB_LENGTH       DW      ?       ;BUFFER-LENGTH IN BYTES
000A 0010[             C   MCB_CALLNAME     DB      16 DUP(?) ;NAME ON LOCAL OR REMOTE NETBIOS INTRFC
        ??             C
                     ] C
                       C
```

```
001A  0010[              C  MCB_NAME      DB    16 DUP(?)        ;NAME ON LOCAL NETBIOS INTERFACE
        ??               C
                      ]  C
                         C
002A  00                 C  MCB_RTO       DB    ?                ;RECIEVE TIME OUT
002B  00                 C  MCB_STO       DB    ?                ;SEND TIMEOUT
002C  00000000           C  MCB_POST      DD    ?                ;POINTER TO POST ROUTINE
0030  00                 C  MCB_LANA_NUM  DB    ?                ;ADAPTER NUMBER 0=FIRST 1=SENCOND ETC
0031  00                 C  MCB_CMD_CPLT  DB    ?                ;COMMAND STATUS
0032  000E[              C  MCB_RESERVED  DB    14 DUP(?)        ;RESERVED EXCEPT FOR MSG.RESET
        ??               C
                      ]  C
                         C
0040                     C  MCB           ENDS
                         C
                         C
                         C  MYMCB         STRUC
0000  0040[              C  OLDMCB        DB    SIZE MCB DUP(?)  ;USER'S MCB
        ??               C
                      ]  C
                         C
0040  00000000           C  MMCB_LOC      DD    0                ;POINTER TO USER'S MCB
0044  00                 C  MMCB_INUSE    DB    0                ;IS THIS MCB IN USE?
0045  0000               C  MMCB_TSRNUM   DW    0                ;POINTER TO TSR USING THIS MCB
0047  0000               C  MMCB_COUNT    DW    0                ;PTR TO NEXT MCB POSTED FOR A TSR
0049  00                 C  MMCB_POSTED   DB    0                ;THIS MCB IS DONE FLAG, 0=NO
004A  0000               C  MMCB_POSTAX   DW    0                ;AX FROM NETWORK POST CALL
004C  0000               C  MMCB_BLOCKS   DW    0                ;NUMBER OF BUFFER BLOCKS ALLOCATED
004E                     C  MYMCB         ENDS
                            ;
                            ;

0000                        _TEXT    SEGMENT WORD PUBLIC 'CODE'
0000                        _TEXT    ENDS

PGROUP   GROUP   _TEXT

0000                        STCKSEG  SEGMENT STACK 'STACK'
0000  0100[                          DW      256 DUP(0)
        0000
                      ]

0200                        STKEND   LABEL   BYTE
0200                        STCKSEG  ENDS

SGROUP   GROUP STCKSEG

0000                        _DATA    SEGMENT WORD PUBLIC 'DATA'
0000                        _DATA    ENDS

DGROUP   GROUP   _DATA

0000                        INIT     SEGMENT WORD PUBLIC 'INIT'
0000                        INIT     ENDS

IGROUP   GROUP   INIT

0000                        _DATA    SEGMENT WORD PUBLIC 'DATA'
                            PUBLIC   MCBBUFF,MCBDATA,MCBDTBL,MCBDTOP,MCBTLEN
                            ;
0000  0000                  _PSP     DW      0
```

```
0002  07 00 0A 0A 48 45      BEFORE_ERROR    DB      7,13,10,10,"HEADROOM NETWORK ERROR: $"
      41 44 52 4F 4F 4D
      20 4E 45 54 57 4F
      52 4B 20 45 52 52
      4F 52 3A 20 24
001F  00 0A 50 6C 65 61      AFTER_ERROR     DB      13,10,"Please increase data buffer/MCB size.",7,13,10
      73 65 20 69 6E 63
      72 65 61 73 65 20
      64 61 74 61 20 62
      75 66 66 65 72 2F
      4D 43 42 20 73 69
      7A 65 2E 07 00 0A
0049  53 79 73 74 65 6D                      DB      "System halted -- sorry!",13,10,7,"$"
      20 68 61 6C 74 65
      64 20 20 20 20 73
      6F 72 72 79 21 00
      0A 07 24

0064  4F 75 74 20 6F 66      OUT_OF_MCBS     DB      "Out of MCBs.$"
      20 4D 43 42 73 2E
      24
0071  4F 75 74 20 6F 66      OUT_OF_DATA     DB      "Out of network buffer space.$"
      20 6E 65 74 77 6F
      72 6B 20 62 75 66
      66 65 72 20 73 70
      61 63 65 2E 24
008E  55 6E 61 6E 74 69      NO_CANCEL2      DB      "Unanticipated network request encountered - 17.$"
      63 69 70 61 74 65
      64 20 6E 65 74 77
      6F 72 68 20 72 65
      71 75 65 73 74 20
      65 6E 63 6F 75 6E
      74 65 72 65 64 20
      20 20 31 37 2E 24
008E  55 6E 61 6E 74 69      NO_CANCEL3      DB      "Unanticipated network request encountered - 32.$"
      63 69 70 61 74 65
      64 20 6E 65 74 77
      6F 72 68 20 72 65
      71 75 65 73 74 20
      65 6E 63 6F 75 6E
      74 65 72 65 64 20
      20 20 33 32 2E 24
                                              ;
00EE  00 0A 48 45 41 44      NETGONE DB              13,10,"HEADROOM NETBIOS Network Extensions "
      52 4F 4F 4D 20 4E
      45 54 42 49 4F 53
      20 4E 65 74 77 6F
      72 68 20 45 78 74
      65 6E 73 69 6F 6E
      73 20
0114  75 6E 6C 6F 61 64                      DB      "unloaded.",13,10,10,"$"
      65 64 2E 00 0A 0A
      24

0121  00                     TMCB    MCB     <>
0122  00
0123  00
0124  00
0125  00000000
0129  0000
012B  0010[
         ??
              ]
```

```
013B  0010[
        ??
                ]
014B  00
014C  00
014D  00000000
0151  00
0152  00
0153  000E[
        ??
                ]
                                ;
0161  0268 R            MCBBUFF  DW    OFFSET DATA_END
0163  0000              MCBDATA  DW    0
0165  00FF[             MCBDTBL  DB    255 DUP(1)
        01
                ]

0264                    MCBTEND  LABEL BYTE
0264  0000              MCBDTOP  DW    0
0266  0000              MCBTLEN  DW    0
                                ;
0268                    DATA_END LABEL BYTE
                                ;
0268  1000[                      DB    64*SIZE MCB DUP(0)
        00
                ]

;
1268                    _DATA    ENDS
                                ;
                                ;
0000                    _TEXT    SEGMENT
                                 ASSUME CS:PGROUP
                                 ASSUME DS:DGROUP
                                ;
                                ;
                                 PUBLIC NETPOST,PSEQ,PNEXT,TINMEM,HRDSEG,MYDSEG,OLDI21,MYSSEG,ZTOFLG
                                ;
                                 PUBLIC POST2TSR,INPOST,NETRET,SWITCHEM,OLDSS,OLDSP,INSWAP,OLDNET
                                ;
0000  0000              INNET    DW    0
0002  0000              INPOST   DW    0
0004  0000              PSEQ     DW    0
0006  0000              PNEXT    DW    0
0008  0000 0000         TINMEM   DW    0,0
000C  0000              HRDSEG   DW    0
000E  0000 0000         INSWAP   DW    0,0
0012  ---- R            MYDSEG   DW    DGROUP
0014  ---- R            MYSSEG   DW    SGROUP
0016  0000              NETRET   DW    0
0018  0000 0000         OLDNET   DW    0,0
001C  0000 0000         OLDI21   DW    0,0
0020  0000 0000         OLDI09   DW    0,0
0024  0000 0000         OLDI28   DW    0,0
0028  0000 0000         OLDI16   DW    0,0
002C  0000              OLDSS    DW    0
002E  0000              OLDSP    DW    0
0030  0000 0000         OLDI08   DW    0,0
0034  0000              ZTOFLG   DW    0
0036  FFFF              SWITCHEM DW    -1
                                ;
```

```
                    PUBLIC  PUSHR,POPR
                ;
0038            PUSHR   PROC    NEAR
0038  55                PUSH    BP
0039  8B EC             MOV     BP,SP
003B  87 7E 02          XCHG    DI,[BP+02]
003E  8B 6E 00          MOV     BP,[BP]
0041  50                PUSH    AX
0042  53                PUSH    BX
0043  51                PUSH    CX
0044  52                PUSH    DX
0045  56                PUSH    SI
0046  06                PUSH    ES
0047  1E                PUSH    DS
0048  FF E7             JMP     DI
004A            PUSHR   ENDP
                ;
004A            POPR    PROC    NEAR
004A  5F                POP     DI
004B  1F                POP     DS
004C  07                POP     ES
004D  5E                POP     SI
004E  5A                POP     DX
004F  59                POP     CX
0050  5B                POP     BX
0051  58                POP     AX
0052  8B EC             MOV     BP,SP
0054  87 7E 02          XCHG    DI,[BP+02]
0057  5D                POP     BP
0058  C3                RET
0059            POPR    ENDP
                ;
                    PUBLIC  NETWORK_ERROR
                ;
0059            NETWORK_ERROR:
0059  52                PUSH    DX
005A  B8 0003           MOV     AX,3
005D  CD 10             INT     10H
005F  2E: 8E 1E 0012 R  MOV     DS,CS:MYDSEG
0064  BA 0002 R         MOV     DX,OFFSET BEFORE_ERROR
0067  B4 09             MOV     AH,9
0069  CD 21             INT     21H
006B  5A                POP     DX
006C  B4 09             MOV     AH,9
006E  CD 21             INT     21H
0070  BA 001F R         MOV     DX,OFFSET AFTER_ERROR
0073  B4 09             MOV     AH,9
0075  CD 21             INT     21H
0077  EB FE     HERE:   JMP     HERE
                ;
0079            OUTDIG  PROC    NEAR
0079  24 0F             AND     AL,0FH
007B  04 30             ADD     AL,30H
007D  3C 39             CMP     AL,'9'
007F  7E 02             JLE     @F
0081  04 07             ADD     AL,'A'-'9'-1
0083  B4 0E     @@:     MOV     AH,0EH
0085  B3 70             MOV     BL,70H
0087  CD 10             INT     10H
0089  C3                RET
008A            OUTDIG  ENDP
                ;
                ;
```

```
                        PUBLIC  PRTNUM
                ;
008A            PRTNUM  PROC    NEAR
008A  E8 0038 R         CALL    PUSHR
008D  26: 8A 07         MOV     AL,ES:[BX.MCB_COMMAND]      ;GET COMMAND
0090  0A C0             OR      AL,AL
0092  75 12             JNE     @F
0094  50                PUSH    AX
0095  24 F0             AND     AL,0F0H
0097  B1 04             MOV     CL,4
0099  D2 E8             SHR     AL,CL
009B  E8 0079 R         CALL    OUTDIG
009E  58                POP     AX
009F  E8 0079 R         CALL    OUTDIG
00A2  33 C0             XOR     AX,AX
00A4  CD 16             INT     16H
00A6  E8 004A R   @@:   CALL    POPR
00A9  C3                RET
00AA            PRTNUM  ENDP
                ;
                        PUBLIC  NEWNET
                ;
00AA            NEWNET  PROC    FAR
00AA  9C                PUSHF
00AB  2E: FF 06 0000 R  INC     CS:INNET
00B0  2E: 83 3E 000C R 00  CMP  CS:HRDSEG,0
00B6  74 52             JE      NEWNO
00B8  26: 8A 47 2A      MOV     AL,ES:[BX.MCB_RTO]
00BC  26: 0A 47 2B      OR      AL,ES:[BX.MCB_STO]
00C0  2E: 83 3E 0034 R 00  CMP  CS:ZTOFLG,0
00C6  74 13             JE      @F
00C8  26: 8A 07         MOV     AL,ES:[BX.MCB_COMMAND]      ;GET COMMAND
00CB  74 0E             JE      @F
00CD  A8 90             TEST    AL,90H
00CF  74 0A             JE      @F
00D1  26: C6 47 2A 00   MOV     ES:[BX.MCB_RTO],0
00D6  26: C6 47 2B 00   MOV     ES:[BX.MCB_STO],0
00DB  26: F6 07 80  @@: TEST    ES:[BX.MCB_COMMAND],80H     ;NO WAIT COMMAND?
00DF  74 29             JE      NEWNO
00E1  8C C8             MOV     AX,CS                       ;GET NBX CODE SEG
00E3  26: 39 47 2E      CMP     WORD PTR ES:[BX.MCB_POST+2],AX
00E7  77 00             JA      @F
00E9  26: 83 7F 2E 00   CMP     WORD PTR ES:[BX.MCB_POST+2],0
00EE  75 1A             JNE     NEWNO
00F0  26: 39 47 06      CMP     WORD PTR ES:[BX.MCB_BUFFER+2],AX
00F4  72 14             JB      NEWNO
00F6  26: 8A 07    @@:  MOV     AL,ES:[BX.MCB_COMMAND]
00F9  24 7F             AND     AL,7FH                      ;CLEAR HIGH ORDER BIT
00FB  3C 35             CMP     AL,35H                      ;CANCEL?
00FD  74 28             JE      NETCAN
00FF  3C 17             CMP     AL,17H                      ;CHAIN
0101  74 18             JE      NE2
0103  3C 32             CMP     AL,32H
0105  74 1A             JE      NE3
0107  E9 01B0 R         JMP     NOWAIT
010A  FA          NEWNO: CLI
010B  2E: FF 1E 0018 R  CALL    DWORD PTR CS:[OLDNET]
0110  9C                PUSHF
0111  2E: FF 0E 0000 R  DEC     CS:INNET
0116  9D                POPF
0117  FB                STI
0118  CA 0002           RETF    2
011B            @@:
```

```
                    ;       CODE HERE TO CANCEL PENDING REQUEST
                    ;
011B BA 008E R      NE2:    MOV     DX,OFFSET NO_CANCEL2
011E E9 0059 R              JMP     NETWORK_ERROR
0121 BA 008E R      NE3:    MOV     DX,OFFSET NO_CANCEL3
0124 E9 0059 R              JMP     NETWORK_ERROR

0127 E8 0038 R      NETCAN: CALL    PUSHR
012A 8B 36 0161 R           MOV     SI,MCBBUFF                              ;POINT TO MCBS
012E 2E: 8E 1E 0012 R       MOV     DS,CS:MYDSEG
0133 06                     PUSH    ES
0134 53                     PUSH    BX
0135 26: C4 5F 04           LES     BX,ES:[BX.MCB_BUFFER]                   ;GET ADDRESS OF MCB TO CAN
0139 8C C0                  MOV     AX,ES
013B 39 5C 40       NETC1:  CMP     WORD PTR DS:[SI.MMCB_LOC],BX            ;CHECK OFFSET OF OLD MCB
013E 75 05                  JNE     @F
0140 39 44 42               CMP     WORD PTR DS:[SI.MMCB_LOC+2],AX          ;AND SEGMENT
0143 74 10                  JE      NETC2                                   ;IF GOT A MATCH THEN CAN IT
0145 83 C6 4E       @@:     ADD     SI,SIZE MYMCB                           ;LOOP THROUGH MCBS
0148 3B 36 0163 R           CMP     SI,MCBDATA
014C 72 ED                  JB      NETC1
014E 5B                     POP     BX
014F 07                     POP     ES
0150 E8 004A R              CALL    POPR                                    ;PROCESS AS IS
0153 EB B5                  JMP     NEWNO
0155 5B              NETC2: POP     BX
0156 07                     POP     ES                                      ;GET BACK MCB OF CAN COMMAND
0157 26: 89 77 04           MOV     WORD PTR ES:[BX.MCB_BUFFER],SI          ;SET TO CANCEL MY MCB
015B 26: 8C 5F 06           MOV     WORD PTR ES:[BX.MCB_BUFFER+2],DS
015F 1E                     PUSH    DS                                      ;SAV ADDR OF MY MCB
0160 56                     PUSH    SI
0161 9C                     PUSHF                                           ;CALL NETBIOS TO DO CANCEL
0162 FA                     CLI
0163 2E: FF 1E 0018 R       CALL    DWORD PTR CS:[OLDNET]
0168 2E: A3 0016 R          MOV     CS:NETRET,AX                            ;SAVE RETURN CODE
016C C5 74 40               LDS     SI,DS:[SI.MMCB_LOC]                     ;GET ORIG. MCB ADDR
016F 26: 89 77 04           MOV     WORD PTR ES:[BX.MCB_BUFFER],SI          ;RELOAD WITH ORIG MCB ADDR
0173 26: 8C 5F 06           MOV     WORD PTR ES:[BX.MCB_BUFFER+2],DS
0177 5E                     POP     SI                                      ;GET BACK MY MCB ADDR
0178 1F                     POP     DS
0179 8B FB                  MOV     DI,BX                                   ;ES:DI TO
017B 8B 44 04               MOV     AX,WORD PTR DS:[SI.MCB_BUFFER]          ;POINT TO BUFFER
017E 2B 06 0163 R           SUB     AX,MCBDATA                              ;ADJUST TO 0 OFFSET
0182 8A C4                  MOV     AL,AH                                   ;GET OFFSET IN BLOCKS
0184 32 E4                  XOR     AH,AH
0186 8B F8                  MOV     DI,AX                                   ;POINT TO USAGE TABLE
0188 81 C7 0165 R           ADD     DI,OFFSET MCBDTBL
018C 8B 4C 4C               MOV     CX,[SI.MMCB_BLOCKS]                     ;GET LENGTH IN BYTES
018F B0 00                  MOV     AL,0
0191 2E: 8E 06 0012 R       MOV     ES,CS:MYDSEG
0196 E3 02                  JCXZ    @F
0198 F3/ AA                 REP     STOSB                                   ;DE-ALLOCATE DATA BUFFER
019A 8B 44 4A       @@:     MOV     AX,[SI.MMCB_POSTAX]                     ;GET AX FROM POST
019D FA                     CLI
019E C6 44 44 00            MOV     [SI.MMCB_INUSE],0                       ;DE-ALLOCATE MCB
01A2 E8 004A R              CALL    POPR
01A5 2E: A1 0016 R          MOV     AX,CS:NETRET
01A9 2E: FF 0E 0000 R       DEC     CS:INNET
01AE 9D                     POPF
01AF CF                     IRET
                    ;
01B0 E8 0038 R      NOWAIT: CALL    PUSHR
01B3 26: 8B 47 06           MOV     AX,WORD PTR ES:[BX.MCB_BUFFER+2]        ;GET BUFFER SEGMENT
```

```
01B7  2E: 3B 06 0012 R              CMP     AX,CS:MYDSEG
01BC  77 10                         JA      @F                              ;IF IN SWAPPABLE AREA, CONTINUE
01BE  26: 8B 47 2E                  MOV     AX,WORD PTR ES:[BX.MCB_POST+2]  ;GET POST ROUTINE SEG
01C2  8C C9                         MOV     CX,CS
01C4  3B C1                         CMP     AX,CX                           ;
01C6  77 06                         JA      @F
01C8  E8 004A R                     CALL    POPR
01CB  E9 010A R                     JMP     NEWNO
01CE  06                    @@:     PUSH    ES
01CF  2E: A1 0012 R                 MOV     AX,CS:MYDSEG                    ;SET DATA SEGMENTS
01D3  8E D8                         MOV     DS,AX
01D5  8E C0                         MOV     ES,AX
01D7  B9 0040                       MOV     CX,SIZE MCB
01DA  8B 3E 0161 R                  MOV     DI,MCBBUFF                      ;FIND A FREE MCB
01DE  FA                            CLI
01DF  80 7D 44 00           @@:     CMP     [DI.MMCB_INUSE],0               ;THIS ONE IN USE?
01E3  74 0F                         JE      @F                              ;IF 0 FOUND A FREE ONE
01E5  83 C7 4E                      ADD     DI,SIZE MYMCB
01E8  3B 3E 0163 R                  CMP     DI,MCBDATA
01EC  72 F1                         JB      @B
01EE  BA 0064 R                     MOV     DX,OFFSET OUT_OF_MCBS
01F1  E9 0059 R                     JMP     NETWORK_ERROR
01F4  C6 45 44 01           @@:     MOV     [DI.MMCB_INUSE],1               ;MARK THIS ONE IN USE
01F8  2E: C5 36 0008 R              LDS     SI,DWORD PTR CS:TINMEM          ;GET ADDRESS OF TSR IN USE
01FD  8B 04                         MOV     AX,DS:[SI]                      ;GET TSR IN USE
01FF  26: 89 45 45                  MOV     ES:[DI.MMCB_TSRNUM],AX          ;SET WHOM BY
0203  1F                            POP     DS                              ;RETRIEVE USER'S DATA SEGMENT
0204  26: 89 5D 40                  MOV     WORD PTR ES:[DI.MMCB_LOC],BX
0208  26: 8C 5D 42                  MOV     WORD PTR ES:[DI.MMCB_LOC+2],DS  ;AND SET LOCATION OF USER'S MCB
020C  33 C0                         XOR     AX,AX
020E  26: 89 45 47                  MOV     ES:[DI.MMCB_COUNT],AX           ;CLEAR NEXT POINTER
0212  26: 88 45 49                  MOV     ES:[DI.MMCB_POSTED],AL          ;CLEAR POSTED FLAG
0216  8B F3                         MOV     SI,BX                           ;OFFSET OF USER'S MCB
0218  FB                            STI                                     ;INTS BACK ON
0219  FC                            CLD
021A  57                            PUSH    DI
021B  F3/ A4                        REP MOVSB                               ;COPY IN USER'S MCB
021D  5F                            POP     DI
021E  2E: 8E 1E 0012 R              MOV     DS,CS:MYDSEG
0223  C7 45 2C 0287 R               MOV     WORD PTR DS:[DI.MCB_POST],OFFSET NETPOST
0228  8C 4D 2E                      MOV     WORD PTR DS:[DI.MCB_POST+2],CS
                                    ;
                                    ; ALLOCATE SPACE FOR THE DATA BUFFER
022B  8B 45 08                      MOV     AX,[DI.MCB_LENGTH]              ;GET LENGTH IN BYTES
022E  8A CC                         MOV     CL,AH                           ;CONVERT TO 256 BYTE BLOCKS
0230  32 ED                         XOR     CH,CH                           ;CLEAR HIGH ORDER
0232  0A C0                         OR      AL,AL                           ;ANY REMAINDER IN DEVIDE?
0234  74 01                         JE      @F                              ;NOPE
0236  41                            INC     CX                              ;ACCOUNT FOR OVERFLOW
0237  89 4D 4C              @@:     MOV     [DI.MMCB_BLOCKS],CX             ;SAVE NUMBER OF BLOCKS
023A  BE 0165 R                     MOV     SI,OFFSET MCBDTBL
023D  8B C6                 NEWN1:  MOV     AX,SI                           ;CHECK DATA TABLE
023F  03 C1                         ADD     AX,CX                           ;ADD NUMBER OF BLOCKS REQUIRED
0241  3D 0264 R                     CMP     AX,OFFSET MCBTEND               ;MORE THAN LEFT IN TABLE?
0244  77 0F                         JA      NET_BUFFER_OVERFLOW             ;IF SO ABORT WITH ERROR MESSAGE
0246  E3 23                         JCXZ    NEWN2
0248  56                            PUSH    SI                              ;SAVE NEXT BLOCK TO CHECK
0249  51                            PUSH    CX                              ;SAVE NUMBER OF BLOCKS
024A  AC                    @@:     LODSB                                   ;GET NEXT FLAG
024B  0A C0                         OR      AL,AL                           ;IS BLOCK FREE?
024D  E1 FB                         LOOPE   @B                              ;LOOP IF IT IS
024F  59                            POP     CX                              ;RESTORE COUNT
0250  74 09                         JE      @F                              ;IF ZR THEN GOT ENOUGH SPACE
```

```
0252  58                              POP     AX                              ;JUNK BLOCK POINTER
0253  EB E8                           JMP     NEWN1

0255                  NET_BUFFER_OVERFLOW:
0255  BA 0071 R                       MOV     DX,OFFSET OUT_OF_DATA
0258  E9 0059 R                       JMP     NETWORK_ERROR
                                ;
025B  5E                      @@:     POP     SI                              ;POINT TO FIRST FREE BLOCK
025C  57                              PUSH    DI                              ;SAVE IT AGAIN
025D  56                              PUSH    SI
025E  8B FE                           MOV     DI,SI                           ;SET UP FOR STOSB
0260  B0 01                           MOV     AL,1                            ;SET TO OCCUPIED
0262  2E: 8E 06 0012 R                MOV     ES,CS:MYDSEG                    ;POINT TO MY MCB
0267  F3/ AA                          REP     STOSB                           ;AND MARK BLOCKS AS USED
0269  58                              POP     AX                              ;GET BACK FIRST FREE
026A  5F                              POP     DI                              ;GET POINTER TO MCB
026B  2D 0165 R               NEWN2:  SUB     AX,OFFSET MCBDTBL               ;CONVERT TO BYTE COUNT
026E  8A E0                           MOV     AH,AL                           ;CONVERT TO BLOCK COUNT
0270  32 C0                           XOR     AL,AL                           ;CLEAR LOW ORDER
0272  03 06 0163 R                    ADD     AX,MCBDATA                      ;FIND OFFSET OF START OF BUFFER
0276  C5 75 04                        LDS     SI,[DI.MCB_BUFFER]              ;GET ADDRESS OF USER'S BUFFER
0279  26: 89 45 04                    MOV     WORD PTR ES:[DI.MCB_BUFFER],AX  ;SET BUFFER ADDRESS IN MCB
027D  26: 8C 45 06                    MOV     WORD PTR ES:[DI.MCB_BUFFER+2],ES
0281  26: 8B 4D 08                    MOV     CX,ES:[DI.MCB_LENGTH]           ;GET SIZE OF USER'S BUFFER
0285  8B DF                           MOV     BX,DI                           ;SAVE MCB POINTER IN BX
0287  8B F8                           MOV     DI,AX                           ;POINT TO MY DATA BUFFER
0289  E3 02                           JCXZ    @F
028B  F3/ A4                          REP     MOVSB                           ;COPY USER'S DATA BUFFER
028D  33 C0                   @@:     XOR     AX,AX
028F  2E: 8E 1E 0012 R                MOV     DS,CS:MYDSEG                    ;SET DS IN CASE?
0294  9C                              PUSHF                                   ;CALL NETBIOS
0295  FA                              CLI
0296  2E: FF 1E 0018 R                CALL    DWORD PTR CS:[OLDNET]
029B  2E: A3 0016 R                   MOV     CS:NETRET,AX                    ;SAVE RETURN CODE
029F  E8 004A R                       CALL    POPR                            ;RESTORE REGISTERS
02A2  26: C6 47 01 FF                 MOV     ES:[BX.MCB_RETCODE],0FFH        ;SET COMMAND NOT COMPLETE
02A7  26: C6 47 31 FF                 MOV     ES:[BX.MCB_CMD_CPLT],0FFH       ;AND IN THIS FIELD TOO
02AC  2E: A1 0016 R                   MOV     AX,CS:NETRET
02B0  2E: FF 0E 0000 R                DEC     CS:INNET
02B5  9D                              POPF
02B6  CF                              IRET
02B7                  NEWNET  ENDP
                            ;
                            ;
02B7                  NETPOST PROC    FAR
02B7  FA                              CLI
02B8  2E: FF 06 0002 R                INC     CS:INPOST
02BD  E8 0038 R                       CALL    PUSHR
02C0  2E: 8E 1E 0012 R                MOV     DS,CS:MYDSEG
02C5  89 47 4A                        MOV     [BX.MMCB_POSTAX],AX             ;SAVE RETURN CODE FROM NETWORK
02C8  8B 7F 45                        MOV     DI,DS:[BX.MMCB_TSRNUM]          ;GET TSR FOR THIS MCB
02CB  0B FF                           OR      DI,DI
02CD  75 08                           JNE     @F
02CF  2E: A1 0004 R                   MOV     AX,CS:PSEQ                      ;GET SEQUENCE NUMBER
02D3  2E: FF 06 0004 R                INC     CS:PSEQ                         ;BUMP IT
02D8  EB 17                           JMP     SHORT NETP2
02DA  1E                      @@:     PUSH    DS
02DB  2E: 8E 1E 000C R                MOV     DS,CS:HRDSEG
02E0  8B 45 5E                        MOV     AX,[DI.POSTSEQ]                 ;GET TSR'S SEQUENCE NUMBER
02E3  FF 45 5E                        INC     [DI.POSTSEQ]
02E6  80 BD 0088 00                   CMP     [DI+SWAPNET].RESET,0            ;NETBIOS SWAP-IN EVENT?
02EB  74 03                           JE      @F
02ED  FE 45 78                        INC     [DI+SWAPNET].COUNT              ;FLAG TO BE SWAPPED IN
```

```
02F0  1F                    aa:       POP    DS
02F1  89 47 47              NETP2:    MOV    [BX.MMCB_COUNT],AX        ;MARK SEQUENCE
02F4  C6 47 49 01                     MOV    [BX.MMCB_POSTED],1        ;THIS ONE'S BEEN POSTED
02F8  E8 004A R                       CALL   POPR
02FB  2E: FF 0E 0002 R                DEC    CS:INPOST
0300  CF                              IRET
0301                        NETPOST ENDP
                            ;
                            ;
                            ;
                            ;WHEN A TSR IS SWAPPED IN, OR AT FIXED INTERVALS, POST COMPLETED
                            ;NETBIOS CALLS TO THE TSR
                            ;
0301                        POST2TSR PROC    NEAR
0301  9C                              PUSHF
0302  FA                              CLI
0303  2E: FF 06 0002 R                INC    CS:INPOST
0308  2E: 83 3E 0002 R 01             CMP    CS:INPOST,1
030E  74 03                           JE     aF
0310  E9 039C R                       JMP    P2TDON
0313  1E                    aa:       PUSH   DS
0314  53                              PUSH   BX
0315  2E: 83 3E 000C R 00             CMP    CS:HRDSEG,0
031B  74 08                           JE     aF
031D  2E: C5 1E 000E R                LDS    BX,DWORD PTR CS:INSWAP    ;GET ADDRESS OF HEADROOM SWAP
0322  83 3F 00                        CMP    WORD PTR DS:[BX],0        ;SEE IF SWAP IS IN PROGRESS
0325  5B                    aa:       POP    BX
0326  1F                              POP    DS
0327  7D 73                           JGE    P2TDON
0329  2E: FF 06 0036 R                INC    CS:SWITCHEM               ;GET A LOCAL STACK FRAME
032E  75 12                           JNE    aF
0330  2E: 8C 16 002C R                MOV    CS:OLDSS,SS
0335  2E: 89 26 002E R                MOV    CS:OLDSP,SP
033A  2E: 8E 16 0014 R                MOV    SS,CS:MYSSEG
033F  BC 0200 R                       MOV    SP,OFFSET STKEND
0342  E8 0038 R             aa:       CALL   PUSHR                     ;SAVE REGS
0345  2E: C5 3E 0008 R      P2TNXT:   LDS    DI,DWORD PTR CS:TINMEM    ;GET DBLK OF CURRENT TSR
034A  8B 3D                           MOV    DI,[DI]
034C  2E: 8E 1E 0012 R                MOV    DS,CS:MYDSEG              ;SET TO MYDSEG
0351  BB 36 0161 R                    MOV    SI,MCBBUFF                ;POINT TO FIRST MCB
0355  2E: 8B 0E 0006 R                MOV    CX,CS:PNEXT               ;GET NEXT SEQUENCE FOR APPL
035A  0B FF                           OR     DI,DI                     ;IS THIS FOR AN APPL?
035C  74 0A                           JE     P2TA                      ;IF YES THE JUMP
035E  1E                              PUSH   DS
035F  2E: 8E 1E 000C R                MOV    DS,CS:HRDSEG              ;GET HEADROOM'S DATA SEGMENT
0364  8B 4D 60                        MOV    CX,[DI.POSTNXT]           ;GET NEXT TO POST FOR TSR
0367  1F                              POP    DS                        ;BACK TO NET DATA SEGMENT
0368  80 7C 44 00           P2TA:     CMP    [SI.MMCB_INUSE],0         ;IS THIS AN ACTIVE MCB?
036C  74 10                           JE     aF                        ;NOPE
036E  80 7C 49 00                     CMP    [SI.MMCB_POSTED],0        ;HAS THIS ONE BEEN POSTED
0372  74 0A                           JE     aF                        ;NOPE
0374  39 7C 45                        CMP    [SI.MMCB_TSRNUM],DI       ;BELONGS TO TSR IN MEMORY
0377  75 05                           JNE    aF                        ;NOPE
0379  39 4C 47                        CMP    [SI.MMCB_COUNT],CX        ;IS THIS THE NEXT ONE POSTED
037C  74 25                           JE     P2TB                      ; YES, THEN GO FOR IT
037E  83 C6 4E              aa:       ADD    SI,SIZE MYMCB             ;LOOP TO NEXT MCB
0381  3B 36 0163 R                    CMP    SI,MCBDATA                ;ANY MORE?
0385  72 E1                           JB     P2TA                      ;LOOP IF MORE
0387  E8 004A R             P2TEND:   CALL   POPR
038A  FA                              CLI
038B  2E: FF 0E 0036 R                DEC    CS:SWITCHEM
0390  7D 0A                           JGE    P2TDON                    ;RESTORE CALLER STACK FRAME
```

```
0392 2E: 8E 16 002C R              MOV     SS,CS:OLDSS
0397 2E: 88 26 002E R              MOV     SP,CS:OLDSP
039C 2E: FF 0E 0002 R      P2TDON: DEC     CS:INPOST
03A1 9D                            POPF
03A2 C3                            RET
                             ;
                             ;FOUND A POSTED MCB FOR TSR CURRENTLY IN MEMORY. NOW POST IT
                             ;
03A3 C4 7C 40              P2TB:   LES     DI,[SI.MMCB_LOC]            ;GET LOC OF CALLER'S MCB
03A6 56                            PUSH    SI
03A7 26: C4 7D 04                  LES     DI,ES:[DI.MCB_BUFFER]       ;POINT TO USER'S BUFFER
03AB 8B 4C 08                      MOV     CX,[SI.MCB_LENGTH]          ;GET NUMBER OF BYTES
03AE 8B 74 04                      MOV     SI,WORD PTR DS:[SI.MCB_BUFFER] ;AND GET MY BUFFER ADDRESS
03B1 FC                            CLD
03B2 E3 02                         JCXZ    @F
03B4 F3/ A4                        REP MOVSB                           ;COPY BUFFER TO USER'S BUFFER
03B6 5E                    @@:     POP     SI                          ;RESTORE MY MCB POINTER
03B7 C4 7C 40                      LES     DI,[SI.MMCB_LOC]            ;GET BACK CALLER'S MCB
03BA 57                            PUSH    DI                          ;SAVE USER'S MCB
03BB 56                            PUSH    SI                          ;SAVE MY MCB
03BC B9 0004                       MOV     CX,MCB_BUFFER-MCB_COMMAND   ;COPY MY MCB TO USER MCB
03BF FC                            CLD
03C0 F3/ A4                        REP MOVSB                           ;FROM COMMAND TO BUFFER
03C2 83 C6 04                      ADD     SI,MCB_LENGTH-MCB_BUFFER    ;SKIP BUFFER ADDRESS
03C5 83 C7 04                      ADD     DI,MCB_LENGTH-MCB_BUFFER
03C8 B9 0024                       MOV     CX,MCB_POST-MCB_LENGTH      ;NOW COPY LENGTH THRU POST
03CB F3/ A4                        REP MOVSB
03CD 83 C6 04                      ADD     SI,MCB_LANA_NUM-MCB_POST    ;SKIP POST ADDRESS
03D0 83 C7 04                      ADD     DI,MCB_LANA_NUM-MCB_POST
03D3 B9 0010                       MOV     CX,SIZE MCB-MCB_LANA_NUM    ;AND COPY REST OF MCB
03D6 F3/ A4                        REP MOVSB
03D8 5E                            POP     SI                          ;RESTORE MY MCB
03D9 06                            PUSH    ES                          ;SAVE USER MCB SEG
03DA 8B 44 04                      MOV     AX,WORD PTR DS:[SI.MCB_BUFFER] ;POINT TO BUFFER
03DD 2B 06 0163 R                  SUB     AX,MCBDATA                  ;ADJUST TO 0 OFFSET
03E1 8A C4                         MOV     AL,AH                       ;GET OFFSET IN BLOCKS
03E3 32 E4                         XOR     AH,AH
03E5 8B F8                         MOV     DI,AX                       ;POINT TO USAGE TABLE
03E7 81 C7 0165 R                  ADD     DI,OFFSET MCBDTBL
03EB 8B 4C 4C                      MOV     CX,[SI.MMCB_BLOCKS]         ;GET LENGTH IN BYTES
03EE B0 00                         MOV     AL,0
03F0 2E: 8E 06 0012 R              MOV     ES,CS:MYDSEG
03F5 E3 02                         JCXZ    @F
03F7 F3/ AA                        REP STOSB                           ;DE-ALLOCATE DATA BUFFER
03F9 8B 44 4A                 @@:  MOV     AX,[SI.MMCB_POSTAX]         ;GET AX FROM POST
03FC FA                            CLI
03FD C6 44 44 00                   MOV     [SI.MMCB_INUSE],0           ;DE-ALLOCATE MCB
                             ;
                             ;NOW BUMP UP SEQUENCE FOR MCBS POSTED FOR THIS TSR
0401 8B 5C 45                      MOV     BX,[SI.MMCB_TSRNUM]         ;GET ADDR OF TSR DBLK
0404 0B DB                         OR      BX,BX                       ;A TSR OR APPL
0406 74 16                         JE      P2TD                        ;APPL -- JUMP
0408 1E                            PUSH    DS
0409 2E: 8E 1E 000C R              MOV     DS,CS:HRDSEG
040E FF 47 60                      INC     [BX.POSTNXT]                ;BUMP SEQUENCE NUMBER
0411 80 BF 0088 00                 CMP     [BX+SWAPNET].RESET,0        ;
0416 74 03                         JE      @F
0418 FE 4F 78                      DEC     [BX+SWAPNET].COUNT          ;BUMP DOWN SWAPIN EVENT
041B 1F                     @@:    POP     DS
041C EB 05                         JMP     SHORT P2TC
041E 2E: FF 06 0006 R     P2TD:    INC     CS:PNEXT                    ;BUMP APPL NEXT NUMBER
                             ;
```

```
                        ;NOW POST TO TSR THAT A COMMAND HAS COMPLETED.
0423 07                 P2TC:   POP     ES                              ;GET BACK USER'S MCB SEG
0424 5B                         POP     BX                              ;GET BACK USER'S MCB OFFSET 0425 50                         PUSH    AX
0426 26: 8B 47 2C               MOV     AX,WORD PTR ES:[BX.MCB_POST]    ;GET OFFSET OF POST ROUTINE
042A 26: 0B 47 2E               OR      AX,WORD PTR ES:[BX.MCB_POST+2]  ;SEE IF NOT 0:0
042E 58                         POP     AX
042F 74 06                      JE      @F
0431 9C                         PUSHF
0432 FA                         CLI
0433 26: FF 5F 2C               CALL    ES:[BX.MCB_POST]                ;CALL USER POST ROUTINE
0437 E9 0345 R           @@:    JMP     P2TNXT                          ;GO POST NEXT COMPLETED MCB
043A                    POST2TSR ENDP
                        ;
                                PUBLIC  NETLOG
                        ;
                        ;ASSIGN PENDING MCBS TO A SWAPPED OUT TSR
                        ; CALLED WITH DI=DBLK OF TSR
                        ;
043A                    NETLOG  PROC    FAR
043A 1E                         PUSH    DS
043B 06                         PUSH    ES
043C 56                         PUSH    SI
043D 2E: A1 0012 R              MOV     AX,CS:MYDSEG
0441 8E D8                      MOV     DS,AX
0443 8E C0                      MOV     ES,AX
0445 FA                         CLI
0446 BE 36 0161 R               MOV     SI,MCBBUFF                      ;POINT TO START OF MCBS
044A 80 7C 44 00         NETL1: CMP     [SI.MMCB_INUSE],0               ;IS THIS ONE IN USE?
044E 74 09                      JE      @F
0450 83 7C 45 00                CMP     [SI.MMCB_TSRNUM],0              ;ALREADY ASSIGNED TO A TSR?
0454 75 03                      JNE     @F                              ;NOPE
0456 89 7C 45                   MOV     [SI.MMCB_TSRNUM],DI             ;POINT TO TSR JUST SWAPPED
0459 83 C6 4E           @@:     ADD     SI,SIZE MYMCB                   ;NEXT . . .
045C 3B 36 0163 R               CMP     SI,MCBDATA
0460 72 E8                      JB      NETL1
0462 2E: A1 000C R              MOV     AX,CS:HRDSEG                    ;GET HEADROOM DATA SEGMENT
0466 8E D8                      MOV     DS,AX
0468 2E: A1 0004 R              MOV     AX,CS:PSEQ
046C 89 45 5E                   MOV     [DI.POSTSEQ],AX                 ;SET CORRECT SEQUENCE NUMBERS
046F 2E: A1 0006 R              MOV     AX,CS:PNEXT                     ;IN TSR
0473 89 45 60                   MOV     [DI.POSTNXT],AX
0476 33 C0                      XOR     AX,AX                           ;CLEAR POSTS FOR APPL
0478 2E: A3 0004 R              MOV     CS:PSEQ,AX
047C 2E: A3 0006 R              MOV     CS:PNEXT,AX
0480 5E                         POP     SI
0481 07                         POP     ES
0482 1F                         POP     DS
0483 FB                         STI
0484 CB                         RET
0485                    NETLOG  ENDP
                        ;
                                PUBLIC  NETOUT
                        ;
0485                    NETOUT  PROC    FAR
0485 2E: 8E 1E 0012 R           MOV     DS,CS:MYDSEG
048A 8B 1E 0000 R               MOV     BX,DS:_PSP
048E B4 50                      MOV     AH,50H
0490 CD 21                      INT     21H                             ;SET TO MY PSP
0492 2E: C5 16 0028 R           LDS     DX,DWORD PTR CS:[OLDI16]
0497 B8 2516                    MOV     AX,2516H
049A CD 21                      INT     21H                             ;RESTORE INTS 21, 8, 5C
```

```
049C  2E: C5 16 001C R              LDS     DX,DWORD PTR CS:[OLDI21]
04A1  B8 2521                       MOV     AX,2521H
04A4  CD 21                         INT     21H                              ;RESTORE INTS 21, 8, 5C
04A6  2E: C5 16 0030 R              LDS     DX,DWORD PTR CS:[OLDI08]
04AB  B8 2508                       MOV     AX,2508H
04AE  CD 21                         INT     21H
                              ;     LDS     DX,DWORD PTR CS:[OLDI28]
                              ;     MOV     AX,2528H
                              ;     INT     21H
04B0  2E: C5 16 0020 R              LDS     DX,DWORD PTR CS:[OLDI09]
04B5  B8 2509                       MOV     AX,2509H
04B8  CD 21                         INT     21H
04BA  2E: C5 16 0018 R              LDS     DX,DWORD PTR CS:[OLDNET]
04BF  B8 255C                       MOV     AX,255CH
04C2  CD 21                         INT     21H
04C4  2E: 8E 1E 0012 R              MOV     DS,CS:MYDSEG
04C9  B8 36 0161 R                  MOV     SI,MCBBUFF                       ;POINT TO MY MCBS
04CD  80 7C 44 00       NOUT1:      CMP     [SI.MMCB_INUSE],0                ;THIS ONE IN USE?
04D1  74 06                         JE      NOUT2                            ;NOPE, SKIP IT
04D3  80 7C 49 00                   CMP     [SI.MMCB_POSTED],0               ;POSTED?
04D7  74 0C                         JE      CANIT                            ;NO, CANCEL IT
04D9  83 C6 4E          NOUT2:      ADD     SI,SIZE MYMCB                    ;NEXT ONE
04DC  3B 36 0163 R                  CMP     SI,MCBDATA                       ;PAST END?
04E0  72 EB                         JB      NOUT1                            ;NO, CONTINUE
04E2  EB 1C 90                      JMP     ALLCAND                          ;NOW EXIT
04E5  BB 0121 R         CANIT: MOV  BX,OFFSET TMCB                           ;POINT TO AN MCB
04E8  C6 07 35                      MOV     [BX.MCB_COMMAND],35H             ;CANCEL COMMAND
04EB  8A 44 30                      MOV     AL,[SI.MCB_LANA_NUM]             ;GET ADAPTER NUMBER
04EE  88 47 30                      MOV     [BX.MCB_LANA_NUM],AL             ;SET IN MCB FOR CANCEL
04F1  89 77 04                      MOV     WORD PTR [BX.MCB_BUFFER],SI      ;SET ADDRESS OF MCB TO CANCEL
04F4  8C 5F 06                      MOV     WORD PTR [BX.MCB_BUFFER+2],DS    ;AND SEGMENT
04F7  2E: 8E 06 0012 R              MOV     ES,CS:MYDSEG
04FC  CD 5C                         INT     5CH                              ;CALL NETBIOS
04FE  EB D9                         JMP     SHORT NOUT2
0500  2E: 8E 1E 0012 R  ALLCAND:MOV DS,CS:MYDSEG
0505  2E: 8E 06 0000 R              MOV     ES,CS:_PSP                       ;POINT TO MY PSP
050A  B4 49                         MOV     AH,49H
050C  CD 21                         INT     21H                              ;DE-ALLOCATE MY SPACE
050E  BA 00EE R                     MOV     DX,OFFSET NETGONE
0511  B4 09                         MOV     AH,9
0513  CD 21                         INT     21H
0515  B8 4C00                       MOV     AX,4C00H                         ;AND EXIT
0518  CD 21                         INT     21H
051A                   NETOUT ENDP
                              ;
                                    PUBLIC  NETLINK
                              ;
                              ; INT 21H HANDLER -- CHECK FOR LOGIN FROM HEADROOM
                              ; ALSO GIVE PROCESSING TIME TO NETPOST
                              ;
051A                   NETLINK PROC FAR
051A  9C                            PUSHF
051B  3D 5758                       CMP     AX,5758H
051E  75 06                         JNE     @F
0520  81 FB 00FE                    CMP     BX,0FEH
0524  74 09                         JE      NETL
0526  E8 0301 R         @@:         CALL    POST2TSR
0529  9D                            POPF
052A  2E: FF 2E 001C R              JMP     DWORD PTR CS:[OLDI21]
052F  9D                NETL:       POPF
0530  FB                            STI
0531  2E: 8C 1E 000C R              MOV     CS:HRDSEG,DS
0536  2E: 8C 06 000A R              MOV     CS:TIMMEM+2,ES
```

```
053B  2E: 8C 06 0010 R              MOV     CS:INSWAP+2,ES
0540  2E: 89 0E 0008 R              MOV     CS:TINMEM,CX
0545  2E: 89 16 000E R              MOV     CS:INSWAP,DX
054A  0E                            PUSH    CS
054B  07                            POP     ES
054C  BB 0000 R                     MOV     BX,OFFSET PGROUP:INNET
054F  B9 0485 R                     MOV     CX,OFFSET PGROUP:NETOUT
0552  B8 0002 R                     MOV     AX,OFFSET PGROUP:INPOST
0555  BA 043A R                     MOV     DX,OFFSET PGROUP:NETLOG
0558  F8                            CLC
0559  CA 0002                       RETF    2
055C                        NETLINK ENDP
                                ;
                                    PUBLIC  NETTIM
                                ;
055C                        NETTIM  PROC    FAR
055C  9C                            PUSHF
055D  2E: FF 1E 0030 R              CALL    DWORD PTR CS:[OLDI08]
0562  E8 0301 R                     CALL    POST2TSR
0565  CF                            IRET
0566                        NETTIM  ENDP
                                ;
0566                        NETKEY  PROC    FAR
0566  9C                            PUSHF
0567  2E: FF 1E 0020 R              CALL    DWORD PTR CS:[OLDI09]
056C  E8 0301 R                     CALL    POST2TSR
056F  CF                            IRET
0570                        NETKEY  ENDP
                                ;
0570                        NETI16  PROC    FAR
0570  9C                            PUSHF
0571  2E: FF 1E 0028 R              CALL    DWORD PTR CS:[OLDI16]
0576  E8 0301 R                     CALL    POST2TSR
0579  CA 0002                       RETF    2
057C                        NETI16  ENDP
                                ;
057C                        NETI28  PROC    FAR
057C  9C                            PUSHF
057D  2E: FF 1E 0024 R              CALL    DWORD PTR CS:[OLDI28]
0582  E8 0301 R                     CALL    POST2TSR
0585  CA 0002                       RETF    2
0588                        NETI28  ENDP
                                ;
0588                        _TEXT   ENDS

0000                        INIT    SEGMENT WORD PUBLIC 'INIT'
                                    ASSUME  CS:IGROUP,DS:DGROUP,ES:DGROUP

PUBLIC  PSP,NUMMCB,BUFSIZ,GETNUM,START,ABORT 0000  00 0A 0A 48 45 41     STRTMES DB      13,10,10,"HEADROOM NETBIOS Network Extensions Version 2.00a",13,10
      44 52 4F 4F 4D 20
      4E 45 54 42 49 4F
      53 20 4E 65 74 77
      6F 72 6B 20 45 78
      74 65 6E 73 69 6F
      6E 73 20 56 65 72
      73 69 6F 6E 20 32
      2E 30 30 61 0D 0A
0036  43 6F 70 79 72 69             DB      "Copyright (c) 1989, Helix Software Company, Inc.",13,10
      67 68 74 20 28 63
      29 20 31 39 38 39
      2C 20 48 65 6C 69
```

```
        78 20 53 6F 66 74
        77 61 72 65 20 43
        6F 6D 70 61 6E 79
        2C 20 49 6E 63 2E
        00 0A
0068    41 4C 4C 20 52 49              DB      "ALL RIGHTS RESERVED.",13,10,10,"$"
        47 48 54 53 20 52
        45 53 45 52 56 45
        44 2E 00 0A 0A 24
0080    48 45 41 44 52 4F      HEADIN  DB      "HEADROOM Network Extensions must be installed "
        4F 4D 20 4E 65 74
        77 6F 72 6B 20 45
        78 74 65 6E 73 69
        6F 6E 73 20 6D 75
        73 74 20 62 65 20
        69 6E 73 74 61 6C
        6C 65 64 20
00AE    42 45 46 4F 52 45              DB      "BEFORE HEADROOM.",13,10,10,"$"
        20 48 45 41 44 52
        4F 4F 4D 2E 00 0A
        0A 24
00C2    48 45 41 44 52 4F      NETIN   DB      "HEADROOM Network Extensions already loaded.",13,10,10,"$"
        4F 4D 20 4E 65 74
        77 6F 72 6B 20 45
        78 74 65 6E 73 69
        6F 6E 73 20 61 6C
        72 65 61 64 79 20
        6C 6F 61 64 65 64
        2E 00 0A 0A 24
00F1    43 6F 6D 6D 61 6E      OPTERR  DB      "Command line option error.  Valid options are:",13,10
        64 20 6C 69 6E 65
        20 6F 70 74 69 6F
        6E 20 65 72 72 6F
        72 2E 20 20 56 61
        6C 69 64 20 6F 70
        74 69 6F 6E 73 20
        61 72 65 3A 00 0A
0121    20 20 20 2D 44 78              DB      "   -Dxx    Set data buffer size to xx Kb",13,10
        78 20 20 20 20 20
        53 65 74 20 64 61
        74 61 20 62 75 66
        66 65 72 20 73 69
        7A 65 20 74 6F 20
        78 78 20 4B 62 00
        0A
014C    20 20 20 2D 4D 78              DB      "   -Mxx    Set number of MCBs available to xx",13,10
        78 20 20 20 20 20
        53 65 74 20 6E 75
        6D 62 65 72 20 6F
        66 20 4D 43 42 73
        20 61 76 61 69 6C
        61 62 6C 65 20 74
        6F 20 78 78 00 0A
017C    20 20 20 20 5A 20              DB      "   -Z      Zero receive and send timeout values",13,10,10,"$"
        20 20 20 20 20 20
        5A 65 72 6F 20 72
        65 63 65 69 76 65
        20 61 6E 64 20 73
        65 6E 64 20 74 69
        6D 65 6F 75 74 20
        76 61 6C 75 65 73
        00 0A 0A 24
01B0    0000                   PSP     DW      0
```

```
01B2  0014                NUMMCB  DW      20
01B4  000C                BUFSIZ  DW      12

;
01B6                      GETNUM  PROC    NEAR
01B6  33 C0                       XOR     AX,AX
01B8  50                  aa:     PUSH    AX
01B9  E3 19                       JCXZ    GOTNUM
01BB  AC                          LODSB
01BC  3C 30                       CMP     AL,'0'
01BE  72 14                       JB      GOTNUM
01C0  3C 39                       CMP     AL,'9'
01C2  77 10                       JA      GOTNUM
01C4  2C 30                       SUB     AL,'0'
01C6  8A D8                       MOV     BL,AL
01C8  58                          POP     AX
01C9  B7 0A                       MOV     BH,10
01CB  F6 E7                       MUL     BH
01CD  32 FF                       XOR     BH,BH
01CF  03 C3                       ADD     AX,BX
01D1  49                          DEC     CX
01D2  EB E4                       JMP     aa
01D4  4E                  GOTNUM: DEC     SI
01D5  58                          POP     AX
01D6  C3                          RET
01D7                      GETNUM  ENDP
                          ;
01D7                      ABORT   PROC    NEAR
01D7  B8 ---- R                   MOV     AX,IGROUP
01DA  8E D8                       MOV     DS,AX
01DC  B4 09                       MOV     AH,9
01DE  CD 21                       INT     21H
01E0  B8 4C01                     MOV     AX,4C01H
01E3  CD 21                       INT     21H
01E5  CD 20                       INT     20H
01E7                      ABORT   ENDP
                          ;
01E7                      START   PROC    FAR
01E7  B8 ---- R                   MOV     AX,IGROUP
01EA  8E D8                       MOV     DS,AX
01EC  BA 0000 R                   MOV     DX,OFFSET IGROUP:STRTMES
01EF  B4 09                       MOV     AH,9
01F1  CD 21                       INT     21H
01F3  B8 ---- R                   MOV     AX,DGROUP
01F6  8E D8                       MOV     DS,AX
                                  ASSUME  DS:DGROUP
01F8  8C C3                       MOV     BX,ES
01FA  2E: 89 1E 0180 R            MOV     CS:PSP,BX
01FF  89 1E 0000 R                MOV     _PSP,BX
0203  B8 5758                     MOV     AX,5758H
0206  BB 0001                     MOV     BX,1
0209  CD 21                       INT     21H
020B  72 05                       JC      aF
020D  BA 0080 R                   MOV     DX,OFFSET IGROUP:HEADIN
0210  EB C5                       JMP     ABORT
0212  33 C0               aa:     XOR     AX,AX
0214  8E D8                       MOV     DS,AX
0216  B8 5758                     MOV     AX,5758H
0219  BB 00FE                     MOV     BX,0FEH
021C  CD 21                       INT     21H
021E  72 05                       JC      aF
0220  BA 00C2 R                   MOV     DX,OFFSET IGROUP:NETIN
0223  EB B2                       JMP     ABORT
```

```
0225  B8 ---- R              aa:      MOV    AX,DGROUP
0228  8E C0                           MOV    ES,AX
022A  2E: 8E 1E 01B0 R                MOV    DS,CS:PSP
022F  BE 0080                         MOV    SI,80H
0232  AC                              LODSB
0233  32 E4                           XOR    AH,AH
0235  8B C8                           MOV    CX,AX
0237  E3 0B                  NXTOPT:  JCXZ   COMDON
0239  AC                     NXTCHR:  LODSB
023A  3C 2D                           CMP    AL,'-'
023C  74 09                           JE     FNDOPT
023E  3C 2F                           CMP    AL,'/'
0240  74 05                           JE     FNDOPT
0242  E2 F5                  NOOPT:   LOOP   NXTCHR
0244  EB 3B 90               COMDON:  JMP    SETMEM
0247  49                     FNDOPT:  DEC    CX
0248  E3 FA                           JCXZ   COMDON
024A  AC                              LODSB
024B  0C 20                           OR     AL,20H
024D  3C 64                           CMP    AL,'d'
024F  74 0E                           JE     DSIZE
0251  3C 7A                           CMP    AL,'z'
0253  74 14                           JE     ZTO
0255  3C 6D                           CMP    AL,'m'
0257  74 1E                           JE     MSIZE
0259  BA 00F1 R                       MOV    DX,OFFSET IGROUP:OPTERR
025C  E9 01D7 R                       JMP    ABORT
025F  49                     DSIZE:   DEC    CX
0260  E8 01B6 R                       CALL   GETNUM
0263  2E: A3 0184 R                   MOV    CS:BUFSIZ,AX
0267  EB CE                           JMP    NXTOPT
0269  1E                     ZTO:     PUSH   DS
026A  B8 ---- R                       MOV    AX,PGROUP
026D  8E D8                           MOV    DS,AX
                                      ASSUME DS:PGROUP
026F  C7 06 0034 R 0001               MOV    DS:ZTOFLG,1
                                      ASSUME DS:NOTHING
0275  EB C0                           JMP    NXTOPT
0277  49                     MSIZE:   DEC    CX
0278  E8 01B6 R                       CALL   GETNUM
027B  2E: A3 0182 R                   MOV    CS:NUMMCB,AX
027F  EB B6                           JMP    NXTOPT
0281  B8 ---- R              SETMEM:  MOV    AX,DGROUP
0284  8E D8                           MOV    DS,AX
0286  8E C0                           MOV    ES,AX
                                      ASSUME DS:DGROUP
                                      ASSUME ES:DGROUP
0288  2E: A1 0182 R                   MOV    AX,NUMMCB
028C  3D 0040                         CMP    AX,64
028F  72 03                           JB     aF
0291  B8 0040                         MOV    AX,64
0294  BB 004E                aa:      MOV    BX,SIZE MYMCB
0297  F7 E3                           MUL    BX
0299  03 06 0161 R                    ADD    AX,MCBBUFF
029D  A3 0163 R                       MOV    MCBDATA,AX
02A0  2E: A1 0184 R                   MOV    AX,BUFSIZ
02A4  BB 0400                         MOV    BX,1024
02A7  F7 E3                           MUL    BX
02A9  0B D2                           OR     DX,DX
02AB  74 03                           JE     aF
02AD  B8 FFF0                         MOV    AX,0FFF0H
02B0  BA FFF0                aa:      MOV    DX,0FFF0H
02B3  2B 16 0163 R                    SUB    DX,MCBDATA
```

```
0287  3B D0                    CMP      DX,AX
0289  77 02                    JA       @F
028B  8B C2                    MOV      AX,DX
02BD  32 C0            @@:     XOR      AL,AL
02BF  A3 0264 R                MOV      MCBDTOP,AX
02C2  86 C4                    XCHG     AL,AH
02C4  FE C8                    DEC      AL
02C6  A3 0266 R                MOV      MCBTLEN,AX
02C9  8B C8                    MOV      CX,AX
02CB  32 C0                    XOR      AL,AL
02CD  BF 0165 R                MOV      DI,OFFSET MCBDTBL
02D0  FC                       CLD
02D1  F3/ AA                   REP      STOSB
02D3  A1 0163 R                MOV      AX,MCBDATA
02D6  01 06 0264 R             ADD      MCBDTOP,AX
02DA  B8 ---- R                MOV      AX,PGROUP
02DD  8E D8                    MOV      DS,AX
                               ASSUME   DS:PGROUP
02DF  B8 355C                  MOV      AX,355CH
02E2  CD 21                    INT      21H
02E4  89 1E 0018 R             MOV      DS:[OLDNET],BX
02E8  8C 06 001A R             MOV      DS:[OLDNET+2],ES
02EC  B8 3516                  MOV      AX,3516H
02EF  CD 21                    INT      21H
02F1  89 1E 0028 R             MOV      DS:[OLDI16],BX
02F5  8C 06 002A R             MOV      DS:[OLDI16+2],ES
02F9  B8 3528                  MOV      AX,3528H
02FC  CD 21                    INT      21H
02FE  89 1E 0024 R             MOV      DS:[OLDI28],BX
0302  8C 06 0026 R             MOV      DS:[OLDI28+2],ES
0306  B8 3509                  MOV      AX,3509H
0309  CD 21                    INT      21H
030B  89 1E 0020 R             MOV      DS:[OLDI09],BX
030F  8C 06 0022 R             MOV      DS:[OLDI09+2],ES
0313  B8 3521                  MOV      AX,3521H
0316  CD 21                    INT      21H
0318  89 1E 001C R             MOV      DS:[OLDI21],BX
031C  8C 06 001E R             MOV      DS:[OLDI21+2],ES
0320  B8 3508                  MOV      AX,3508H
0323  CD 21                    INT      21H
0325  89 1E 0030 R             MOV      DS:[OLDI08],BX
0329  8C 06 0032 R             MOV      DS:[OLDI08+2],ES
032D  BA 051A R                MOV      DX,OFFSET NETLINK
0330  B8 2521                  MOV      AX,2521H
0333  CD 21                    INT      21H
0335  BA 00AA R                MOV      DX,OFFSET NEWNET
0338  B8 255C                  MOV      AX,255CH
033B  CD 21                    INT      21H
033D  BA 0570 R                MOV      DX,OFFSET NETI16
0340  B8 2516                  MOV      AX,2516H
0343  CD 21                    INT      21H
0345  BA 0566 R                MOV      DX,OFFSET NETKEY
0348  B8 2509                  MOV      AX,2509H
034B  CD 21                    INT      21H
034D  BA 057C R                MOV      DX,OFFSET NETI28
0350  B8 2528                  MOV      AX,2528H
0353  CD 21                    INT      21H
0355  BA 055C R                MOV      DX,OFFSET NETTIM
0358  B8 2508                  MOV      AX,2508H
035B  CD 21                    INT      21H
035D  BB ---- R                MOV      BX,DGROUP
0360  8E DB                    MOV      DS,BX
0362  8E C3                    MOV      ES,BX
```

```
0364  2E: 2B 1E 01B0 R              SUB    BX,CS:PSP
0369  26: A1 0264 R                 MOV    AX,MCBDTOP
036D  B1 04                         MOV    CL,4
036F  D3 E8                         SHR    AX,CL
0371  40                            INC    AX
0372  03 C3                         ADD    AX,BX
0374  8B D0                         MOV    DX,AX
0376  B8 3100                       MOV    AX,3100H
0379  CD 21                         INT    21H
037B                         START  ENDP
                             ;
                             ;
037B                         INIT   ENDS

END    START
Structures and Records:

N a m e         Width    # fields
                                    Shift    Width    Mask    Initial DESCRIPT . . . . . . . . . . . .    0008     0005
    LIMIT  . . . . . . . . . . .    0000
    BASELO . . . . . . . . . . .    0002
    BASEHI . . . . . . . . . . .    0004
    ACCESS . . . . . . . . . . .    0005
EFCB . . . . . . . . . . . . . .    0007     0003
    EXTEND . . . . . . . . . . .    0000
    ATTRIB . . . . . . . . . . .    0006
EXPTBL . . . . . . . . . . . . .    0002     0002
    NEXT . . . . . . . . . . . .    0000
    PREV . . . . . . . . . . . .    0001
FCB  . . . . . . . . . . . . . .    0025     000B
    DRIVE  . . . . . . . . . . .    0000
    FNAME  . . . . . . . . . . .    0001
    FEXT . . . . . . . . . . . .    0009
    BLOCK  . . . . . . . . . . .    000C
    RECSIZ . . . . . . . . . . .    000E
    FILSIZ . . . . . . . . . . .    0010
    FDATE  . . . . . . . . . . .    0014
    RESERV . . . . . . . . . . .    0016
    RELREC . . . . . . . . . . .    0020
    RRECLOW  . . . . . . . . . .    0021
    RRECHI . . . . . . . . . . .    0023
MCB  . . . . . . . . . . . . . .    0040     000E
    MCB_COMMAND  . . . . . . . .    0000
    MCB_RETCODE  . . . . . . . .    0001
    MCB_LSN  . . . . . . . . . .    0002
    MCB_NUM  . . . . . . . . . .    0003
    MCB_BUFFER . . . . . . . . .    0004
    MCB_LENGTH . . . . . . . . .    0008
    MCB_CALLNAME . . . . . . . .    000A
    MCB_NAME . . . . . . . . . .    001A
    MCB_RTO  . . . . . . . . . .    002A
    MCB_STO  . . . . . . . . . .    002B
    MCB_POST . . . . . . . . . .    002C
    MCB_LANA_NUM . . . . . . . .    0030
    MCB_CMD_CPLT . . . . . . . .    0031
    MCB_RESERVED . . . . . . . .    0032
MYMCB  . . . . . . . . . . . . .    004E     0008
    OLDMCB . . . . . . . . . . .    0000
    MMCB_LOC . . . . . . . . . .    0040
    MMCB_INUSE . . . . . . . . .    0044
```

| | | |
|---|---|---|
| MMCB_TSRNUM | 0045 | |
| MMCB_COUNT | 0047 | |
| MMCB_POSTED | 0049 | |
| MMCB_POSTAX | 004A | |
| MMCB_BLOCKS | 004C | |
| SWAPINT | 0013 | 0013 |
| SWAP0 | 0000 | |
| SWAP5 | 0001 | |
| SWAP8 | 0002 | |
| SWAP9 | 0003 | |
| SWAPB | 0004 | |
| SWAPC | 0005 | |
| SWAPF | 0006 | |
| SWAP10 | 0007 | |
| SWAP14 | 0008 | |
| SWAP16 | 0009 | |
| SWAP16A | 000A | |
| SWAP17 | 000B | |
| SWAP21 | 000C | |
| SWAP28 | 000D | |
| SWAP2A | 000E | |
| SWAPNET | 000F | |
| SWAPU1 | 0010 | |
| SWAPU2 | 0011 | |
| SWAPU3 | 0012 | |
| TSR | 00E5 | 0029 |
| TSRNAME | 0000 | |
| INMEM | 0015 | |
| KEY | 0016 | |
| SHIFTS | 0020 | |
| KEYSON | 002A | |
| EMMCHN | 002B | |
| APPSEQ | 002C | |
| BATCHP | 002D | |
| BATCHFL | 002F | |
| DOSSTRT | 0030 | |
| FIRSTP | 0031 | |
| CYCLE | 0033 | |
| PAGES | 0035 | |
| LASTP | 0037 | |
| SWPSEG | 0039 | |
| XFERADD | 003B | |
| LOCALS | 003F | |
| EMMHNDL | 0043 | |
| EMMOUTH | 0045 | |
| TEXT | 0047 | |
| ISTSR | 0048 | |
| ISGENIE | 0049 | |
| OUTRECL | 004A | |
| OUTRECH | 004C | |
| TSRPSP | 004E | |
| TSRDTA | 0050 | |
| ESAVLOC | 0054 | |
| CONSOLE | 0058 | |
| PINMEM | 005C | |
| POSTSEQ | 005E | |
| POSTNXT | 0060 | |
| XRUN | 0062 | |
| IDLECNT | 0063 | |
| AT_LOW | 0065 | |
| AT_HIGH | 0067 | |
| COUNT | 0069 | |
| RESET | 007C | |

| | |
|---|---|
| TSRFEXT | 008F |
| TSRFCB | 0096 |
| SWPNAME | 00BB |
| INIDIC | 00E3 |

Segments and Groups:

| Name | Length | Align | Combine | Class | |
|---|---|---|---|---|---|
| BIOS_SEG | 0101 | AT | 0040 | | |
| DGROUP | GROUP | | | | |
| _DATA | 1268 | WORD | PUBLIC | 'DATA' | |
| IGROUP | GROUP | | | | |
| INIT | 037B | WORD | PUBLIC | 'INIT' | |
| IPAGE_SEG | 0074 | AT | 0000 | | |
| MTR_SEG | E05B | AT | F000 | | |
| PGROUP | GROUP | | | | |
| _TEXT | 0588 | WORD | PUBLIC | 'CODE' | |
| SGROUP | GROUP | | | | |
| STCKSEG | 0200 | PARA | STACK | 'STACK' | |

Symbols:

| Name | Type | Value | Attr | | |
|---|---|---|---|---|---|
| ABORT | N PROC | 01D7 | INIT | Global | Length = 0010 |
| AFTER_ERROR | L BYTE | 001F | _DATA | | |
| ALLCAND | L NEAR | 0500 | _TEXT | | |
| ALT_INPUT | L BYTE | 0019 | BIOS_SEG | | |
| BEFORE_ERROR | L BYTE | 0002 | _DATA | | |
| BIOS_TIME | L DWORD | 006C | BIOS_SEG | | |
| BUFFER_HEAD | L WORD | 001A | BIOS_SEG | | |
| BUFFER_TAIL | L WORD | 001C | BIOS_SEG | | |
| BUFSIZ | L WORD | 01B4 | INIT | Global | |
| CANIT | L NEAR | 04E5 | _TEXT | | |
| COMDON | L NEAR | 0244 | INIT | | |
| CRT_ADDR | L WORD | 0063 | BIOS_SEG | | |
| CRT_CMOD | L WORD | 0060 | BIOS_SEG | | |
| CRT_COLS | L WORD | 004A | BIOS_SEG | | |
| CRT_CURSES | L WORD | 0050 | BIOS_SEG | Length = 0008 | |
| CRT_INFO | L BYTE | 0087 | BIOS_SEG | | |
| CRT_INFO_3 | L BYTE | 0088 | BIOS_SEG | | |
| CRT_LEN | L WORD | 004C | BIOS_SEG | | |
| CRT_MODE | L BYTE | 0049 | BIOS_SEG | | |
| CRT_MSET | L BYTE | 0065 | BIOS_SEG | | |
| CRT_PAGE | L BYTE | 0062 | BIOS_SEG | | |
| CRT_PALETTE | L BYTE | 0066 | BIOS_SEG | | |
| CRT_POINTS | L WORD | 0085 | BIOS_SEG | | |
| CRT_RFLSG | L WORD | 0072 | BIOS_SEG | | |
| CRT_ROWS | L BYTE | 0084 | BIOS_SEG | | |
| CRT_SAV_PTR | L DWORD | 00A8 | BIOS_SEG | | |
| CRT_START | L WORD | 004E | BIOS_SEG | | |
| CRT_STATUS_B | L BYTE | 0100 | BIOS_SEG | | |
| DATA_END | L BYTE | 0268 | _DATA | | |
| DSIZE | L NEAR | 025F | INIT | | |
| DWBSIZ | NUMBER | 1000 | | | |
| EQUIPMENT | L WORD | 0010 | BIOS_SEG | | |
| FNDOPT | L NEAR | 0247 | INIT | | |

| | | | | | |
|---|---|---|---|---|---|
| GETNUM . . . . . . . . . . . . . . . | N PROC | 0186 | INIT | Global | Length = 0021 |
| GOTNUM . . . . . . . . . . . . . . . | L NEAR | 01D4 | INIT | | |
| HEADIN . . . . . . . . . . . . . . . | L BYTE | 0080 | INIT | | |
| HERE . . . . . . . . . . . . . . . . | L NEAR | 0077 | _TEXT | | |
| HRDSEG . . . . . . . . . . . . . . . | L WORD | 000C | _TEXT | Global | |
| I09FLG . . . . . . . . . . . . . . . | WORD | 0008 | | | |
| I13FLG . . . . . . . . . . . . . . . | WORD | 0001 | | | |
| I14FLG . . . . . . . . . . . . . . . | WORD | 0020 | | | |
| I17FLG . . . . . . . . . . . . . . . | WORD | 0010 | | | |
| I25FLG . . . . . . . . . . . . . . . | WORD | 0002 | | | |
| I26FLG . . . . . . . . . . . . . . . | WORD | 0004 | | | |
| INNET . . . . . . . . . . . . . . . | L WORD | 0000 | _TEXT | | |
| INPOST . . . . . . . . . . . . . . . | L WORD | 0002 | _TEXT | Global | |
| INSWAP . . . . . . . . . . . . . . . | L WORD | 000E | _TEXT | Global | |
| KB_BUFFER . . . . . . . . . . . . | L WORD | 001E | BIOS_SEG | Length = 0010 | |
| KB_BUFFER_END . . . . . . . . . | L WORD | 003E | BIOS_SEG | | |
| KB_FLAG . . . . . . . . . . . . . | L BYTE | 0017 | BIOS_SEG | | |
| KB_FLAG_1 . . . . . . . . . . . . | L BYTE | 0018 | BIOS_SEG | | |
| KB_INT . . . . . . . . . . . . . . | L WORD | 0024 | IPAGE_SEG | | |
| MCBBUFF . . . . . . . . . . . . | L WORD | 0161 | _DATA | Global | |
| MCBDATA . . . . . . . . . . . . | L WORD | 0163 | _DATA | Global | |
| MCBDTBL . . . . . . . . . . . . | L BYTE | 0165 | _DATA | Global | Length = 00FF |
| MCBDTOP . . . . . . . . . . . . | L WORD | 0264 | _DATA | Global | |
| MCBTEND . . . . . . . . . . . . | L BYTE | 0264 | _DATA | | |
| MCBTLEN . . . . . . . . . . . . | L WORD | 0266 | _DATA | Global | |
| MSIZE . . . . . . . . . . . . . . | L NEAR | 0277 | INIT | | |
| MTR_RESET . . . . . . . . . . . | L FAR | E05B | MTR_SEG | | |
| MYDSEG . . . . . . . . . . . . . | L WORD | 0012 | _TEXT | Global | |
| MYSSEG . . . . . . . . . . . . . | L WORD | 0014 | _TEXT | Global | |
| NE2 . . . . . . . . . . . . . . . . | L NEAR | 011B | _TEXT | | |
| NE3 . . . . . . . . . . . . . . . . | L NEAR | 0121 | _TEXT | | |
| NETC1 . . . . . . . . . . . . . . | L NEAR | 013B | _TEXT | | |
| NETC2 . . . . . . . . . . . . . . | L NEAR | 0155 | _TEXT | | |
| NETCAN . . . . . . . . . . . . . | L NEAR | 0127 | _TEXT | | |
| NETGONE . . . . . . . . . . . . | L BYTE | 00EE | _DATA | | |
| NETI16 . . . . . . . . . . . . . . | F PROC | 0570 | _TEXT | Length = 000C | |
| NETI28 . . . . . . . . . . . . . . | F PROC | 057C | _TEXT | Length = 000C | |
| NETIN . . . . . . . . . . . . . . | L BYTE | 00C2 | INIT | | |
| NETKEY . . . . . . . . . . . . . | F PROC | 0566 | _TEXT | Length = 000A | |
| NETL . . . . . . . . . . . . . . . | L NEAR | 052F | _TEXT | | |
| NETL1 . . . . . . . . . . . . . . | L NEAR | 044A | _TEXT | | |
| NETLINK . . . . . . . . . . . . | F PROC | 051A | _TEXT | Global | Length = 0042 |
| NETLOG . . . . . . . . . . . . . | F PROC | 043A | _TEXT | Global | Length = 004B |
| NETOUT . . . . . . . . . . . . . | F PROC | 0485 | _TEXT | Global | Length = 0095 |
| NETP2 . . . . . . . . . . . . . . | L NEAR | 02F1 | _TEXT | | |
| NETPOST . . . . . . . . . . . . | F PROC | 02B7 | _TEXT | Global | Length = 004A |
| NETRET . . . . . . . . . . . . . | L WORD | 0016 | _TEXT | Global | |
| NETTIM . . . . . . . . . . . . . | F PROC | 055C | _TEXT | Global | Length = 000A |
| NETWORK_ERROR . . . . . . . . | L NEAR | 0059 | _TEXT | Global | |
| NETWORK_VERSION . . . . . . . | NUMBER | 0001 | | | |
| NET_BUFFER_OVERFLOW . . . . . | L NEAR | 0255 | _TEXT | | |
| NEWNO . . . . . . . . . . . . . | L NEAR | 010A | _TEXT | | |
| NEWN1 . . . . . . . . . . . . . | L NEAR | 0230 | _TEXT | | |
| NEWN2 . . . . . . . . . . . . . | L NEAR | 026B | _TEXT | | |
| NEWNET . . . . . . . . . . . . . | F PROC | 00AA | _TEXT | Global | Length = 020D |
| NOOPT . . . . . . . . . . . . . | L NEAR | 0242 | INIT | | |
| NOUT1 . . . . . . . . . . . . . | L NEAR | 04CD | _TEXT | | |
| NOUT2 . . . . . . . . . . . . . | L NEAR | 04D9 | _TEXT | | |

| Symbol | Type | Addr | Segment | Attrs |
|---|---|---|---|---|
| NOWAIT | L NEAR | 01B0 | _TEXT | |
| NO_CANCEL2 | L BYTE | 008E | _DATA | |
| NO_CANCEL3 | L BYTE | 00BE | _DATA | |
| NUMMCB | L WORD | 0182 | INIT | Global |
| NXTCHR | L NEAR | 0239 | INIT | |
| NXTOPT | L NEAR | 0237 | INIT | |
| OLDI08 | L WORD | 0030 | _TEXT | |
| OLDI09 | L WORD | 0020 | _TEXT | |
| OLDI16 | L WORD | 0028 | _TEXT | |
| OLDI21 | L WORD | 001C | _TEXT | Global |
| OLDI28 | L WORD | 0024 | _TEXT | |
| OLDNET | L WORD | 0018 | _TEXT | Global |
| OLDSP | L WORD | 002E | _TEXT | Global |
| OLDSS | L WORD | 002C | _TEXT | Global |
| OPTERR | L BYTE | 00F1 | INIT | |
| OUTDIG | N PROC | 0079 | _TEXT | Length = 0011 |
| OUT_OF_DATA | L BYTE | 0071 | _DATA | |
| OUT_OF_MCBS | L BYTE | 0064 | _DATA | |
| P2TA | L NEAR | 0368 | _TEXT | |
| P2TB | L NEAR | 03A3 | _TEXT | |
| P2TC | L NEAR | 0423 | _TEXT | |
| P2TD | L NEAR | 041E | _TEXT | |
| P2TDON | L NEAR | 039C | _TEXT | |
| P2TEND | L NEAR | 0387 | _TEXT | |
| P2TNXT | L NEAR | 0345 | _TEXT | |
| PARAM_TBL | L DWORD | 0074 | IPAGE_SEG | |
| PNEXT | L WORD | 0006 | _TEXT | Global |
| POPR | N PROC | 004A | _TEXT | Global Length = 000F |
| POST2TSR | N PROC | 0301 | _TEXT | Global Length = 0139 |
| PRTNUM | N PROC | 008A | _TEXT | Global Length = 0020 |
| PSEQ | L WORD | 0004 | _TEXT | Global |
| PSP | L WORD | 0180 | INIT | Global |
| PUSHR | N PROC | 0038 | _TEXT | Global Length = 0012 |
| SETMEM | L NEAR | 0281 | INIT | |
| START | F PROC | 01E7 | INIT | Global Length = 0194 |
| STKEND | L BYTE | 0200 | STCKSEG | |
| STRTMES | L BYTE | 0000 | INIT | |
| SWITCHEM | L WORD | 0036 | _TEXT | Global |
| TIMER_HI | L WORD | 006E | BIOS_SEG | |
| TIMER_LOW | L WORD | 006C | BIOS_SEG | |
| TINMEM | L WORD | 0008 | _TEXT | Global |
| TMCB | L | 0121 | _DATA | |
| TSRSIZE | NUMBER | 00E5 | | Global |
| VECSIZ | NUMBER | 0200 | | |
| ZTO | L NEAR | 0269 | INIT | |
| ZTOFLG | L WORD | 0034 | _TEXT | Global |
| @0 | L NEAR | 0083 | _TEXT | |
| @1 | L NEAR | 00A6 | _TEXT | |
| @10 | L NEAR | 0237 | _TEXT | |
| @11 | L NEAR | 024A | _TEXT | |
| @12 | L NEAR | 025B | _TEXT | |
| @13 | L NEAR | 028D | _TEXT | |
| @14 | L NEAR | 02DA | _TEXT | |
| @15 | L NEAR | 02F0 | _TEXT | |
| @16 | L NEAR | 0313 | _TEXT | |
| @17 | L NEAR | 0325 | _TEXT | |

| | | | |
|---|---|---|---|
| a18 | L NEAR | 0342 | _TEXT |
| a19 | L NEAR | 037E | _TEXT |
| a2 | L NEAR | 00DB | _TEXT |
| a20 | L NEAR | 0386 | _TEXT |
| a21 | L NEAR | 03F9 | _TEXT |
| a22 | L NEAR | 041B | _TEXT |
| a23 | L NEAR | 0437 | _TEXT |
| a24 | L NEAR | 0459 | _TEXT |
| a25 | L NEAR | 0526 | _TEXT |
| a26 | L NEAR | 01B8 | INIT |
| a27 | L NEAR | 0212 | INIT |
| a28 | L NEAR | 0225 | INIT |
| a29 | L NEAR | 0294 | INIT |
| a3 | L NEAR | 00F6 | _TEXT |
| a30 | L NEAR | 02B0 | INIT |
| a31 | L NEAR | 02BD | INIT |
| a4 | L NEAR | 011B | _TEXT |
| a5 | L NEAR | 0145 | _TEXT |
| a6 | L NEAR | 019A | _TEXT |
| a7 | L NEAR | 01CE | _TEXT |
| a8 | L NEAR | 01DF | _TEXT |
| a9 | L NEAR | 01F4 | _TEXT |
| @CPU | TEXT | 0101h | |
| @FILENAME | TEXT | hrnbx | |
| @VERSION | TEXT | 510 | |
| _PSP | L WORD | 0000 | _DATA |

```
 1137 Source Lines
 1137 Total  Lines
  300 Symbols

46870 + 273903 Bytes symbol space free

0 Warning Errors
   0 Severe  Errors
```

```
                        PAGE    ,132
                        TITLE   TSREND -- END OF A TSR PROGRAM
                ;
                ;
                ;
                PGROUP  GROUP   _TEXT,PROG

0000            _TEXT   SEGMENT BYTE PUBLIC 'CODE'
0000            _TEXT   ENDS

0000            PROG    SEGMENT BYTE PUBLIC 'PROG'
0000            PROG    ENDS

0000            _DATA   SEGMENT WORD PUBLIC 'DATA'
0000            _DATA   ENDS

0000            CONST   SEGMENT WORD PUBLIC 'CONST'
0000            CONST   ENDS

0000            _BSS    SEGMENT WORD PUBLIC 'BSS'
0000            _BSS    ENDS

= 0400          STKRSV  EQU     1024
0000            STACK   SEGMENT STACK 'STACK'
                        PUBLIC  STKEND
```

```
0000  0400[            SBASE   DB      STKRSV DUP ('STCK')
      53 54 43 4B
                ]

1000                   STKEND  LABEL   WORD
1000                   STACK   ENDS

0000                   MYEND   SEGMENT PARA PUBLIC 'MEND'
0000  0064[                    DB      100 DUP('MY END')
      4D 59 20 45 4E
      44
                ]

0258                   MYEND   ENDS

DGROUP  GROUP   _DATA, CONST, _BSS, STACK, MYEND

INCLUDE DEFTSR.ASM
                     C EFCB    STRUC
0000  00             C EXTEND  DB      0
0001  0005[          C         DB      5 DUP(0)
      00             C
                ]    C
                     C
0006  00             C ATTRIB  DB      0
0007                 C EFCB    ENDS
                     C ;
                     C FCB     STRUC
0000  00             C DRIVE   DB      ?
0001  0008[          C FNAME   DB      8 DUP(?)
      ??             C
                ]    C
                     C
0009  0003[          C FEXT    DB      3 DUP(?)
      ??             C
                ]    C
                     C
000C  0000           C BLOCK   DW      ?
000E  0000           C RECSIZ  DW      ?
0010  00000000       C FILSIZ  DD      ?
0014  0000           C FDATE   DW      ?
0016  000A[          C RESERV  DB      10 DUP(?)
      ??             C
                ]    C
                     C
0020  00             C RELREC  DB      ?
0021  0000           C RRECLOW DW      ?
0023  0000           C RRECHI  DW      ?
0025                 C FCB     ENDS
                     C ;
                     C SWAPINT STRUC
0000  00             C SWAP0   DB      0
0001  00             C SWAP5   DB      0
0002  00             C SWAP8   DB      0
0003  00             C SWAP9   DB      0
0004  00             C SWAPB   DB      0
0005  00             C SWAPC   DB      0
0006  00             C SWAPF   DB      0
0007  00             C SWAP10  DB      0
0008  00             C SWAP14  DB      0
0009  00             C SWAP16  DB      0
000A  00             C SWAP16A DB      0
000B  00             C SWAP17  DB      0
```

```
000C  00                    C  SWAP21   DB    0
000D  00                    C  SWAP28   DB    0
000E  00                    C  SWAP2A   DB    0
000F  00                    C  SWAPNET  DB    0
0010  00                    C  SWAPU1   DB    0
0011  00                    C  SWAPU2   DB    0
0012  00                    C  SWAPU3   DB    0
0013                        C  SWAPINT  ENDS
                            C
                            C  TSR      STRUC
0000  0015[                  C  TSRNAME  DB    21 DUP(0)              ;TSR NAME FOR MENU
          00                 C
      ]                      C
                            C
0015  00                    C  INMEM    DB    0                      ;FLAG SET IF TSR/APP SWAPPED IN
0016  000A[                  C  KEY      DB    10 DUP(?)              ;ACTIVATION KEY
          ??                 C
      ]                      C
                            C
0020  000A[                  C  SHIFTS   DB    10 DUP(?)              ;SHIFT STATE FOR ACTIVATION
          ??                 C
      ]                      C
                            C
002A  01                    C  KEYSON   DB    1                      ;ARE THE KEYS FOR THIS TSR ACTIVE
002B  FF                    C  EMMCHN   DB    -1                     ;POINTER TO START OF CHAIN OF HANDLES
002C  00                    C  APPSEQ   DB    0                      ;SEQUENCE NUMBER OF APPLICATION
002D  0000                  C  BATCHP   DW    0                      ;POINTER TO BATCH FILE IN BATCH BLOCK
002F  00                    C  BATCHFL  DB    0                      ;FLAG IF SHOULD PROCESS BATCH COMMAND
0030  00                    C  DOSSTRT  DB    0                      ;ACTIVATION FLAG - SWAP WHEN NOT BUSY
0031  0000                  C  FIRSTP   DW    0                      ;PAGE NUMBER OF FIRST PAGE FOR APPL.
0033  0000                  C  CYCLE    DW    0                      ;NEXT FREE 64k FOR APPL. SWAP
0035  0000                  C  PAGES    DW    0                      ;SIZE OF APPLICATION IN PAGES.
0037  0000                  C  LASTP    DW    0                      ;NUMBER OF WORDS IN LAST PAGE
0039  0000                  C  SWPSEG   DW    0                      ;SEGMENT FOR SWAP IN
003B  00000000              C  XFERADD  DD    0                      ;LOCATION TO START/CONTINUE TSR/APPL
003F  00000000              C  LOCALS   DD    0                      ;A NEW STACK FRAME FOR AFTER A SWAP
0043  FFFF                  C  EMMHNDL  DW    -1                     ;HANDLE OF EMM PAGE MAP FOR TSR/APPL
0045  0000                  C  EMMOUTH  DW    0                      ;TEMPORARY HANDLE FOR APPL SWAP OUT
0047  00                    C  TEXT     DB    0                      ;FLAG SET IF SHOULD SWITCH TO TEXT
0048  01                    C  ISTSR    DB    1                      ;FLAG SET IF IS A TSR
0049  00                    C  ISGENIE  DB    0                      ;FLAG SET IF IS A GENIE MODULE
004A  0000                  C  OUTRECL  DW    0                      ;1ST RECORD NUMBER OF SWAPPED
004C  0000                  C  OUTRECH  DW    0                      ;  APPL CODE IN SWAPOUT FILE
004E  0000                  C  TSRPSP   DW    0                      ;SAVE AREA FOR PSP
0050  00000000              C  TSRDTA   DD    0                      ;SAVE AREA FOR OLD DTA
0054  00000000              C  ESAVLOC  DD    0                      ;SAVE FOR EGA SAVE AREA
0058  00000000              C  CONSOLE  DD    0                      ;SAVE AREA FOR DOS CONSOLE DRIVER
005C  0000                  C  PINMEM   DW    0                      ;PREVIOUS TSR/APPL IN MEMORY
005E  0000                  C  POSTSEQ  DW    0                      ;SEQUENCE NUMBER FOR POSTED MCBS
0060  0000                  C  POSTNXT  DW    0                      ;NEXT MCB TO POST SEQUENCE NUMBER
0062  00                    C  XRUN     DB    0                      ;0 = XPANDED, 1 = DISK, 2 = EXTENDED
                            C                                         ;4 = RUNNING IN XPANDED
0063  0000                  C  IDLECNT  DW    0                      ;NUMBER OF MINUTES IDLE BEFORE SWAP
0065  0000                  C  AT_LOW   DW    0                      ;TIME AT WHICH TO SWAP IN - LOW WORD
0067  0000                  C  AT_HIGH  DW    0                      ;TIME AT WHICH TO SWAP IN - HIGH WORD
0069  0013[                  C  COUNT    DB    SIZE SWAPINT DUP(0)    ;COUNTS OF SWAPIN ON INTERRUPT USU. 1
          00                 C
      ]                      C
                            C
007C  0013[                  C  RESET    DB    SIZE SWAPINT DUP(0)    ;INITIAL VALUE OF SWAPIN ON INTERRUPT
          00                 C
      ]                      C
                            C
```

```
008F  0007[           C  TSRFEXT  DB      7 DUP(0)         ;ROOM FOR FCB EXTENTION
      00              C
                   ]  C
                      C
0096  0025[           C  TSRFCB   DB      25H DUP(0)       ;ROOM FOR DISKSWAP FCB
      00              C
                   ]  C
                      C
00BB  0028[           C  SWPNAME  DB      40 DUP(?)        ;FULL PATH NAME OF SWAP FILE
      ??              C
                   ]  C
                      C
00E3  48 52           C  INIDIC   DB      'HR'
00E5                  C  TSR      ENDS
                      C  ;
                      C           PUBLIC  TSRSIZE
                      C  ;
= 00E5                C  TSRSIZE  EQU     SIZE TSR
                      C  ;
                      C  EXPTBL   STRUC
0000  FF              C  NEXT     DB      0FFH
0001  FF              C  PREV     DB      0FFH
0002                  C  EXPTBL   ENDS
                      C  ;
                      C  DESCRIPT STRUC
0000  0000            C  LIMIT    DW      0
0002  0000            C  BASELO   DW      0
0004  00              C  BASEHI   DB      0
0005  00              C  ACCESS   DB      0
0006  0000            C           DW      0
0008                  C  DESCRIPT ENDS
                      C
                      C  ELSE
= 1000               .C  DWBSIZ   EQU     4096
                      C  ENDIF
                                  INCLUDE DEFBIOS.ASM
                      C  ;
= 0200                C  VECSIZ   EQU     200H              ;SIZE OF INT. VECTOR TABLE IN WORDS
                      C  ;
0000                  C  BIOS_SEG         SEGMENT AT 40H
0010                  C           ORG     10H
0010  0000            C  EQUIPMENT        DW      ?
0017                  C           ORG     17H
0017  00              C  KB_FLAG  DB      ?
0018  00              C  KB_FLAG_1        DB      ?
0019  00              C  ALT_INPUT        DB      ?
001A  0000            C  BUFFER_HEAD      DW      ?
001C  0000            C  BUFFER_TAIL      DW      ?
001E  0010[           C  KB_BUFFER        DW      16 DUP(?)
      ????            C
                   ]  C
                      C
                      C  ;
003E                  C  KB_BUFFER_END    LABEL   WORD
                      C  ;
0049                  C           ORG     49H
0049  00              C  CRT_MODE         DB      ?
004A  0000            C  CRT_COLS         DW      ?
004C  0000            C  CRT_LEN  DW      ?
004E  0000            C  CRT_START        DW      ?
0050  0008[           C  CRT_CURSES       DW      8 DUP(?)
      ????            C
                   ]  C
```

```
0060 0000              C   CRT_CMOD         DW      ?
0062 00                C   CRT_PAGE         DB      ?
0063 0000              C   CRT_ADDR         DW      ?
0065 00                C   CRT_MSET         DB      ?
0066 00                C   CRT_PALETTE      DB      ?
006C                   C            ORG     6CH
006C                   C   BIOS_TIME        LABEL   DWORD
006C 0000              C   TIMER_LOW        DW      0
006E 0000              C   TIMER_HI         DW      0
0072                   C            ORG     72H
0072 0000              C   CRT_RFLSG        DW      ?
0084                   C            ORG     84H
0084 00                C   CRT_ROWS         DB      ?
0085 0000              C   CRT_POINTS       DW      ?
0087 00                C   CRT_INFO         DB      ?
0088 00                C   CRT_INFO_3       DB      ?
00A8                   C            ORG     0A8H
00A8                   C   CRT_SAV_PTR      LABEL   DWORD
0100                   C            ORG     100H
0100 00                C   CRT_STATUS_B     DB      ?
                       C ;
0101                   C   BIOS_SEG         ENDS
                       C ;
0000                   C   IPAGE_SEG        SEGMENT AT 0
                       C ;
0024                   C            ORG     24H
0024                   C   KB_INT  LABEL    WORD
                       C ;
0074                   C            ORG     1DH*4
0074                   C   PARAM_TBL        LABEL   DWORD
                       C ;
0074                   C   IPAGE_SEG        ENDS
                       C ;
0000                   C   MTR_SEG SEGMENT AT 0F000H
E05B                   C            ORG     0E05BH
E05B                   C   MTR_RESET        LABEL   FAR
                       C ;
E05B                   C   MTR_SEG ENDS
                       C ;
                       C ;       CONSTANT DEFENITIONS
                       C ;
= 0001                 C   I13FLG  EQU      WORD PTR 0001
= 0002                 C   I25FLG  EQU      WORD PTR 0002
= 0004                 C   I26FLG  EQU      WORD PTR 0004
= 0008                 C   I09FLG  EQU      WORD PTR 0008
= 0010                 C   I17FLG  EQU      WORD PTR 0016
= 0020                 C   I14FLG  EQU      WORD PTR 0032

PUBLIC   __acrtused
= 1234                     __acrtused EQU  1234H
                           ;
                           ; The data segment defines locations which contain the offsets
                           ; of the base and top of the stack.
                           ;
0000                       _DATA   SEGMENT WORD PUBLIC 'DATA'
                                   PUBLIC  _PSP,_DBLK,_COMLIN,_ONDISK,_EMMAVAIL,_LOADFLG
                                   PUBLIC  _EXTAVAIL
                           ;
0000 00000000 00000000     NULL    DD       0,0,0,0
     00000000 00000000
0010 0000                  _PSP    DW       0
0012 0000                  _MPSP   DW       0
```

```
0014  0000              _HLEN    DW    0
0016  0000              MEMTOP   DW    0
0018  0200[             VECTBL   DW    VECSIZ DUP(0)
      0000
                   ]

0418  00               DFCB      FCB   0
0419  0008[
      ??
                   ]
0421  0003[
      ??
                   ]
0424  0000
0426  0000
0428  00000000
042C  0000
042E  000A[
      ??
                   ]
0438  00
0439  0000
043B  0000

043D  0000             _ONDISK   DW    0
043F  0000             _EMMAVAIL DW    0
0441  0000             _EXTAVAIL DW    0
0443  0000             _LOADFLG  DW    0
0445  0015[            _DBLK     TSR   0
      00
                   ]
045A  00
045B  000A[
      ??
                   ]
0465  000A[
      ??
                   ]
046F  01
0470  FF
0471  00
0472  0000
0474  00
0475  00
0476  0000
0478  0000
047A  0000
047C  0000
047E  0000
0480  00000000
0484  00000000
0488  FFFF
048A  0000
048C  00
048D  01
048E  00
048F  0000
0491  0000
0493  0000
0495  00000000
0499  00000000
049D  00000000
04A1  0000
```

```
04A3  0000
04A5  0000
04A7  00
04A8  0000
04AA  0000
04AC  0000
04AE  0013[
      00
                    ]
04C1  0013[
      00
                    ]
04D4  0007[
      00
                    ]
04DB  0025[
      00
                    ]
0500  0028[
      ??
                    ]
0528  4852

052A  002A[                _COMLIN  DB    256/6 DUP('COMLIN')
      43 4F 4D 4C 49
      4E
                    ]

0626  07 48 45 41 44 52     NOROOM   DB    7,"HEADROOM not loaded - Aborting operation.",13,10,10,"$"
      4F 4F 4D 20 6E 6F
      74 20 6C 6F 61 64
      65 64 20 2D 20 41
      62 6F 72 74 69 6E
      67 20 6F 70 65 72
      61 74 69 6F 6E 2E
      0D 0A 0A 24
0654  07 4E 6F 20 54 53     NOTSRS   DB    7,"No TSRs found - nothing to swap out.",13,10,10,"$"
      52 73 20 66 6F 75
      6E 64 20 2D 20 6E
      6F 74 68 69 6E 67
      20 74 6F 20 73 77
      61 70 20 6F 75 74
      2E 0D 0A 0A 24
067D  07 45 72 72 6F 72     POEM     DB    7,"Error swapping out to Expanded Memory",13,10,10,"$"
      20 73 77 61 70 70
      69 6E 67 20 6F 75
      74 20 74 6F 20 45
      78 70 61 6E 64 65
      64 20 4D 65 6D 6F
      72 79 0D 0A 0A 24
06A7  07 43 61 6E 27 74     NOTAPPO  DB    7,"Can't swap a TSR in a secondary partition.",13,10,10,"$"
      20 73 77 61 70 20
      61 20 54 53 52 20
      69 6E 20 61 20 73
      65 63 6F 6E 64 61
      72 79 20 70 61 72
      74 69 74 69 6F 6E
      2E 0D 0A 0A 24
06D6  43 6F 6D 6D 61 6E     ERRLIN2  DB    "Command line error at: $"
      64 20 6C 69 6E 65
      20 65 72 72 6F 72
      20 61 74 3A 20 24
```

```
06EE  0D 0A                  ERRLIN3  DB      13,10
06F0  56 44 49 53 4B         VDISK    DB      "VDISK"
06F5  45 4D 4D 58 58 58      EMMDEV   DB      "EMMXXXX0"
      58 30
06FD  0D 0A 0A 48 45 41      STRTMS   DB      13,10,10,"HEADROOM TSR Swap-out Program v2.01a",13,10
      44 52 4F 4F 4D 20
      54 53 52 20 53 77
      61 70 2D 6F 75 74
      20 50 72 6F 67 72
      61 6D 20 76 32 2E
      30 31 61 0D 0A
0726  43 6F 70 79 72 69               DB      "Copyright (c) 1988, Helix Software Company, Inc.",13,10,10,"$"
      67 68 74 20 28 63
      29 20 31 39 38 38
      2C 20 48 65 6C 69
      78 20 53 6F 66 74
      77 61 72 65 20 43
      6F 6D 70 61 6E 79
      2C 20 49 6E 63 2E
      0D 0A 0A 24
075A                         _DATA    ENDS
                             ;
                             ;
0000                         _TEXT    SEGMENT BYTE PUBLIC 'CODE'
                             ;
                                      ASSUME  CS:PGROUP,DS:DGROUP,ES:DGROUP
                             ;
                                      EXTRN   _COMPARSE:NEAR,_OPEN_FCB:NEAR
                             ;
                                      PUBLIC  _KEYWAIT,_WTCNT,_WTCNT1
                             ;
0000  0000                   _KEYWAIT DW      0
0002  000A                   _WTCNT   DW      10
0004  0009                   _WTCNT1  DW      9
                             ;
0006  0100[                           DB      256 DUP('STCK')
      53 54 43 4B
                    ]

0406                         LOCSTK   LABEL   WORD
                             ;
0406  0011[                   PALETTE  DB      11H DUP(?)
      ??
                    ]

0417  0600[                   SAVBUF   DB      256*6 DUP('s')
      73
                    ]

0A17  00000000               UNGET    DD      0
0A1B  00000000               KHIT     DD      0
0A1F  00000000               TIDLE    DD      0
0A23  00000000               DOSFLG   DD      0
0A27  00000000               OLDMS    DD      0
                             ;
                                      PUBLIC  IDLEOP
                             ;
0A2B                         IDLEOP   PROC    FAR
0A2B  2E: 89 16 0A17 R                MOV     WORD PTR CS:[UNGET],DX
0A30  2E: 89 0E 0A1B R                MOV     WORD PTR CS:[KHIT],CX
0A35  2E: 89 36 0A1F R                MOV     WORD PTR CS:[TIDLE],SI
0A3A  2E: 89 3E 0A23 R                MOV     WORD PTR CS:[DOSFLG],DI
0A3F  2E: A3 0A19 R                   MOV     WORD PTR CS:[UNGET+2],AX
```

```
0A43  2E: A3 0A1D R                MOV     WORD PTR CS:[KHIT+2],AX
0A47  2E: A3 0A21 R                MOV     WORD PTR CS:[TIDLE+2],AX
0A4B  2E: A3 0A25 R                MOV     WORD PTR CS:[DOSFLG+2],AX
0A4F  2E: C5 1E 0A1B R             LDS     BX,CS:[KHIT]            ;SAVE CURRENT STATE OF FLAG
0A54  FF 37                        PUSH    WORD PTR DS:[BX]
0A56  32 E4               IDLE1:   XOR     AH,AH                   ;GET CURRENT TICK COUNT
0A58  CD 1A                        INT     1AH                     ;** CX:DX IS COUNT
0A5A  B4 01                        MOV     AH,1                    ;CHECK KEYBOARD BUFF
0A5C  CD 16                        INT     16H
0A5E  9C                           PUSHF                           ;SAVE FLAGS
0A5F  8B F1                        MOV     SI,CX                   ;PUT OLD TIME INTO SI:DI
0A61  8B FA                        MOV     DI,DX
0A63  32 E4                        XOR     AH,AH                   ;GET NEW TICK COUNT
0A65  CD 1A                        INT     1AH
0A67  2E: 03 3E 0002 R             ADD     DI,CS:_WTCNT            ;BUMP OLD COUNT BY 10 TICKS
0A6C  83 D6 00                     ADC     SI,0
0A6F  3B F1                        CMP     SI,CX                   ;CHECK IF NEW TIME > OLD+10
0A71  72 09                        JB      POPPED                  ;IF SO THEN TSR IS DONE
0A73  3B FA                        CMP     DI,DX                   ;CHECK LOW ORDER BYTE
0A75  76 05                        JBE     POPPED                  ;
0A77  9D                           POPF                            ;GET BACK FLAGS FROM INT 16
0A78  74 DC                        JZ      IDLE1                   ;IF NO CHAR THEN LOOP
0A7A  EB 09                        JMP     SHORT IDLE3             ;SKIP TIMEOUT EXIT
0A7C  58                  POPPED:  POP     AX                      ;DUMP INT 16 FLAGS
0A7D  2E: 83 3E 0000 R 00          CMP     CS:_KEYWAIT,0           ; IF NO TIMEOUT THEN
0A83  75 D1                        JNE     IDLE1                   ;  GO BACK INTO TIMEOUT LOOP
0A85  C6 07 01            IDLE3:   MOV     BYTE PTR DS:[BX],1      ;SET TO NOT READ FROM BUFFER
0A88  32 E4               IDLE3B:  XOR     AH,AH                   ;GET TICK COUNT
0A8A  CD 1A                        INT     1AH
0A8C  2E: 03 16 0004 R             ADD     DX,CS:_WTCNT1           ;BUMP BY 9
0A91  83 D1 00                     ADC     CX,0
0A94  8B F1                        MOV     SI,CX                   ;SAVE IN SI:DI
0A96  8B FA                        MOV     DI,DX
0A98  2E: C5 1E 0A1F R             LDS     BX,CS:[TIDLE]           ;GET IDLE FLAG
0A9D  83 27 F7                     AND     WORD PTR DS:[BX],NOT I09FLG ;CLEAR OUT KB BIT
0AA0  B4 01               IDLE3A:  MOV     AH,1
0AA2  CD 16                        INT     16H                     ;CHECK KB BUFF
0AA4  75 14                        JNZ     @F                      ;GOT ONE!
0AA6  32 E4                        XOR     AH,AH
0AA8  CD 1A                        INT     1AH                     ;GET TICK COUNT
0AAA  3B F1                        CMP     SI,CX                   ;TIME OUT?
0AAC  72 17                        JB      IDLE2                   ;YUP
0AAE  3B FA                        CMP     DI,DX                   ;LOW ORDER TIME OUT
0AB0  76 13                        JBE     IDLE2                   ;YUP
0AB2  F7 07 0008                   TEST    WORD PTR DS:[BX],I09FLG ;KEY STRUCK?
0AB6  75 00                        JNE     IDLE2
0AB8  EB E6                        JMP     IDLE3A                  ;NO TIME OUT, LOOP BACK
0ABA  B4 00               @@:      MOV     AH,0
0ABC  CD 16                        INT     16H
0ABE  2E: FF 1E 0A17 R             CALL    DWORD PTR CS:[UNGET]
0AC3  EB C3                        JMP     IDLE3B
0AC5  2E: C5 1E 0A1B R    IDLE2:   LDS     BX,CS:[KHIT]
0ACA  8F 07                        POP     WORD PTR DS:[BX]
0ACC  CB                           RET
0ACD                      IDLEOP   ENDP
                                   ;
0ACD  0020[               MEMEND   DB      32 DUP('X')
          58
          ]

0AED  43 6F 70 79 72 69            DB      'Copyright (c) 1989, Helix Software Co., Inc.'
      67 68 74 20 28 63
      29 20 31 39 38 39
```

```
              2C 20 48 65 6C 69
              78 20 53 6F 66 74
              77 61 72 65 20 43
              6F 2E 2C 20 49 6E
              63 2E
0B19 0020[                         DB      32 DUP('x')
       78
            ]

0B39                      RESEND  LABEL   BYTE
                          ;
                          ;
                          ;
                                  PUBLIC  PUSHR,POPR
                          ;
0B39                      PUSHR   PROC    NEAR
0B39  55                          PUSH    BP
0B3A  8B EC                       MOV     BP,SP
0B3C  87 7E 02                    XCHG    DI,[BP+02]
0B3F  8B 6E 00                    MOV     BP,[BP]
0B42  50                          PUSH    AX
0B43  53                          PUSH    BX
0B44  51                          PUSH    CX
0B45  52                          PUSH    DX
0B46  56                          PUSH    SI
0B47  06                          PUSH    ES
0B48  1E                          PUSH    DS
0B49  FF E7                       JMP     DI
0B4B                      PUSHR   ENDP
                          ;
0B4B                      POPR    PROC    NEAR
0B4B  5F                          POP     DI
0B4C  1F                          POP     DS
0B4D  07                          POP     ES
0B4E  5E                          POP     SI
0B4F  5A                          POP     DX
0B50  59                          POP     CX
0B51  5B                          POP     BX
0B52  58                          POP     AX
0B53  8B EC                       MOV     BP,SP
0B55  87 7E 02                    XCHG    DI,[BP+02]
0B58  5D                          POP     BP
0B59  C3                          RET
0B5A                      POPR    ENDP
                          ;
                                  PUBLIC  _ERRABT
                          ;
0B5A                      _ERRABT PROC    NEAR
0B5A  55                          PUSH    BP
0B5B  8B EC                       MOV     BP,SP
0B5D  BA 06D6 R                   MOV     DX,OFFSET ERRLIN2
0B60  CD 21                       INT     21H
0B62  BA 06EE R                   MOV     DX,OFFSET ERRLIN3
0B65  CD 21                       INT     21H
0B67  8B 56 06                    MOV     DX,[BP+06]
0B6A  CD 21                       INT     21H
0B6C  8B 56 04                    MOV     DX,[BP+04]
0B6F  B4 09                       MOV     AH,9
0B71  CD 21                       INT     21H
0B73  BA 06EE R                   MOV     DX,OFFSET ERRLIN3
0B76  CD 21                       INT     21H
0B78  CD 21                       INT     21H
0B7A  B8 4C01                     MOV     AX,4C01H
```

```
0B7D  CD 21                             INT     21H
0B7F  CD 20                             INT     20H
0B81  CD 19                             INT     19H
0B83                          _ERRABT   ENDP
                              ;
                                        PUBLIC  _PRTSTR
                              ;
0B83                          _PRTSTR   PROC    NEAR
0B83  55                                PUSH    BP
0B84  8B EC                             MOV     BP,SP
0B86  57                                PUSH    DI
0B87  56                                PUSH    SI
0B88  8B 76 04                          MOV     SI,[BP+04]
0B8B  FC                                CLD
0B8C  AC                    PSTR1:      LODSB
0B8D  0A C0                             OR      AL,AL
0B8F  74 08                             JE      PSTR2
0B91  8A D0                             MOV     DL,AL
0B93  B4 02                             MOV     AH,2
0B95  CD 21                             INT     21H
0B97  EB F3                             JMP     PSTR1
0B99  5E                    PSTR2:      POP     SI
0B9A  5F                                POP     DI
0B9B  5D                                POP     BP
0B9C  C3                                RET
0B9D                          _PRTSTR   ENDP
                              ;
                              ;
                                        PUBLIC  _SETWAIT
                              ;
0B9D                          _SETWAIT  PROC    NEAR
0B9D  2E: C7 06 0000 R 0001            MOV     CS:_KEYWAIT,1
0BA4  C3                                RET
0BA5                          _SETWAIT  ENDP
                              ;
                                        PUBLIC  _GETSDIR
                              ;
0BA5                          _GETSDIR  PROC    NEAR
0BA5  55                                PUSH    BP
0BA6  B8 5758                           MOV     AX,5758H
0BA9  BB 0005                           MOV     BX,5
0BAC  CD 21                             INT     21H
0BAE  5D                                POP     BP
0BAF  C3                                RET
0BB0                          _GETSDIR  ENDP
                              ;
                                        PUBLIC  _GETEXE
                                        EXTRN   _STRLEN:NEAR
                              ;
0BB0                          _GETEXE   PROC    NEAR
0BB0  55                                PUSH    BP
0BB1  8B EC                             MOV     BP,SP
0BB3  57                                PUSH    DI
0BB4  56                                PUSH    SI
0BB5  06                                PUSH    ES
0BB6  1E                                PUSH    DS
0BB7  B4 30                             MOV     AH,30H
0BB9  CD 21                             INT     21H
0BBB  3C 03                             CMP     AL,3
0BBD  72 29                             JB      GEERR
0BBF  A1 0012 R                         MOV     AX,_MPSP
0BC2  03 06 0014 R                      ADD     AX,_MLEN
0BC6  8E C0                 GE3:        MOV     ES,AX
```

```
0BC8  26: 80 3E 0000 5A              CMP     BYTE PTR ES:[0],5AH
0BCE  74 1C                          JE      GE2
0BD0  26: 83 3E 0001 00              CMP     WORD PTR ES:[1],0
0BD6  75 14                          JNE     GE2
0BD8  26: 03 06 0003     GE3A:       ADD     AX,WORD PTR ES:[3]
0BDD  40                             INC     AX
0BDE  EB E6                          JMP     SHORT GE3
0BE0  26: 80 3E 0000 5A  GECONT:     CMP     BYTE PTR ES:[0],5AH
0BE6  75 F0                          JNE     GE3A
0BE8  33 C0              GEERR:      XOR     AX,AX
0BEA  EB 5D                          JMP     SHORT GEEND
0BEC  8B D0              GE2:        MOV     DX,AX
0BEE  42                             INC     DX
0BEF  8E DA                          MOV     DS,DX
0BF1  81 3E 0000 20CD                CMP     WORD PTR DS:[0],20CDH
0BF7  74 08                          JE      @F
0BF9  81 3E 0050 21CD                CMP     WORD PTR DS:[50H],21CDH
0BFF  75 DF                          JNE     GECONT
0C01  8B 1E 002C         @@:         MOV     BX,DS:[2CH]
0C05  4B                             DEC     BX
0C06  8E DB                          MOV     DS,BX
0C08  80 3E 0000 4D                  CMP     BYTE PTR DS:[0],4DH
0C0D  75 D1                          JNE     GECONT
0C0F  39 16 0001                     CMP     DS:[1],DX
0C13  75 CB                          JNE     GECONT
0C15  1F                             POP     DS
0C16  1E                             PUSH    DS
0C17  43                             INC     BX
0C18  8E C3                          MOV     ES,BX
0C1A  33 C0                          XOR     AX,AX
0C1C  B9 FFFF                        MOV     CX,0FFFFH
0C1F  8B F8                          MOV     DI,AX
0C21  FC                             CLD
0C22  F2/ AE             GE0:        REPNE   SCASB
0C24  AE                             SCASB
0C25  75 FB                          JNE     GE0
0C27  83 C7 02                       ADD     DI,2
0C2A  1E                             PUSH    DS
0C2B  06                             PUSH    ES
0C2C  06                             PUSH    ES
0C2D  1F                             POP     DS
0C2E  57                             PUSH    DI
0C2F  E8 0000 E                      CALL    _STRLEN
0C32  5E                             POP     SI
0C33  1F                             POP     DS
0C34  07                             POP     ES
0C35  8B 7E 04                       MOV     DI,[BP+04]
0C38  8B C8                          MOV     CX,AX
0C3A  83 F9 32                       CMP     CX,50
0C3D  76 03                          JBE     GE1
0C3F  B9 0032                        MOV     CX,50
0C42  FC                 GE1:        CLD
0C43  F3/ A4                         REP     MOVSB
0C45  33 C0                          XOR     AX,AX
0C47  AA                             STOSB
0C48  40                             INC     AX
0C49  1F                 GEEND:      POP     DS
0C4A  07                             POP     ES
0C4B  5E                             POP     SI
0C4C  5F                             POP     DI
0C4D  5D                             POP     BP
0C4E  C3                             RET
0C4F                     _GETEXE ENDP
                         ;
```

```
                          PUBLIC   MYDSEG
                        ;
OC4F  ---- R            MYDSEG   DW       DGROUP
                        ;
                          PUBLIC   _ISEMM
                        ;
OC51  0000              EMMFR    DW       0
                        ;
OC53                    _ISEMM   PROC     NEAR
OC53  55                         PUSH     BP
OC54  57                         PUSH     DI
OC55  56                         PUSH     SI
OC56  06                         PUSH     ES
OC57  1E                         PUSH     DS
OC58  B8 3567                    MOV      AX,3567H
OC5B  CD 21                      INT      21H
OC5D  B8 ---- R                  MOV      AX,DGROUP
OC60  8E D8                      MOV      DS,AX
OC62  BF 000A                    MOV      DI,10
OC65  BE 06F5 R                  MOV      SI,OFFSET EMMDEV
OC68  B9 0008                    MOV      CX,8
OC6B  FC                         CLD
OC6C  F3/ A6                     REP CMPSB
OC6E  B8 0000           ISEMM0:  MOV      AX,0
OC71  75 09                      JNE      ISEMM1
OC73  B8 0001                    MOV      AX,1
OC76  C7 06 043F R 0001          MOV      _EMMAVAIL,1
OC7C  1F                ISEMM1:  POP      DS
OC7D  07                         POP      ES
OC7E  5E                         POP      SI
OC7F  5F                         POP      DI
OC80  5D                         POP      BP
OC81  C3                         RET
OC82                    _ISEMM   ENDP
                        ;
                          PUBLIC   _ISEXT
                        ;
OC82                    _ISEXT   PROC     NEAR
OC82  55                         PUSH     BP
OC83  54                         PUSH     SP
OC84  58                         POP      AX
OC85  3B C4                      CMP      AX,SP
OC87  75 14                      JNE      ISEXT1
OC89  B8 8808                    MOV      AX,8808H
OC8C  CD 15                      INT      15H
OC8E  0B C0                      OR       AX,AX
OC90  74 0B                      JE       ISEXT1
OC92  3D 8808                    CMP      AX,8808H
OC95  74 06                      JE       ISEXT1
OC97  C7 06 0441 R 0001          MOV      _EXTAVAIL,1
OC9D  5D                ISEXT1:  POP      BP
OC9E  C3                         RET
OC9F                    _ISEXT   ENDP
                        ;
                          PUBLIC   EXTOUT
                        ;
                        ; LOAD SEGMENT TO EXTENDED MEMORY
                        ;
                        ; CALL WITH BX=PAGE NUMBER, DI=SEGMENT NUMBER,CX=NUMBER OF PAGES
                        ; DX=FIRST 1K,BP = WORDS IN LAST PAGE
                        ;
OC9F  0000              BLKHAND  DESCRIPT <>              ;DUMMY
OCA1  0000
```

```
OCA3  00
OCA4  00
OCA5  0000

OCA7  0000                      DESCRIPT <>         ;DESCRIPTOR FOR DESCRIPTOR TABLE
OCA9  0000
OCAB  00
OCAC  00
OCAD  0000

OCAF  0000              BLKSRC  DESCRIPT <>         ;FOR SOURCE OF MOVE (HERE MEMORY TO EXTENDED)
OCB1  0000
OCB3  00
OCB4  00
OCB5  0000

OCB7  0000              BLKDST  DESCRIPT <>         ;FOR DESTINATION OF MOVE (EXTENDED)
OCB9  0000
OCBB  00
OCBC  00
OCBD  0000

OCBF  0000                      DESCRIPT <>         ;FOR BIOS
OCC1  0000
OCC3  00
OCC4  00
OCC5  0000

OCC7  0000                      DESCRIPT <>         ;FOR STACK
OCC9  0000
OCCB  00
OCCC  00
OCCD  0000

;
OCCF                    EXTOUT  PROC    NEAR
OCCF  1E                        PUSH    DS
OCD0  06                        PUSH    ES
OCD1  0E                        PUSH    CS
OCD2  1F                        POP     DS
OCD3  51                        PUSH    CX              ;SAVE BLOCK COUNT
OCD4  55                        PUSH    BP              ;AND WORDS IN LAST PAGE
                                ASSUME  DS:PGROUP
                        ;
                        ;SET UP FIRST RAM SOURCE ADDRESS
OCD5  BE OCAF R                 MOV     SI,OFFSET BLKSRC
OCD8  33 C0                     XOR     AX,AX
OCDA  D1 E7                     SHL     DI,1            ;SET SEGMENT ADDRESS
OCDC  D1 D0                     RCL     AX,1            ;TO BYTE ADDRESS (*2)
OCDE  D1 E7                     SHL     DI,1
OCE0  D1 D0                     RCL     AX,1            ;*4
OCE2  D1 E7                     SHL     DI,1
OCE4  D1 D0                     RCL     AX,1            ;*8
OCE6  D1 E7                     SHL     DI,1
OCE8  D1 D0                     RCL     AX,1            ;*10H
OCEA  89 7C 02                  MOV     [SI].BASELO,DI  ;RAM ADDRESS
OCED  88 44 04                  MOV     [SI].BASEHI,AL
OCF0  C6 44 05 93               MOV     [SI].ACCESS,93H
                        ;
                        ;SET UP FIRST EXTENDED MEMORY DESTINATION ADDRESS
OCF4  BE OCB7 R                 MOV     SI,OFFSET BLKDST
OCF7  8A C6                     MOV     AL,DH           ;MULTIPLY 1K BLOCK NUMBER BY 100H
OCF9  8A F2                     MOV     DH,DL           ; (COMPUTE BYTE ADDRESS OF FIRST 1K)
OCFB  32 E4                     XOR     AH,AH
```

```
OCFD  8A D4              MOV    DL,AH              ;* 100H
OCFF  D1 E2              SHL    DX,1
0001  D1 D0              RCL    AX,1               ;* 2
0003  D1 E2              SHL    DX,1
0005  D1 D0              RCL    AX,1               ;*2 =*400H = BYTE LOC OF 1ST 1K BLK
0007  8B E8              MOV    BP,AX              ; PLACE IN BP:DX
0009  8A C7              MOV    AL,BH              ; NOW COMPUTE OFFSET FROM FIRST BLK
000B  8A FB              MOV    BH,BL              ; FROM PAGE NUMBER IN BX
000D  32 E4              XOR    AH,AH
000F  8A DC              MOV    BL,AH              ;* 100H
0011  D1 E3              SHL    BX,1
0013  D1 D0              RCL    AX,1               ;*2
0015  D1 E3              SHL    BX,1
0017  D1 D0              RCL    AX,1               ;*4
0019  D1 E3              SHL    BX,1
001B  D1 D0              RCL    AX,1               ;*6
001D  D1 E3              SHL    BX,1
001F  D1 D0              RCL    AX,1               ;*10
0021  D1 E3              SHL    BX,1
0023  D1 D0              RCL    AX,1               ;*20
0025  D1 E3              SHL    BX,1
0027  D1 D0              RCL    AX,1               ;*40H = PAGE * 4000H = BYTE OFFSET
0029  03 DA              ADD    BX,DX              ; ADD IN OFFSET OF 1ST 1K
002B  13 C5              ADC    AX,BP              ; GET ADDRESS OF DESTINATION
002D  05 0010            ADD    AX,10H             ;NOW ADJUST TO +1M
0030  89 5C 02           MOV    [SI].BASELO,BX
0033  88 44 04           MOV    [SI].BASEHI,AL
0036  C6 44 05 93        MOV    [SI].ACCESS,93H
003A  5D                 POP    BP
003B  59                 POP    CX
003C  55         EX00:   PUSH   BP
003D  51                 PUSH   CX
003E  83 F9 03           CMP    CX,3
0041  76 05              JBE    EX01
0043  B9 C000            MOV    CX,0C000H          ;SET FOR MAX MOVE
0046  EB 11              JMP    SHORT EX01A
                 ;
                 ;COMPUTE ADDRESS LIMIT OF NEXT MOVE
0048  49         EX01:   DEC    CX                 ; LAST PAGE IS BP WORDS
0049  86 E9              XCHG   CH,CL              ;* 100H
004B  D1 E1              SHL    CX,1               ;* 2
004D  D1 E1              SHL    CX,1               ;* 4
004F  D1 E1              SHL    CX,1               ;* 8
0051  D1 E1              SHL    CX,1               ;* 10H
0053  D1 E1              SHL    CX,1               ;* 20H
0055  03 CD              ADD    CX,BP              ; = TOTAL NUMBER OF WORDS TO MOVE
0057  D1 E1              SHL    CX,1               ;* 40H = *4000H
0059  BE 0CAF R  EX01A:  MOV    SI,OFFSET BLKSRC
005C  89 0C              MOV    [SI].LIMIT,CX      ; MAX PER MOVE IS C000 BYTES
005E  BE 0CB7 R          MOV    SI,OFFSET BLKDST
0061  89 0C              MOV    [SI].LIMIT,CX      ;SET LIMIT SAME AS SOURCE
0063  51                 PUSH   CX                 ;SAVE BYTE COUNT
0064  D1 E9              SHR    CX,1               ;CX = NUMBER OF WORDS
0066  BE 0C9F R          MOV    SI,OFFSET BLKHAND  ;NOW DO MOVE
0069  8C C8              MOV    AX,CS
006B  8E C0              MOV    ES,AX
006D  B4 87              MOV    AH,87H
006F  CD 15              INT    15H
0071  59                 POP    CX                 ;GET BYTE COUNT
0072  BE 0CAF R          MOV    SI,OFFSET BLKSRC
0075  01 4C 02           ADD    [SI].BASELO,CX
0078  80 54 04 00        ADC    [SI].BASEHI,0
007C  BE 0CB7 R          MOV    SI,OFFSET BLKDST
```

```
007F  01 4C 02                    ADD     [SI].BASELO,CX
0082  80 54 04 00                 ADC     [SI].BASEHI,0
0086  59                          POP     CX
0087  5D                          POP     BP
0088  83 F9 03                    CMP     CX,3
008B  76 05                       JBE     EX02
008D  83 E9 03                    SUB     CX,3
0090  EB AA                       JMP     EX00
0092  07            EX02:         POP     ES
0093  1F                          POP     DS
                                  ASSUME  DS:DGROUP
0094  C3                          RET
0095                EXTOUT        ENDP
                    ;
                    ;             PUBLIC  PAGEOUT
                    ;
                    ;     LOAD SEGMENT TO EMM PAGE
                    ;
                    ; CALL WITH BX=PAGE NUMBER, DI=SEGMENT NUMBER,CX=TOP SEGMENT NUMBER
                    ; DX=EMM HANDLE
                    ;
0095                PAGEOUT PROC  NEAR
0095  1E                          PUSH    DS
0096  06                          PUSH    ES
0097  53            PO1:          PUSH    BX
0098  51                          PUSH    CX
0099  B8 4400                     MOV     AX,4400H       ;MAP LOGICAL PAGE IN BX TO PHYS. PG 0
009C  CD 67                       INT     67H
009E  0A E4                       OR      AH,AH
00A0  75 21                       JNZ     POERR
00A2  2E: 8B 1E 0C51 R            MOV     BX,CS:EMMFR
00A7  8E C3                       MOV     ES,BX          ;SET ES TO EMM PAGE FRAME SEG
00A9  57                          PUSH    DI
00AA  8E DF                       MOV     DS,DI
00AC  33 F6                       XOR     SI,SI
00AE  8B FE                       MOV     DI,SI
00B0  B9 2000                     MOV     CX,8192        ;WORDS PER PAGE
00B3  FC                          CLD
00B4  F3/ A5                      REP MOVSW              ;MOVE DATA IN
00B6  5F                          POP     DI
00B7  81 C7 0400                  ADD     DI,1024        ;PARAGRAPHS PER PAGE
00BB  59                          POP     CX
00BC  5B                          POP     BX
00BD  43                          INC     BX
00BE  E2 D7                       LOOP    PO1
00C0  07                          POP     ES
00C1  1F                          POP     DS
00C2  C3                          RET
00C3  BA 067D R     POERR:        MOV     DX,OFFSET POEM
00C6  E9 122A R                   JMP     ABORT
00C9                PAGEOUT ENDP
                    ;
                                  PUBLIC  _EMMSETUP
                    ;
00C9                _EMMSETUP PROC NEAR
00C9  E8 0B39 R                   CALL    PUSHR
00CC  B4 41                       MOV     AH,41H
00CE  CD 67                       INT     67H
00D0  0A E4                       OR      AH,AH
00D2  75 59                       JNE     EMSERR
00D4  2E: 89 1E 0C51 R            MOV     CS:EMMFR,BX
00D9  8B 1E 0012 R                MOV     BX,_HPSP
00DD  03 1E 0014 R                ADD     BX,_HLEN
```

```
00E1  89 1E 047E R              MOV    WORD PTR DS:[_DBLK].SWPSEG,BX
00E5  C7 06 0476 R 0000         MOV    WORD PTR DS:[_DBLK].FIRSTP,0
00EB  B8 0839 R                 MOV    AX,OFFSET PGROUP:RESEND
00EE  B1 04                     MOV    CL,4
00F0  D3 E8                     SHR    AX,CL
00F2  40                        INC    AX
00F3  8C C9                     MOV    CX,CS
00F5  03 C1                     ADD    AX,CX
00F7  2B C3                     SUB    AX,BX
00F9  33 D2                     XOR    DX,DX
00FB  B9 0400                   MOV    CX,1024
00FE  F7 F1                     DIV    CX
0E00  40                        INC    AX
0E01  40                        INC    AX
0E02  40                        INC    AX
0E03  8B D8                     MOV    BX,AX
0E05  A3 047A R                 MOV    DS:[_DBLK].PAGES,AX
0E08  C7 06 0478 R 0000         MOV    DS:[_DBLK].CYCLE,0
0E0E  C6 06 04A7 R 00           MOV    DS:[_DBLK].XRUN,0
0E13  B1 03                     MOV    CL,3
0E15  D3 E2                     SHL    DX,CL
0E17  89 16 047C R              MOV    WORD PTR DS:[_DBLK].LASTP,DX
0E1B  B4 43                     MOV    AH,43H
0E1D  CD 67                     INT    67H
0E1F  0A E4                     OR     AH,AH
0E21  75 0A                     JNE    EMSERR
0E23  89 16 0488 R              MOV    WORD PTR DS:[_DBLK].EMMHNDL,DX
0E27  E8 0848 R                 CALL   POPR
0E2A  33 C0                     XOR    AX,AX
0E2C  C3                        RET
0E2D  E8 0848 R         EMSERR: CALL   POPR
0E30  B8 0001                   MOV    AX,1
0E33  C3                        RET
0E34                     _EMMSETUP ENDP
                          ;
                          ;
                          ;       PUBLIC  _EMMSWAP
                          ;
                          ;   SWAP AN APPLICATION OR TSR OUT
                          ;
                          ; CALL WITH BX = TSR OFFSET
                          ;
0E34                     _EMMSWAP PROC  NEAR
0E34  E8 0839 R                 CALL   PUSHR
0E37  E8 00C9 R                 CALL   _EMMSETUP
0E3A  0B C0                     OR     AX,AX
0E3C  75 EF                     JNE    EMSERR
0E3E  BB 0445 R                 MOV    BX,OFFSET _DBLK
0E41  53                        PUSH   BX
0E42  B8 ---- R                 MOV    AX,DGROUP
0E45  8E D8                     MOV    DS,AX
0E47  8E C0                     MOV    ES,AX
0E49  33 FF                     XOR    DI,DI          ;SWAP OUT INTERRUPT PAGE FOR TSR
0E4B  B9 0001                   MOV    CX,1
0E4E  8B 57 43                  MOV    DX,[BX].EMMHNDL
0E51  BB 0000                   MOV    BX,0
0E54  E8 0095 R                 CALL   PAGEOUT
0E57  E8 0839 R                 CALL   PUSHR          ;SET INT PAGE TO POINT TO HEADROOM
0E5A  B3 02                     MOV    BL,2
0E5C  B8 5758                   MOV    AX,5758H
0E5F  CD 21                     INT    21H
0E61  2E: 89 1E 101A R          MOV    WORD PTR CS:[MSFUN],BX
0E66  2E: 8C 06 101C R          MOV    WORD PTR CS:[MSFUN+2],ES
```

```
0E68  BB 0004              MOV      BX,4
0E6E  B8 5758              MOV      AX,5758H
0E71  9C                   PUSHF
0E72  FA                   CLI
0E73  2E: FF 1E 101A R     CALL     DWORD PTR CS:[MSFUN]
0E78  E8 084B R            CALL     POPR
0E7B  5B                   POP      BX
0E7C  8B 4F 35             MOV      CX,[BX].PAGES
0E7F  49                   DEC      CX
0E80  49                   DEC      CX
0E81  8B 7F 39             MOV      DI,[BX].SWPSEG
0E84  BB 0002              MOV      BX,2
0E87  E8 0095 R            CALL     PAGEOUT
0E8A  E8 084B R            CALL     POPR
0E8D  B8 0000              MOV      AX,0
0E90  C3                   RET
0E91                       _EMMSWAP ENDP
                           ;
                                    PUBLIC   _EXTVDISK
                           ;
0E91                       _EXTVDISK PROC NEAR
0E91  06                            PUSH     ES
0E92  1E                            PUSH     DS
0E93  57                            PUSH     DI
0E94  56                            PUSH     SI
0E95  0E                            PUSH     CS
0E96  1F                            POP      DS
0E97  B8 3519                       MOV      AX,3519H
0E9A  CD 21                         INT      21H
0E9C  33 FF                         XOR      DI,DI
0E9E  B9 1000                       MOV      CX,1000H
0EA1  FC                            CLD
0EA2  BE 06F0 R            @@:      MOV      SI,OFFSET PGROUP:VDISK
0EA5  A6                            CMPSB
0EA6  E0 FA                         LOOPNE   @B
0EA8  75 00                         JNE      NOVDISK
0EAA  51                            PUSH     CX
0EAB  57                            PUSH     DI
0EAC  B9 0004                       MOV      CX,4
0EAF  F3/ A6                        REPE CMPSB
0EB1  5F                            POP      DI
0EB2  59                            POP      CX
0EB3  74 07                         JE       @F
0EB5  E0 EB                         LOOPNE   @B
0EB7  33 C0                NOVDISK: XOR      AX,AX
0EB9  EB 18 90                      JMP      EVDONE
0EBC  83 C7 19             @@:      ADD      DI,25
0EBF  26: 8B 05                     MOV      AX,WORD PTR ES:[DI]
0EC2  26: 8A 55 02                  MOV      DL,BYTE PTR ES:[DI+2]
0EC6  32 F6                         XOR      DH,DH
0EC8  83 EA 10                      SUB      DX,10H         ;ADJUST TO 0 OFFSET
0ECB  1D 0000                       SBB      AX,0
0ECE  BB 0400                       MOV      BX,400H
0ED1  F7 F3                         DIV      BX
0ED3  5E                   EVDONE:  POP      SI
0ED4  5F                            POP      DI
0ED5  1F                            POP      DS
0ED6  07                            POP      ES
0ED7  C3                            RET
0ED8                       _EXTVDISK ENDP
                           ;
                                    PUBLIC   _EXTSWAP
                           ;
```

```
OED8                      _EXTSWAP PROC  NEAR
OED8  E8 0B39 R                    CALL  PUSHR
OED8  88 1E 0012 R                 MOV   BX,_HPSP
OEDF  03 1E 0014 R                 ADD   BX,_HLEN
OEE3  89 1E 047E R                 MOV   WORD PTR DS:[_DBLK].SWPSEG,BX
OEE7  B8 0B39 R                    MOV   AX,OFFSET PGROUP:RESEND
OEEA  B1 04                        MOV   CL,4
OEEC  D3 E8                        SHR   AX,CL          ;COMPUTE SEGMENT OFFFSET FOR END OF SWAP
OEEE  40                           INC   AX
OEEF  8C C9                        MOV   CX,CS          ;
OEF1  03 C1                        ADD   AX,CX          ;ADD IN CS
OEF3  2B C3                        SUB   AX,BX          ;SUBTRACT FIRST SWAP SEGMENT
OEF5  33 D2                        XOR   DX,DX
OEF7  B9 0400                      MOV   CX,1024        ;NOW COMPUTE PAGES REQUIRED
OEFA  F7 F1                        DIV   CX
OEFC  0B D2                        OR    DX,DX
OEFE  74 01                        JE    EXTS1          ;NO REMAINDER
OF00  40                           INC   AX             ;ONE FOR REMAINDER
OF01  40              EXTS1:       INC   AX             ;ONE FOR INTERRUPTS
OF02  40                           INC   AX             ;ONE EXTRA FOR XCHANGE ROUTINE
OF03  8B D8                        MOV   BX,AX          ;NUMBER OF PAGES FOR TSR
OF05  A3 047A R                    MOV   DS:[_DBLK].PAGES,AX
OF08  C7 06 0478 R 0000            MOV   DS:[_DBLK].CYCLE,0
OF0E  C6 06 04A7 R 02              MOV   DS:[_DBLK].XRUN,2
OF13  B1 03                        MOV   CL,3
OF15  D3 E2                        SHL   DX,CL
OF17  89 16 047C R                 MOV   WORD PTR DS:[_DBLK].LASTP,DX  ;WORDS IN LAST PAGE
OF1B  B4 88                        MOV   AH,88H
OF1D  CD 15                        INT   15H                          ;GET FREE 1K BLOCKS
OF1F  50                           PUSH  AX
OF20  53                           PUSH  BX
OF21  E8 0E91 R                    CALL  _EXTVDISK      ;GET K IN USE BY VDISK
OF24  5B                           POP   BX
OF25  5A                           POP   DX             ;
OF26  B1 04                        MOV   CL,4
OF28  D3 E3                        SHL   BX,CL          ;BX = PAGES* 16
OF2A  8B CA                        MOV   CX,DX          ;K AVAILABLE
OF2C  2B C8                        SUB   CX,AX          ;LES K IN USE BY VDISK
OF2E  3B D9                        CMP   BX,CX          ;SEE IF REQUIRED > AVAILABLE
OF30  77 65                        JA    EXSERR
OF32  2B D3                        SUB   DX,BX
OF34  89 16 0476 R                 MOV   WORD PTR DS:[_DBLK].FIRSTP,DX
OF38  8B D3                        MOV   DX,BX
OF3A  B8 5758                      MOV   AX,5758H
OF3D  BB 0006                      MOV   BX,6           ;ALLOCATE EXT PAGES
OF40  CD 21                        INT   21H
OF42  33 FF                        XOR   DI,DI          ;SWAP OUT INTERRUPT PAGE FOR TSR
OF44  B9 0001                      MOV   CX,1
OF47  8B 16 0476 R                 MOV   DX,[_DBLK].FIRSTP
OF4B  BB 0000                      MOV   BX,0
OF4E  BD 0200                      MOV   BP,VECSIZ
OF51  E8 0CCF R                    CALL  EXTOUT
OF54  E8 0B39 R                    CALL  PUSHR          ;SET INT PAGE TO POINT TO HEADROOM
OF57  B3 02                        MOV   BL,2
OF59  B8 5758                      MOV   AX,5758H
OF5C  CD 21                        INT   21H
OF5E  2E: 89 1E 101A R             MOV   WORD PTR CS:[MSFUN],BX
OF63  2E: 8C 06 101C R             MOV   WORD PTR CS:[MSFUN+2],ES
OF68  BB 0004                      MOV   BX,4
OF6B  B8 5758                      MOV   AX,5758H
OF6E  9C                           PUSHF
OF6F  FA                           CLI
OF70  2E: FF 1E 101A R             CALL  DWORD PTR CS:[MSFUN]
```

```
0F75  E8 0B4B R                   CALL    POPR
0F78  88 0E 047A R                MOV     CX,[_DBLK].PAGES
0F7C  49                          DEC     CX
0F7D  49                          DEC     CX
0F7E  88 3E 047E R                MOV     DI,[_DBLK].SWPSEG
0F82  BB 0002                     MOV     BX,2
0F85  8B 2E 047C R                MOV     BP,[_DBLK].LASTP
0F89  8B 16 0476 R                MOV     DX,[_DBLK].FIRSTP
0F8D  E8 0CCF R                   CALL    EXTOUT
0F90  E8 0B4B R                   CALL    POPR
0F93  B8 0000                     MOV     AX,0
0F96  C3                          RET
0F97  E8 0B4B R       EXSERR:     CALL    POPR
0F9A  B8 0001                     MOV     AX,1
0F9D  C3                          RET
0F9E                  _EXTSWAP ENDP
                      ;
                      ;       PUBLIC  DISKOUT
                      ;
                      ;   WRITE OUT BYTES FROM DISK
                      ;
                      ; CALL WITH DX = FCB, DS:DI = DESTINATION, CX=NUMBER OF BLOCKS(256 BYTES)
                      ; AX:BP=STARTING BLOCK NUMBER IN FILE
                      ;
0F9E                  DISKOUT PROC    NEAR
0F9E  8B F7                       MOV     SI,DI
0FA0  E8 0B39 R                   CALL    PUSHR
0FA3  8B FE                       MOV     DI,SI
0FA5  EB 05                       JMP     SHORT DOT1
0FA7  E8 0B4B R       DOTERR:     CALL    POPR
0FAA  F9                          STC
0FAB  C3                          RET
0FAC  8B F0           DOT1:       MOV     SI,AX           ;HIGH PART OF RECORD NUMBER
0FAE  52                          PUSH    DX
0FAF  8B D7                       MOV     DX,DI           ;SET NEW DTA
0FB1  B4 1A                       MOV     AH,1AH
0FB3  CD 21                       INT     21H
0FB5  5A                          POP     DX              ;RESTORE FCB ADDRESS
0FB6  2E: 8E 06 0C4F R            MOV     ES,CS:MYDSEG    ;FCB IS IN MYDSEG
0FBB  8B DA                       MOV     BX,DX
0FBD  26: 89 6F 21                MOV     ES:[BX].RRECLOW,BP
0FC1  26: 89 77 23                MOV     ES:[BX].RRECHI,SI
0FC5  26: C7 47 0E 0100           MOV     ES:[BX].RECSIZ,100H  ;MAKE SURE RECORD SIZE IS SET
0FCB  51                          PUSH    CX
0FCC  81 F9 00FF      DOT3:       CMP     CX,0FFH         ; 64k MAX READ
0FD0  76 03                       JBE     DOT2
0FD2  B9 00FF                     MOV     CX,0FFH
0FD5  1E              DOT2:       PUSH    DS
0FD6  2E: 8E 1E 0C4F R            MOV     DS,CS:MYDSEG
0FDB  B4 28                       MOV     AH,28H
0FDD  CD 21                       INT     21H             ;READ
0FDF  0A C0                       OR      AL,AL
0FE1  58                          POP     AX              ;GET DTA SEG
0FE2  75 22                       JNE     DOT4
0FE4  D1 E1                       SHL     CX,1
0FE6  D1 E1                       SHL     CX,1
0FE8  D1 E1                       SHL     CX,1
0FEA  D1 E1                       SHL     CX,1
0FEC  03 C1                       ADD     AX,CX           ;ADJUST FOR READ
0FEE  8E D8                       MOV     DS,AX           ;
0FF0  52                          PUSH    DX              ;AND SET NEW DTA
0FF1  8B D7                       MOV     DX,DI
0FF3  B4 1A                       MOV     AH,1AH
```

```
0FF5  CD 21                          INT     21H
0FF7  5A                             POP     DX               ;RESTORE FCB
0FF8  59                             POP     CX               ;RESTORE COUNT
0FF9  81 F9 00FF                     CMP     CX,0FFH
0FFD  76 07                          JBE     DOT4
0FFF  81 E9 00FF                     SUB     CX,0FFH
1003  51                             PUSH    CX
1004  EB C6                          JMP     DOT3
1006  E8 084B R            DOT4:     CALL    POPR
1009  2E: 8E 1E 0C4F R               MOV     DS,CS:MYDSEG
100E  8B EA                          MOV     BP,DX
1010  3E: 8B 46 23                   MOV     AX,DS:[BP].RRECHI
1014  3E: 8B 6E 21                   MOV     BP,DS:[BP].RRECLOW
1018  F8                             CLC
1019  C3                             RET
101A                        DISKOUT  ENDP
                            ;
101A  00000000              MSFUN    DD      0
                            ;
                                     PUBLIC  _DSKSWAP
                            ;
101E                        _DSKSWAP PROC    NEAR
101E  55                             PUSH    BP
101F  57                             PUSH    DI
1020  56                             PUSH    SI
1021  1E                             PUSH    DS
1022  06                             PUSH    ES
1023  B3 02                          MOV     BL,2
1025  B8 5758                        MOV     AX,5758H
1028  CD 21                          INT     21H
102A  2E: 89 1E 101A R               MOV     WORD PTR CS:[MSFUN],BX
102F  2E: 8C 06 101C R               MOV     WORD PTR CS:[MSFUN+2],ES
1034  07                             POP     ES
1035  06                             PUSH    ES
1036  BB 0445 R                      MOV     BX,OFFSET _DBLK
1039  C6 47 62 01                    MOV     DS:[BX].XRUN,1
103D  BF 0018 R            SD02:     MOV     DI,OFFSET DGROUP:VECTBL
1040  33 F6                          XOR     SI,SI
1042  1E                             PUSH    DS
1043  8E DE                          MOV     DS,SI
1045  B9 0200                        MOV     CX,VECSIZ
1048  FC                             CLD
1049  FA                             CLI
104A  F3/ A5                         REP     MOVSW                   ;STORE TSR INTS TEMPORARILY
104C  FB                             STI
104D  1F                             POP     DS
104E  06                             PUSH    ES
104F  B3 02                          MOV     BL,2
1051  B8 5758                        MOV     AX,5758H
1054  CD 21                          INT     21H
1056  2E: 89 1E 101A R               MOV     WORD PTR CS:[MSFUN],BX
105B  2E: 8C 06 101C R               MOV     WORD PTR CS:[MSFUN+2],ES
1060  BB 0004                        MOV     BX,4
1063  B8 5758                        MOV     AX,5758H
1066  9C                             PUSHF
1067  FA                             CLI
1068  2E: FF 1E 101A R               CALL    DWORD PTR CS:[MSFUN]
106D  07                   SD01:     POP     ES
106E  BB 0445 R                      MOV     BX,OFFSET DGROUP:_DBLK
1071  A1 0012 R                      MOV     AX,_HPSP
1074  03 06 0014 R                   ADD     AX,_HLEN
1078  89 47 39                       MOV     DS:[BX].SWPSEG,AX
107B  C7 47 31 0000                  MOV     DS:[BX].FIRSTP,0
```

```
1080  B8 0B39 R              MOV    AX,OFFSET PGROUP:RESEND    ;COMPUTE NUMBER OF PAGES
1083  B1 04                  MOV    CL,4
1085  D3 E8                  SHR    AX,CL
1087  40                     INC    AX
1088  8C C9                  MOV    CX,CS
108A  03 C1                  ADD    AX,CX
108C  2B 06 0012 R           SUB    AX,_HPSP
1090  2B 06 0014 R           SUB    AX,_HLEN
1094  40                     INC    AX
1095  33 D2                  XOR    DX,DX
1097  B9 0010                MOV    CX,10H
109A  F7 F1                  DIV    CX
109C  05 000A                ADD    AX,6+VECSIZ/80H
109F  89 47 35               MOV    DS:[BX].PAGES,AX
10A2  B1 03                  MOV    CL,3
10A4  D3 E2                  SHL    DX,CL
10A6  89 57 37               MOV    DS:[BX].LASTP,DX
10A9  8D 97 0096             LEA    DX,[BX].TSRFCB            ;POINT TO TSR FCB
10AD  BD 0000                MOV    BP,0                      ;RECORD 0=DBLK DEF
10B0  B8 0000                MOV    AX,0
10B3  B9 0001                MOV    CX,1
10B6  8B FB                  MOV    DI,BX                     ;SAVE OUT COPY OF DBLK
10B8  E8 0F9E R              CALL   DISKOUT
10BB  83 C5 04               ADD    BP,4                      ;4 PAGES RESERVED FOR EMM TABLE
10BE  8B 4F 35               MOV    CX,[BX].PAGES
10C1  83 E9 09               SUB    CX,5+VECSIZ/80H           ;ACCOUNT FOR ROOM FOR TSR DBLK & INTS
10C4  8E 5F 39               MOV    DS,DS:[BX].SWPSEG
10C7  33 FF                  XOR    DI,DI
10C9  E8 0F9E R              CALL   DISKOUT                   ;WRITE OUT TSR
10CC  50                     PUSH   AX
10CD  B8 ---- R              MOV    AX,DGROUP
10D0  8E D8                  MOV    DS,AX
10D2  58                     POP    AX
10D3  BF 0018 R              MOV    DI,OFFSET VECTBL
10D6  B9 0004                MOV    CX,VECSIZ/80H             ;NUMBER OF RECORDS IN VECTBL
10D9  E8 0F9E R              CALL   DISKOUT
10DC  B4 10                  MOV    AH,10H
10DE  CD 21                  INT    21H
10E0  B0 72                  MOV    AL,'r'
10E2  50                     PUSH   AX
10E3  B8 0500 R              MOV    AX,OFFSET _DBLK.SWPNAME
10E6  50                     PUSH   AX
10E7  52                     PUSH   DX
10E8  E8 0000 E              CALL   _OPEN_FCB
10EB  83 C4 06               ADD    SP,6
10EE  07                     POP    ES
10EF  1F                     POP    DS
10F0  5E                     POP    SI
10F1  5F                     POP    DI
10F2  5D                     POP    BP
10F3  C3                     RET
10F4  C3                     RET
10F5                  _DSKSWAP ENDP
                      ;
                             PUBLIC GETPAL
                      ;
10F5                  GETPAL PROC   NEAR
10F5  E8 0839 R              CALL   PUSHR
10F8  33 C0                  XOR    AX,AX
10FA  8E D8                  MOV    DS,AX
10FC  C5 36 04A8             LDS    SI,DWORD PTR DS:[4A8H]
1100  8C D8                  MOV    AX,DS
1102  0B C6                  OR     AX,SI
```

```
1104  74 14                         JE       NOPAL
1106  C5 74 04                      LDS      SI,DWORD PTR DS:[SI+04]
1109  8C D8                         MOV      AX,DS
110B  0B C6                         OR       AX,SI
110D  74 08                         JE       NOPAL
110F  0E                            PUSH     CS
1110  07                            POP      ES
1111  BF 0406 R                     MOV      DI,OFFSET PGROUP:PALETTE
1114  B9 0011                       MOV      CX,17
1117  FC                            CLD
1118  F3/ A4                        REP MOVSB
111A  E8 084B R         NOPAL:      CALL     POPR
111D  C3                            RET
111E                   GETPAL       ENDP
                       ;
                                    PUBLIC   STRT
                       ;
111E                   STRT         PROC     FAR
111E  FA                            CLI
111F  B8 ---- R                     MOV      AX,DGROUP
1122  8E D8                         MOV      DS,AX
1124  8E D0                         MOV      SS,AX
1126  BC 1000 R                     MOV      SP,OFFSET DGROUP:STKEND
1129  FB                            STI
112A  BA 06FD R                     MOV      DX,OFFSET STRTMS
112D  B4 09                         MOV      AH,9
112F  CD 21                         INT      21H
1131  B3 01                         MOV      BL,1
1133  B8 5758                       MOV      AX,5758H
1136  CD 21                         INT      21H
1138  73 06                         JNC      S0
113A  BA 0626 R                     MOV      DX,OFFSET DGROUP:NOROOM
113D  E9 122A R                     JMP      ABORT
1140  50               S0:          PUSH     AX
1141  8C C0                         MOV      AX,ES
1143  26: 8B 0E 0002                MOV      CX,ES:[2]
1148  A3 0010 R                     MOV      _PSP,AX
114B  8E D8                         MOV      DS,AX
114D  B8 ---- R                     MOV      AX,DGROUP
1150  8E C0                         MOV      ES,AX
1152  58                            POP      AX
1153  26: A3 0012 R                 MOV      ES:[_HPSP],AX
1157  26: 89 1E 0014 R              MOV      ES:[_HLEN],BX
115C  03 C3                         ADD      AX,BX
115E  05 0020                       ADD      AX,20H
1161  8C DB                         MOV      BX,DS
1163  83 EB 02                      SUB      BX,2
1166  3B C3                         CMP      AX,BX
1168  72 06                         JB       S2
116A  BA 0654 R                     MOV      DX,OFFSET DGROUP:NOTSRS
116D  E9 122A R                     JMP      ABORT
1170  26: 89 0E 0016 R  S2:         MOV      ES:[MEMTOP],CX
1175  B8 5758                       MOV      AX,5758H
1178  BB 0009                       MOV      BX,9
117B  CD 21                         INT      21H
117D  0B DB                         OR       BX,BX
117F  74 06                         JE       @F
1181  BA 06A7 R                     MOV      DX,OFFSET DGROUP:NOTAPPO
1184  E9 122A R                     JMP      ABORT
1187  06               @@:          PUSH     ES
1188  26: 8B 1E 0010 R              MOV      BX,ES:[_PSP]
118D  8E C3                         MOV      ES,BX
118F  8C C8                         MOV      AX,CS
```

```
1191  2B C3                    SUB    AX,BX
1193  BB 0ACD R                MOV    BX,OFFSET PGROUP:MEMEND
1196  B1 04                    MOV    CL,4
1198  D3 EB                    SHR    BX,CL
119A  43                       INC    BX
119B  03 D8                    ADD    BX,AX
119D  8C C8                    MOV    AX,CS
119F  B4 4A                    MOV    AH,4AH
11A1  CD 21                    INT    21H
11A3  07                       POP    ES
11A4  26: 8B 1E 0012 R         MOV    BX,ES:[_HPSP]
11A9  B4 50                    MOV    AH,50H
11AB  CD 21                    INT    21H
11AD  E8 10F5 R                CALL   GETPAL
11B0  BF 052A R                MOV    DI,OFFSET _COMLIN
11B3  BE 0081                  MOV    SI,81H
11B6  8A 0E 0080               MOV    CL,DS:[80H]
11BA  32 ED                    XOR    CH,CH
11BC  FC                       CLD
11BD  E3 02                    JCXZ   S1
11BF  F3/ A4                   REP    MOVSB
11C1  32 C0              S1:   XOR    AL,AL
11C3  AA                       STOSB
11C4  8B EC                    MOV    BP,SP
11C6  BA 052A R                MOV    DX,OFFSET _COMLIN
11C9  52                       PUSH   DX
11CA  B8 ---- R                MOV    AX,DGROUP
11CD  8E C0                    MOV    ES,AX
11CF  8E D8                    MOV    DS,AX
11D1  E8 0000 E                CALL   _COMPARSE
11D4  8B E5                    MOV    SP,BP
11D6  8C C8                    MOV    AX,CS
11D8  C7 06 0480 R 0A2B R      MOV    WORD PTR DS:[_DBLK].XFERADD,OFFSET PGROUP:IDLEOP
11DE  A3 0482 R                MOV    WORD PTR DS:[_DBLK].XFERADD+2,AX
11E1  C7 06 0484 R 0406 R      MOV    WORD PTR DS:[_DBLK].LOCALS,OFFSET PGROUP:LOCSTK
11E7  A3 0486 R                MOV    WORD PTR DS:[_DBLK].LOCALS+2,AX
11EA  33 C0                    XOR    AX,AX
11EC  8E C0                    MOV    ES,AX
11EE  26: C4 16 04A8           LES    DX,DWORD PTR ES:[4A8H]
11F3  89 16 0499 R             MOV    WORD PTR DS:[_DBLK].ESAVLOC,DX
11F7  8C 06 0498 R             MOV    WORD PTR DS:[_DBLK].ESAVLOC+2,ES
11FB  B8 ---- R          S4:   MOV    AX,DGROUP
11FE  8E D8                    MOV    DS,AX
1200  8E C0                    MOV    ES,AX
1202  A1 0012 R                MOV    AX,DS:[_HPSP]
1205  03 06 0014 R             ADD    AX,DS:[_HLEN]
1209  E8 1239 R                CALL   FREEMEM
120C  BB ---- R                MOV    BX,DGROUP
120F  8E C3                    MOV    ES,BX
1211  8E DB                    MOV    DS,BX
1213  B3 03                    MOV    BL,3
1215  B8 5758                  MOV    AX,5758H
1218  BE 0445 R                MOV    SI,OFFSET DGROUP:_DBLK
121B  CD 21                    INT    21H
121D  8B 1E 0010 R             MOV    BX,_PSP
1221  B4 50                    MOV    AH,50H
1223  CD 21                    INT    21H
1225  B8 4C00                  MOV    AX,4C00H
1228  CD 21                    INT    21H
                         ;
122A  B8 ---- R          ABORT: MOV   AX,DGROUP
122D  8E D8                    MOV    DS,AX
122F  B4 09                    MOV    AH,9
```

```
1231  CD 21                           INT     21H
1233  B8 4C01                         MOV     AX,4C01H
1236  CD 21                           INT     21H
1238  F4                              HLT
1239                          STRT    ENDP
                              ;
                                      PUBLIC  FREEMEM
                              ;
1239                          FREEMEM PROC    NEAR
1239  50                              PUSH    AX
123A  06                              PUSH    ES
123B  8E C0                           MOV     ES,AX
123D  26: 80 3E 0000 5A               CMP     BYTE PTR ES:[0],5AH
1243  74 14                           JE      FR1
1245  26: 03 06 0003                  ADD     AX,WORD PTR ES:[3]
124A  40                              INC     AX
124B  BB ---- R                       MOV     BX,DGROUP
124E  8E DB                           MOV     DS,BX
1250  3B 06 0016 R                    CMP     AX,DS:[MEMTOP]
1254  73 03                           JAE     FR1
1256  E8 1239 R                       CALL    FREEMEM
1259  8C C0                   FR1:    MOV     AX,ES
125B  26: 8B 1E 0001                  MOV     BX,WORD PTR ES:[1]
1260  0B DB                           OR      BX,BX
1262  74 0A                           JZ      FR2
1264  06                              PUSH    ES
1265  50                              PUSH    AX
1266  8E C3                           MOV     ES,BX
1268  B4 50                           MOV     AH,50H
126A  CD 21                           INT     21H
126C  58                              POP     AX
126D  07                              POP     ES
126E  40                      FR2:    INC     AX
126F  8E C0                           MOV     ES,AX
1271  B4 49                           MOV     AH,49H
1273  CD 21                           INT     21H
1275  07                              POP     ES
1276  58                              POP     AX
1277  C3                              RET
1278                          FREEMEM ENDP
                              ;
                                      PUBLIC  _FCBOPEN
                              ;
1278                          _FCBOPEN PROC   NEAR
1278  55                              PUSH    BP
1279  8B EC                           MOV     BP,SP
127B  57                              PUSH    DI
127C  56                              PUSH    SI
127D  8B 56 04                        MOV     DX,[BP+04]
1280  B4 0F                           MOV     AH,0FH
1282  CD 21                           INT     21H
1284  0A C0                           OR      AL,AL
1286  B8 0000                         MOV     AX,0
1289  74 01                           JE      FCB01
128B  40                              INC     AX
128C  5E                      FCB01:  POP     SI
128D  5F                              POP     DI
128E  5D                              POP     BP
128F  C3                              RET
1290                          _FCBOPEN ENDP
                              ;
                                      PUBLIC  _FCBCREAT
                              ;
```

```
1290                    _FCBCREAT PROC   NEAR
1290  55                        PUSH    BP
1291  8B EC                     MOV     BP,SP
1293  57                        PUSH    DI
1294  56                        PUSH    SI
1295  8B 56 04                  MOV     DX,[BP+04]
1298  B4 16                     MOV     AH,16H
129A  CD 21                     INT     21H
129C  0A C0                     OR      AL,AL
129E  B8 0000                   MOV     AX,0
12A1  74 01                     JE      FCBC1
12A3  40                        INC     AX
12A4  5E              FCBC1:    POP     SI
12A5  5F                        POP     DI
12A6  5D                        POP     BP
12A7  C3                        RET
12A8                    _FCBCREAT ENDP
                        ;
                                PUBLIC  _DOPARSE
                        ;
12A8                    _DOPARSE PROC   NEAR
12A8  55                        PUSH    BP
12A9  8B EC                     MOV     BP,SP
12AB  56                        PUSH    SI
12AC  57                        PUSH    DI
12AD  8B 76 06                  MOV     SI,[BP+06]
12B0  8B 7E 04                  MOV     DI,[BP+04]
12B3  B8 2900                   MOV     AX,2900H
12B6  CD 21                     INT     21H
12B8  32 E4                     XOR     AH,AH
12BA  5F                        POP     DI
12BB  5E                        POP     SI
12BC  5D                        POP     BP
12BD  C3                        RET
12BE                    _DOPARSE ENDP
                        ;
                        ;
                                PUBLIC  _LINSTR
                        ;
12BE                    _LINSTR PROC    NEAR            ;int instr(str,chr,pos);
12BE  55                        PUSH    BP
12BF  8B EC                     MOV     BP,SP
12C1  57                        PUSH    DI
12C2  06                        PUSH    ES
12C3  1E                        PUSH    DS
12C4  07                        POP     ES
12C5  8B 7E 04                  MOV     DI,[BP+04]
12C8  57                        PUSH    DI
12C9  E8 0000 E                 CALL    _STRLEN
12CC  5F                        POP     DI
12CD  8B C8                     MOV     CX,AX
12CF  2B 4E 08                  SUB     CX,[BP+08]
12D2  03 F9                     ADD     DI,CX
12D4  2B 7E 08                  SUB     DI,[BP+08]
12D7  8B 46 06                  MOV     AX,[BP+06]
12DA  FD                        STD
12DB  F2/ AE                    REPNE   SCASB
12DD  FC                        CLD
12DE  75 09                     JNE     LINST1
12E0  2B 7E 04                  SUB     DI,[BP+04]
12E3  8B C7                     MOV     AX,DI
12E5  40                        INC     AX
12E6  40                        INC     AX
```

```
12E7  EB 02                  JMP      SHORT LINST2
12E9  33 C0          LINST1: XOR      AX,AX
12EB  07             LINST2: POP      ES
12EC  5F                     POP      DI
12ED  5D                     POP      BP
12EE  C3                     RET
12EF                 _LINSTR ENDP
                     ;
                             PUBLIC   _SETWCNT
                     ;
12EF                 _SETWCNT PROC    NEAR
12EF  55                     PUSH     BP
12F0  8B EC                  MOV      BP,SP
12F2  8B 46 04               MOV      AX,[BP+04]
12F5  2E: A3 0002 R          MOV      CS:_WTCNT,AX
12F9  5D                     POP      BP
12FA  C3                     RET
12FB                 _SETWCNT ENDP
                     ;
                             PUBLIC   _SETW1CNT
                     ;
12FB                 _SETW1CNT PROC   NEAR
12FB  55                     PUSH     BP
12FC  8B EC                  MOV      BP,SP
12FE  8B 46 04               MOV      AX,[BP+04]
1301  2E: A3 0004 R          MOV      CS:_WTCNT1,AX
1305  5D                     POP      BP
1306  C3                     RET
1307                 _SETW1CNT ENDP
                     ;
                     ;
                     ;
1307                 _TEXT   ENDS

END      STRT
```

Structures and Records:

| Name | Width | # fields |
|---|---|---|
| | Shift | Width  Mask  Initial |

| Name | Shift | Width | Mask | Initial |
|---|---|---|---|---|
| DESCRIPT . . . . . . . . . . . . . | 0008 | 0005 | | |
| LIMIT . . . . . . . . . . . . . | 0000 | | | |
| BASELO . . . . . . . . . . . . | 0002 | | | |
| BASEHI . . . . . . . . . . . . | 0004 | | | |
| ACCESS . . . . . . . . . . . . | 0005 | | | |
| EFCB . . . . . . . . . . . . . . | 0007 | 0003 | | |
| EXTEND . . . . . . . . . . . . | 0000 | | | |
| ATTRIB . . . . . . . . . . . . | 0006 | | | |
| EXPTBL . . . . . . . . . . . . . | 0002 | 0002 | | |
| NEXT . . . . . . . . . . . . . | 0000 | | | |
| PREV . . . . . . . . . . . . . | 0001 | | | |
| FCB . . . . . . . . . . . . . . | 0025 | 0008 | | |
| DRIVE . . . . . . . . . . . . | 0000 | | | |
| FNAME . . . . . . . . . . . . | 0001 | | | |
| FEXT . . . . . . . . . . . . . | 0009 | | | |
| BLOCK . . . . . . . . . . . . | 000C | | | |
| RECSIZ . . . . . . . . . . . . | 000E | | | |
| FILSIZ . . . . . . . . . . . . | 0010 | | | |
| FDATE . . . . . . . . . . . . | 0014 | | | |
| RESERV . . . . . . . . . . . . | 0016 | | | |
| RELREC . . . . . . . . . . . . | 0020 | | | |

| | | |
|---|---|---|
| RRECLOW | 0021 | |
| RRECHI | 0023 | |
| SWAPINT | 0013 | 0013 |
| SWAP0 | 0000 | |
| SWAP5 | 0001 | |
| SWAP8 | 0002 | |
| SWAP9 | 0003 | |
| SWAPB | 0004 | |
| SWAPC | 0005 | |
| SWAPF | 0006 | |
| SWAP10 | 0007 | |
| SWAP14 | 0008 | |
| SWAP16 | 0009 | |
| SWAP16A | 000A | |
| SWAP17 | 000B | |
| SWAP21 | 000C | |
| SWAP28 | 000D | |
| SWAP2A | 000E | |
| SWAPNET | 000F | |
| SWAPU1 | 0010 | |
| SWAPU2 | 0011 | |
| SWAPU3 | 0012 | |
| TSR | 00E5 | 0029 |
| TSRNAME | 0000 | |
| INMEM | 0015 | |
| KEY | 0016 | |
| SHIFTS | 0020 | |
| KEYSON | 002A | |
| EMMCHN | 002B | |
| APPSEQ | 002C | |
| BATCHP | 002D | |
| BATCHFL | 002F | |
| DOSSTRT | 0030 | |
| FIRSTP | 0031 | |
| CYCLE | 0033 | |
| PAGES | 0035 | |
| LASTP | 0037 | |
| SWPSEG | 0039 | |
| XFERADD | 003B | |
| LOCALS | 003F | |
| EMMHNDL | 0043 | |
| EMMOUTH | 0045 | |
| TEXT | 0047 | |
| ISTSR | 0048 | |
| ISGENIE | 0049 | |
| OUTRECL | 004A | |
| OUTRECH | 004C | |
| TSRPSP | 004E | |
| TSRDTA | 0050 | |
| ESAVLOC | 0054 | |
| CONSOLE | 0058 | |
| PINMEM | 005C | |
| POSTSEQ | 005E | |
| POSTNXT | 0060 | |
| XRUN | 0062 | |
| IDLECNT | 0063 | |
| AT_LOW | 0065 | |
| AT_HIGH | 0067 | |
| COUNT | 0069 | |
| RESET | 007C | |
| TSRFEXT | 008F | |
| TSRFCB | 0096 | |
| SWPNAME | 00B8 | |
| INIDIC | 00E3 | |

Segments and Groups:

| Name | Length | Align | Combine | Class |
|---|---|---|---|---|
| BIOS_SEG | 0101 | AT | 0040 | |
| DGROUP | GROUP | | | |
| _DATA | 075A | WORD | PUBLIC | 'DATA' |
| CONST | 0000 | WORD | PUBLIC | 'CONST' |
| _BSS | 0000 | WORD | PUBLIC | 'BSS' |
| STACK | 1000 | PARA | STACK | 'STACK' |
| MYEND | 0258 | PARA | PUBLIC | 'MEND' |
| IPAGE_SEG | 0074 | AT | 0000 | |
| MTR_SEG | E05B | AT | F000 | |
| PGROUP | GROUP | | | |
| _TEXT | 1307 | BYTE | PUBLIC | 'CODE' |
| PROG | 0000 | BYTE | PUBLIC | 'PROG' |

Symbols:

| Name | Type | Value | Attr | |
|---|---|---|---|---|
| ABORT | L NEAR | 122A | _TEXT | |
| ALT_INPUT | L BYTE | 0019 | BIOS_SEG | |
| BIOS_TIME | L DWORD | 006C | BIOS_SEG | |
| BLKDST | L QWORD | 0CB7 | _TEXT | |
| BLKHAND | L QWORD | 0C9F | _TEXT | |
| BLKSRC | L QWORD | 0CAF | _TEXT | |
| BUFFER_HEAD | L WORD | 001A | BIOS_SEG | |
| BUFFER_TAIL | L WORD | 001C | BIOS_SEG | |
| CRT_ADDR | L WORD | 0063 | BIOS_SEG | |
| CRT_CMOD | L WORD | 0060 | BIOS_SEG | |
| CRT_COLS | L WORD | 004A | BIOS_SEG | |
| CRT_CURSES | L WORD | 0050 | BIOS_SEG | Length = 0008 |
| CRT_INFO | L BYTE | 0087 | BIOS_SEG | |
| CRT_INFO_3 | L BYTE | 0088 | BIOS_SEG | |
| CRT_LEN | L WORD | 004C | BIOS_SEG | |
| CRT_MODE | L BYTE | 0049 | BIOS_SEG | |
| CRT_MSET | L BYTE | 0065 | BIOS_SEG | |
| CRT_PAGE | L BYTE | 0062 | BIOS_SEG | |
| CRT_PALETTE | L BYTE | 0066 | BIOS_SEG | |
| CRT_POINTS | L WORD | 0085 | BIOS_SEG | |
| CRT_RFLSG | L WORD | 0072 | BIOS_SEG | |
| CRT_ROWS | L BYTE | 0084 | BIOS_SEG | |
| CRT_SAV_PTR | L DWORD | 00A8 | BIOS_SEG | |
| CRT_START | L WORD | 004E | BIOS_SEG | |
| CRT_STATUS_B | L BYTE | 0100 | BIOS_SEG | |
| DFCB | L | 0418 | _DATA | |
| DISKOUT | N PROC | 0F9E | _TEXT | Global Length = 007C |
| DOSFLG | L DWORD | 0A23 | _TEXT | |
| DOT1 | L NEAR | 0FAC | _TEXT | |
| DOT2 | L NEAR | 0FD5 | _TEXT | |
| DOT3 | L NEAR | 0FCC | _TEXT | |
| DOT4 | L NEAR | 1006 | _TEXT | |
| DOTERR | L NEAR | 0FA7 | _TEXT | |
| DWBSIZ | NUMBER | 1000 | | |
| EMMDEV | L BYTE | 06F5 | _DATA | |
| EMMFR | L WORD | 0C51 | _TEXT | |
| EMSERR | L NEAR | 0E2D | _TEXT | |
| EQUIPMENT | L WORD | 0010 | BIOS_SEG | |

| | | | | | |
|---|---|---|---|---|---|
| ERRLIN2 . . . . . . . . . . . . . . | L BYTE | 06D6 | _DATA | | |
| ERRLIN3 . . . . . . . . . . . . . | L BYTE | 06EE | _DATA | | |
| EVDONE . . . . . . . . . . . . . | L NEAR | 0ED3 | _TEXT | | |
| EX00 . . . . . . . . . . . . . . | L NEAR | 003C | _TEXT | | |
| EX01 . . . . . . . . . . . . . . | L NEAR | 0048 | _TEXT | | |
| EX01A . . . . . . . . . . . . . | L NEAR | 0059 | _TEXT | | |
| EX02 . . . . . . . . . . . . . . | L NEAR | 0092 | _TEXT | | |
| EXSERR . . . . . . . . . . . . . | L NEAR | 0F97 | _TEXT | | |
| EXTOUT . . . . . . . . . . . . . | N PROC | 0CCF | _TEXT | Global | Length = 00C6 |
| EXTS1 . . . . . . . . . . . . . | L NEAR | 0F01 | _TEXT | | |
| FCBC1 . . . . . . . . . . . . . | L NEAR | 12A4 | _TEXT | | |
| FCBD1 . . . . . . . . . . . . . | L NEAR | 128C | _TEXT | | |
| FR1 . . . . . . . . . . . . . . | L NEAR | 1259 | _TEXT | | |
| FR2 . . . . . . . . . . . . . . | L NEAR | 126E | _TEXT | | |
| FREEMEM . . . . . . . . . . . . | N PROC | 1239 | _TEXT | Global | Length = 003F |
| GE0 . . . . . . . . . . . . . . | L NEAR | 0C22 | _TEXT | | |
| GE1 . . . . . . . . . . . . . . | L NEAR | 0C42 | _TEXT | | |
| GE2 . . . . . . . . . . . . . . | L NEAR | 0BEC | _TEXT | | |
| GE3 . . . . . . . . . . . . . . | L NEAR | 0BC6 | _TEXT | | |
| GE3A . . . . . . . . . . . . . . | L NEAR | 0BD8 | _TEXT | | |
| GECONT . . . . . . . . . . . . . | L NEAR | 0BE0 | _TEXT | | |
| GEEND . . . . . . . . . . . . . | L NEAR | 0C49 | _TEXT | | |
| GEERR . . . . . . . . . . . . . | L NEAR | 0BEB | _TEXT | | |
| GETPAL . . . . . . . . . . . . . | N PROC | 10F5 | _TEXT | Global | Length = 0029 |
| I09FLG . . . . . . . . . . . . . | WORD | 0008 | | | |
| I13FLG . . . . . . . . . . . . . | WORD | 0001 | | | |
| I14FLG . . . . . . . . . . . . . | WORD | 0020 | | | |
| I17FLG . . . . . . . . . . . . . | WORD | 0010 | | | |
| I25FLG . . . . . . . . . . . . . | WORD | 0002 | | | |
| I26FLG . . . . . . . . . . . . . | WORD | 0004 | | | |
| IDLE1 . . . . . . . . . . . . . | L NEAR | 0A56 | _TEXT | | |
| IDLE2 . . . . . . . . . . . . . | L NEAR | 0AC5 | _TEXT | | |
| IDLE3 . . . . . . . . . . . . . | L NEAR | 0A85 | _TEXT | | |
| IDLE3A . . . . . . . . . . . . . | L NEAR | 0AA0 | _TEXT | | |
| IDLE3B . . . . . . . . . . . . . | L NEAR | 0A88 | _TEXT | | |
| IDLEOP . . . . . . . . . . . . . | F PROC | 0A28 | _TEXT | Global | Length = 00A2 |
| ISEMM0 . . . . . . . . . . . . . | L NEAR | 0C6E | _TEXT | | |
| ISEMM1 . . . . . . . . . . . . . | L NEAR | 0C7C | _TEXT | | |
| ISEXT1 . . . . . . . . . . . . . | L NEAR | 0C9D | _TEXT | | |
| KB_BUFFER . . . . . . . . . . . | L WORD | 001E | BIOS_SEG | | Length = 0010 |
| KB_BUFFER_END . . . . . . . . . | L WORD | 003E | BIOS_SEG | | |
| KB_FLAG . . . . . . . . . . . . | L BYTE | 0017 | BIOS_SEG | | |
| KB_FLAG_1 . . . . . . . . . . . | L BYTE | 0018 | BIOS_SEG | | |
| KB_INT . . . . . . . . . . . . . | L WORD | 0024 | IPAGE_SEG | | |
| KHIT . . . . . . . . . . . . . . | L DWORD | 0A1B | _TEXT | | |
| LINST1 . . . . . . . . . . . . . | L NEAR | 12E9 | _TEXT | | |
| LINST2 . . . . . . . . . . . . . | L NEAR | 12EB | _TEXT | | |
| LOCSTK . . . . . . . . . . . . . | L WORD | 0406 | _TEXT | | |
| MEMEND . . . . . . . . . . . . . | L BYTE | 0ACD | _TEXT | Length = 0020 | |
| MEMTOP . . . . . . . . . . . . . | L WORD | 0016 | _DATA | | |
| MSFUN . . . . . . . . . . . . . | L DWORD | 101A | _TEXT | | |
| MTR_RESET . . . . . . . . . . . | L FAR | E05B | MTR_SEG | | |
| MYDSEG . . . . . . . . . . . . . | L WORD | 0C4F | _TEXT | Global | |
| NOPAL . . . . . . . . . . . . . | L NEAR | 111A | _TEXT | | |
| NOROOM . . . . . . . . . . . . . | L BYTE | 0626 | _DATA | | |
| NOTAPPO . . . . . . . . . . . . | L BYTE | 06A7 | _DATA | | |
| NOTSRS . . . . . . . . . . . . . | L BYTE | 0654 | _DATA | | |

| | | | | |
|---|---|---|---|---|
| NOVDISK | L NEAR | 0EB7 | _TEXT | |
| NULL | L DWORD | 0000 | _DATA | |
| OLDMS | L DWORD | 0A27 | _TEXT | |
| PAGEOUT | N PROC | 0095 | _TEXT | Global Length = 0034 |
| PALETTE | L BYTE | 0406 | _TEXT | Length = 0011 |
| PARAM_TBL | L DWORD | 0074 | IPAGE_SEG | |
| PO1 | L NEAR | 0097 | _TEXT | |
| POEM | L BYTE | 067D | _DATA | |
| POERR | L NEAR | 0DC3 | _TEXT | |
| POPPED | L NEAR | 0A7C | _TEXT | |
| POPR | N PROC | 0B4B | _TEXT | Global Length = 000F |
| PSTR1 | L NEAR | 0B8C | _TEXT | |
| PSTR2 | L NEAR | 0B99 | _TEXT | |
| PUSHR | N PROC | 0B39 | _TEXT | Global Length = 0012 |
| RESEND | L BYTE | 0B39 | _TEXT | |
| S0 | L NEAR | 1140 | _TEXT | |
| S1 | L NEAR | 11C1 | _TEXT | |
| S2 | L NEAR | 1170 | _TEXT | |
| S4 | L NEAR | 11FB | _TEXT | |
| SAVBUF | L BYTE | 0417 | _TEXT | Length = 0600 |
| SBASE | L BYTE | 0000 | STACK | Length = 0400 |
| SD01 | L NEAR | 106D | _TEXT | |
| SD02 | L NEAR | 1030 | _TEXT | |
| STKEND | L WORD | 1000 | STACK | Global |
| STKRSV | NUMBER | 0400 | | |
| STRT | F PROC | 111E | _TEXT | Global Length = 011B |
| STRTMS | L BYTE | 06FD | _DATA | |
| TIDLE | L DWORD | 0A1F | _TEXT | |
| TIMER_HI | L WORD | 006E | BIOS_SEG | |
| TIMER_LOW | L WORD | 006C | BIOS_SEG | |
| TSRSIZE | NUMBER | 00E5 | | Global |
| UNGET | L DWORD | 0A17 | _TEXT | |
| VDISK | L BYTE | 06F0 | _DATA | |
| VECSIZ | NUMBER | 0200 | | |
| VECTBL | L WORD | 0018 | _DATA | Length = 0200 |
| a0 | L NEAR | 0ABA | _TEXT | |
| a1 | L NEAR | 0C01 | _TEXT | |
| a2 | L NEAR | 0EA2 | _TEXT | |
| a3 | L NEAR | 0EBC | _TEXT | |
| a4 | L NEAR | 1187 | _TEXT | |
| @CPU | TEXT | 0101h | | |
| @FILENAME | TEXT | swapout | | |
| @VERSION | TEXT | 510 | | |
| _COMLIN | L BYTE | 052A | _DATA | Global Length = 002A |
| _COMPARSE | L NEAR | 0000 | _TEXT | External |
| _DBLK | L | 0445 | _DATA | Global |
| _DOPARSE | N PROC | 12A8 | _TEXT | Global Length = 0016 |
| _DSKSWAP | N PROC | 101E | _TEXT | Global Length = 0007 |
| _EMMAVAIL | L WORD | 043F | _DATA | Global |
| _EMMSETUP | N PROC | 0DC9 | _TEXT | Global Length = 0068 |
| _EMMSWAP | N PROC | 0E34 | _TEXT | Global Length = 0050 |
| _ERRABT | N PROC | 085A | _TEXT | Global Length = 0029 |
| _EXTAVAIL | L WORD | 0441 | _DATA | Global |
| _EXTSWAP | N PROC | 0ED8 | _TEXT | Global Length = 00C6 |
| _EXTVDISK | N PROC | 0E91 | _TEXT | Global Length = 0047 |

| Symbol | Type | Addr | Segment | Scope | Length |
|---|---|---|---|---|---|
| _FCBCREAT | N PROC | 1290 | _TEXT | Global | Length = 0018 |
| _FCBOPEN | N PROC | 1278 | _TEXT | Global | Length = 0018 |
| _GETEXE | N PROC | 0BB0 | _TEXT | Global | Length = 009F |
| _GETSDIR | N PROC | 0BA5 | _TEXT | Global | Length = 000B |
| _HLEN | L WORD | 0014 | _DATA | | |
| _HPSP | L WORD | 0012 | _DATA | | |
| _ISEMM | N PROC | 0C53 | _TEXT | Global | Length = 002F |
| _ISEXT | N PROC | 0C82 | _TEXT | Global | Length = 001D |
| _KEYWAIT | L WORD | 0000 | _TEXT | Global | |
| _LINSTR | N PROC | 12BE | _TEXT | Global | Length = 0031 |
| _LOADFLG | L WORD | 0443 | _DATA | Global | |
| _ONDISK | L WORD | 0430 | _DATA | Global | |
| _OPEN_FCB | L NEAR | 0000 | _TEXT | External | |
| _PRTSTR | N PROC | 0B83 | _TEXT | Global | Length = 001A |
| _PSP | L WORD | 0010 | _DATA | Global | |
| _SETW1CNT | N PROC | 12FB | _TEXT | Global | Length = 000C |
| _SETWAIT | N PROC | 0B9D | _TEXT | Global | Length = 0008 |
| _SETWCNT | N PROC | 12EF | _TEXT | Global | Length = 000C |
| _STRLEN | L NEAR | 0000 | _TEXT | External | |
| _WTCNT | L WORD | 0002 | _TEXT | Global | |
| _WTCNT1 | L WORD | 0004 | _TEXT | Global | |
| __ACRTUSED | NUMBER | 1234 | | Global | |

```
    1413 Source Lines
    1413 Total  Lines
     277 Symbols

47076 + 281364 Bytes symbol space free

0 Warning Errors
     0 Severe  Errors
                               PAGE    ,132
                               TITLE   TSREND -- END OF A TSR PROGRAM
                           ;
                           ;
                           ;
                           PGROUP  GROUP   _TEXT,PROG 0000                       _TEXT   SEGMENT BYTE PUBLIC 'CODE'
0000                       _TEXT   ENDS 0000                       PROG    SEGMENT BYTE PUBLIC 'PROG'
0000                       PROG    ENDS 0000                       _DATA   SEGMENT WORD PUBLIC 'DATA'
0000                       _DATA   ENDS 0000                       CONST   SEGMENT WORD PUBLIC 'CONST'
0000                       CONST   ENDS 0000                       _BSS    SEGMENT WORD PUBLIC 'BSS'
0000                       _BSS    ENDS = 0400                     STKRSV  EQU     1024
0000                       STACK   SEGMENT STACK 'STACK'
                                   PUBLIC  STKEND
0000  0400[                SBASE   DB      STKRSV DUP ('STCK')
        53 54 43 4B
                    ]

1000                       STKEND  LABEL   WORD
1000                       STACK   ENDS
```

```
0000                            MYEND   SEGMENT PARA PUBLIC 'MEND'
0000  0064[                             DB      100 DUP('MY END')
      4D 59 20 45 4E
      44
            ]

0258                            MYEND   ENDS

DGROUP  GROUP   _DATA, CONST, _BSS, STACK, MYEND

INCLUDE DEFTSR.ASM
                              C EFCB    STRUC
0000  00                      C EXTEND  DB      0
0001  0005[                   C         DB      5 DUP(0)
      00
            ]                 C
                              C
0006  00                      C ATTRIB  DB      0
0007                          C EFCB    ENDS
                              C ;
                              C FCB     STRUC
0000  00                      C DRIVE   DB      ?
0001  0008[                   C FNAME   DB      8 DUP(?)
      ??
            ]                 C
                              C
0009  0003[                   C FEXT    DB      3 DUP(?)
      ??
            ]                 C
                              C
000C  0000                    C BLOCK   DW      ?
000E  0000                    C RECSIZ  DW      ?
0010  00000000                C FILSIZ  DD      ?
0014  0000                    C FDATE   DW      ?
0016  000A[                   C RESERV  DB      10 DUP(?)
      ??
            ]                 C
                              C
0020  00                      C RELREC  DB      ?
0021  0000                    C RRECLOW DW      ?
0023  0000                    C RRECHI  DW      ?
0025                          C FCB     ENDS
                              C ;
                              C SWAPINT STRUC
0000  00                      C SWAP0   DB      0
0001  00                      C SWAP5   DB      0
0002  00                      C SWAP8   DB      0
0003  00                      C SWAP9   DB      0
0004  00                      C SWAPB   DB      0
0005  00                      C SWAPC   DB      0
0006  00                      C SWAPF   DB      0
0007  00                      C SWAP10  DB      0
0008  00                      C SWAP14  DB      0
0009  00                      C SWAP16  DB      0
000A  00                      C SWAP16A DB      0
000B  00                      C SWAP17  DB      0
000C  00                      C SWAP21  DB      0
000D  00                      C SWAP28  DB      0
000E  00                      C SWAP2A  DB      0
000F  00                      C SWAPNET DB      0
0010  00                      C SWAPU1  DB      0
0011  00                      C SWAPU2  DB      0
0012  00                      C SWAPU3  DB      0
```

```
0013                          C   SWAPINT ENDS
                              C
                              C   TSR     STRUC
0000  0015[                   C   TSRNAME DB    21 DUP(0)            ;TSR NAME FOR MENU
        00                    C
                            ] C
                              C
0015  00                      C   INMEM   DB    0                    ;FLAG SET IF TSR/APP SWAPPED IN
0016  000A[                   C   KEY     DB    10 DUP(?)            ;ACTIVATION KEY
        ??                    C
                            ] C
                              C
0020  000A[                   C   SHIFTS  DB    10 DUP(?)            ;SHIFT STATE FOR ACTIVATION
        ??                    C
                            ] C
                              C
002A  01                      C   KEYSON  DB    1                    ;ARE THE KEYS FOR THIS TSR ACTIVE
002B  FF                      C   EMMCHN  DB    -1                   ;POINTER TO START OF CHAIN OF HANDLES
002C  00                      C   APPSEQ  DB    0                    ;SEQUENCE NUMBER OF APPLICATION
002D  0000                    C   BATCHP  DW    0                    ;POINTER TO BATCH FILE IN BATCH BLOCK
002F  00                      C   BATCHFL DB    0                    ;FLAG IF SHOULD PROCESS BATCH COMMAND
0030  00                      C   DOSSTRT DB    0                    ;ACTIVATION FLAG - SWAP WHEN NOT BUSY
0031  0000                    C   FIRSTP  DW    0                    ;PAGE NUMBER OF FIRST PAGE FOR APPL.
0033  0000                    C   CYCLE   DW    0                    ;NEXT FREE 64k FOR APPL. SWAP
0035  0000                    C   PAGES   DW    0                    ;SIZE OF APPLICATION IN PAGES.
0037  0000                    C   LASTP   DW    0                    ;NUMBER OF WORDS IN LAST PAGE
0039  0000                    C   SWPSEG  DW    0                    ;SEGMENT FOR SWAP IN
003B  00000000                C   XFERADD DD    0                    ;LOCATION TO START/CONTINUE TSR/APPL
003F  00000000                C   LOCALS  DD    0                    ;A NEW STACK FRAME FOR AFTER A SWAP
0043  FFFF                    C   EMMHNDL DW    -1                   ;HANDLE OF EMM PAGE MAP FOR TSR/APPL
0045  0000                    C   EMMOUTH DW    0                    ;TEMPORARY HANDLE FOR APPL SWAP OUT
0047  00                      C   TEXT    DB    0                    ;FLAG SET IF SHOULD SWITCH TO TEXT
0048  01                      C   ISTSR   DB    1                    ;FLAG SET IF IS A TSR
0049  00                      C   ISGENIE DB    0                    ;FLAG SET IF IS A GENIE MODULE
004A  0000                    C   OUTRECL DW    0                    ;1ST RECORD NUMBER OF SWAPPED
004C  0000                    C   OUTRECH DW    0                    ;  APPL CODE IN SWAPOUT FILE
004E  0000                    C   TSRPSP  DW    0                    ;SAVE AREA FOR PSP
0050  00000000                C   TSRDTA  DD    0                    ;SAVE AREA FOR OLD DTA
0054  00000000                C   ESAVLOC DD    0                    ;SAVE FOR EGA SAVE AREA
0058  00000000                C   CONSOLE DD    0                    ;SAVE AREA FOR DOS CONSOLE DRIVER
005C  0000                    C   PINMEM  DW    0                    ;PREVIOUS TSR/APPL IN MEMORY
005E  0000                    C   POSTSEQ DW    0                    ;SEQUENCE NUMBER FOR POSTED MCBS
0060  0000                    C   POSTNXT DW    0                    ;NEXT MCB TO POST SEQUENCE NUMBER
0062  00                      C   XRUN    DB    0                    ;0 = XPANDED, 1 = DISK, 2 = EXTENDED
                              C                                      ;4 = RUNNING IN XPANDED
0063  0000                    C   IDLECNT DW    0                    ;NUMBER OF MINUTES IDLE BEFORE SWAP
0065  0000                    C   AT_LOW  DW    0                    ;TIME AT WHICH TO SWAP IN - LOW WORD
0067  0000                    C   AT_HIGH DW    0                    ;TIME AT WHICH TO SWAP IN - HIGH WORD
0069  0013[                   C   COUNT   DB    SIZE SWAPINT DUP(0)  ;COUNTS OF SWAPIN ON INTERRUPT USU. 1
        00                    C
                            ] C
                              C
007C  0013[                   C   RESET   DB    SIZE SWAPINT DUP(0)  ;INITIAL VALUE OF SWAPIN ON INTERRUPT
        00                    C
                            ] C
                              C
008F  0007[                   C   TSRFEXT DB    7 DUP(0)             ;ROOM FOR FCB EXTENTION
        00                    C
                            ] C
                              C
0096  0025[                   C   TSRFCB  DB    25H DUP(0)           ;ROOM FOR DISKSWAP FCB
        00                    C
                            ] C
                              C
```

```
00BB  0028[         C  SWPNAME   DB      40 DUP(?)       ;FULL PATH NAME OF SWAP FILE
      ??            C
                ]   C
                    C
00E3  48 52         C  INIDIC    DB      'HR'
00E5                C  TSR       ENDS
                    C  ;
                    C            PUBLIC  TSRSIZE
                    C  ;
= 00E5              C  TSRSIZE   EQU     SIZE TSR
                    C  ;
                    C  EXPTBL    STRUC
0000  FF            C  NEXT      DB      0FFH
0001  FF            C  PREV      DB      0FFH
0002                C  EXPTBL    ENDS
                    C  ;
                    C  DESCRIPT  STRUC
0000  0000          C  LIMIT     DW      0
0002  0000          C  BASELO    DW      0
0004  00            C  BASEHI    DB      0
0005  00            C  ACCESS    DB      0
0006  0000          C            DW      0
0008                C  DESCRIPT  ENDS
                    C
                    C  ELSE
= 1000              C  DWBSIZ    EQU     4096
                    C  ENDIF
                       INCLUDE DEFBIOS.ASM
                    C  ;
= 0200              C  VECSIZ    EQU     200H            ;SIZE OF INT. VECTOR TABLE IN WORDS
                    C  ;
0000                C  BIOS_SEG          SEGMENT AT 40H
0010                C            ORG     10H
0010  0000          C  EQUIPMENT         DW      ?
0017                C            ORG     17H
0017  00            C  KB_FLAG   DB      ?
0018  00            C  KB_FLAG_1 DB      ?
0019  00            C  ALT_INPUT DB      ?
001A  0000          C  BUFFER_HEAD DW    ?
001C  0000          C  BUFFER_TAIL DW    ?
001E  0010[         C  KB_BUFFER DW      16 DUP(?)
      ????          C
                ]   C
                    C
                    C  ;
003E                C  KB_BUFFER_END     LABEL   WORD
                    C  ;
0049                C            ORG     49H
0049  00            C  CRT_MODE  DB      ?
004A  0000          C  CRT_COLS  DW      ?
004C  0000          C  CRT_LEN   DW      ?
004E  0000          C  CRT_START DW      ?
0050  0008[         C  CRT_CURSES DW     8 DUP(?)
      ????          C
                ]   C
                    C
0060  0000          C  CRT_CMOD  DW      ?
0062  00            C  CRT_PAGE  DB      ?
0063  0000          C  CRT_ADDR  DW      ?
0065  00            C  CRT_MSET  DB      ?
0066  00            C  CRT_PALETTE DB    ?
006C                C            ORG     6CH
006C                C  BIOS_TIME         LABEL   DWORD
```

```
006C 0000              C  TIMER_LOW       DW    0
006E 0000              C  TIMER_HI        DW    0
0072                   C          ORG     72H
0072 0000              C  CRT_RFLSG       DW    ?
0084                   C          ORG     84H
0084 00                C  CRT_ROWS        DB    ?
0085 0000              C  CRT_POINTS      DW    ?
0087 00                C  CRT_INFO        DB    ?
0088 00                C  CRT_INFO_3      DB    ?
00A8                   C          ORG     0A8H
00A8                   C  CRT_SAV_PTR     LABEL DWORD
0100                   C          ORG     100H
0100 00                C  CRT_STATUS_B    DB    ?
                       C  ;
0101                   C  BIOS_SEG        ENDS
                       C  ;
0000                   C  IPAGE_SEG       SEGMENT AT 0
                       C  ;
0024                   C          ORG     24H
0024                   C  KB_INT  LABEL   WORD
                       C  ;
0074                   C          ORG     1DH*4
0074                   C  PARAM_TBL       LABEL DWORD
                       C  ;
0074                   C  IPAGE_SEG       ENDS
                       C  ;
0000                   C  MTR_SEG SEGMENT AT 0F000H
E05B                   C          ORG     0E05BH
E05B                   C  MTR_RESET       LABEL FAR
                       C  ;
E05B                   C  MTR_SEG ENDS
                       C  ;
                       C  ;       CONSTANT DEFENITIONS
                       C  ;
= 0001                 C  I13FLG  EQU     WORD PTR 0001
= 0002                 C  I25FLG  EQU     WORD PTR 0002
= 0004                 C  I26FLG  EQU     WORD PTR 0004
= 0008                 C  I09FLG  EQU     WORD PTR 0008
= 0010                 C  I17FLG  EQU     WORD PTR 0016
= 0020                 C  I14FLG  EQU     WORD PTR 0032

PUBLIC  __acrtused
= 1234                    __acrtused EQU  1234H
                          ;
                          ; The data segment defines locations which contain the offsets
                          ; of the base and top of the stack.
                          ;
0000                      _DATA   SEGMENT WORD PUBLIC 'DATA'
                                  PUBLIC  _PSP,_DBLK,_COMLIN,_ONDISK,_EMMAVAIL,_LOADFLG
                                  PUBLIC  _EXTAVAIL,_PNAME,_COMLEN
                          ;
                                  EXTRN   _USIZE:WORD,_USTKSEG:WORD,_USTKOFF:WORD,_USTRTSEG:WORD
                                  EXTRN   _USTRTOFF:WORD
                          ;
0000 00000000 00000000    NULL    DD      0,0,0,0
     00000000 00000000
0010 0000                 _PSP    DW      0
0012 0000                 _MPSP   DW      0
0014 0000                 _MLEN   DW      0
0016 0000                 MEMTOP  DW      0
0018 0200[                VECTBL  DW      VECSIZ DUP(0)
       0000
     ]
```

```
0418  00                    DFCB    FCB     <>
0419  0008[
      ??
                  ]
0421  0003[
      ??
                  ]
0424  0000
0426  0000
0428  00000000
042C  0000
042E  000A[
      ??
                  ]
0438  00
0439  0000
043B  0000

043D  0000          _ONDISK   DW    0
043F  0000          _EMMAVAIL DW    0
0441  0000          _EXTAVAIL DW    0
0443  0000          _COMLEN   DW    0
0445  0000          _LOADFLG  DW    0
0447  0080[         _PNAME    DB    128 DUP(0)
       00
                  ]

04C7  0000          CPARBLK  DW     0
04C9  00000000               DD     0
04CD  00            CFCB0    FCB    <>
04CE  0008[
      ??
                  ]
04D6  0003[
      ??
                  ]
04D9  0000
04DB  0000
04DD  00000000
04E1  0000
04E3  000A[
      ??
                  ]
04ED  00
04EE  0000
04F0  0000

04F2  00            CFCB1    FCB    <>
04F3  0008[
      ??
                  ]
04FB  0003[
      ??
                  ]
04FE  0000
0500  0000
0502  00000000
0506  0000
0508  000A[
      ??
                  ]
0512  00
0513  0000
0515  0000
```

```
0517  0015[                    _DBLK   TSR     0
       00
                        ]
052C  00
052D  000A[
       ??
                        ]
0537  000A[
       ??
                        ]
0541  01
0542  FF
0543  00
0544  0000
0546  00
0547  00
0548  0000
054A  0000
054C  0000
054E  0000
0550  0000
0552  00000000
0556  00000000
055A  FFFF
055C  0000
055E  00
055F  01
0560  00
0561  0000
0563  0000
0565  0000
0567  00000000
0568  00000000
056F  00000000
0573  0000
0575  0000
0577  0000
0579  00
057A  0000
057C  0000
057E  0000
0580  0013[
       00
                        ]
0593  0013[
       00
                        ]
05A6  0007[
       00
                        ]
05AD  0025[
       00
                        ]
05D2  0028[
       ??
                        ]
05FA  4852

05FC  002A[              _COMLIN DB    256/6 DUP('COMLIN')
       43 4F 4D 4C 49
       4E
                        ]
```

```
06F8  00 0A 0A 48 65 61      NOROOM   DB    13,10,10,"HeadRoom not loaded - Aborting operation."
      64 52 6F 6F 6D 20
      6E 6F 74 20 6C 6F
      61 64 65 64 20 20
      20 41 62 6F 72 74
      69 6E 67 20 6F 70
      65 72 61 74 69 6F
      6E 2E
0724  00 0A 0A 24                     DB    13,10,10,"$"
0728  00 0A 0A 45 72 72      POEM     DB    13,10,10,"Error swapping out to Expanded Memory",13,10,10,"$"
      6F 72 20 73 77 61
      70 70 69 6E 67 20
      6F 75 74 20 74 6F
      20 45 78 70 61 6E
      64 65 64 20 4D 65
      6D 6F 72 79 00 0A
      0A 24
0754  07 43 61 6E 27 74      NOTAPPO  DB    7,"Can't swap a TSR in a secondary partition.",13,10,10,"$"
      20 73 77 61 70 20
      61 20 54 53 52 20
      69 6E 20 61 20 73
      65 63 6F 6E 64 61
      72 79 20 70 61 72
      74 69 74 69 6F 6E
      2E 00 0A 0A 24
0783  43 6F 6D 6D 61 6E      ERRLIN2  DB    "Command line error at: $"
      64 20 6C 69 6E 65
      20 65 72 72 6F 72
      20 61 74 3A 20 24
0798  00 0A                  ERRLIN3  DB    13,10
079D  45 4D 4D 58 58 58      EMMDEV   DB    "EMMXXXX0"
      58 30
07A5  00 0A 0A 48 65 61      STRTMS   DB    13,10,10,"HeadRoom Expanded Memory Loader v2.01a",13,10
      64 52 6F 6F 6D 20
      45 78 70 61 6E 64
      65 64 20 4D 65 6D
      6F 72 79 20 4C 6F
      61 64 65 72 20 76
      32 2E 30 31 61 00
      0A
07D0  43 6F 70 79 72 69               DB    "Copyright (c) 1988, Helix Software Company, Inc.",13,10,10,"$"
      67 68 74 20 28 63
      29 20 31 39 38 38
      2C 20 48 65 6C 69
      78 20 53 6F 66 74
      77 61 72 65 20 43
      6F 6D 70 61 6E 79
      2C 20 49 6E 63 2E
      00 0A 0A 24
0804  00 0A 0A 41 6C 6C      XRMEM    DB    13,10,10,"Allocation error loading program.",13,10,"$"
      6F 63 61 74 69 6F
      6E 20 65 72 72 6F
      72 20 6C 6F 61 64
      69 6E 67 20 70 72
      6F 67 72 61 6D 2E
      00 0A 24
082B  00 0A 0A 52 75 6E      SWAPMES  DB    13,10,10,"Running in expanded memory frame buffer.",13,10,"$"
      6E 69 6E 67 20 69
      6E 20 65 78 70 61
      6E 64 65 64 20 6D
      65 6D 6F 72 79 20
      66 72 61 6D 65 20
      62 75 66 66 65 72
      2E 00 0A 24
```

```
0859                            _DATA   ENDS
                                ;
                                ;
0000                            _TEXT   SEGMENT BYTE PUBLIC 'CODE'
                                ;
                                        ASSUME  CS:PGROUP,DS:DGROUP,ES:DGROUP
                                ;
                                        PUBLIC  _KEYWAIT,_WTCNT,_WTCNT1
                                ;
0000  0000                      _KEYWAIT DW     0
0002  000A                      _WTCNT   DW     10
0004  0009                      _WTCNT1  DW     9
                                ;
0006  0100[                             DB      256 DUP('STCK')
         53 54 43 4B
      ]

0406                            LOCSTK  LABEL   WORD
                                ;
0406  0011[                     PALETTE DB      11H DUP(?)
         ??
      ]

0417  0600[                     SAVBUF  DB      256*6 DUP('s')
         73
      ]

0A17  00000000                  UNGET   DD      0
0A1B  00000000                  KHIT    DD      0
0A1F  00000000                  -TIDLE  DD      0
0A23  00000000                  DOSFLG  DD      0
0A27  00000000                  OLDMS   DD      0
                                ;
                                        PUBLIC  IDLEOP
                                ;
0A2B                            IDLEOP  PROC    FAR
0A2B  2E: 89 16 0A17 R                  MOV     WORD PTR CS:[UNGET],DX
0A30  2E: 89 0E 0A1B R                  MOV     WORD PTR CS:[KHIT],CX
0A35  2E: 89 36 0A1F R                  MOV     WORD PTR CS:[TIDLE],SI
0A3A  2E: 89 3E 0A23 R                  MOV     WORD PTR CS:[DOSFLG],DI
0A3F  2E: A3 0A19 R                     MOV     WORD PTR CS:[UNGET+2],AX
0A43  2E: A3 0A1D R                     MOV     WORD PTR CS:[KHIT+2],AX
0A47  2E: A3 0A21 R                     MOV     WORD PTR CS:[TIDLE+2],AX
0A4B  2E: A3 0A25 R                     MOV     WORD PTR CS:[DOSFLG+2],AX
0A4F  2E: C5 1E 0A1B R                  LDS     BX,CS:[KHIT]            ;SAVE CURRENT STATE OF FLAG
0A54  FF 37                             PUSH    WORD PTR DS:[BX]
0A56  32 E4                     IDLE1:  XOR     AH,AH                   ;GET CURRENT TICK COUNT
0A58  CD 1A                             INT     1AH                     ;** CX:DX IS COUNT
0A5A  B4 01                             MOV     AH,1                    ;CHECK KEYBOARD BUFF.
0A5C  CD 16                             INT     16H
0A5E  9C                                PUSHF                           ;SAVE FLAGS
0A5F  8B F1                             MOV     SI,CX                   ;PUT OLD TIME INTO SI:DI
0A61  8B FA                             MOV     DI,DX
0A63  32 E4                             XOR     AH,AH                   ;GET NEW TICK COUNT
0A65  CD 1A                             INT     1AH
0A67  2E: 03 3E 0002 R                  ADD     DI,CS:_WTCNT            ;BUMP OLD COUNT BY 10 TICKS
0A6C  83 D6 00                          ADC     SI,0
0A6F  3B F1                             CMP     SI,CX                   ;CHECK IF NEW TIME > OLD+10
0A71  72 09                             JB      POPPED                  ;IF SO THEN TSR IS DONE
0A73  3B FA                             CMP     DI,DX                   ;CHECK LOW ORDER BYTE
0A75  76 05                             JBE     POPPED                  ;
0A77  9D                                POPF                            ;GET BACK FLAGS FROM INT 16
0A78  74 DC                             JZ      IDLE1                   ;IF NO CHAR THEN LOOP
```

```
0A7A  EB 09                            JMP     SHORT IDLE3        ;SKIP TIMEOUT EXIT
0A7C  58                  POPPED: POP  AX                         ;DUMP INT 16 FLAGS
0A7D  2E: 83 3E 0000 R 00          CMP  CS:_KEYWAIT,0             ; IF NO TIMEOUT THEN
0A83  75 D1                        JNE  IDLE1                     ; GO BACK INTO TIMEOUT LOOP
0A85  C6 07 01            IDLE3:  MOV   BYTE PTR DS:[BX],1        ;SET TO NOT READ FROM BUFFER
0A88  32 E4               IDLE3B: XOR   AH,AH                     ;GET TICK COUNT
0A8A  CD 1A                        INT  1AH
0A8C  2E: 03 16 0004 R             ADD  DX,CS:_WTCNT1             ;BUMP BY 9
0A91  83 D1 00                     ADC  CX,0
0A94  8B F1                        MOV  SI,CX                     ;SAVE IN SI:DI
0A96  8B FA                        MOV  DI,DX
0A98  2E: C5 1E 0A1F R             LDS  BX,CS:[TIDLE]             ;GET IDLE FLAG
0A9D  83 27 F7                     AND  WORD PTR DS:[BX],NOT I09FLG  ;CLEAR OUT KB BIT
0AA0  B4 01               IDLE3A: MOV   AH,1
0AA2  CD 16                        INT  16H                       ;CHECK KB BUFF
0AA4  75 14                        JNZ  8F                        ;GOT ONE!
0AA6  32 E4                        XOR  AH,AH
0AA8  CD 1A                        INT  1AH                       ;GET TICK COUNT
0AAA  3B F1                        CMP  SI,CX                     ;TIME OUT?
0AAC  72 17                        JB   IDLE2                     ;YUP
0AAE  3B FA                        CMP  DI,DX                     ;LOW ORDER TIME OUT
0AB0  76 13                        JBE  IDLE2                     ;YUP
0AB2  F7 07 0008                   TEST WORD PTR DS:[BX],I09FLG   ;KEY STRUCK?
0AB6  75 00                        JNE  IDLE2
0AB8  EB E6                        JMP  IDLE3A                    ;NO TIME OUT, LOOP BACK
0ABA  B4 00               8@:     MOV   AH,0
0ABC  CD 16                        INT  16H
0ABE  2E: FF 1E 0A17 R             CALL DWORD PTR CS:[UNGET]
0AC3  EB C3                        JMP  IDLE3B
0AC5  2E: C5 1E 0A1B R    IDLE2:  LDS   BX,CS:[KHIT]
0ACA  8F 07                        POP  WORD PTR DS:[BX]
0ACC  CB                           RET
0ACD                      IDLEOP  ENDP
                                  ;
0ACD  0020[               MEMEND  DB   32 DUP('X')
        58
                       ]

0AED  43 6F 70 79 72 69           DB    'Copyright (c) 1989, Helix Software Co., Inc.'
      67 68 74 20 28 63
      29 20 31 39 38 39
      2C 20 48 65 6C 69
      78 20 53 6F 66 74
      77 61 72 65 20 43
      6F 2E 2C 20 49 6E
      63 2E
0B19  0020[                       DB    32 DUP('x')
        78
                       ]

;
0B39                      RESEND  LABEL BYTE
                                  ;
                                  PUBLIC PUSHR,POPR
                                  ;
0B39                      PUSHR   PROC  NEAR
0B39  55                          PUSH  BP
0B3A  8B EC                       MOV   BP,SP
0B3C  87 7E 02                    XCHG  DI,[BP+02]
0B3F  8B 6E 00                    MOV   BP,[BP]
0B42  50                          PUSH  AX
0B43  53                          PUSH  BX
0B44  51                          PUSH  CX
```

```
0845  52                      PUSH    DX
0846  56                      PUSH    SI
0847  06                      PUSH    ES
0848  1E                      PUSH    DS
0849  FF E7                   JMP     DI
084B          PUSHR   ENDP
              ;
084B          POPR    PROC    NEAR
084B  5F                      POP     DI
084C  1F                      POP     DS
084D  07                      POP     ES
084E  5E                      POP     SI
084F  5A                      POP     DX
0850  59                      POP     CX
0851  5B                      POP     BX
0852  58                      POP     AX
0853  8B EC                   MOV     BP,SP
0855  87 7E 02                XCHG    DI,[BP+02]
0858  5D                      POP     BP
0859  C3                      RET
085A          POPR    ENDP
              ;
                      PUBLIC  _ERRABT
              ;
085A          _ERRABT PROC    NEAR
085A  55                      PUSH    BP
085B  8B EC                   MOV     BP,SP
085D  BA 0783 R               MOV     DX,OFFSET ERRLIN2
0860  CD 21                   INT     21H
0862  BA 0798 R               MOV     DX,OFFSET ERRLIN3
0865  CD 21                   INT     21H
0867  8B 56 06                MOV     DX,[BP+06]
086A  CD 21                   INT     21H
086C  8B 56 04                MOV     DX,[BP+04]
086F  B4 09                   MOV     AH,9
0871  CD 21                   INT     21H
0873  BA 0798 R               MOV     DX,OFFSET ERRLIN3
0876  CD 21                   INT     21H
0878  CD 21                   INT     21H
087A  B8 4C01                 MOV     AX,4C01H
087D  CD 21                   INT     21H
087F  CD 20                   INT     20H
0881  CD 19                   INT     19H
0883          _ERRABT ENDP
              ;
                      PUBLIC  _PRTSTR
              ;
0883          _PRTSTR PROC    NEAR
0883  55                      PUSH    BP
0884  8B EC                   MOV     BP,SP
0886  57                      PUSH    DI
0887  56                      PUSH    SI
0888  8B 76 04                MOV     SI,[BP+04]
088B  FC                      CLD
088C  AC            PSTR1:    LODSB
088D  0A C0                   OR      AL,AL
088F  74 08                   JE      PSTR2
0891  8A D0                   MOV     DL,AL
0893  B4 02                   MOV     AH,2
0895  CD 21                   INT     21H
0897  EB F3                   JMP     PSTR1
0899  5E            PSTR2:    POP     SI
089A  5F                      POP     DI
```

```
089B  5D                              POP     BP
089C  C3                              RET
089D                          _PRTSTR ENDP
                              ;
                              ;       PUBLIC  _GETSDIR
                              ;
089D                          _GETSDIR PROC   NEAR
089D  55                              PUSH    BP
089E  B8 5758                         MOV     AX,5758H
08A1  BB 0005                         MOV     BX,5
08A4  CD 21                           INT     21H
08A6  5D                              POP     BP
08A7  C3                              RET
08A8                          _GETSDIR ENDP
                              ;
                              ;       PUBLIC  MYDSEG
                              ;
08A8  ---- R                  MYDSEG  DW      DGROUP
                              ;
                              ;       PUBLIC  _ISEMM
                              ;
08AA  0000                    EMMFR   DW      0
                              ;
08AC                          _ISEMM  PROC    NEAR
08AC  55                              PUSH    BP
08AD  57                              PUSH    DI
08AE  56                              PUSH    SI
08AF  06                              PUSH    ES
08B0  1E                              PUSH    DS
08B1  B8 3567                         MOV     AX,3567H
08B4  CD 21                           INT     21H
08B6  B8 ---- R                       MOV     AX,DGROUP
08B9  8E D8                           MOV     DS,AX
08BB  BF 000A                         MOV     DI,10
08BE  BE 079D R                       MOV     SI,OFFSET EMMDEV
08C1  B9 0008                         MOV     CX,8
08C4  FC                              CLD
08C5  F3/ A6                          REP     CMPSB
08C7  B8 0000                 ISEMM0: MOV     AX,0
08CA  75 09                           JNE     ISEMM1
08CC  B8 0001                         MOV     AX,1
08CF  C7 06 043F R 0001               MOV     _EMMAVAIL,1
08D5  1F                      ISEMM1: POP     DS
08D6  07                              POP     ES
08D7  5E                              POP     SI
08D8  5F                              POP     DI
08D9  5D                              POP     BP
08DA  C3                              RET
08DB                          _ISEMM  ENDP
                              ;
                              ;       PUBLIC  PAGEOUT
                              ;
                              ;;  LOAD SEGMENT TO EMM PAGE
                              ;
                              ; CALL WITH BX=PAGE NUMBER, DI=SEGMENT NUMBER,CX=TOP SEGMENT NUMBER
                              ; DX=EMM HANDLE
                              ;
08DB                          PAGEOUT PROC    NEAR
08DB  1E                              PUSH    DS
08DC  06                              PUSH    ES
08DD  53                      PO1:    PUSH    BX
08DE  51                              PUSH    CX
08DF  B8 4400                         MOV     AX,4400H        ;MAP LOGICAL PAGE IN BX TO PHYS. PG 0
```

```
0BE2  CD 67              INT      67H
0BE4  0A E4              OR       AH,AH
0BE6  75 21              JNZ      POERR
0BE8  2E: 8B 1E 0BAA R   MOV      BX,CS:EMMFR
0BED  8E C3              MOV      ES,BX           ;SET ES TO EMM PAGE FRAME SEG
0BEF  57                 PUSH     DI
0BF0  8E DF              MOV      DS,DI
0BF2  33 F6              XOR      SI,SI
0BF4  8B FE              MOV      DI,SI
0BF6  B9 2000            MOV      CX,8192         ;WORDS PER PAGE
0BF9  FC                 CLD
0BFA  F3/ A5             REP MOVSW                ;MOVE DATA IN
0BFC  5F                 POP      DI
0BFD  81 C7 0400         ADD      DI,1024         ;PARAGRAPHS PER PAGE
0C01  59                 POP      CX
0C02  5B                 POP      BX
0C03  43                 INC      BX
0C04  E2 D7              LOOP     PO1
0C06  07                 POP      ES
0C07  1F                 POP      DS
0C08  C3                 RET
0C09  BA 0728 R   POERR: MOV      DX,OFFSET POEM
0C0C  E9 0F55 R          JMP      ABORT
0C0F              PAGEOUT ENDP
                  ;
                          PUBLIC  _EMMFREE
                  ;
0C0F              _EMMFREE PROC   NEAR
0C0F  55                 PUSH     BP
0C10  57                 PUSH     DI
0C11  1E                 PUSH     DS
0C12  B4 42              MOV      AH,42H
0C14  CD 67              INT      67H
0C16  0A E4              OR       AH,AH
0C18  74 02              JE       8F
0C1A  33 DB              XOR      BX,BX
0C1C  8B C3       @@:    MOV      AX,BX
0C1E  5E                 POP      SI
0C1F  5F                 POP      DI
0C20  5D                 POP      BP
0C21  C3                 RET
0C22              _EMMFREE ENDP
                  ;
                          PUBLIC  _EMMSETUP
                  ;
0C22              _EMMSETUP PROC  NEAR
0C22  E8 0B39 R          CALL     PUSHR
0C25  B4 41              MOV      AH,41H
0C27  CD 67              INT      67H
0C29  0A E4              OR       AH,AH
0C2B  75 3D              JNE      EMSERR
0C2D  2E: 89 1E 0BAA R   MOV      CS:EMMFR,BX
0C32  8B 1E 0012 R       MOV      BX,_HPSP
0C36  03 1E 0014 R       ADD      BX,_HLEN
0C3A  89 1E 0550 R       MOV      WORD PTR DS:[_DBLK].SWPSEG,BX
0C3E  C7 06 0548 R 0000  MOV      WORD PTR DS:[_DBLK].FIRSTP,0
0C44  C7 06 054C R 0005  MOV      DS:[_DBLK].PAGES,5
0C4A  C7 06 054A R 0000  MOV      DS:[_DBLK].CYCLE,0
0C50  C6 06 0579 R 04    MOV      DS:[_DBLK].XRUN,4
0C55  BB 0005            MOV      BX,5
0C58  B4 43              MOV      AH,43H
0C5A  CD 67              INT      67H
```

```
0C5C  0A E4                      OR      AH,AH
0C5E  75 0A                      JNE     EMSERR
0C60  89 16 055A R               MOV     WORD PTR DS:[_DBLK].EMMHNDL,DX
0C64  E8 0B4B R                  CALL    POPR
0C67  33 C0                      XOR     AX,AX
0C69  C3                         RET
0C6A  E8 0B4B R     EMSERR:      CALL    POPR
0C6D  B8 0001                    MOV     AX,1
0C70  C3                         RET
0C71                             _EMMSETUP ENDP
                                 ;
                                         PUBLIC  HRMS,MSFUN,SEGSIZ
                                 ;
0C71  00000000                   HRMS    DD      0
0C75  0000                       SEGSIZ  DW      0
                                 ;
0C77  00000000                   MSFUN   DD      0
                                 ;
                                         EXTRN   _COMPARSE:NEAR
                                         PUBLIC  STRT
                                 ;
0C7B                             STRT    PROC    FAR
0C7B  FA                                 CLI
0C7C  B8 ---- R                          MOV     AX,DGROUP
0C7F  8E D8                              MOV     DS,AX
0C81  8E D0                              MOV     SS,AX
0C83  BC 1000 R                          MOV     SP,OFFSET DGROUP:STKEND
0C86  FB                                 STI
0C87  BA 07A5 R                          MOV     DX,OFFSET STRTMS
0C8A  B4 09                              MOV     AH,9
0C8C  CD 21                              INT     21H
0C8E  B3 01                              MOV     BL,1
0C90  B8 5758                            MOV     AX,5758H
0C93  CD 21                              INT     21H
0C95  73 06                              JNC     S0
0C97  BA 06F8 R                          MOV     DX,OFFSET DGROUP:NOROOM
0C9A  E9 0F55 R                          JMP     ABORT
0C9D  B8 5758       S0:          MOV     AX,5758H
0CA0  BB 0009                            MOV     BX,9
0CA3  CD 21                              INT     21H
0CA5  0B DB                              OR      BX,BX
0CA7  74 06                              JE      @F
0CA9  BA 0754 R                          MOV     DX,OFFSET DGROUP:NOTAPPO
0CAC  E9 0F55 R                          JMP     ABORT
0CAF  50            @@:          PUSH    AX
0CB0  8C C0                              MOV     AX,ES
0CB2  26: 8B 0E 0002                     MOV     CX,ES:[2]
0CB7  A3 0010 R                          MOV     _PSP,AX
0CBA  8E D8                              MOV     DS,AX
0CBC  B8 ---- R                          MOV     AX,DGROUP
0CBF  8E C0                              MOV     ES,AX
0CC1  58                                 POP     AX
0CC2  26: A3 0012 R                      MOV     ES:[_HPSP],AX
0CC6  26: 89 1E 0014 R                   MOV     ES:[_HLEN],BX
0CCB  26: 89 0E 0016 R                   MOV     ES:[MEMTOP],CX
0CD0  BF 05FC R                          MOV     DI,OFFSET _COMLIN
0CD3  BE 0081                            MOV     SI,81H
0CD6  8A 0E 0080                         MOV     CL,DS:[80H]
0CDA  32 ED                              XOR     CH,CH
0CDC  FC                                 CLD
0CDD  E3 03                              JCXZ    S1
0CDF  41                                 INC     CX
0CE0  F3/ A4                             REP     MOVSB
0CE2  32 C0         S1:          XOR     AL,AL
```

```
0CE4  AA                              STOSB
0CE5  8B EC                     MOV   BP,SP
0CE7  BA 05FC R                 MOV   DX,OFFSET _COMLIN
0CEA  52                        PUSH  DX
0CEB  B8 ---- R                 MOV   AX,DGROUP
0CEE  8E C0                     MOV   ES,AX
0CF0  8E D8                     MOV   DS,AX
0CF2  E8 0000 E                 CALL  _COMPARSE
0CF5  8B E5                     MOV   SP,BP
0CF7  0B C0                     OR    AX,AX
0CF9  75 05                     JNE   S1A
0CFB  B8 4C00                   MOV   AX,4C00H
0CFE  CD 21                     INT   21H
0D00  E8 0C22 R         S1A:    CALL  _EMMSETUP
0D03  BB ---- R         S4:     MOV   BX,DGROUP
0D06  8E C3                     MOV   ES,BX
0D08  8E DB                     MOV   DS,BX
0D0A  8C C8             APSTRT: MOV   AX,CS
0D0C  8E D8                     MOV   DS,AX
0D0E  BA 0E24 R                 MOV   DX,OFFSET PGROUP:APDONE   ;SET RETURN ADDRESS FOR TSR
0D11  B8 2522                   MOV   AX,2522H
0D14  CD 21                     INT   21H
0D16  2E: 8E 1E 0BA8 R          MOV   DS,CS:MYDSEG
0D1B  8B 16 055A R              MOV   DX,DS:[_DBLK].EMMHNDL     ;GET EMM HANDLE
0D1F  BB 0001                   MOV   BX,1                      ; MAP IN (PAGE 0 FOR INTS)
0D22  B9 0004                   MOV   CX,4                      ;PAGES 1 THRU 4
0D25  8A C3             MLOOP:  MOV   AL,BL
0D27  FE C8                     DEC   AL
0D29  B4 44                     MOV   AH,44H                    ;MAP PAGE FUNCTION
0D2B  CD 67                     INT   67H
0D2D  43                        INC   BX
0D2E  E2 F5                     LOOP  MLOOP
0D30  2E: 8E 1E 0BA8 R          MOV   DS,CS:MYDSEG
0D35  A1 0010 R                 MOV   AX,_PSP                   ;GET MY PSP
0D38  8E D8                     MOV   DS,AX                     ;SET DS = PSP
0D3A  2E: A1 0BAA R             MOV   AX,CS:EMMFR               ;SET ES = EMM PAGE FRAME
0D3E  40                        INC   AX                        ;ADJUST FOR ALLOCATION PARA
0D3F  8E C0                     MOV   ES,AX
0D41  33 FF                     XOR   DI,DI                     ;COPY FROM MY PSP TO EMM
0D43  33 F6                     XOR   SI,SI
0D45  B9 0100                   MOV   CX,100H
0D48  FC                        CLD
0D49  F3/ A4                    REP MOVSB
0D4B  26: C7 06 000A 0E24 R     MOV   WORD PTR ES:[0AH],OFFSET PGROUP:APDONE
0D52  26: C7 06 000C ---- R     MOV   WORD PTR ES:[0CH],PGROUP
0D59  2E: 8E 1E 0BA8 R          MOV   DS,CS:MYDSEG              ;GET USER'S COMMAND LINE
0D5E  BE 05FC R                 MOV   SI,OFFSET _COMLIN
0D61  BF 0081                   MOV   DI,81H                    ; AND PUT IT AT 80 H
0D64  8B 0E 0443 R              MOV   CX,_COMLEN
0D68  FC                        CLD
0D69  F3/ A4                    REP MOVSB
0D6B  8B 0E 0443 R              MOV   CX,_COMLEN
0D6F  49                        DEC   CX                        ;
0D70  26: 88 0E 0080            MOV   BYTE PTR ES:[80H],CL
0D75  05 2000                   ADD   AX,2000H                  ;TOP OF MEMORY = EMM FRAME + 64K -3K
0D78  48                        DEC   AX
0D79  26: A3 0002               MOV   ES:[2],AX                 ;SET TOP OF MEMORY
0D7D  2E: 2B 06 0BAA R          SUB   AX,CS:EMMFR
0D82  2E: 8E 06 0BAA R          MOV   ES,CS:EMMFR
0D87  26: C6 06 0000 5A         MOV   BYTE PTR ES:[0],5AH       ; LAST ALLOCATION
0D8D  26: A3 0003               MOV   WORD PTR ES:[3],AX        ;SIZE OF ALLOCATION
0D91  2E: A1 0BAA R             MOV   AX,CS:EMMFR
0D95  40                        INC   AX
```

```
0D96  26: A3 0001            MOV    WORD PTR ES:[1],AX      ;AND OWNER OF SEGMENT
0D9A  2E: 88 1E 0BAA R       MOV    BX,CS:EMMFR
0D9F  A1 0010 R              MOV    AX,_PSP                 ;COMPUTE DISTANCE FORM MY PSP TO EMM
0DA2  48                     DEC    AX
0DA3  2B D8                  SUB    BX,AX
0DA5  4B                     DEC    BX
0DA6  8E C0                  MOV    ES,AX
0DA8  26: C6 06 0000 4D      MOV    BYTE PTR ES:[0],4DH     ;SET UP ALLOCATION TO POINT TO MY SEG
0DAE  26: A1 0003            MOV    AX,WORD PTR ES:[3]      ;GET CURRENT SIZE OF SEGMENT
0DB2  2E: A3 0C75 R          MOV    CS:SEGSIZ,AX            ;SAVE IT
0DB6  26: 89 1E 0003         MOV    WORD PTR ES:[3],BX
0DBB  2E: 8E 06 0BA8 R       MOV    ES,CS:MYDSEG            ;NOW SET UP FOR LOAD MODULE CALL
0DC0  BB 04C7 R              MOV    BX,OFFSET CPARBLK       ;
0DC3  2E: A1 0BAA R          MOV    AX,CS:EMMFR             ;FRAME ADDR
0DC7  05 0011                ADD    AX,11H                  ;ADJUST TO OFFSET 100H
0DCA  26: 89 07              MOV    ES:[BX],AX              ;SEGMENT TO LOAD
0DCD  26: 89 47 02           MOV    ES:[BX+2],AX            ;AND SEGMENT TO ADJUST TO
0DD1  BA 0447 R              MOV    DX,OFFSET _PNAME        ;NAME OF MODULE
0DD4  B8 4B03                MOV    AX,4B03H                ; AND LOAD IT - DO NOT RUN
0DD7  CD 21                  INT    21H
0DD9  2E: 88 1E 0BAA R       MOV    BX,CS:EMMFR
0DDE  43                     INC    BX
0DDF  B4 50                  MOV    AH,50H                  ;SET PSP TO USER'S
0DE1  CD 21                  INT    21H
0DE3  2E: 8E 1E 0BA8 R       MOV    DS,CS:MYDSEG
0DE8  8E C3                  MOV    ES,BX
0DEA  8B 0E 0000 E           MOV    CX,_USIZE
0DEE  8B 1E 0002 E           MOV    BX,_USIZE+2
0DF2  33 F6                  XOR    SI,SI
0DF4  33 FF                  XOR    DI,DI
0DF6  33 ED                  XOR    BP,BP
0DF8  2E: A1 0BAA R          MOV    AX,CS:EMMFR
0DFC  40                     INC    AX
0DFD  03 06 0000 E           ADD    AX,_USTKSEG
0E01  8B 16 0000 E           MOV    DX,_USTKOFF
0E05  FA                     CLI
0E06  8E D0                  MOV    SS,AX                   ;SET UP STACK
0E08  8B E2                  MOV    SP,DX
0E0A  FC                     CLD
0E0B  B8 0200                MOV    AX,200H
0E0E  50                     PUSH   AX
0E0F  2E: A1 0BAA R          MOV    AX,CS:EMMFR
0E13  40                     INC    AX
0E14  03 06 0000 E           ADD    AX,_USTRTSEG
0E18  50                     PUSH   AX
0E19  FF 36 0000 E           PUSH   _USTRTOFF
0E1D  06                     PUSH   ES
0E1E  1F                     POP    DS
0E1F  33 C0                  XOR    AX,AX
0E21  33 D2                  XOR    DX,DX
0E23  CF                     IRET                           ;JUMP TO USER PROGRAM
                             ;
                             ; GET HERE ONCE USER PROGRAM DOES A TSR
                                     PUBLIC  APDONE
                             ;
0E24  FA                     APDONE: CLI
0E25  B8 ---- R              MOV    AX,DGROUP
0E28  8E D8                  MOV    DS,AX
0E2A  8E D0                  MOV    SS,AX
0E2C  BC 1000 R              MOV    SP,OFFSET DGROUP:STKEND
0E2F  FB                     STI
0E30  8E C0                  MOV    ES,AX                   ;ES IS DGROUP AS WELL
0E32  BF 0018 R              MOV    DI,OFFSET DGROUP:VECTBL ;SAVE TSR'S INT TABLE
```

```
0E35  33 F6                        XOR     SI,SI
0E37  8E DE                        MOV     DS,SI
0E39  B9 0200                      MOV     CX,VECSIZ
0E3C  FA                           CLI
0E3D  FC                           CLD
0E3E  F3/ A5                       REP MOVSW
0E40  FB                           STI
0E41  B8 5758                      MOV     AX,5758H           ;GET ADDRESS OF HEADROOM DOS HANDLER
0E44  BB 0002                      MOV     BX,2
0E47  CD 21                        INT     21H
0E49  2E: 89 1E 0C71 R             MOV     WORD PTR CS:[HRMS],BX   ;SAVE HR DOS
0E4E  2E: 8C 06 0C73 R             MOV     WORD PTR CS:[HRMS+2],ES
0E53  B8 5758                      MOV     AX,5758H
0E56  BB 0004                      MOV     BX,4               ;ASK HEADROOM TO RESTORE INTS
0E59  9C                           PUSHF
0E5A  FA                           CLI
0E5B  2E: FF 1E 0C71 R             CALL    DWORD PTR CS:[HRMS]     ; INTS NOW NOT TO TSR
0E60  2E: 8E 1E 0BA8 R             MOV     DS,CS:MYDSEG
0E65  8B 1E 0010 R                 MOV     BX,_PSP
0E69  B4 50                        MOV     AH,50H             ;SET MY PSP
0E6B  CD 21                        INT     21H
                             ;FIND END OF TSR IN EMM
                             ;
0E6D  2E: 8E 06 0BAA R             MOV     ES,CS:EMMFR        ;POINT TO EMM
0E72  8C C3                        MOV     BX,ES
0E74  81 C3 1000                   ADD     BX,1000H           ;HIGHEST LEGAL ADDRESS
0E78  26: 80 3E 0000 5A     @@:    CMP     BYTE PTR ES:[0],5AH ;LAST ALLOC BLK?
0E7E  74 10                        JE      @F                 ;YES THEN DONE
0E80  8C C0                        MOV     AX,ES
0E82  26: 03 06 0003               ADD     AX,WORD PTR ES:[3] ;POINT TO NEXT BLOCK
0E87  40                           INC     AX
0E88  3B C3                        CMP     AX,BX              ;?TOO BIG?
0E8A  73 13                        JAE     XRERRJ             ;YES THEN JUMP
0E8C  8E C0                        MOV     ES,AX              ;NEXT BLK BECOMES CURRENT BLK
0E8E  EB E8                        JMP     @B                 ;CONTINUE
0E90  8C C0                @@:     MOV     AX,ES              ;HIGHEST ALLOC BLK
0E92  40                           INC     AX                 ;POINT PAST IT
0E93  2B D8                        SUB     BX,AX              ;COMPUTE AVAILABLE SPACE
0E95  B1 04                        MOV     CL,4               ;CONVERT TO BYTES
0E97  D3 E3                        SHL     BX,CL              ;
0E99  81 FB 0B39 R                 CMP     BX,OFFSET PGROUP:RESEND ;ENOUGH SPACE FOR XRUN STUFF?
0E9D  77 03                        JA      @F
0E9F  E9 0F27 R            XRERRJ: JMP     XRUNERR
0EA2  33 FF                @@:     XOR     DI,DI              ;MOVE FROM CS TO ES
0EA4  8C C0                        MOV     AX,ES              ;SKIP PAST LAST ALLOC HEADER
0EA6  40                           INC     AX
0EA7  8E C0                        MOV     ES,AX
0EA9  0E                           PUSH    CS
0EAA  1F                           POP     DS
0EAB  33 F6                        XOR     SI,SI
0EAD  B9 0B39 R                    MOV     CX,OFFSET PGROUP:RESEND ;NUMBER OF BYTES OF CODE TO MOVE
0EB0  FC                           CLD
0EB1  F3/ A4                       REP MOVSB                  ;COPY CODE INTO EXPANDED MEM
0EB3  2E: 8E 1E 0BA8 R             MOV     DS,CS:MYDSEG
0EB8  8C C0                        MOV     AX,ES              ;SEGMENT OF USER STACK & STARTUP CODE
0EBA  C7 06 0552 R 0A2B R          MOV     WORD PTR DS:[_DBLK].XFERADD,OFFSET PGROUP:IDLEOP
0EC0  A3 0554 R                    MOV     WORD PTR DS:[_DBLK].XFERADD+2,AX
0EC3  C7 06 0556 R 0406 R          MOV     WORD PTR DS:[_DBLK].LOCALS,OFFSET PGROUP:LOCSTK
0EC9  A3 0558 R                    MOV     WORD PTR DS:[_DBLK].LOCALS+2,AX
0ECC  33 C0                        XOR     AX,AX
0ECE  8E C0                        MOV     ES,AX
0ED0  26: C4 16 04A8               LES     DX,DWORD PTR ES:[4A8H]
0ED5  89 16 0568 R                 MOV     WORD PTR DS:[_DBLK].ESAVLOC,DX
```

```
OED9  8C 06 056D R              MOV     WORD PTR DS:[_DBLK].ESAVLOC+2,ES
OEDD  8B 16 055A R              MOV     DX,DS:[_DBLK].EMMHNDL
OEE1  B8 4400                   MOV     AX,4400H
OEE4  33 DB                     XOR     BX,BX                   ;MAP IN TSR PAGE 0
OEE6  CD 67                     INT     67H                     ;
OEE8  2E: 8E 06 0BAA R          MOV     ES,CS:EMMFR
OEED  33 FF                     XOR     DI,DI
OEEF  BE 0018 R                 MOV     SI,OFFSET VECTBL        ;NOTE: DS IS DGROUP
OEF2  B9 0200                   MOV     CX,VECSIZ
OEF5  F3/ A5                    REP MOVSW
OEF7  A1 0010 R                 MOV     AX,_PSP                 ;RESET OWN MEMORY LAYOUT
OEFA  48                        DEC     AX                      ;POINT TO ALLOCATION TABLE ENTRY
OEFB  8E C0                     MOV     ES,AX
OEFD  2E: A1 0C75 R             MOV     AX,CS:SEGSIZ            ;RESTORE SEGMENT SIZE (SAVED B4)
OF01  26: A3 0003               MOV     WORD PTR ES:[3],AX
OF05  26: C6 06 0000 5A         MOV     BYTE PTR ES:[0],5AH
OF0B  BA 082B R                 MOV     DX,OFFSET SWAPMES       ;PRINT SWAPPED MESSAGE
OF0E  B4 09                     MOV     AH,9
OF10  CD 21                     INT     21H
OF12  B8 5758                   MOV     AX,5758H                ;TELL HEADROOM TO TAKE OVER
OF15  BB 0003                   MOV     BX,3
OF18  BE 0517 R                 MOV     SI,OFFSET _DBLK
OF1B  CD 21                     INT     21H
OF1D  2E: 8E 1E 0BA8 R   APSERR: MOV    DS,CS:MYDSEG
OF22  B8 4C00                   MOV     AX,4C00H
OF25  CD 21                     INT     21H
OF27  2E: 8E 1E 0BA8 R   XRUNERR:MOV    DS,CS:MYDSEG
OF2C  8B 16 055A R              MOV     DX,DS:[_DBLK].EMMHNDL
OF30  B4 45                     MOV     AH,45H                  ;DEALLOCATE PAGES
OF32  CD 67                     INT     67H
OF34  A1 0010 R                 MOV     AX,_PSP                 ;RESET OWN MEMORY LAYOUT
OF37  48                        DEC     AX                      ;POINT TO ALLOCATION TABLE ENTRY
OF38  8E C0                     MOV     ES,AX
OF3A  2E: 2B 06 0C75 R          SUB     AX,CS:SEGSIZ            ;RESTORE SEGMENT SIZE (SAVED B4)
OF3F  26: A3 0003               MOV     WORD PTR ES:[3],AX
OF43  26: C6 06 0000 5A         MOV     BYTE PTR ES:[0],5AH
OF49  BA 0804 R                 MOV     DX,OFFSET XRMEM
OF4C  B4 09                     MOV     AH,9
OF4E  CD 21                     INT     21H
OF50  B8 4C01                   MOV     AX,4C01H
OF53  CD 21                     INT     21H
                                ;
OF55  B8 ---- R          ABORT:  MOV    AX,DGROUP
OF58  8E D8                     MOV     DS,AX
OF5A  B4 09                     MOV     AH,9
OF5C  CD 21                     INT     21H
OF5E  B8 4C01                   MOV     AX,4C01H
OF61  CD 21                     INT     21H
OF63  F4                        HLT
OF64                     STRT   ENDP
                                ;
                                PUBLIC  FREEMEM
                                ;
OF64                     FREEMEM PROC   NEAR
OF64  50                        PUSH    AX
OF65  06                        PUSH    ES
OF66  8E C0                     MOV     ES,AX
OF68  26: 80 3E 0000 5A         CMP     BYTE PTR ES:[0],5AH
OF6E  74 14                     JE      FR1
OF70  26: 03 06 0003            ADD     AX,WORD PTR ES:[3]
OF75  40                        INC     AX
OF76  BB ---- R                 MOV     BX,DGROUP
OF79  8E DB                     MOV     DS,BX
```

```
0F7B  3B 06 0016 R              CMP     AX,DS:[MEMTOP]
0F7F  73 03                     JAE     FR1
0F81  E8 0F64 R                 CALL    FREEMEM
0F84  8C C0           FR1:      MOV     AX,ES
0F86  26: 88 1E 0001            MOV     BX,WORD PTR ES:[1]
0F88  0B DB                     OR      BX,BX
0F8D  74 0A                     JZ      FR2
0F8F  06                        PUSH    ES
0F90  50                        PUSH    AX
0F91  8E C3                     MOV     ES,BX
0F93  B4 50                     MOV     AH,50H
0F95  CD 21                     INT     21H
0F97  58                        POP     AX
0F98  07                        POP     ES
0F99  40              FR2:      INC     AX
0F9A  8E C0                     MOV     ES,AX
0F9C  B4 49                     MOV     AH,49H
0F9E  CD 21                     INT     21H
0FA0  07                        POP     ES
0FA1  58                        POP     AX
0FA2  C3                        RET
0FA3                  FREEMEM ENDP
                      ;
                      ;         PUBLIC  _FCBOPEN
                      ;
0FA3                  _FCBOPEN PROC NEAR
0FA3  55                        PUSH    BP
0FA4  8B EC                     MOV     BP,SP
0FA6  57                        PUSH    DI
0FA7  56                        PUSH    SI
0FA8  8B 56 04                  MOV     DX,[BP+04]
0FAB  B4 0F                     MOV     AH,0FH
0FAD  CD 21                     INT     21H
0FAF  0A C0                     OR      AL,AL
0FB1  B8 0000                   MOV     AX,0
0FB4  74 01                     JE      FCBO1
0FB6  40                        INC     AX
0FB7  5E              FCBO1:    POP     SI
0FB8  5F                        POP     DI
0FB9  5D                        POP     BP
0FBA  C3                        RET
0FBB                  _FCBOPEN ENDP
                      ;
                      ;         PUBLIC  _FCBCREAT
                      ;
0FBB                  _FCBCREAT PROC NEAR
0FBB  55                        PUSH    BP
0FBC  8B EC                     MOV     BP,SP
0FBE  57                        PUSH    DI
0FBF  56                        PUSH    SI
0FC0  8B 56 04                  MOV     DX,[BP+04]
0FC3  B4 16                     MOV     AH,16H
0FC5  CD 21                     INT     21H
0FC7  0A C0                     OR      AL,AL
0FC9  B8 0000                   MOV     AX,0
0FCC  74 01                     JE      FCBC1
0FCE  40                        INC     AX
0FCF  5E              FCBC1:    POP     SI
0FD0  5F                        POP     DI
0FD1  5D                        POP     BP
0FD2  C3                        RET
0FD3                  _FCBCREAT ENDP
                      ;
```

```
                    PUBLIC  _DOPARSE
                ;
0FD3            _DOPARSE PROC  NEAR
0FD3  55                 PUSH  BP
0FD4  8B EC              MOV   BP,SP
0FD6  56                 PUSH  SI
0FD7  57                 PUSH  DI
0FD8  8B 76 06           MOV   SI,[BP+06]
0FDB  8B 7E 04           MOV   DI,[BP+04]
0FDE  B8 2900            MOV   AX,2900H
0FE1  CD 21              INT   21H
0FE3  32 E4              XOR   AH,AH
0FE5  5F                 POP   DI
0FE6  5E                 POP   SI
0FE7  5D                 POP   BP
0FE8  C3                 RET
0FE9            _DOPARSE ENDP
                ;
                    PUBLIC  _SETWCNT
                ;
0FE9            _SETWCNT PROC  NEAR
0FE9  55                 PUSH  BP
0FEA  8B EC              MOV   BP,SP
0FEC  8B 46 04           MOV   AX,[BP+04]
0FEF  2E: A3 0002 R      MOV   CS:_WTCNT,AX
0FF3  5D                 POP   BP
0FF4  C3                 RET
0FF5            _SETWCNT ENDP
                ;
                    PUBLIC  _SETW1CNT
                ;
0FF5            _SETW1CNT PROC  NEAR
0FF5  55                 PUSH  BP
0FF6  8B EC              MOV   BP,SP
0FF8  8B 46 04           MOV   AX,[BP+04]
0FFB  2E: A3 0004 R      MOV   CS:_WTCNT1,AX
0FFF  5D                 POP   BP
1000  C3                 RET
1001            _SETW1CNT ENDP
                ;
                ;
1001            _TEXT    ENDS

END   STRT
```

Structures and Records:

| Name | Width | # fields | | |
|---|---|---|---|---|
| | Shift | Width | Mask | Initial |
| DESCRIPT . . . . . . . . . . . . . | 0008 | 0005 | | |
| LIMIT . . . . . . . . . . . . | 0000 | | | |
| BASELO . . . . . . . . . . . . | 0002 | | | |
| BASEHI . . . . . . . . . . . . | 0004 | | | |
| ACCESS . . . . . . . . . . . . | 0005 | | | |
| EFCB . . . . . . . . . . . . . | 0007 | 0003 | | |
| EXTEND . . . . . . . . . . . . | 0000 | | | |
| ATTRIB . . . . . . . . . . . . | 0006 | | | |
| EXPTBL . . . . . . . . . . . . . | 0002 | 0002 | | |
| NEXT . . . . . . . . . . . . | 0000 | | | |
| PREV . . . . . . . . . . . . | 0001 | | | |
| FCB . . . . . . . . . . . . . | 0025 | 0008 | | |
| DRIVE . . . . . . . . . . . | 0000 | | | |

| | | |
|---|---|---|
| FNAME | 0001 | |
| FEXT | 0009 | |
| BLOCK | 000C | |
| RECSIZ | 000E | |
| FILSIZ | 0010 | |
| FDATE | 0014 | |
| RESERV | 0016 | |
| RELREC | 0020 | |
| RRECLOW | 0021 | |
| RRECHI | 0023 | |
| SWAPINT | 0013 | 0013 |
| SWAP0 | 0000 | |
| SWAP5 | 0001 | |
| SWAP8 | 0002 | |
| SWAP9 | 0003 | |
| SWAPB | 0004 | |
| SWAPC | 0005 | |
| SWAPF | 0006 | |
| SWAP10 | 0007 | |
| SWAP14 | 0008 | |
| SWAP16 | 0009 | |
| SWAP16A | 000A | |
| SWAP17 | 000B | |
| SWAP21 | 000C | |
| SWAP28 | 000D | |
| SWAP2A | 000E | |
| SWAPNET | 000F | |
| SWAPU1 | 0010 | |
| SWAPU2 | 0011 | |
| SWAPU3 | 0012 | |
| TSR | 00E5 | 0029 |
| TSRNAME | 0000 | |
| INMEM | 0015 | |
| KEY | 0016 | |
| SHIFTS | 0020 | |
| KEYSON | 002A | |
| EMMCHN | 002B | |
| APPSEQ | 002C | |
| BATCHP | 002D | |
| BATCHFL | 002F | |
| DOSSTRT | 0030 | |
| FIRSTP | 0031 | |
| CYCLE | 0033 | |
| PAGES | 0035 | |
| LASTP | 0037 | |
| SWPSEG | 0039 | |
| XFERADD | 003B | |
| LOCALS | 003F | |
| EMMHNDL | 0043 | |
| EMMOUTH | 0045 | |
| TEXT | 0047 | |
| ISTSR | 0048 | |
| ISGENIE | 0049 | |
| OUTRECL | 004A | |
| OUTRECH | 004C | |
| TSRPSP | 004E | |
| TSRDTA | 0050 | |
| ESAVLOC | 0054 | |
| CONSOLE | 0058 | |
| PINMEM | 005C | |
| POSTSEQ | 005E | |
| POSTNXT | 0060 | |
| XRUN | 0062 | |

| | |
|---|---|
| IDLECNT . . . . . . . . . . . . | 0063 |
| AT_LOW . . . . . . . . . . . . | 0065 |
| AT_HIGH . . . . . . . . . . . | 0067 |
| COUNT . . . . . . . . . . . . | 0069 |
| RESET . . . . . . . . . . . . | 007C |
| TSRFEXT . . . . . . . . . . . | 008F |
| TSRFCB . . . . . . . . . . . . | 0096 |
| SWPNAME . . . . . . . . . . . | 00BB |
| INIDIC . . . . . . . . . . . . | 00E3 |

Segments and Groups:

| Name | Length | Align | Combine | Class |
|---|---|---|---|---|
| BIOS_SEG . . . . . . . . . . . | 0101 | AT | 0040 | |
| DGROUP . . . . . . . . . . . . | GROUP | | | |
| _DATA | 0859 | WORD | PUBLIC | 'DATA' |
| CONST | 0000 | WORD | PUBLIC | 'CONST' |
| _BSS . . . . . . . . . . . | 0000 | WORD | PUBLIC | 'BSS' |
| STACK | 1000 | PARA | STACK | 'STACK' |
| MYEND | 0258 | PARA | PUBLIC | 'MEND' |
| IPAGE_SEG . . . . . . . . . . | 0074 | AT | 0000 | |
| MTR_SEG . . . . . . . . . . . | E05B | AT | F000 | |
| PGROUP . . . . . . . . . . . . | GROUP | | | |
| _TEXT . . . . . . . . . . . | 1001 | BYTE | PUBLIC | 'CODE' |
| PROG . . . . . . . . . . . . | 0000 | BYTE | PUBLIC | 'PROG' |

Symbols:

| Name | Type | Value | Attr | |
|---|---|---|---|---|
| ABORT . . . . . . . . . . . . | L NEAR | 0F55 | _TEXT | |
| ALT_INPUT . . . . . . . . . . | L BYTE | 0019 | BIOS_SEG | |
| APDONE . . . . . . . . . . . . | L NEAR | 0E24 | _TEXT | Global |
| APSERR . . . . . . . . . . . . | L NEAR | 0F1D | _TEXT | |
| APSTRT . . . . . . . . . . . . | L NEAR | 000A | _TEXT | |
| BIOS_TIME . . . . . . . . . . | L DWORD | 006C | BIOS_SEG | |
| BUFFER_HEAD . . . . . . . . . | L WORD | 001A | BIOS_SEG | |
| BUFFER_TAIL . . . . . . . . . | L WORD | 001C | BIOS_SEG | |
| CFCB0 . . . . . . . . . . . . | L | 04CD | _DATA | |
| CFCB1 . . . . . . . . . . . . | L | 04F2 | _DATA | |
| CPARBLK . . . . . . . . . . . | L WORD | 04C7 | _DATA | |
| CRT_ADDR . . . . . . . . . . . | L WORD | 0063 | BIOS_SEG | |
| CRT_CMOD . . . . . . . . . . . | L WORD | 0060 | BIOS_SEG | |
| CRT_COLS . . . . . . . . . . . | L WORD | 004A | BIOS_SEG | |
| CRT_CURSES . . . . . . . . . . | L WORD | 0050 | BIOS_SEG | Length = 0008 |
| CRT_INFO . . . . . . . . . . . | L BYTE | 0087 | BIOS_SEG | |
| CRT_INFO_3 . . . . . . . . . . | L BYTE | 0088 | BIOS_SEG | |
| CRT_LEN . . . . . . . . . . . | L WORD | 004C | BIOS_SEG | |
| CRT_MODE . . . . . . . . . . . | L BYTE | 0049 | BIOS_SEG | |
| CRT_MSET . . . . . . . . . . . | L BYTE | 0065 | BIOS_SEG | |
| CRT_PAGE . . . . . . . . . . . | L BYTE | 0062 | BIOS_SEG | |
| CRT_PALETTE . . . . . . . . . | L BYTE | 0066 | BIOS_SEG | |
| CRT_POINTS . . . . . . . . . . | L WORD | 0085 | BIOS_SEG | |
| CRT_RFLSG . . . . . . . . . . | L WORD | 0072 | BIOS_SEG | |
| CRT_ROWS . . . . . . . . . . . | L BYTE | 0084 | BIOS_SEG | |
| CRT_SAV_PTR . . . . . . . . . | L DWORD | 00A8 | BIOS_SEG | |
| CRT_START . . . . . . . . . . | L WORD | 004E | BIOS_SEG | |
| CRT_STATUS_B . . . . . . . . . | L BYTE | 0100 | BIOS_SEG | |
| DFCB . . . . . . . . . . . . | L | 0418 | _DATA | |

| | | | | |
|---|---|---|---|---|
| DOSFLG . . . . . . . . . . . . . . . | L DWORD | 0A23 | _TEXT | |
| DWBSIZ . . . . . . . . . . . . . . | NUMBER | 1000 | | |
| | | | | |
| EMMDEV . . . . . . . . . . . . . . | L BYTE | 079D | _DATA | |
| EMMFR . . . . . . . . . . . . . . | L WORD | 0BAA | _TEXT | |
| EMSERR . . . . . . . . . . . . . . | L NEAR | 0C6A | _TEXT | |
| EQUIPMENT . . . . . . . . . . . | L WORD | 0010 | BIOS_SEG | |
| ERRLIN2 . . . . . . . . . . . . . | L BYTE | 0783 | _DATA | |
| ERRLIN3 . . . . . . . . . . . . . | L BYTE | 0798 | _DATA | |
| | | | | |
| FCBC1 . . . . . . . . . . . . . . | L NEAR | 0FCF | _TEXT | |
| FCB01 . . . . . . . . . . . . . . | L NEAR | 0FB7 | _TEXT | |
| FR1 . . . . . . . . . . . . . . . | L NEAR | 0F84 | _TEXT | |
| FR2 . . . . . . . . . . . . . . . | L NEAR | 0F99 | _TEXT | |
| FREEMEM . . . . . . . . . . . . | N PROC | 0F64 | _TEXT | Global Length = 003F |
| NRMS . . . . . . . . . . . . . . | L DWORD | 0C71 | _TEXT | Global |
| | | | | |
| I09FLG . . . . . . . . . . . . . | WORD | 0008 | | |
| I13FLG . . . . . . . . . . . . . | WORD | 0001 | | |
| I14FLG . . . . . . . . . . . . . | WORD | 0020 | | |
| I17FLG . . . . . . . . . . . . . | WORD | 0010 | | |
| I25FLG . . . . . . . . . . . . . | WORD | 0002 | | |
| I26FLG . . . . . . . . . . . . . | WORD | 0004 | | |
| IDLE1 . . . . . . . . . . . . . . | L NEAR | 0A56 | _TEXT | |
| IDLE2 . . . . . . . . . . . . . . | L NEAR | 0AC5 | _TEXT | |
| IDLE3 . . . . . . . . . . . . . . | L NEAR | 0A85 | _TEXT | |
| IDLE3A . . . . . . . . . . . . . | L NEAR | 0AA0 | _TEXT | |
| IDLE3B . . . . . . . . . . . . . | L NEAR | 0A88 | _TEXT | |
| IDLEOP . . . . . . . . . . . . . | F PROC | 0A2B | _TEXT | Global Length = 00A2 |
| ISEMM0 . . . . . . . . . . . . . | L NEAR | 0BC7 | _TEXT | |
| ISEMM1 . . . . . . . . . . . . . | L NEAR | 0BD5 | _TEXT | |
| | | | | |
| KB_BUFFER . . . . . . . . . . . | L WORD | 001E | BIOS_SEG | Length = 0010 |
| KB_BUFFER_END . . . . . . . . | L WORD | 003E | BIOS_SEG | |
| KB_FLAG . . . . . . . . . . . . | L BYTE | 0017 | BIOS_SEG | |
| KB_FLAG_1 . . . . . . . . . . . | L BYTE | 0018 | BIOS_SEG | |
| KB_INT . . . . . . . . . . . . . | L WORD | 0024 | IPAGE_SEG | |
| KNIT . . . . . . . . . . . . . . | L DWORD | 0A1B | _TEXT | |
| | | | | |
| LOCSTK . . . . . . . . . . . . . | L WORD | 0406 | _TEXT | |
| | | | | |
| MEMEND . . . . . . . . . . . . . | L BYTE | 0ACD | _TEXT | Length = 0020 |
| MEMTOP . . . . . . . . . . . . . | L WORD | 0016 | _DATA | |
| MLOOP . . . . . . . . . . . . . | L NEAR | 0D25 | _TEXT | |
| MSFUN . . . . . . . . . . . . . | L DWORD | 0C77 | _TEXT | Global |
| MTR_RESET . . . . . . . . . . . | L FAR | E05B | MTR_SEG | |
| MYDSEG . . . . . . . . . . . . . | L WORD | 0BA8 | _TEXT | Global |
| | | | | |
| NOROOM . . . . . . . . . . . . . | L BYTE | 06F8 | _DATA | |
| NOTAPPO . . . . . . . . . . . . | L BYTE | 0754 | _DATA | |
| NULL . . . . . . . . . . . . . . | L DWORD | 0000 | _DATA | |
| | | | | |
| OLDMS . . . . . . . . . . . . . | L DWORD | 0A27 | _TEXT | |
| | | | | |
| PAGEOUT . . . . . . . . . . . . | N PROC | 0BDB | _TEXT | Global Length = 0034 |
| PALETTE . . . . . . . . . . . . | L BYTE | 0406 | _TEXT | Length = 0011 |
| PARAM_TBL . . . . . . . . . . . | L DWORD | 0074 | IPAGE_SEG | |
| P01 . . . . . . . . . . . . . . | L NEAR | 0BDD | _TEXT | |
| POEM . . . . . . . . . . . . . . | L BYTE | 0728 | _DATA | |
| POERR . . . . . . . . . . . . . | L NEAR | 0C09 | _TEXT | |
| POPPED . . . . . . . . . . . . . | L NEAR | 0A7C | _TEXT | |
| POPR . . . . . . . . . . . . . . | N PROC | 0B4B | _TEXT | Global Length = 000F |
| PSTR1 . . . . . . . . . . . . . | L NEAR | 0B8C | _TEXT | |

| Symbol | Type | Address | Segment | Attributes |
|---|---|---|---|---|
| PSTR2 | L NEAR | 0B99 | _TEXT | |
| PUSHR | N PROC | 0B39 | _TEXT | Global Length = 0012 |
| RESEND | L BYTE | 0B39 | _TEXT | |
| S0 | L NEAR | 0C9D | _TEXT | |
| S1 | L NEAR | 0CE2 | _TEXT | |
| S1A | L NEAR | 0D00 | _TEXT | |
| S4 | L NEAR | 0D03 | _TEXT | |
| SAVBUF | L BYTE | 0417 | _TEXT | Length = 0600 |
| SBASE | L BYTE | 0000 | STACK | Length = 0400 |
| SEGSIZ | L WORD | 0C75 | _TEXT | Global |
| STKEND | L WORD | 1000 | STACK | Global |
| STKRSV | NUMBER | 0400 | | |
| STRT | F PROC | 0C7B | _TEXT | Global Length = 02E9 |
| STRTMS | L BYTE | 07A5 | _DATA | |
| SWAPMES | L BYTE | 082B | _DATA | |
| TIDLE | L DWORD | 0A1F | _TEXT | |
| TIMER_HI | L WORD | 006E | BIOS_SEG | |
| TIMER_LOW | L WORD | 006C | BIOS_SEG | |
| TSRSIZE | NUMBER | 00E5 | | Global |
| UNGET | L DWORD | 0A17 | _TEXT | |
| VECSIZ | NUMBER | 0200 | | |
| VECTBL | L WORD | 0018 | _DATA | Length = 0200 |
| XRERRJ | L NEAR | 0E9F | _TEXT | |
| XRMEM | L BYTE | 0804 | _DATA | |
| XRUNERR | L NEAR | 0F27 | _TEXT | |
| @0 | L NEAR | 0ABA | _TEXT | |
| @1 | L NEAR | 0C1C | _TEXT | |
| @2 | L NEAR | 0CAF | _TEXT | |
| @3 | L NEAR | 0E78 | _TEXT | |
| @4 | L NEAR | 0E90 | _TEXT | |
| @5 | L NEAR | 0EA2 | _TEXT | |
| @CPU | TEXT | 0101h | | |
| @FILENAME | TEXT | xrun | | |
| @VERSION | TEXT | 510 | | |
| _COMLEN | L WORD | 0443 | _DATA | Global |
| _COMLIN | L BYTE | 05FC | _DATA | Global Length = 002A |
| _COMPARSE | L NEAR | 0000 | _TEXT | External |
| _DBLK | L | 0517 | _DATA | Global |
| _DOPARSE | N PROC | 0FD3 | _TEXT | Global Length = 0016 |
| _EMMAVAIL | L WORD | 043F | _DATA | Global |
| _EMMFREE | N PROC | 0C0F | _TEXT | Global Length = 0013 |
| _EMMSETUP | N PROC | 0C22 | _TEXT | Global Length = 004F |
| _ERRABT | N PROC | 0B5A | _TEXT | Global Length = 0029 |
| _EXTAVAIL | L WORD | 0441 | _DATA | Global |
| _FCBCREAT | N PROC | 0FBB | _TEXT | Global Length = 0018 |
| _FCBOPEN | N PROC | 0FA3 | _TEXT | Global Length = 0018 |
| _GETSDIR | N PROC | 089D | _TEXT | Global Length = 000B |
| _MLEN | L WORD | 0014 | _DATA | |
| _MPSP | L WORD | 0012 | _DATA | |
| _ISEMM | N PROC | 0BAC | _TEXT | Global Length = 002F |
| _KEYWAIT | L WORD | 0000 | _TEXT | Global |
| _LOADFLG | L WORD | 0445 | _DATA | Global |
| _ONDISK | L WORD | 043D | _DATA | Global |
| _PNAME | L BYTE | 0447 | _DATA | Global Length = 0080 |
| _PRTSTR | N PROC | 0B83 | _TEXT | Global Length = 001A |
| _PSP | L WORD | 0010 | _DATA | Global |

```
_SETW1CNT . . . . . . . . . . . . .    N PROC   OFF5    _TEXT   Global  Length = 000C
_SETWCNT  . . . . . . . . . . . . .    N PROC   OFE9    _TEXT   Global  Length = 000C
_USIZE    . . . . . . . . . . . . .    V WORD   0000    _DATA   External
_USTKOFF  . . . . . . . . . . . . .    V WORD   0000    _DATA   External
_USTKSEG  . . . . . . . . . . . . .    V WORD   0000    _DATA   External
_USTRTOFF . . . . . . . . . . . . .    V WORD   0000    _DATA   External
_USTRTSEG . . . . . . . . . . . . .    V WORD   0000    _DATA   External
_WTCNT    . . . . . . . . . . . . .    L WORD   0002    _TEXT   Global
_WTCNT1   . . . . . . . . . . . . .    L WORD   0004    _TEXT   Global
__ACRTUSED . . . . . . . . . . . .     NUMBER   1234            Global 977 Source Lines
    977 Total  Lines
    254 Symbols 47146 + 281327 Bytes symbol space free 0 Warning Errors
    0 Severe  Errors
```

I claim:

1. A method for allocating RAM space for a communications program in a network environment, comprising the steps of:

loading a communications program into RAM;

determining the RAM space utilized by said communications program and the interrupt vector table associated therewith;

transferring said communications program to storage with said associated interrupt vector table;

reallocating the RAM space previously utilized by said communications program to a second program and running said second program;

monitoring the computer operation system while said second program is running until a call is initiated for said communications program, and trapping said call;

suspending processing of said second program in a manner allowing subsequent restart;

passing the portion of said second program in the RAM space used by said communications program to storage with its associated interrupt vector table in a manner allowing subsequent restart of said second program upon return of the portion of the program of said second program to RAM;

returning said communication program and interrupt vector table to at least the RAM space made available by said passing of said portion of said program;

monitoring said communications program for the initiation of a data transfer request thereby;

intercepting said request and interrogating said communications program to determine parameters associated with the data request and the handling thereby of said communications program;

duplicating said parameters in an assigned section of memory separate from that under the control of said communications program, allocating a data space of equal size to that indicated by said parameters and copying the controls of the data space of said communications program, if any;

modifying said duplicated parameters to permit received data to be passed to said new data space and transmitted data to be passed from said new data space;

passing the modified data request parameters on to the network operating system and commencing communications;

monitoring the data communication to await a completion signal from the network operating system; and returning said completion signal and said received data, if any, to said communications program.

2. The method of claim 1 further including the steps of:

transferring said communications program back to storage; and returning the portion of said second program in storage to RAM and reinstituting operation thereof;

said transferring and returning steps being performed during said data communication monitoring step, said communication program being returned to RAM prior to passing said completion signal and said received data, if any, thereto.

3. A method for controlling communication between a user program having an associated data space and a network operating system upon the initiation of a communications request by said user program, comprising the steps of:

intercepting the request;

said request by the user program to determine parameters associated with the request and the handling thereof by said user program;

duplicating said parameters in an assigned section of memory separate from that under the control of said user program, allocating a data space of equal size to that indicated by said parameters and copying the contents of the user program data space, modifying said duplicated parameters to permit received data to be passed to said new data space and transmitted data to be passed from said new data space;

passing the modified data request parameters on to the network operating system and commencing communication by the network operating system;

monitoring the data communication to await a completion signal from the network operating system; and copying said received data, if any, to the user program and notifying said user program of the completion of communications.

* * * * *